United States Patent
Klas et al.

(10) Patent No.: US 12,135,270 B2
(45) Date of Patent: Nov. 5, 2024

(54) MODULAR FLOW CYTOMETRY SYSTEMS AND METHODS OF PROCESSING SAMPLES

(71) Applicant: ABS Global, Inc., DeForest, WI (US)

(72) Inventors: Gary Klas, Madison, WI (US); Daniel McAda, Madison, WI (US); Zheng Xia, Middleton, WI (US); Matthew Ebersole, Sun Prairie, WI (US); Brian Lena, Sun Prairie, WI (US); David Appleyard, Madison, WI (US); Richard Lu, Sun Prairie, WI (US); Scott Buckley, Sun Prairie, WI (US); Mark Abermoske, Middleton, WI (US)

(73) Assignee: ABS GLOBAL, INC., Deforest, WI (US)

( * ) Notice: Subject to any disclaimer, the term of this patent is extended or adjusted under 35 U.S.C. 154(b) by 215 days.

(21) Appl. No.: 17/525,125

(22) Filed: Nov. 12, 2021

(65) Prior Publication Data

US 2022/0163438 A1    May 26, 2022

Related U.S. Application Data

(60) Provisional application No. 63/230,568, filed on Aug. 6, 2021, provisional application No. 63/162,222, filed
(Continued)

(51) Int. Cl.
*G01N 15/1404* (2024.01)
*B01L 3/00* (2006.01)
(Continued)

(52) U.S. Cl.
CPC .... *G01N 15/1404* (2013.01); *B01L 3/502761* (2013.01); *G01N 15/1484* (2013.01);
(Continued)

(58) Field of Classification Search
None
See application file for complete search history.

(56) References Cited

U.S. PATENT DOCUMENTS

| | | | |
|---|---|---|---|
| 3,390,449 | A | 7/1968 | Fox |
| 3,649,829 | A | 3/1972 | Randolph |

(Continued)

FOREIGN PATENT DOCUMENTS

| | | |
|---|---|---|
| CA | 1341328 C | 12/2001 |
| CN | 2125369 U | 12/1992 |

(Continued)

OTHER PUBLICATIONS

Thermofisher, Optics of a Flow Cytometer, Sep. 2020, ThermoFisher, https://www.thermofisher.com/us/en/home/life-science/cell-analysis/cell-analysis-learning-center/molecular-probes-school-of-fluorescence/flow-cytometry-basics/flow-cytometry-fundamentals/optics-flow-cytometer.html (Year: 2020).*

(Continued)

*Primary Examiner* — Maris R Kessel
*Assistant Examiner* — Mickey Huang
(74) *Attorney, Agent, or Firm* — NGUYEN TARBET IP LAW

(57) ABSTRACT

Modular flow cytometry systems and methods for processing samples are described herein. The systems include automated or semi-automated modules that are replaceable and removable. A sample pathway module may be removed and placed in a microfluidic device cleaning module for cleaning, and then reinstalled or stored for later use. The systems further include optical modules, electronics modules, and mixing and collection modules. The optical module includes a photo-damaging assembly and detection laser assembly that may be on the same side relative to a plane or surface of a flow cytometry device and opposite of a (Continued)

detection assembly. The laser beam may have a beam waist that is wider in a direction perpendicular to a flow direction than in the flow direction. The mixing and collection module can automatically mix a sample being collected in a sample tube and switch to another sample tube when the other tube is full.

8 Claims, 45 Drawing Sheets

Related U.S. Application Data on Mar. 17, 2021, provisional application No. 63/119,769, filed on Dec. 1, 2020, provisional application No. 63/117,104, filed on Nov. 23, 2020.

(51) Int. Cl.
*G01N 15/10* (2024.01)
*G01N 15/14* (2024.01)

(52) U.S. Cl.
CPC . *B01L 2200/028* (2013.01); *B01L 2200/0652* (2013.01); *B01L 2200/10* (2013.01); *G01N 2015/1006* (2013.01)

(56) References Cited

U.S. PATENT DOCUMENTS

| | | | |
|---|---|---|---|
| 3,661,460 A | 5/1972 | Elking et al. |
| 3,710,933 A | 1/1973 | Fulwyler et al. |
| 3,764,901 A | 10/1973 | Kachel |
| 3,791,517 A | 2/1974 | Friedman |
| 4,175,662 A | 11/1979 | Zold |
| 4,325,706 A | 4/1982 | Gershman et al. |
| 4,395,397 A | 7/1983 | Shapiro |
| 4,409,106 A | 10/1983 | Furuta et al. |
| 4,424,132 A | 1/1984 | Iriguchi |
| 4,660,971 A | 4/1987 | Sage et al. |
| 4,667,830 A | 5/1987 | Nozaki, Jr. et al. |
| 4,765,737 A | 8/1988 | Harris et al. |
| 4,885,473 A | 12/1989 | Shofner et al. |
| 4,919,817 A | 4/1990 | Schoendorfer et al. |
| 4,983,038 A | 1/1991 | Ohki et al. |
| 5,007,732 A | 4/1991 | Ohki et al. |
| 5,030,002 A | 7/1991 | North, Jr. |
| 5,100,627 A | 3/1992 | Buican et al. |
| 5,125,749 A | 6/1992 | Leugers et al. |
| 5,135,759 A | 8/1992 | Johnson |
| 5,180,065 A | 1/1993 | Touge et al. |
| 5,194,909 A | 3/1993 | Tycko |
| 5,229,297 A | 7/1993 | Schnipelsky et al. |
| 5,483,469 A | 1/1996 | Van den Engh et al. |
| 5,491,550 A | 2/1996 | Dabbs |
| 5,620,857 A | 4/1997 | Weetall et al. |
| 5,674,743 A | 10/1997 | Ulmer |
| 5,689,109 A | 11/1997 | Schütze |
| 5,752,606 A | 5/1998 | Wilson et al. |
| 5,800,690 A | 9/1998 | Chow et al. |
| 5,837,115 A | 11/1998 | Austin et al. |
| 5,849,178 A | 12/1998 | Holm et al. |
| 5,858,187 A | 1/1999 | Ramsey et al. |
| 5,879,625 A | 3/1999 | Rosianiec et al. |
| 5,966,457 A | 10/1999 | Lemelson |
| 5,976,885 A | 11/1999 | Cohenford |
| 5,985,216 A | 11/1999 | Rens et al. |
| 6,008,010 A | 12/1999 | Greenberger et al. |
| 6,053,856 A | 4/2000 | Hlavinka |
| 6,071,442 A | 6/2000 | Dean et al. |
| 6,146,897 A | 11/2000 | Cohenford et al. |
| 6,159,739 A | 12/2000 | Weigl et al. |
| 6,159,749 A | 12/2000 | Liu |
| 6,171,865 B1 | 1/2001 | Weigl et al. |
| 6,185,664 B1 | 2/2001 | Jeddeloh |
| 6,213,151 B1 | 4/2001 | Jacobson et al. |
| H1960 H | 6/2001 | Conrad et al. |
| 6,368,871 B1 | 4/2002 | Christel et al. |
| 6,416,190 B1 | 7/2002 | Grier et al. |
| 6,416,959 B1 | 7/2002 | Giuliano et al. |
| 6,432,630 B1 | 8/2002 | Blankenstein |
| 6,451,264 B1 | 9/2002 | Bhullar et al. |
| 6,473,171 B1 | 10/2002 | Buttry et al. |
| 6,494,230 B2 | 12/2002 | Chow |
| 6,506,609 B1 | 1/2003 | Wada |
| 6,519,032 B1 | 2/2003 | Kuebler et al. |
| 6,519,954 B1 | 2/2003 | Prien et al. |
| 6,524,860 B1 | 2/2003 | Seidel et al. |
| 6,540,895 B1 | 4/2003 | Spence et al. |
| 6,549,275 B1 | 4/2003 | Cabuz et al. |
| 6,592,821 B1 | 7/2003 | Wada et al. |
| 6,637,463 B1 | 10/2003 | Lei et al. |
| 6,674,525 B2 | 1/2004 | Bardell et al. |
| 6,727,451 B1 | 4/2004 | Fuhr et al. |
| 6,808,075 B2 | 10/2004 | Böhm et al. |
| 6,833,542 B2 | 12/2004 | Wang et al. |
| 6,838,056 B2 | 1/2005 | Foster |
| 6,841,388 B2 | 1/2005 | Dukor et al. |
| 6,853,654 B2 | 2/2005 | Mcdonald et al. |
| 6,877,528 B2 | 4/2005 | Gilbert et al. |
| 6,944,324 B2 | 9/2005 | Tran et al. |
| 6,976,590 B2 | 12/2005 | Deshpande et al. |
| 7,029,430 B2 | 4/2006 | Hlavinka et al. |
| 7,069,943 B2 | 7/2006 | Gilbert et al. |
| 7,092,154 B2 | 8/2006 | Yasuda et al. |
| 7,104,405 B2 | 9/2006 | Böhm et al. |
| 7,195,920 B2 | 3/2007 | Seidel et al. |
| 7,208,265 B1 | 4/2007 | Schenk |
| 7,241,988 B2 | 7/2007 | Gruber et al. |
| 7,276,701 B2 | 10/2007 | Lendl |
| 7,298,478 B2 | 11/2007 | Gilbert et al. |
| 7,300,803 B2 | 11/2007 | Lin et al. |
| 7,311,476 B2 | 12/2007 | Gilbert et al. |
| 7,312,085 B2 | 12/2007 | Chou et al. |
| 7,355,696 B2 | 4/2008 | Mueth et al. |
| 7,355,699 B2 | 4/2008 | Gilbert et al. |
| 7,466,734 B1 | 12/2008 | Day et al. |
| 7,472,794 B2 | 1/2009 | Oakey et al. |
| 7,482,577 B2 | 1/2009 | Gruber et al. |
| 7,492,522 B2 | 2/2009 | Gilbert et al. |
| 7,524,681 B2 | 4/2009 | Wolf et al. |
| 7,569,788 B2 | 8/2009 | Deshpande et al. |
| 7,576,861 B2 | 8/2009 | Gilbert et al. |
| 7,584,857 B2 | 9/2009 | Böhm et al. |
| 7,611,309 B2 | 11/2009 | Gilbert et al. |
| 7,670,471 B2 | 3/2010 | Quake et al. |
| 7,697,576 B2 | 4/2010 | Maier et al. |
| 7,758,811 B2 | 7/2010 | Durack et al. |
| 7,760,351 B2 | 7/2010 | Cox et al. |
| 7,820,425 B2 | 10/2010 | Schenk |
| 7,826,509 B2 | 11/2010 | Belkin et al. |
| 7,956,328 B2 | 6/2011 | Sundaram et al. |
| 7,963,399 B2 | 6/2011 | Böhm et al. |
| 7,997,831 B2 | 8/2011 | Gilbert et al. |
| 8,032,200 B2 | 10/2011 | Tearney et al. |
| 8,080,422 B2 | 12/2011 | Neas et al. |
| 8,123,044 B2 | 2/2012 | Johnson et al. |
| 8,149,402 B2 | 4/2012 | Rich |
| 8,158,122 B2 | 4/2012 | Hampson et al. |
| 8,173,001 B2 | 5/2012 | Quake et al. |
| 8,174,394 B2 | 5/2012 | Ridder et al. |
| 8,198,092 B2 | 6/2012 | Durack et al. |
| 8,206,987 B2 | 6/2012 | Durack et al. |
| 8,209,987 B2 | 7/2012 | Hautman et al. |
| 8,210,209 B2 | 7/2012 | Gilbert et al. |
| 8,277,764 B2 | 10/2012 | Gilbert et al. |
| 8,388,822 B2 | 3/2013 | Quake et al. |
| 8,408,399 B2 | 4/2013 | Böhm et al. |
| 8,502,148 B2 | 8/2013 | Wagner et al. |
| 8,529,161 B2 | 9/2013 | Gilbert et al. |
| 8,563,325 B1 | 10/2013 | Bartsch et al. |
| 8,567,608 B2 | 10/2013 | Deshpande et al. |
| 8,569,069 B2 | 10/2013 | Durack |
| 8,623,295 B2 | 1/2014 | Gilbert et al. |

(56) References Cited

U.S. PATENT DOCUMENTS

| | | |
|---|---|---|
| 8,727,131 B2 | 5/2014 | Deshpande et al. |
| 8,731,860 B2 | 5/2014 | Charles et al. |
| 8,863,962 B2 | 10/2014 | Johnson et al. |
| 8,941,062 B2 | 1/2015 | Wagner et al. |
| 8,961,904 B2 | 2/2015 | Xia et al. |
| 8,964,184 B2 | 2/2015 | Gilbert et al. |
| 8,981,298 B2 | 3/2015 | Wagner et al. |
| 9,000,357 B2 | 4/2015 | Mueth et al. |
| 9,003,869 B2 | 4/2015 | Wagner et al. |
| 9,011,797 B2 | 4/2015 | Gilbert et al. |
| 9,109,195 B2 | 8/2015 | Zimmermann et al. |
| 9,140,690 B2 | 9/2015 | Mueth et al. |
| 9,255,874 B2 | 2/2016 | Sharpe et al. |
| 9,260,693 B2 | 2/2016 | Johnson et al. |
| 9,335,247 B2 | 5/2016 | Sharpe et al. |
| 9,335,295 B2 | 5/2016 | Mueth et al. |
| 9,339,850 B2 | 5/2016 | Deshpande et al. |
| 9,365,822 B2 | 6/2016 | Seidel et al. |
| 9,377,400 B2 | 6/2016 | Wagner et al. |
| 9,446,912 B2 | 9/2016 | Gilbert et al. |
| 9,485,984 B2 | 11/2016 | Burbank et al. |
| 9,550,215 B2 | 1/2017 | Deshpande et al. |
| 9,588,100 B2 | 3/2017 | Appleyard et al. |
| 9,618,442 B2 | 4/2017 | Sharpe et al. |
| 9,683,922 B2 | 6/2017 | Wagner et al. |
| D791,338 S | 7/2017 | Morkos et al. |
| 9,752,976 B2 | 9/2017 | Gilbert et al. |
| 9,781,918 B2 | 10/2017 | Zimmermann et al. |
| 9,802,767 B2 | 10/2017 | Gilbert et al. |
| 9,823,252 B2 | 11/2017 | Gilbert et al. |
| 9,835,552 B2 | 12/2017 | Wagner |
| D815,754 S | 4/2018 | Morkos et al. |
| 9,943,847 B2 | 4/2018 | Gilbert et al. |
| 9,964,968 B2 | 5/2018 | Sharpe et al. |
| 10,025,322 B2 | 7/2018 | Lofstrom et al. |
| 10,029,283 B2 | 7/2018 | Deshpande et al. |
| 10,175,159 B2 | 1/2019 | Wagner et al. |
| 10,180,388 B2 | 1/2019 | Wagner |
| 10,216,144 B2 | 2/2019 | Mueth et al. |
| 10,315,194 B2 | 6/2019 | Akiyama et al. |
| 11,187,224 B2 | 11/2021 | Xia et al. |
| 11,193,879 B2 | 12/2021 | Wagner et al. |
| 11,243,494 B2 | 2/2022 | Mueth et al. |
| 2002/0005354 A1 | 1/2002 | Spence et al. |
| 2002/0027649 A1 | 3/2002 | Chudner |
| 2002/0042042 A1 | 4/2002 | Fahy |
| 2002/0058332 A1 | 5/2002 | Quake et al. |
| 2002/0106716 A1 | 8/2002 | Leboeuf et al. |
| 2002/0115208 A1 | 8/2002 | Mitchell et al. |
| 2002/0176069 A1 | 11/2002 | Hansen et al. |
| 2002/0198928 A1 | 12/2002 | Bukshpan et al. |
| 2003/0007894 A1 | 1/2003 | Wang et al. |
| 2003/0032204 A1 | 2/2003 | Walt et al. |
| 2003/0044832 A1 | 3/2003 | Blankenstein |
| 2003/0054365 A1 | 3/2003 | Xu et al. |
| 2003/0054558 A1 | 3/2003 | Kurabayashi et al. |
| 2003/0068646 A1 | 4/2003 | Singh et al. |
| 2003/0047676 A1 | 6/2003 | Grier et al. |
| 2003/0113709 A1 | 6/2003 | Alivisatos et al. |
| 2003/0175944 A1 | 9/2003 | Yang et al. |
| 2003/0175980 A1 | 9/2003 | Hayenga et al. |
| 2003/0186426 A1 | 10/2003 | Brewer et al. |
| 2004/0043506 A1 | 3/2004 | Haussecker et al. |
| 2004/0079893 A1 | 4/2004 | Dietz et al. |
| 2004/0089798 A1 | 5/2004 | Gruber et al. |
| 2004/0144648 A1 | 7/2004 | Jacobson et al. |
| 2004/0161772 A1 | 8/2004 | Bohm et al. |
| 2004/0166504 A1 | 8/2004 | Rossier et al. |
| 2004/0206399 A1 | 10/2004 | Heller et al. |
| 2004/0217297 A1 | 11/2004 | Moses et al. |
| 2004/0229349 A1 | 11/2004 | Daridon |
| 2004/0266022 A1 | 12/2004 | Sundararajan et al. |
| 2005/0037471 A1 | 2/2005 | Liu et al. |
| 2005/0061962 A1 | 3/2005 | Mueth et al. |
| 2005/0103690 A1 | 5/2005 | Kawano et al. |
| 2005/0112541 A1 | 5/2005 | Durack et al. |
| 2005/0121604 A1 | 6/2005 | Mueth et al. |
| 2005/0123450 A1 | 6/2005 | Gilbert et al. |
| 2005/0124869 A1 | 6/2005 | Hefti et al. |
| 2005/0148085 A1 | 7/2005 | Larsen |
| 2005/0153354 A1 | 7/2005 | Gilmanshin |
| 2005/0190372 A1 | 9/2005 | Dogariu |
| 2005/0196876 A1 | 9/2005 | Chan et al. |
| 2005/0207940 A1 | 9/2005 | Butler et al. |
| 2005/0207943 A1 | 9/2005 | Puzey |
| 2006/0013270 A1 | 1/2006 | Yumoto et al. |
| 2006/0035273 A1 | 2/2006 | Quake et al. |
| 2006/0043301 A1 | 3/2006 | Mantele et al. |
| 2006/0058167 A1 | 3/2006 | Ragusa et al. |
| 2006/0078888 A1 | 4/2006 | Griffiths et al. |
| 2006/0105453 A1 | 5/2006 | Brenan et al. |
| 2006/0152707 A1 | 7/2006 | Kanda |
| 2006/0170912 A1 | 8/2006 | Mueth et al. |
| 2006/0252047 A1 | 11/2006 | Ekstrom et al. |
| 2006/0257089 A1 | 11/2006 | Mueth et al. |
| 2006/0263829 A1 | 11/2006 | Evans et al. |
| 2007/0009386 A1 | 1/2007 | Padmanabhan et al. |
| 2007/0078348 A1 | 4/2007 | Holman |
| 2007/0114172 A1 | 5/2007 | Mueth et al. |
| 2007/0128082 A1 | 6/2007 | Yang et al. |
| 2007/0207551 A1 | 9/2007 | Glensbjerg |
| 2007/0247620 A1 | 10/2007 | Koo |
| 2007/0248958 A1 | 10/2007 | Jovanovich et al. |
| 2007/0255362 A1 | 11/2007 | Levinson |
| 2008/0003685 A1 | 1/2008 | Goix et al. |
| 2008/0014574 A1 | 1/2008 | Viator et al. |
| 2008/0021674 A1 | 1/2008 | Puskas |
| 2008/0069733 A1 | 3/2008 | Maltezo et al. |
| 2008/0144037 A1 | 6/2008 | Mueth et al. |
| 2008/0166188 A1 | 7/2008 | Gilbert et al. |
| 2008/0195020 A1 | 8/2008 | Cabuz et al. |
| 2008/0213821 A1 | 9/2008 | Liu et al. |
| 2008/0248966 A1 | 10/2008 | Hansen et al. |
| 2008/0261295 A1 | 10/2008 | Butler et al. |
| 2008/0292555 A1 | 11/2008 | Ye et al. |
| 2008/0299013 A1 | 12/2008 | Trieu et al. |
| 2008/0309919 A1 | 12/2008 | Birmingham et al. |
| 2008/0311005 A1 | 12/2008 | Kim et al. |
| 2009/0004652 A1 | 1/2009 | Rubin et al. |
| 2009/0029870 A1 | 1/2009 | Ward et al. |
| 2009/0032449 A1 | 2/2009 | Mueth et al. |
| 2009/0042241 A1 | 2/2009 | Yu-Chong et al. |
| 2009/0051912 A1 | 2/2009 | Salazar et al. |
| 2009/0114285 A1 | 5/2009 | Hashimoto et al. |
| 2009/0125242 A1 | 5/2009 | Choi et al. |
| 2009/0141279 A1 | 6/2009 | Hillmer |
| 2009/0156932 A1 | 6/2009 | Zharov |
| 2009/0170149 A1 | 7/2009 | Viator et al. |
| 2009/0176271 A1 | 7/2009 | Durack et al. |
| 2009/0201504 A1 | 8/2009 | Ho et al. |
| 2009/0225319 A1 | 9/2009 | Lee et al. |
| 2009/0281250 A1 | 11/2009 | DeSimone et al. |
| 2009/0290156 A1 | 11/2009 | Popescu et al. |
| 2010/0044570 A1 | 2/2010 | McGill et al. |
| 2010/0068723 A1 | 3/2010 | Jovanovich et al. |
| 2010/0079516 A1 | 4/2010 | Nakazawa |
| 2010/0167336 A1 | 7/2010 | Son et al. |
| 2010/0171954 A1 | 7/2010 | Quake et al. |
| 2010/0216208 A1 | 8/2010 | Mueth et al. |
| 2010/0248362 A1 | 9/2010 | Durack et al. |
| 2010/0330693 A1 | 12/2010 | Chapin et al. |
| 2011/0001963 A1 | 1/2011 | Durack |
| 2011/0003303 A1 | 1/2011 | Pagano et al. |
| 2011/0003324 A1 | 1/2011 | Durack |
| 2011/0003325 A1 | 1/2011 | Durack |
| 2011/0003330 A1 | 1/2011 | Durack |
| 2011/0008764 A1 | 1/2011 | Silva et al. |
| 2011/0008767 A1 | 1/2011 | Durack |
| 2011/0008817 A1 | 1/2011 | Durack |
| 2011/0008818 A1 | 1/2011 | Durack |
| 2011/0075928 A1 | 3/2011 | Jeong et al. |
| 2011/0076712 A1 | 3/2011 | Gilligan et al. |
| 2011/0090500 A1 | 4/2011 | Hu et al. |
| 2011/0096327 A1 | 4/2011 | Papautsky et al. |

(56) References Cited

U.S. PATENT DOCUMENTS

| | | |
|---|---|---|
| 2011/0190146 A1 | 8/2011 | Boehm et al. |
| 2011/0223654 A1 | 9/2011 | Holman et al. |
| 2011/0256523 A1 | 10/2011 | Mendele et al. |
| 2011/0263747 A1 | 10/2011 | Doyle et al. |
| 2011/0294139 A1 | 12/2011 | Takeda |
| 2012/0009619 A1 | 1/2012 | Gilbert et al. |
| 2012/0028366 A1 | 2/2012 | Krager et al. |
| 2012/0033220 A1 | 2/2012 | Kotidis et al. |
| 2012/0033697 A1 | 2/2012 | Goyal et al. |
| 2012/0081709 A1 | 4/2012 | Durack |
| 2012/0082362 A1 | 4/2012 | Diem et al. |
| 2012/0107805 A1 | 5/2012 | Neas et al. |
| 2012/0122084 A1 | 5/2012 | Wagner et al. |
| 2012/0138152 A1 | 6/2012 | Villarruel et al. |
| 2012/0183947 A1 | 7/2012 | Arryx |
| 2012/0196356 A1 | 8/2012 | Wagner et al. |
| 2012/0199741 A1 | 8/2012 | Wagner et al. |
| 2012/0199742 A1 | 8/2012 | Wagner et al. |
| 2012/0202237 A1 | 8/2012 | Sedoglavich et al. |
| 2012/0202277 A1 | 8/2012 | Wagner et al. |
| 2012/0202278 A1 | 8/2012 | Wagner et al. |
| 2012/0204628 A1 | 8/2012 | Wagner et al. |
| 2012/0225474 A1 | 9/2012 | Wagner et al. |
| 2012/0225475 A1 | 9/2012 | Wagner et al. |
| 2012/0273054 A1 | 11/2012 | Lou et al. |
| 2012/0287419 A1 | 11/2012 | Sharpe et al. |
| 2012/0295263 A1 | 11/2012 | Cantor et al. |
| 2012/0307244 A1 | 12/2012 | Sharpe et al. |
| 2013/0121877 A1 | 5/2013 | Ono |
| 2013/0164731 A1 | 6/2013 | Cimino et al. |
| 2013/0164773 A1 | 6/2013 | Bardell et al. |
| 2013/0200277 A1 | 8/2013 | Li et al. |
| 2013/0224843 A1 | 8/2013 | Evans et al. |
| 2013/0252237 A1 | 9/2013 | Wagner |
| 2013/0295602 A1 | 11/2013 | Fowler et al. |
| 2013/0313170 A1 | 11/2013 | Bohm et al. |
| 2014/0033808 A1 | 2/2014 | Ding et al. |
| 2014/0050540 A1 | 2/2014 | Gilbert et al. |
| 2014/0091014 A1 | 4/2014 | Wagner et al. |
| 2014/0224710 A1 | 8/2014 | Di Carlo et al. |
| 2014/0273192 A1 | 9/2014 | Sharpe et al. |
| 2014/0287243 A1 | 9/2014 | Weber et al. |
| 2014/0318645 A1 | 10/2014 | Koksal et al. |
| 2014/0339446 A1 | 11/2014 | Yamamoto et al. |
| 2014/0361148 A1 | 12/2014 | Popescu et al. |
| 2015/0064694 A1 | 3/2015 | Sadri |
| 2015/0114093 A1 | 4/2015 | Appleyard et al. |
| 2015/0192511 A1 | 7/2015 | Wagner et al. |
| 2015/0198517 A1 | 7/2015 | Simpson et al. |
| 2015/0276588 A1 | 10/2015 | Marshall et al. |
| 2015/0331429 A1* | 11/2015 | Lofstrom ............. G05D 7/0617 137/565.26 |
| 2016/0004060 A1 | 1/2016 | Simpson et al. |
| 2016/0123858 A1 | 5/2016 | Kapur et al. |
| 2016/0199835 A1 | 7/2016 | Tachibana et al. |
| 2016/0303563 A1* | 10/2016 | Granier ................. G01N 21/78 |
| 2016/0368003 A1* | 12/2016 | Vester .................... B04B 11/04 |
| 2017/0016813 A1 | 1/2017 | Wagner |
| 2017/0181425 A1 | 6/2017 | Burbank et al. |
| 2017/0307505 A1 | 10/2017 | Vrane et al. |
| 2017/0333902 A1 | 11/2017 | Masaeli et al. |
| 2018/0266937 A1 | 9/2018 | de Wagenaar et al. |
| 2019/0025212 A1 | 1/2019 | Evans |
| 2019/0040356 A1 | 2/2019 | Durack et al. |
| 2019/0071725 A1 | 3/2019 | Roti-Roti et al. |
| 2019/0137931 A1* | 5/2019 | Mueth .................. G03H 1/0005 |
| 2019/0160439 A1 | 5/2019 | Muto et al. |
| 2019/0187044 A1 | 6/2019 | Appleyard et al. |
| 2019/0382720 A1 | 12/2019 | Savage et al. |
| 2019/0390164 A1 | 12/2019 | Morjal et al. |
| 2020/0070152 A1 | 3/2020 | Kasai et al. |
| 2022/0025443 A1 | 1/2022 | Korani et al. |
| 2022/0026341 A1 | 1/2022 | Appleyard et al. |

FOREIGN PATENT DOCUMENTS

| | | |
|---|---|---|
| CN | 1482369 A | 3/2004 |
| CN | 1886315 | 12/2006 |
| CN | 101189504 A | 5/2008 |
| CN | 104862273 A | 8/2015 |
| CN | 1910441 A | 2/2017 |
| CN | 105940301 A | 6/2017 |
| CN | 101201313 A | 6/2018 |
| CN | 109221081 A | 1/2019 |
| CN | 109497040 A | 3/2019 |
| CN | 109517787 A | 3/2019 |
| EP | 0057907 | 8/1982 |
| EP | 0282994 | 9/1988 |
| EP | 0679325 | 11/1995 |
| EP | 0471758 B1 | 9/1996 |
| FR | 2798557 | 3/2001 |
| GB | 502971 A | 3/1939 |
| GB | 2507959 A | 5/2014 |
| JP | 57131451 | 8/1982 |
| JP | 58090513 | 5/1983 |
| JP | S6426125 A | 1/1989 |
| JP | 64074451 | 3/1989 |
| JP | H02105041 A | 4/1990 |
| JP | 03297385 | 12/1991 |
| JP | H0526799 | 2/1993 |
| JP | 06265452 | 9/1994 |
| JP | 06327494 | 11/1994 |
| JP | 07024309 | 1/1995 |
| JP | H07286953 A | 10/1995 |
| JP | 2552582 | 11/1996 |
| JP | H10512952 A | 12/1998 |
| JP | H11508182 | 7/1999 |
| JP | 2000146819 A | 5/2000 |
| JP | 2000512541 | 9/2000 |
| JP | 2001504936 | 4/2001 |
| JP | 2002503334 | 1/2002 |
| JP | UP2002153260 | 5/2002 |
| JP | 2003106980 A | 4/2003 |
| JP | 2003515738 A | 5/2003 |
| JP | 2004093553 A | 3/2004 |
| JP | 2005502482 | 1/2005 |
| JP | 2005530986 A | 10/2005 |
| JP | 2006524054 A | 10/2006 |
| JP | 2007148981 | 6/2007 |
| JP | 2007514522 A | 6/2007 |
| JP | 2007515936 A | 6/2007 |
| JP | 2008533440 A | 8/2008 |
| JP | 2008261295 A | 10/2008 |
| JP | 2009085872 A | 4/2009 |
| JP | 2009115672 A | 5/2009 |
| JP | 2009162660 A | 7/2009 |
| JP | 2010117197 A | 5/2010 |
| JP | 2010151777 A | 7/2010 |
| JP | 2010190680 A | 9/2010 |
| JP | 2011145185 | 7/2011 |
| JP | 2014503195 A | 2/2014 |
| WO | WO9622521 A1 | 7/1996 |
| WO | WO9700442 | 1/1997 |
| WO | WO1997030338 A1 | 8/1997 |
| WO | WO9739338 | 10/1997 |
| WO | WO9747390 | 12/1997 |
| WO | WO9810267 | 3/1998 |
| WO | WO99/39223 | 8/1999 |
| WO | WO0070080 A1 | 11/2000 |
| WO | WO0118400 | 3/2001 |
| WO | WO0131315 | 5/2001 |
| WO | WO2001040766 A1 | 6/2001 |
| WO | WO0185913 A2 | 11/2001 |
| WO | WO2002006778 A1 | 1/2002 |
| WO | WO0241906 A2 | 5/2002 |
| WO | WO02081183 A1 | 10/2002 |
| WO | WO02087792 | 11/2002 |
| WO | WO03024163 | 3/2003 |
| WO | WO03062867 | 7/2003 |
| WO | WO03078065 | 9/2003 |
| WO | WO2004012133 A2 | 2/2004 |
| WO | WO2004029221 | 4/2004 |
| WO | WO2004043506 A1 | 5/2004 |

(56) References Cited

FOREIGN PATENT DOCUMENTS

| | | |
|---|---|---|
| WO | WO2004088283 A3 | 10/2004 |
| WO | WO2005023391 A3 | 3/2005 |
| WO | WO2005037471 A1 | 4/2005 |
| WO | WO2005075629 A1 | 8/2005 |
| WO | WO2006119806 A1 | 11/2006 |
| WO | WO2007008495 A2 | 1/2007 |
| WO | WO2007133710 A2 | 11/2007 |
| WO | WO2008114458 A1 | 9/2008 |
| WO | WO2008126064 A2 | 10/2008 |
| WO | WO2008130977 A2 | 10/2008 |
| WO | WO2009032449 A1 | 3/2009 |
| WO | WO2009134395 A2 | 11/2009 |
| WO | WO2010129441 | 11/2010 |
| WO | WO2012068287 A3 | 5/2012 |
| WO | WO2012112641 A1 | 8/2012 |
| WO | WO2013018273 A1 | 2/2013 |
| WO | WO2013173446 A1 | 11/2013 |
| WO | 2015038494 | 3/2015 |
| WO | WO2015063552 A2 | 5/2015 |
| WO | WO2018047011 A2 | 3/2018 |
| WO | WO2018151680 A1 | 8/2018 |
| WO | WO2020092321 A1 | 5/2020 |
| WO | WO2020182193 A1 | 9/2020 |

OTHER PUBLICATIONS

De Novo, Flow Cytometery: a basic introduction, Sep. 2019, De Novo, Chapter 2: The Flow cytometer, https://flowbook.denovosoftware.com/chapter-2-flow-cytometer (Year: 2019).*

Kang, et al. "Effect of an osmotic differential on the efficiency of gene transfer by electroporation of fish spermatozoa." Aquaculture 173.1-4 (1999): 297-307. (Year: 1999).

Rieth et al. "Electroporation of bovine spermatozoa to carry DNA containing highly repetitive sequences into oocytes and detection of homologous recombination events." Molecular Reproduction and Development: Incorporating Gamete Research 57.4 (2000): 338-345.

Chamberland et al. "The effect of heparin on motility parameters and protein phosphorylation during bovine sperm capacitation." Theriogenology 55.3 (2001): 823-835. (Year: 2001).

Chan, et al. "Luminescent quantum dots for multiplexed biological detection and imaging." Current opinion in biotechnology 13.1 (2002): 40-46. (Year: 2002).

USPTO, "Non-Final Office Action," issued in connection with U.S. Appl. No. 16/561,146, dated Jan. 21, 2022, 14 pages.

USPTO, "Non-Final Office Action," issued in connection with U.S. Appl. No. 17/496,469, dated Jan. 28, 2022, 13 pages.

USPTO, "Notice of Allowance," issued in connection with U.S. Appl. No. 16/864,514, mailed Jan. 3, 2022, 24 pages.

USPTO, "Notice of Allowance," issued in connection with U.S. Appl. No. 16/419,756, mailed Jan. 12, 2022, 16 pages.

USPTO, "Non-Final Office Action," issued in connection with U.S. Appl. No. 16/852,303, dated Jan. 6, 2022, 27 pages.

Intellectual Property India, "Examination Report," issued in connection with Indian Patent Application No. 202147003036, mailed Jan. 4, 2022, 5 pages.

Di Carlo, "Inertial microfluidics." Lab on a Chip 9.21 (2009): 3038-3046.

Intellectual Property India, "Examination Report," issued in connection with Indian Patent Application No. 202017054203, mailed Jan. 7, 2022, 5 pages.

USPTO, "Non-Final Office Action," issued in connection with U.S. Appl. No. 16/741,608, dated Mar. 18, 2022, 12 pages.

USPTO, "Notice of Allowance," issued in connection with U.S. Appl. No. 17/412,789, mailed Mar. 21, 2022, 30 pages.

USPTO, "Notice of Allowance," issued in connection with U.S. Appl. No. 17/458,947, dated Mar. 31, 2022, 30 pages.

USPTO, "Final Office Action," issued in connection with U.S. Appl. No. 16/741,608, dated Jun. 13, 2022, 11 pages.

USPTO, "Non-Final Office Action," issued in connection with U.S. Appl. No. 17/403,642, dated Jul. 13, 2022, 7 pages.

CNIPA, "First Office Action," issued in connection with Chinese Patent Application No. 202080028183.1, mailed Jul. 6, 2022, 21 pages.

USPTO, "Final Office Action," issued in connection with U.S. Appl. No. 16/852,303, dated May 27, 2022, 48 pages.

USPTO, "Non-Final Office Action," issued in connection with U.S. Appl. No. 16/279,430, dated May 23, 2022, 14 pages.

European Patent Office, "Examination Report," issued in connection with patent application No. 20167363.9, mailed Mar. 22, 2022, 4 pages.

European Patent Office, "Examination Report," issued in connection with patent application No. 19182993.6, mailed May 10, 2022, 8 pages.

International Search Report and Written Opinion for Application Serial No. PCT/US2021/059148, dated May 4, 2022, 15 pages.

European Patent Office, "Communication under Rule 71(3) EPC," issued in connection with European Patent Application No. 16723498.8, mailed May 18, 2022, 54 pages.

IP Australia, "Notice of Acceptance for Patent Application," issued in connection with Australian Patent Application No. 2021200818, mailed Jun. 1, 2022, 3 pages.

USPTO, "Non-Final Office Action," issued in connection with U.S. Appl. No. 17/496,614, dated Dec. 21, 2022, 9 pages.

USPTO, "Non-Final Office Action," issued in connection with U.S. Appl. No. 16/852,303, dated Jan. 9, 2023, 30 pages.

European Patent Office, "European Search Report," issued in connection with European Patent Application No. 20792020.8, mailed Dec. 23, 2022, 10 pages.

Brazilian Office Action, Application No. BR112020023607-1, mailed Dec. 12, 2022, 5 pages.

Ron Bardell et al. "Microfluidic disposables for cellular and chemical detection: CFD model results and fluidic verification experiments," Proc. SPIE 4265, Biomedical Instrumentation Based on Micro- and Nanotechnology, May 21, 2001; doi: 10.1117/12.427961 Invited Paper: BiOS 2001 The International Symposium on Biomedical Optics, 2001, San Jose, CA, United States, 14 pages.

New Zealand IP Office, "First Examination Report," issued in connection with New Zealand Patent Application No. 751869, mailed Aug. 12, 2022, 3 pages.

Canadian Office Action, Application No. 3,034,007, mailed Aug. 25, 2022, 3 pages.

Jokinen, Ville, et al. "Durable superhydrophobicity in embossed CYTOP fluoropolymer micro and nanostructures", Colloids and Surfaces A: Physicochemical and Engineering Aspects, vol. 434, 2013, pp. 207-212.

Forsberg et al. "Cassie-Wenzel and Wenzel-Cassie transitions on immersed superhydrophobic surfaces under hydrostatic pressure", Soft Matter, vol. 7, No. 1, 2011, pp. 104-109.

Lu et al. "Photochemical reactions and on-line UV detection in microfabricated reactors", Lab on a Chip, vol. 1, No. 1, 2001, pp. 22-28.

Japan Patent Office, "Office Action," issued in connection with Japanese Patent Application No. 2019-513891, Jun. 17, 2021, 11 pages.

Brazilian Office Action, Application No. BR112019004727-1, mailed Jul. 6, 2021, 4 pages.

Australian Office Action, Application No. 2017323502, mailed Jun. 28, 2021, 6 pages.

China Office Action, Application No. 201780056064.5, mailed Apr. 26, 2021, 8 pages.

China Office Action, Application No. 201780056064.5, mailed Nov. 4, 2020 11 pages.

Europe Office Action, Application No. 17808998.3, mailed Jul. 21, 2020, 8 pages.

Pedreira et al: "Overview of clinical flow cytometry data analysis: recent advances and future challenges", Trends in Biotechnology, Elsevier Publications, Cambridge, GB, vol. 31, No. 7, Jul. 5, 2013, 12 pages.

China Patent Office, "The Third Office Action," issued in connection with China Patent Application No. 201480071952.0, mailed Jul. 23, 2020, 23 pages.

(56) References Cited

OTHER PUBLICATIONS

Intellectual Property India, "Examination Report," issued in connection with Indian Patent Application No. 3429/DELNP/2015, mailed Mar. 26, 2018, 6 pages.
European Patent Office, " European Search Report," issued in connection with patent application No. 20167363.9, mailed Jul. 21, 2020, 9 pages.
Japan Patent Office, "Notice of Reasons for Refusal," issued in connection with Japan Patent Application No. 2018-220397, Jul. 31, 2020, 3 pages.
European Patent Office, "Examination Report," issued in connection with European Patent Application No. 16723498.8, mailed Oct. 12, 2020, 6 pages.
European Patent Office, "European Search Report," issued in connection with European Patent Application No. 14168200.5, mailed Mar. 20, 2015, 12 pages.
European Patent Office, "European Search Report," issued in connection with European Patent Application No. 17172322.4, mailed Aug. 24, 2017, 8 pages.
European Patent Office, "European Search Report," issued in connection with European Patent Application No. 15160613.4, mailed Jul. 24, 2015, 14 pages.
European Patent Office, "Communication pursuant to Article 94(3) EPC," issued in connection with European Patent Application No. 17172322.4, mailed Aug. 14, 2018, 5 pages.
European Patent Office, "Communication pursuant to Article 94(3) EPC," issued in connection with European Patent Application No. 11193936.9, mailed Dec. 11, 2015, 3 pages.
European Patent Office, "Communication pursuant to Article 94(3) EPC," issued in connection with European Patent Application No. 15160613.4, mailed Jul. 11, 2016, 4 pages.
Hori et al., "Cell fusion by optical trapping with laser-involves contacting different cells with each other then imparting high voltage pulse to cells," WPI/Thompson, Dec. 27, 1991, Abstract, 1 page.
Japan Patent Office, "Notification of Reasons for Refusal," issued in connection with Japanese Patent Application No. 2016-185743, mailed Jul. 3, 2018, 4 pages.
Japan Patent Office, "Final Notification of Reasons for Rejection," issued in connection with Japanese Patent Application No. 2011-256171, mailed Oct. 28, 2014, 5 pages.
Japan Patent Office, "Decision for Grant," issued in connection with Japanese Patent Application No. 2015-091320, mailed May 9, 2017, 7 pages.
Japan Patent Office, "Final Notification of Reasons for Rejection," issued in connection with Japanese Patent Application No. 2015-091320, mailed Mar. 22, 2016, 22 pages.
Japan Patent Office, "Notification of Reasons for Refusal," issued in connection with Japanese Patent Application No. 2016-185743, mailed Jul. 26, 2017, 2 pages.
Smith et al., "Inexpensive Optical Tweezers for Undergraduate Laboratories," Am. J. Phys., vol. 67, No. 1, Jan. 1999, 10 pages.
Takayama et al., "Patterning Cells and Their Environments Using Multiple Laminar Fluid Flows in Capillary Networks," Proceedings of National Academy of Sciences, vol. 96, 1999, 4 pages.
Guéron et al., Excited states of nucleic acids. Edited by Ts'o, P. O. P., & Eisinger, J. Basic principles in nucleic acid chemistry. New York: Academic Press. pp. 311-387. 1974.
Japan Patent Office; "Notice of Reasons for Refusal,"issued in connection with Japanese Patent Application No. 2019-088655, mailed Feb. 18, 2020, 5 pages.
International Preliminary Report on Patentability corresponding to International Patent Application No. PCT/US2013/050669, mailed Jan. 28, 2016, 15 pages.
Supplementary European Search Report for Application No. 13889551.1, dated May 22, 2017, 12 pages.
State Intellectual Property Office of People's Republic of China, "Second Office Action," issued in connection with Chinese Patent Application No. 201380079634.4, Jun. 4, 2018, 14 pages.
Japan Patent Office, "Notice of Reasons for Rejection," issued in connection with Japanese Patent Application No. 2017-168904, Jul. 6, 2018, 3 pages.
State Intellectual Property Office of People's Republic of China, "Third Office Action," issued in connection with Chinese Patent Application No. 201380079634.4, Nov. 1, 2018, 20 pages.
Japanese Office Action for Application No. 2016-527978 dated Mar. 24, 2017, 6 pages.
State Intellectual Property Office of People's Republic of China, "First Office Action," issued in connection with Chinese Patent Application No. 201380079634.4, Jul. 28, 2017, 18 pages.
Indian Patent Application No. 3425/DELNP/2015 Pre-Grant Opposition, mailed Dec. 4, 2020, 138 pages.
Indian Patent Application No. 3425/DELNP/2015 Pre-Grant Opposition, mailed Jul. 21, 2020, 59 pages.
Indian Patent Application No. 3425/DELNP/2015 Pre-Grant Opposition, mailed Jul. 21, 2020, 96 pages.
Indian Patent Application No. 3425/DELNP/2015 Pre-Grant Opposition, mailed Jul. 2, 2020, 137 pages.
Lee et al., The potential of a dielectrophoresis activated cell sorter (DACS) as a next generation cell sorter. Micro and Nano Syst Lett. 2016;4:2, 10 pages.
Maser et al., Nanoparticle injector for photonic manipulators using dielectrophoresis. AIP Advances 9.6 (2019): 065109, 8 pages.
Morgan et al., Separation of Submicron Bioparticles by Dielectrophoresis. Biophysical Journal. vol. 77, 1999, pp. 516-525.
Sutera et al., The history of Poiseuille's law. Annual Review of Fluid Mechanics, 25.1 (1993): pp. 1-20.
USPTO, "Final Office Action," issued in connection with U.S. Appl. No. 16/741,608, dated Oct. 21, 2021, 11 pages.
USPTO, "Non-Final Office Action," issued in connection with U.S. Appl. No. 17/403,642, dated Nov. 29, 2021, 13 pages.
Australian Office Action, Application No. 2017323502, dated Oct. 22, 2021, 6 pages.
Intellectual Property India, "Examination Report," issued in connection with Indian Patent Application No. 201917009874, mailed Nov. 25, 2021, 6 pages.
Brazilian Office Action, Application No. BR112019004727-1, mailed Mar. 20, 2023, 6 pages.
USPTO "Final Office Action," issued in connection with U.S. Appl. No. 16/852,303, mailed May 1, 2023, 33 pages.
National Institute of Industrial Property (INPI) Argentina, "Examination Report," issued in connection with Argentina Patent Application No. 20190101378, mailed Apr. 19, 2023, 8 pages.
China National Intellectual Property Administration, "Decision of Rejection," issue in connection with Chinese Patent Application No. 202080028183.1, mailed Jun. 7, 2023, 23 pages.
USPTO, "Non-Final Office Action," issued in connection with U.S. Appl. No. 17/164,710, dated Jun. 26, 2023, 13 pages.
Notice of Allowance issued in U.S. Appl. No. 17/692,876 on Feb. 1, 2023, 24 pages.
European Patent Office, "European Search Report," issued in connection with European Patent Application No. 22190948.4, mailed Jan. 23, 2023, 10 pages.
European Patent Office, "Intention to Grant Notice," issued in connection with patent application No. 20167363.9, mailed Dec. 15, 2022, 8 pages.
Notice of Allowance issued in U.S. Appl. No. 16/741,608 on Feb. 7, 2023, 22 pages.
USPTO, "Final Office Action," issued in connection with U.S. Appl. No. 16/741,608, dated Oct. 19, 2022, 12 pages.
USPTO, "Non-Final Office Action," issued in connection with U.S. Appl. No. 17/851,319, dated Nov. 2, 2022, 12 pages.
USPTO, "Final Office Action," issued in connection with U.S. Appl. No. 16/279,430, dated Dec. 6, 2022, 18 pages.
Jun et al. "Detecting and estimating contamination of human DNA samples in sequencing and array-based genotype data." The American Journal of Human Genetics 91.5 (2012): 839-848.
International Searching Authority, "International Search Report and Written Opinion," issued in connection with International Patent Application No. PCT/US21/56094, mailed Mar. 16, 2022, 22 pages.
USPTO, "Notice of Allowance," issued in connection with U.S. Appl. No. 17/496,469, dated May 10, 2022, 54 pages.

(56) References Cited

OTHER PUBLICATIONS

China National Intellectual Property Administration, "Notice of Allowance," issued in connection with Chinese Patent Application No. 201480071952.0, dated Mar. 21, 2022, 3 pages.
Trial Transcript, Sep. 5, 2019 (a.m.); ABS Global, Inc. v. Inguran, LLC d/b/a Sexing Technologies, Case Nos. 17-cv-446 and 14-cv-503, United States District Court for the Western District of Wisconsin, 14 pages.
Brief in Support of ABS Global, Inc. and Genus PLC's Rule 50(8) Motion for Judgment as a Matter of Law and Rule 59 Motion for a New Trial, *ABS Global, Inc. v. Inguran, LLC d/b/a Sexing Technologies,* Case No. 14-cv-503, United States District Court for the Western District of Wisconsin. Filed Sep. 2, 2016. 72 pages.
Inguran, LLC and XY, LLC's Response To ABS Global, Inc. and Genus PLC's Rule 50(8) Motion Fof Judgment as a Matter of Law and Rule 59 Motion for New Trial, pp. 9-28, 33-36, 73-74. Filed Sep. 23, 2016.
ST's Response To ABS's Renewed Motion for Judgment as a Matter of Law That the Asserted Claims of the '987 Patent are Invalid for Lack of Enablement and, in the Alternative, for a New Trial, *ABS Global, Inc. v. Inguran, LLC d/b/a Sexing Technologies,* Case No. 14-cv-503, United States District Court for the Western District of Wisconsin. Filed: Jul. 24, 2020. 40 pages.
Clinical Laboratory Instruments and In Vitro Diagnostic Reagents, Personnel Department of the State Food and Drug Administration, et al., pp. 17-21, China Medical Science and Technology Publishing House, Oct. 31, 2010.
Dicarlo "Continuous inertial focusing, ordering, and separation of particles in microchannels" BioMEMS Resource Center, Center for Engineering in Medicine and Surgical Services, Massachusetts General Hospital, Nov. 27, 2007, PNAS, 18892-18897, vol. 104, No. 48.
Dicarlo "Equilibrium Separation and Filtration of Particles Using Differential Inertial Focusing" BioMEMS Resource Center, Center for Engineering in Medicine and Surgical Services, Massachusetts General Hospital, Anal Chem 2008, 8, 2204-2211.
Dicarlo "Inertial Microfluidics: High-Throughput Focusing and Separation of Cells and Particles" BioMEMS Resource Center, Center for Engineering in Medicine, Massachusetts General Hospital, Twelfth International Conference on Miniaturized Systems for Chemistry and Life Sciences, Oct. 12-16, 2008, San Diego, California, USA. 3 pages.
Miyake, Ryo, et al. "Investigation of sheath flow chambers for flow cytometers: Micro machined flow chamber with low pressure loss." JSME International Journal Series B Fluids and Thermal Engineering 40.1 (1997): 106-113.
*Inguran, LLC v. ABS Glob., Inc.,* W.D. Wis., Case: 17-cv-446-wmc, Filed Apr. 29, 2019, 61 pages.
Miyake, Ryo, et al. "Flow cytometric analysis by using micromachined flow chamber." JSME International Journal Series B Fluids and Thermal Engineering 43.2 (2000): 219-224.
Shapiro et al., "Practical Flow Cytometry," Fourth Edition, New Jersey: John Wiley & Sons, 2003, 5 pages.
Johnson et al. "Sex preselection in rabbits: live births from X and Y sperm separated by DNA and cell sorting." Biology of Reproduction 41.2 (1989): 199-203.
China Patent Office, "The Fifth Office Action," issued in connection with China Patent Application No. 2014800719520, Oct. 20, 2021, 7 pages.
USPTO, "Non-Final Office Action," issued in connection with U.S. Appl. No. 17/458,947, dated Dec. 15, 2021, 9 pages.
Sell, "Cellular Origin of Cancer: Dedifferentiation or Stem Cell Maturation Arrest?", Environmental Health Perspectives, vol. 101, Suppl. 5, 1993, p15-26.
Shapiro et al., "Pratical Flow Cytometry," Fourth Edition, New Jersey: John W. Wiley & Sons, 2003, 52 pages.
Sharpe et al., "Advances in Flow Cytometry for Sperm Sexing," Theriogenology, vol. 71, 2009, pp. 4-10.
Short, "Raman Spectroscopy Detects Biochemical Changes Due to Proliferation in Mammalian Cell Cultures," Biophysical Journal, vol. 88, Jun. 2005, pp. 4274-4288.
USPTO, "Non-Final Office Action," issued in connection with U.S. Appl. No. 15/226,899, mailed Apr. 12, 2018, 14 pages.
USPTO, "Notice of Allowance," issued in connection with U.S. Appl. No. 15/226,899, mailed Aug. 23, 2018, 5 pages.
USPTO, "Notice of Allowance," issued in connection with U.S. Appl. No. 15/226,899, mailed Sep. 20, 2018, 6 pages.
USPTO, "Final Office Action," issued in connection with U.S. Appl. No. 15/174,681, mailed Jan. 2, 2018, 15 pages.
USPTO, "Final Office Action," issued in connection with U.S. Appl. No. 15/174,681, mailed Sep. 14, 2018, 17 pages.
USPTO, "Non-Final Office Action," issued in connection with U.S. Appl. No. 15/174,681, mailed May 4, 2017, 13 pages.
USPTO, "Non-Final Office Action," issued in connection with U.S. Appl. No. 15/174,681, mailed Apr. 5, 2018, 16 pages.
USPTO, "Notice of Allowance," issued in connection with U.S. Appl. No. 15/174,681, mailed Nov. 27, 2018, 10 pages.
USPTO, "Final Office Action," issued in connection with U.S. Appl. No. 13/298,148, mailed Oct. 18, 2013, 46 pages.
USPTO, "Non-Final Office Action," issued in connection with U.S. Appl. No. 13/298,148, mailed Feb. 5, 2013, 66 pages.
USPTO, "Notice of Allowance," issued in connection with U.S. Appl. No. 13/298,148, mailed Sep. 19, 2014, 9 pages.
USPTO, "Office Action," issued in connection with U.S. Appl. No. 13/298,148, mailed Sep. 28, 2012, 5 pages.
USPTO, "Final Office Action," issued in connection with U.S. Appl. No. 13/894,831, mailed Sep. 10, 2015, 11 pages.
USPTO, "Final Office Action," issued in connection with U.S. Appl. No. 13/894,831, mailed Jun. 15, 2017, 19 pages.
USPTO, "Non-Final Office Action," issued in connection with U.S. Appl. No. 13/894,831, mailed Dec. 23, 2014, 11 pages.
USPTO, "Non-Final Office Action," issued in connection with U.S. Appl. No. 13/894,831, mailed Oct. 5, 2016, 17 pages.
USPTO, "Notice of Allowance," issued in connection with U.S. Appl. No. 13/894,831, mailed Apr. 1, 2016, 8 pages.
USPTO, "Notice of Allowance," issued in connection with U.S. Appl. No. 13/894,831, mailed Sep. 5, 2017, 9 pages.
Wang et al., Detection of endogenous biomolecules in Barrett's esophagus by Fourier transform infrared spectroscopy, PNAS, vol. 104, No. 40, Oct. 2, 2007, p. 15864-15869.
Webster, Merriam, "Definition of 'successive,'" Merriam Webster's Online Dictionary, accessed at http://www.merriamwebster.com/dictionary/successive," Jul. 3, 2013, 1 page.
Weida et al., "Quantum cascade laser-based replacement for FTIR microscopy", Proc. SPIE 7902, Imaging, Manipulation, and Analysis of Biomolecules, Cells, and Tissues IX, 79021C, Feb. 11, 2011; 7 pages; https://doi.org/10.1117/12.873954.
International Bureau, "International Preliminary Report on Patentability," issued in connection with International Patent Application No. PCT/IB2017/001289, mailed Mar. 21, 2019, 12 pages.
International Search Report and Written Opinion for Application Serial No. PCT/IB2017/001289, dated Apr. 3, 2018, 21 pages.
Mehrnoush Malek et al: flowDensity: reproducing manual gating of flow cytometry data by automated density-based cell population identification, Bioinformatics., vol. 31, No. 4, Oct. 16, 2014 (Oct. 16, 2014), pp. 606-607.
International Search Report and Written Opinion for Application Serial No. PCT/IB2018/001641, dated Nov. 5, 2019, 4 pages.
China Patent Office, "The Fourth Office Action," issued in connection with China Patent Application No. 201480071952.0, Feb. 3, 2021, 25 pages.
Japan Patent Office, "Notice of Reasons for Refusal," issued in connection with Japan Patent Application No. 2019-088655, Oct. 9, 2020, 5 pages.
Johnson LA et al., Flow sorting of X and Y chromosome-bearing spermatozoa into two populations, Gamete Research. Jan. 1987. 16(1):1-9. (Johnson 1987).
Paape et al., Flow Cytometry: a Versatile Tool for Studies on Cells From Domestic Animals, National Cytometry Symposium, Abstract Only, Dec. 14, 1997, https://www.ars.usda.gov/research/publications/publication/?seqNo115=86408.

(56) References Cited

OTHER PUBLICATIONS

Keij, J.F. et al., "High-Speed Photodamage Cell Selection Using a Frequency-Doubled Argon Ion Laser." Cytometry 19 (1995): 209-216. (Keij 1995).

Keij, J.F., "Introduction to High-Speed Flow Sorting." Flow and Image Cytometry. Series H: Cell Biology, 95 (1996): 213-227. (Keij 1996).

Johnson et al. "The Beltsville sperm sexing technology: high-speed sperm sorting gives improved sperm output for in vitro fertilization and AI." J Anim Sci 1999. 77:213-220.

Counterclaim Defendants ABS Global Inc.'s and Genus PLC's Invalidity Contentions. *ABS Global, Inc., v. Inguran, LLC D/B/A Sexing Technologies* and. *XY, LLC v. Genus PLC.* Case No. 14-cv-503 United States District Court for the Western District of Wisconsin; Decided Aug. 14, 2019, pp. 1, 43-114, and 168-177.

ABS Global, Inc. And Genus PLC's Renewed Motion For Judgment As A Matter Of Law That The Asserted Claims Of The '987 Patent Are Invalid For Lack Of Enablement And, In The Alternative, For A New Trial. *ABS Global, Inc. v. Inguran, LLC & XY, LLC v. Genus PLC.* Case: 3:14-cv-00503-wmc. Filed on Jul. 3, 2020, 40 pages.

Brief in Support of ABS Global, Inc. And Genus PLC's Motion for Judgment as A Matter of Law That the Asserted Claims Of The '987 Patent Are Not Enabled. *Inguran, LLC d/b/a STGenetics, XY, LLC, and Cytonome/ST, LLC,* Plaintiffs/Counterclaim-Defendants, v.*ABS Global, Inc., Genus PLC, and Premium Genetics (UK) Ltd,* Defendants/Counterclaim-Plaintiffs. Case: 3:17-cv-00446-wmc. Filed Sep. 6, 2019.

ABS Global, Inc. And Genus Plc Renewed Motion for Judgment As A Matter Of Law That The Asserted Claims Of The 987 Patent Are Invalid For Lack Of Enablement And, In The Alternative, For A New Trial. *Inguran, LLC d/b/a STGenetics, XY, LLC, and Cytonome/ST, LLC,* Plaintiffs/Counterclaim-Defendants, v.*ABS Global, Inc., Genus PLC, and Premium Genetics (UK) Ltd,* Defendants/Counterclaim-Plaintiffs. Case: 3:17-cv-00446-wmc. iled Jul. 3, 2020, 72 pages.

ABS Global, Inc. And Genus PLC's Reply In Support Of Their Renewed Motion For Judgment As A Matter Of Law That The Asserted Claims Of The '987 Patent Are Invalid For Lack Of Enablement And, In The Alternative, For A New Trial. *Inguran, LLC d/b/a STGenetics, XY, LLC, and Cytonome/ST, LLC,* Plaintiffs/Counterclaim-Defendants, v. *ABS Global, Inc., Genus PLC, and Premium Genetics (UK) Ltd,* Defendants/Counterclaim-Plaintiffs. Case: : 17-cv-00446-wmc. Filed Aug. 17, 2020, 40 pages.

Abs Global, Inc. and Genus PLC's Motion For Judgment As A Matter Of Law That The Asserted Claims Of The 987 And '092 Patents Are Invalid. *ABS Global, Inc.,* Plaintiff/Counterclaim Defendant, v. *Inguran, LLC d/b/a Sexing Technologies,* Defendant/Counterclaim Plaintiff, and *XY, LLC,* Intervenor-Defendant/Counterclaim Plaintiff, v. *Genus PLC,* Counterclaim Defendant. Case: 3:14-cv-00503-wmc. Filed Aug. 9, 2016, 35 pages.

ABS Global, Inc. and Genus PLC's Rule 50(8) Motion For Judgment As A Matter Of Law And Rule 59 Motion For A New Trial. *ABS Global, Inc.,* Plaintiff/Counterclaim Defendant, v. *Inguran, LLC d/b/a Sexing Technologies,* Defendant/Counterclaim Plaintiff, and *XY, LLC,* Intervenor-Defendant/Counterclaim Plaintiff, v. *Genus PLC,* Counterclaim Defendant. Case: 3:14-cv-00503-wmc. Filed Sep. 2, 2016, 61 pages.

Opinion and Order of the United States District Court For The Western District Of Wisconsin. Plaintiff/Counterclaim Defendant, v. *Inguran, LLC d/b/a Sexing Technologies,* Defendant/Counterclaim Plaintiff, and *XY, LLC,* Intervenor-Defendant/Counterclaim Plaintiff, v. *Genus PLC,* Counterclaim Defendant. Case: 3:14-cv-00503-wmc. riled Mar. 31, 2017, 18 pages.

Appeal from the United States District Court for the Western District of Wisconsin. No. 14-CV-503. *ABS Global, NC.,* Plaintiff/Counterclaim Defendant-Appellant, *and Genus PLC,* Counterclaim Defendant-Appellant, v. *Inguran, LLC, doing business as Sexing Technologies,* Defendant/Counterclaim Plaintiff-Appellee, *and XY, LLC,* Intervening Defendant/Counterclaim Plaintiff-Appellee. Case: 3:14-cv-00503-wmc. Filed: May 12, 2011, 200 pages.

Judge's Opinion & Order in Case No. 14-cv-503-wmc. Plaintiff/Counterclaim Defendant, v. *Inguran, LLC di b/a Sexing Technologies,* Defendant/Counterclaim Plaintiff, and *XY, LLC,* Intervenor-Defendant/Counterclaim Plaintiff, v. *Genus PLC,* Counterclaim Defendant. Case: 3:14-cv-00503-wmc. Filed Jul. 21, 2016, 41 pages.

ABS Global Inc. and Genus PLC's Reply in Support of Their Motion for Claim Construction and Partial Summary Judgment, *ABS Global, Inc. v. Inguran, LLC d/b/a Sexing Technologies,* Case No. 14- cv-503, United States District Court for the Western District of Wisconsin. Mar. 7, 2016, 55 pages.

USPTO, "Notice of Allowance," issued in connection with U.S. Appl. No. 16/852,303, mailed Sep. 20, 2023, 31 pages.

European Patent Office, "Communication pursuant to Article 94(3) EPC," issued in connection with European Patent Application No. 17808998.3, mailed Sep. 15, 2023, 4 pages.

European Patent Office, "European Search Report," issued in connection with patent application No. 20913158.0, mailed Sep. 20, 2023, 9 pages.

European Patent Office, "European Search Report," issued in connection with patent application No. 23169267.4 mailed Jul. 14, 2023, 5 pages.

Brazilian Office Action, Application No. BR112021012000-9, mailed Aug. 16, 2023, 4 pages.

USPTO, "Non-Final Office Action," issued in connection with U.S. Appl. No. 17/692,876, dated Sep. 19, 2022, 21 pages.

USPTO, "Notice of Allowance," issued in connection with U.S. Appl. No. 17/403,642, mailed Sep. 29, 2022, 24 pages.

China National Intellectual Property Administration, "Second Office Action," issued in connection with Chinese Patent Application No. 202080028183.1, mailed Jan. 13, 2023, 23 pages.

Notice of Allowance issued in U.S. Appl. No. 17/851,319 on Feb. 15, 2023, 52 pages.

USPTO, "Final Office Action," issued in connection with U.S. Appl. No. 17/403,642, dated Mar. 4, 2022, 14 pages.

Australian Office Action, Application No. 2021200818, dated Mar. 4, 2022, 3 pages.

Al-Holy et al., "The Use of Fourier Transform Infrared Spectroscopy to Differentiate *Escherichia coli* O157:H7 from Other Bacteria Inoculated Into Apple Juice," Food Microbiology, vol. 23, 2006, 162-168.

Alberts et al., "Molecular Biology of the Cell, 5th edition," New York: Garland Science, 2008, p. 1293.

Barcot et al., "Investigation of Spermatozoa and Seminal Plasma by Fourier Transform Infrared Spectroscopy," Applied Spectroscopy, vol. 61, No. 3, Mar. 2007, pp. 309-313.

Bassan et al; "Reflection Contributions to the Dispersion Artefact in FTIR Spectra of Single Biological Cells," Analyst, vol. 134, Apr. 9, 2009, pp. 1171-1175.

Bassan et al; "Resonant Mie Scattering in Infrared Spectroscopy of Biological Materials-Understanding the Dispersion Artefact," Analyst, vol. 134, 2009, pp. 1586-1593.

Bassan et al; "Resonant Mie Scattering {RMieS) Correction of Infrared Spectra From Highly Scattering Biological Samples," Analyst, vol. 135, No. 2, Feb. 2010, pp. 268-277.

Belkin et al.; "Intra-Cavity Absorption Spectroscopy with Narrow-Ridge Microfluidic Quantum Cascade Lasers," Optics Express, vol. 15, No. 18, Sep. 3, 2007, pp. 11262-11271.

Boustany et al.; "Microscopic Imaging and Spectroscopy with Scattered Light," Annual Review of Biomedical Engineering, vol. 12, 2010, pp. 285-314.

Chan et al.; "Nondestructive Identification of Individual Leukemia Cells by Laser Trapping Raman Spectroscopy," Analytical Chemistry, vol. 80, No. 6, Mar. 15, 2008, 8 pages.

Chan et al.; "Label-Free Biochemical Characterization of Stem Cells Using Vibrational Spectroscopy," Journal of Biophotonics vol. 2, No. 11, Aug. 5, 2009, pp. 656-668.

Chan et al.; "Label-Free Separation of Human Embryonic Stem Cells (hESCs) and their Cardiac Derivatives using Raman Spectroscopy," Lawrence Livermore Journal, LLNL-JRNL-406938, Sep. 11, 2008, 30 pages.

(56) References Cited

OTHER PUBLICATIONS

Chen et al,; "Synchrotron Infrared Measurements of Protein Phosphorylation in Living Single PC12 Cells during Neuronal Differentiation," Analytical Chemistry, vol. 84, 2012, pp. 4118-4125.
Cheng et al., "Laser-Scanning Coherent Anti-Stokes Raman Scattering Microscopy and Applications to Cell Biology," Biophysical Journal, vol. 83, Jul. 2002, pp. 502-509.
Cho et al., "Passively Driven Integrated Microfluidic System for Separation of Motile Sperm," Analytical Chemistry, vol. 75, Apr. 1, 2003, Abstract.
Genzen et al. "Laboratory-developed tests: a legislative and regulatory review." Clinical chemistry 63.10 (2017): 10 pages.
Cho et al., "A microfluidic device for separating motile sperm from nonmotile sperm via inter-streamline crossings," 2nd Annual International IEEE-EMBS Special Topic Conference on Microtechnologies in Medicine and Biology. Proceedings (Cat. No.02EX578), 2002, pp. 156-159, doi: 10.1109/MMB.2002.1002304.
Cleary et al., "Infrared Surface Plasmon Resonance Biosensor," OSA Biomed, Miami, Florida, Apr. 2010, 11 pages.
Dousseau et al., "On the Spectral Subtraction of Water from the FT-IR Spectra of Aqueous Solutions of Proteins," Applied Spectroscopy, vol. 43, No. 3, 1989, pp. 538-542.
Downes et al., "Optical Spectroscopy for Noninvasive Monitoring of Stem Cell Differentiation," Journal of Biomedicine and Biotechnology, vol. 2010, Article ID 101864, 2010, 10 pages.
Ege, "Organic Chemistry: Structure and Reactivity," Fifth Edition, Boston, MA, Houghton Mifflin Company, 2004, pp. 453-457.
European Patent Office, "Extended European Search Report," issued in connection with European Patent Application No. 11841869.8, mailed Feb. 15, 2018, 9 pages.
Fu et al., "A Microfabricated Fluorescence-Activated Cell Sorter," Nature Biotechnology, vol. 17, Nov. 1999, pp. 1109-1111.
Green et al., "Flow Cytometric Determination of Size and Complex Refractive Index for Marine Particles: Comparison with Independent and Bulk Estimates," Applied Optics, vol. 42, No. 3, Jan. 20, 2003, pp. 526-541.
Harvey et al., "Discrimination of Prostate Cancer Cells by Reflection Mode FTIR Photoacoustic Spectroscopy," The Analyst, vol. 132, 2007, pp. 292-295.
Herzenberg et al., "Fluorescence-activated Cell Sorting," Scientific American, vol. 234, Mar. 1976, pp. 108-117.
Holman et al., "Synchrotron-Based FTIR Spectromicroscopy: Cytotoxicity and Heating Considerations," Journal of Biological Physics, vol. 29, 2003, pp. 275-286.
Holman et al., "IR Spectroscopic Characteristics of Cell Cycle and Cell Death Probed by Synchrotron Radiation Based Fourier Transform IR Spectromicroscopy," Biopolymers (Biospectroscopy) vol. 57, 2000, pp. 329-335.
Holman et al., "Tracking Chemical Changes in a Live Cell: Biomedical Applications of SR-FTIR Spectromicroscopy, "Lawrence Berkeley National Laboratory, http://escholarship.org/uc/item/9k185794, Berkeley, CA Jul. 25, 2002, 34 pages.
Huser et al., "Raman Spectroscopy of DNA Packaging in Individual Human Sperm Cells Distinguishes Normal From Abnormal Cells," Journal of Biophotonics, vol. 2, No. 5, 2009, pp. 322-332.
Intel, "Intel C-bank Tunable Laser, Performance and Design," White Paper, May 2003, 14 pages.
International Searching Authority, "International Search Report and Written Opinion," International Patent Application No. PCT/US2013/041123, mailed Aug. 19, 2013, 12 pages.
International Search Authority, "International Preliminary Report on Patentability," International Patent Application No. PCT/US2011/061046, mailed May 30, 2013, 7 pages.
International Searching Authority, "International Preliminary Report on Patentability," International Patent Application No. PCT/US2013/041123, Nov. 18, 2014, 7 pages.
Japan Patent Office, "Office Action," issued in connection with Japanese Patent Application No. 2013-539983, Jul. 8, 2015, 6 pages.
Japan Patent Office, "Office Action," issued in connection with Japanese Patent Application No. 2013-539983, Jul. 2, 2016, 6 pages.
Japan Patent Office, "Office Action," issued in connection with Japanese Patent Application No. 2016-198323, Oct. 2, 2017, 3 pages.
Japan Patent Office, "Office Action," issued in connection with Japanese Patent Application No. 2016-198323, Jul. 25, 2018, 9 pages.
Lee et al., "DFB Quantum Cascade Laser Arrays," IEEE Journal of Quantum Electronics, vol. 45, No. 5, May 2009, pp. 554-565.
Libbus et al., "Incidence of Chromosome Aberrations in Mammalian Sperm Stained with Hoechst 33342 and UV-Laser Irradiated During Flow Sorting," Mutation Research, vol. 182, 1987, pp. 265-274.
Malone, Jr., "Infrared Microspectroscopy: A Study of the Single Isolated Bread Yeast Cell," Thesis, The Ohio State University, 2010, 162 pages.
Meister et al., "Confocal Raman Microspectroscopy as an Analytical Tool to Assess the Mitochondrial Status in Human Spermatozoa," Analyst, vol. 135, 2010, pp. 1370-1374.
Miyamoto et al., "Label-free Detection and Classification of DNA by Surface Vibration Spectroscopy in Conjugation with Electrophoresis," Applied Physics Letters, vol. 86, No. 053902, 2005, 3 pages.
Mohlenhoff et al., "Mie-Type Scattering and Non-Beer-Lambert Absorption Behavior of Human Cells in Infrared Microspectroscopy," Biophysical Journal, vol. 88, May 2005, pp. 3635-3640.
Montag et al., "Laser-induced Immobilization and Plasma Membrane Permeabilization in Human Spermatozoa," Human Reproduction, vol. 15, No. 4, 2000, pp. 846-852.
Mourant et al., "Methods for Measuring the Infrared Spectra of Biological Cells," Physics in Medicine and Biology, vol. 48, 2003, pp. 243-257.
Van Munster, "Interferometry in Flow to Sort Unstained X-and Y-Chromosome-Bearing Bull Spermatozoa,"Cytometry, vol. 47, 2002, pp. 192-199.
Rajagopalan et al., "Aneuploidy and Cancer," Nature, vol. 432, Nov. 2004, pp. 338-341.
Ropcke et al., "Application of Mid-Infrared Tuneable Diode Laser Absorption Spectroscopy to Plasma Diagnostics: A Review," Plasma Sources Science and Technology, vol. 15, 2006, S148-S168.
Schaden et al., "Quantum Cascade Laser Modulation for Correction of Matrix-Induced Background Changes in Aqueous Samples," Applied Physics B, vol. 86, 2007, pp. 347-351.
Sandt et al., "Identification of Spectral Modifications Occurring during Reprogramming of Somatic Cells," PLoS ONE, vol. 7, Issue 4, e30743, Apr. 2012, 7 pages.
Altendorf et al., "Results Obtained Using a Prototype Microfluidics-Based Hematology Analyzer," in Proceedings of the microTAS 1998 Symposium, 73-76 (Oct. 1998).
Nieuwenhuis et al., "Particle-Shape Sensing-Elements for Integrated Flow Cytometer," in Proceedings of the microTAS 2001 Symposium, 357-358 (Oct. 21, 2001).
Nieuwenhuis et al. "Virtual Flow Channel: A Novel Micro-fluidics System with Orthogonal, Dynamic Control of Sample Flow Dimensions," in Proceedings of the microTAS 2002 Symposium, vol. 1, 103-105 (Nov. 3, 2002).
Nieuwenhuis, J., et al. "Integrated flow-cells for novel adjustable sheath flows." Lab Chip, 2003, 3, 56-61 (Mar. 2003).
Shoji, S., et al. "Design and fabrication of micromachined chemical/biochemical systems." RIKEN Rev., vol. 36, pp. 8-11, 2001.
Lin, C., et al. "A Novel Microflow Cytometer with 3-dimensional Focusing Utilizing Dielectrophoretic and Hydrodynamic Forces." The Sixteenth Annual International Conference on Micro Electro Mechanical Systems, 2003. MEMS-03 Kyoto. IEEE, Kyoto, Japan, 2003, pp. 439-442.
Miyake et al., "A Development of Micro Sheath Flow Chamber," in Proceedings of the IEEE Micro Electro Mechanical Systems Workshop 1991, 265-270 (Jan. 1991).

(56) References Cited

OTHER PUBLICATIONS

Tashiro et al., "Design and Simulation of Particles and Biomolecules Handling Micro Flow Cells with Three-Dimensional Sheath Flow," in Proceedings of the microTAS 2000 Symposium, 209-212 (May 14, 2000).
Weigl, B. et al. "Design and Rapid Prototyping of Thin-Film Laminate-Based Microfluidic Devices." Biomedical Microdevices, 3:4, pp. 267-274, 2001.
Blankenstein, G. et al. "Modular concept of a laboratory on a chip for chemical and biochemical analysis." Biosensors & Bioelectronics, vol. 13. No 3-4, pp. 427-438, 1998.
Shapiro, Practical Flow Cytometry, 15-17, 133-135 (3rd ed. 1995).
Shapiro, Practical Flow Cytometry, 55-57, 166-169 (4th ed. 2003).
International Search Report for PCT Patent Application No. PCT/IB2014/001425 dated Apr. 28, 2015.
Herweijer, H. et al., "High Speed Photodamage Cell Selection Using Bromodeoxyuridine/Hoechst 33342 Photosensitized Cell Killing", Radiobiological Institute TNO, Rotterdam, The Netherlands, Jun. 1, 1987.
Johnson, L.A., et al., "Sex Preselection: High-Speed Flow Cytometric Sorting of X and Y Sperm for Maximum Efficiency" U.S. Dept. of Agriculture, Beltsville, MD, Sep. 23, 1999.
Bazyer H., et al., "Views and Reviews—Compact 151W Green Laser with U-Type Resonator for Prostate Surgery", Optics & Laser Technology, vol. 47, Apr. 27, 2013, 237-241.
Keij, J. et al., "High-Speed Photodamage Cell Sorting: An Evaluation of the ZAPPER Prototype", Methods in Cell Biology, 1994; pp. 371-386, vol. 42, Chapter 22, Academic Press, Inc.
International Search Report and Written Opinion issued on Mar. 7, 2014 in connection with PCT/US2013/050669.
Kachel, V, et al., "Uniform Lateral Orientation, caused by Flow Forces, of Flat Particles in Flow-Through Systems", The Journal of Histochemistry and Cytochemistry, vol. 25, No. 7, pp. 774-780, 1977.
Notice of Allowance issued in U.S. Appl. No. 13/943,322 on Sep. 12, 2014.
Fulwler, M., "Hydrodynamic Orientation of Cells", The Journal of Histochemistry and Cytochemistry, vol. 25, No. 7, pp. 781-783, 1977.
Khodjakov A., et al., "A Synergy of Technologies: Combining Laser Microsurgery with Green Fluorescent Protein Tagging", Cell Motility and the Cytoskeleton 38:311-317 (1997), Division of Molecular Medicine and Department of Biomedical Sciences, Albany, New York.
Canadian Office Action, Application No. 2,929,275, mailed May 4, 2020, 8 pages.
Australian Office Action, Application No. 2019202882, mailed Mar. 26, 2020, 3 pages.
Brazilian Office Action, Application No. BR122017012966-0, mailed Jun. 2, 2020, 6 pages.
Japan Patent Office, "Reconsideration Report by Examiner before Appeal," issued in connection with Japanese Patent Application No. 2016-551082, mailed Jul. 12, 2019, 17 pages.
Intellectual Property India, "Examination Report," issued in connection with Indian Patent Application No. 3425/DELNP/2015, mailed Jan. 20, 2020, 6 pages.
European Patent Office, "Extended European Search Report," issued in connection with patent application No. 19182993.6, mailed Oct. 21, 2019, 11 pages.
China National Intellectual Property Administration, "Second Office Action, " issued in connection with Chinese Patent Application No. 201480071952.0, mailed Nov. 26, 2018, 34 pages.
China National Intellectual Property Administration, "Decision of Rejection," issued in connection with Chinese Patent Application No. 201480071952.0, mailed Mar. 4, 2019, 19 pages.
IP Australia, "Examination Report No. 1 for Standard Patent Application," issued in connection with Australian Patent Application No. 2014343391, mailed Sep. 4, 2018, 3 pages.
International Preliminary Report on Patentability, issued in connection with application PCT/IB2014/001425, May 3, 2016, 11 pages.

Japan Patent Office, "Non Final Notice of Reasons for Rejection," issued in connection with Japanese Patent Application No. 2016-551082, mailed Apr. 24, 2018, 5 pages.
New Zealand IP Office, "First Examination Report," issued in connection with New Zealand Patent Application No. 720575, mailed Sep. 9, 2016, 5 pages.
New Zealand IP Office, "Further Examination Report," issued in connection with New Zealand Patent Application No. 720575, mailed Apr. 28, 2017, 3 pages.
State Intellectual Property Office of People's Republic of China, "Notification of First Office Action," issued in connection with Chinese Patent Application No. 201480071952.0, mailed Mar. 16, 2018, 31 pages.
New Zealand IP Office, "Further Examination Report," issued in connection with New Zealand Patent Application No. 735496, mailed Aug. 31, 2018, 2 pages.
Drobnis et al., Cold Shock Damage is due to Lipid Phase Transitions in Cell Membranes: A Demonstration Using Sperm as a Model, The Journal of Experimental Zoology, 1993, 265:432-437.
Way et al., Comparison of four staining methods for evaluating acrosome status and viability of ejaculated and cauda epididymal bull spermatozoa, Theriogenology, 1995, 43(8): 1301-1316.
Marian et al., Hypo-osmotic Shock Induces an Osmolality-dependent Permeabilization and Structural Changes in the Membrane of Carp Sperm, 1993, 41(2):291-297.
Molecular Probes Inc., Product Information, Influx Pinocytic Cell-Loading Reagent (1-14402), Revised Feb. 1, 2001, 1-7.
Parks, Processing and Handling Bull Semen for Artificial Insemination—Don't Add Insult to Injury!, Department of Animal Sciences, Cornell University, 2013, retrieved on May 29, 2015, retrieved from the internet: http://www/ansci.cornell.edu/bullsemen.pdf.
Mammal (Online Datasheet), Wikipedia, 2003, retrieved on Aug. 13, 2018, retrieved from internet: http://web.archive.org/web/20031230110838/hllps://en.wikipedia.org/wiki/Mammal.
International Searching Authority, "International Search Report and Written Opinion," issued in connection with International Patent Application No. PCT/IB2016/000295, mailed Oct. 14, 2016, 19 pages.
International Bureau, "International Preliminary Report on Patentability," issued in connection with International Patent Application No. PCT/IB2016/000295, mailed Aug. 31, 2017, 14 pages.
Japan Patent Office, "Office Action," issued in connection with Japanese Patent Application No. 2017-543990, Jul. 31, 2019, 23 pages.
Di Carlo et al. "Equilibrium Separation and Filtration of Particles Using Differential Inertial Focusing" Anal. Chem. 2008, 80, 2204-2211 (Year: 2008).
"Hydraulic Diameter", Neutrium, Apr. 1, 2012, https://neutrium.net/fluid-flow/hydraulic-diameter/ (Year: 2012).
Gossett et al. "Particle Focusing Mechanisms in Curving Confined Flows" Anal. Chem. 2009, 81, 8459-8465 (Year: 2009).
Di Carlo et al. "Continuous inertial focusing, ordering, and separation of particles in microchannels" PNAS Nov. 27, 2007 vol. 104 No. 48 18893 (Year: 2007).
State Intellectual Property Office of People's Republic of China, "First Office Action," issued in connection with Chinese Patent Application No. 2018801002551, Jan. 26, 2024, 8 pages.
Japan Patent Office, "Office Action," issued in connection with Japanese Patent Application No. 2022-540313, May 7, 2024, 3 pages.
USPTO, "Final Office Action," issued in connection with U.S. Appl. No. 17/416,727, mailed May 2, 2024, 11 pages.
Maxwell, W.M.C & Johnson, L.A.; Chlortetracycline analysis of boar spermatozoa after incubation, flow cytometric sorting, cooling, or cryopreservation; Molecular Reproduction Development, 46: 408-419 (1997).
Johnson, L.A. et al.; Artificial Insemination of Swine: Fecundity of boar semen stored in Beltsville TS (BTS), Modified Modena (MM), or MR-A and inseminated on one, three and four days after collection; Reproduction in domestic Animals, vol. 23, Issue 2, pp. 49-55 (1988).

(56) References Cited

OTHER PUBLICATIONS

Stap, J. et al.; Improving the resolution of cryopreserved X- and Y-Sperm during DNA flow cytometric analysis with the addition of Percoll to quench the fluorescence of dead sperm; Journal of Animal Science, 76: 1896-1902 (1998).

De Leeuw, F.E. et al.; Effects of various cryoprotective agents and membrane-stabilizing compounds on bull sperm membrane integrity after cooling and freezing; Cryobiology, 30, 32-44 (1993).

\* cited by examiner

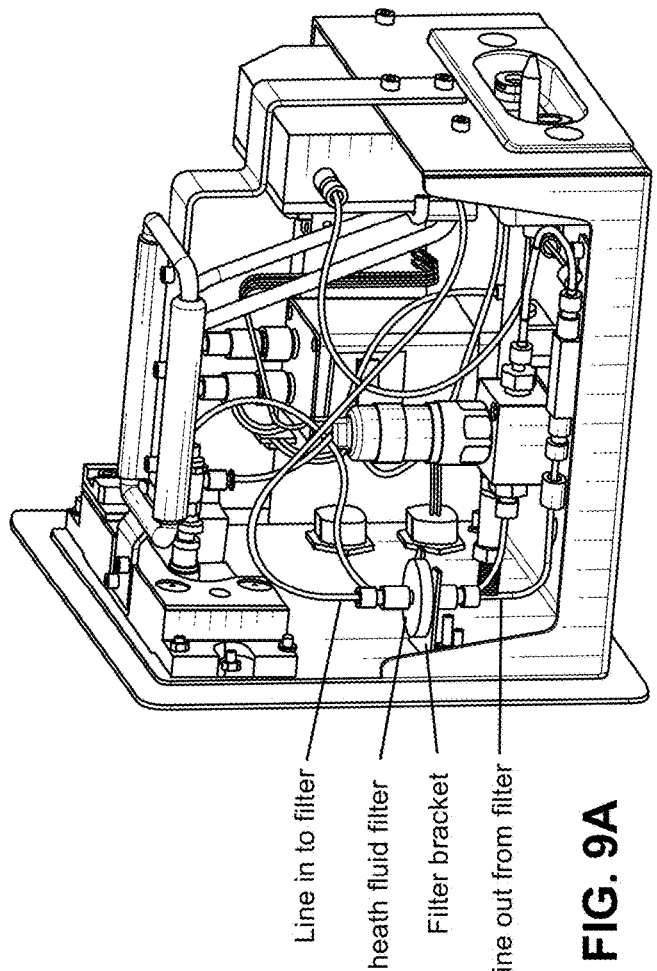
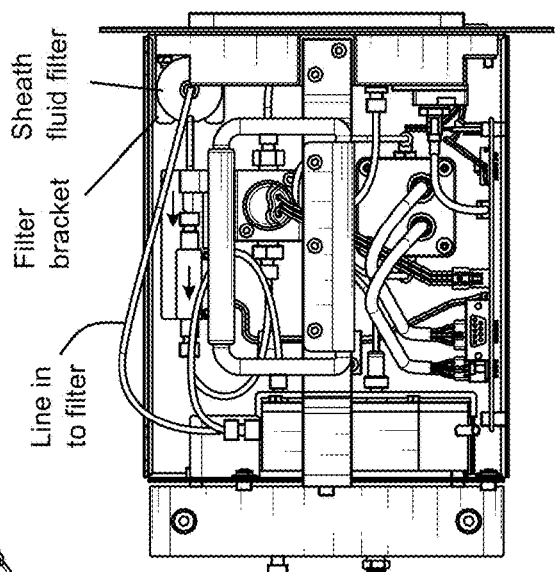
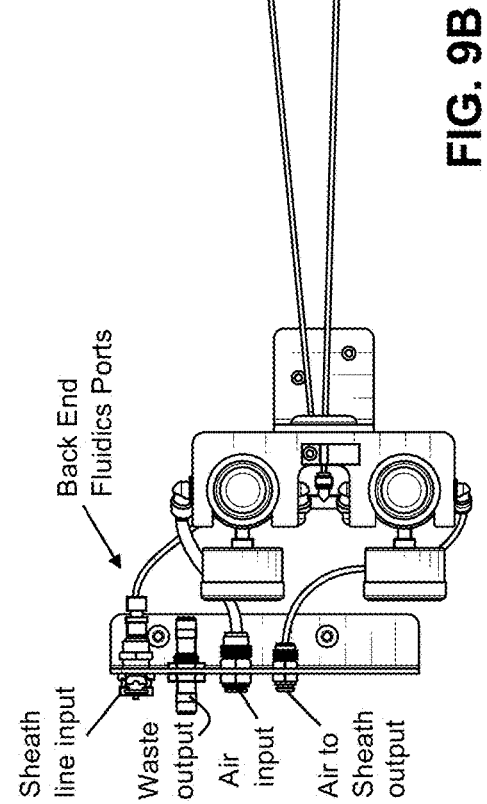
FIG. 9A
FIG. 9B

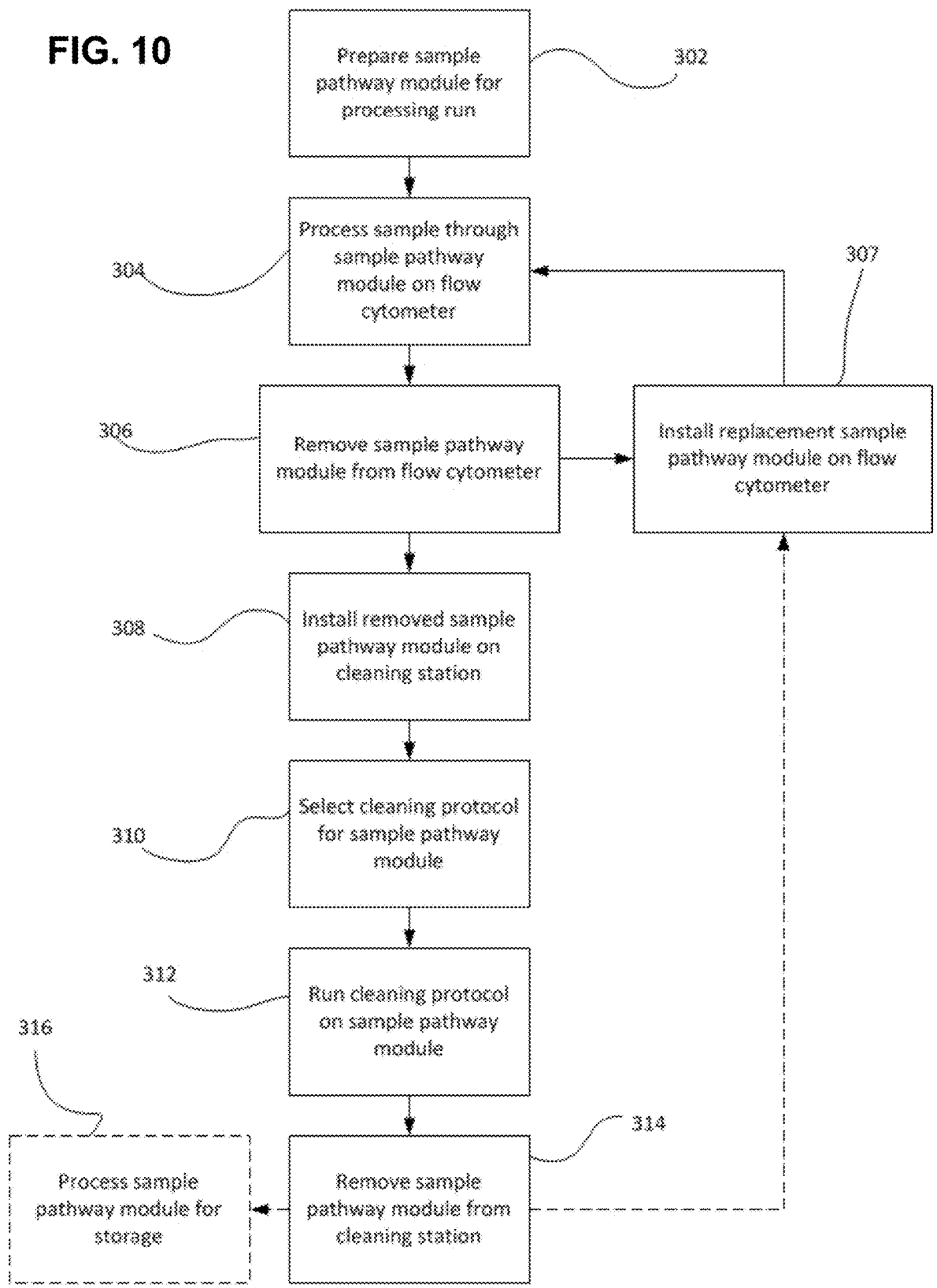

7020

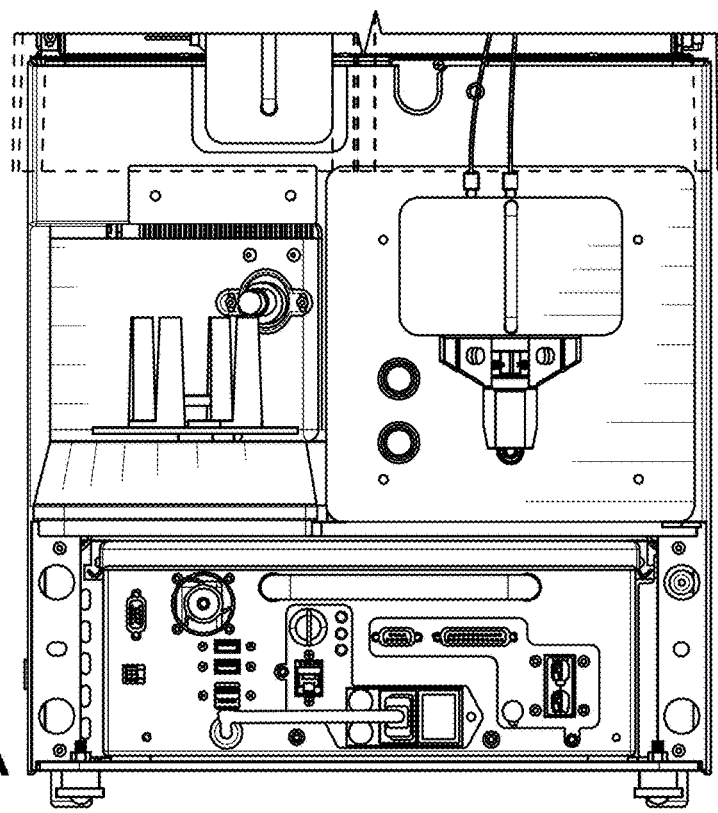
FIG. 20A
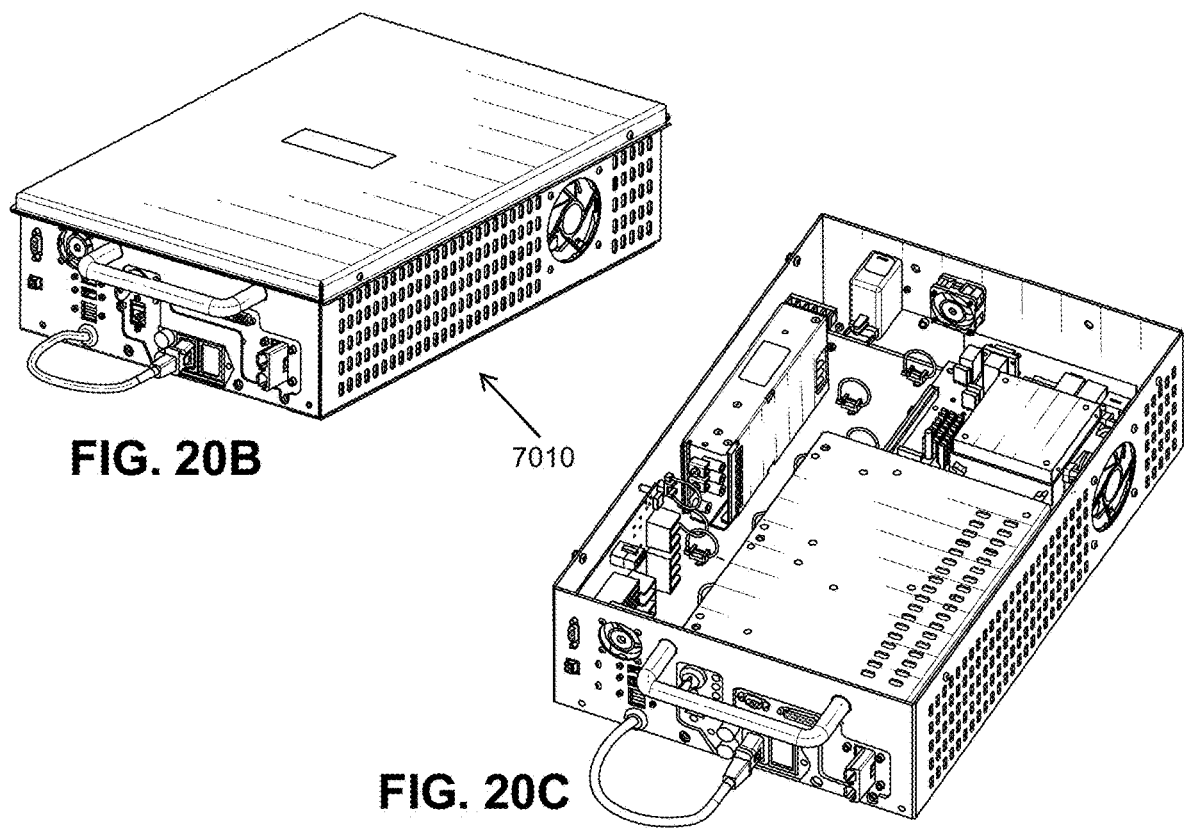
FIG. 20B
7010
FIG. 20C

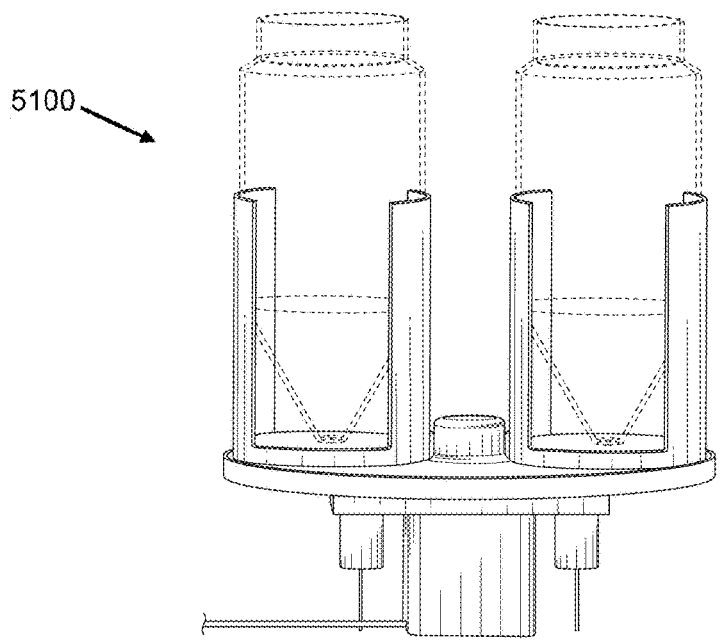
FIG. 37A
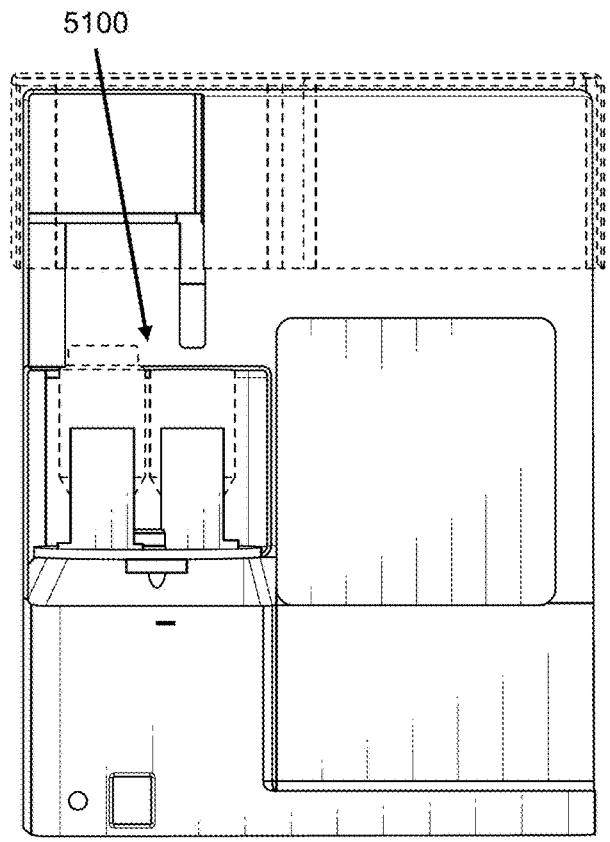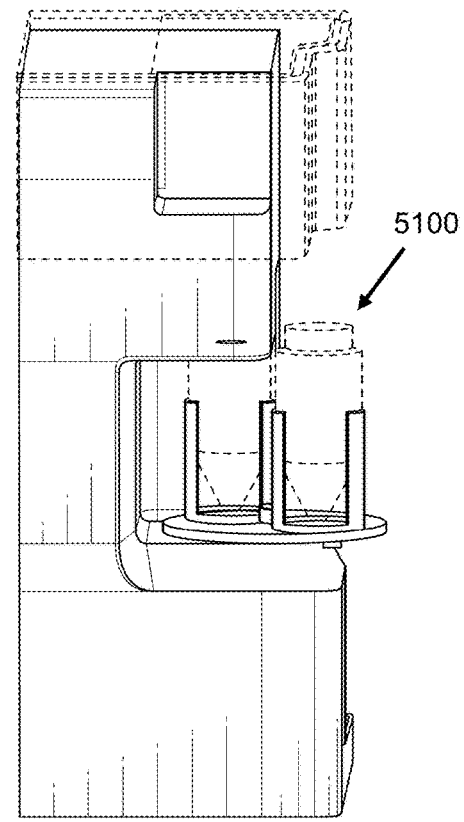
FIG. 37B  FIG. 37C

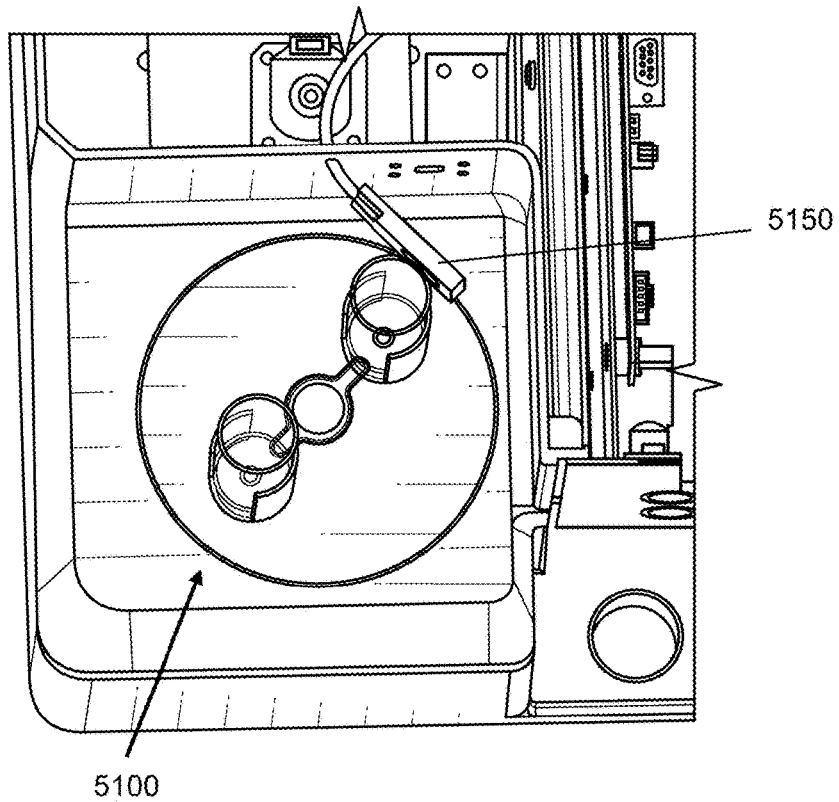
FIG. 38A
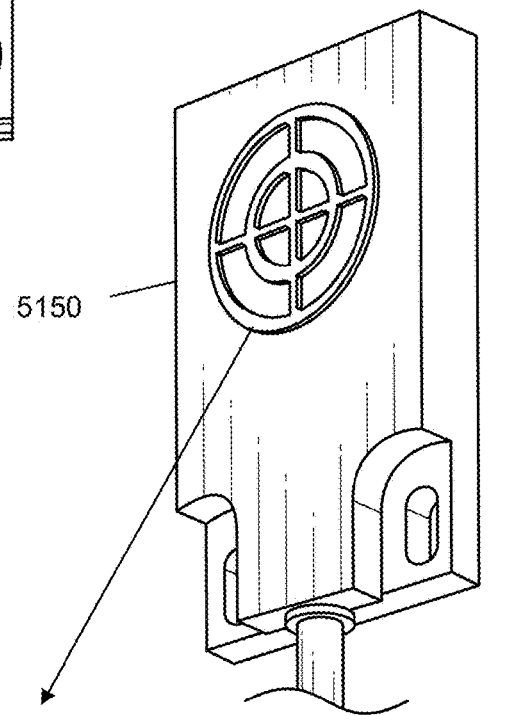
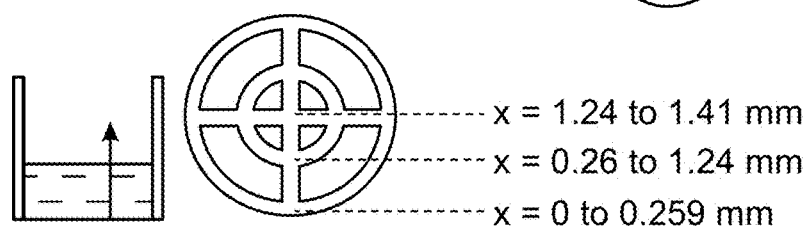
x = 1.24 to 1.41 mm
x = 0.26 to 1.24 mm
x = 0 to 0.259 mm
FIG. 38B

MODULAR FLOW CYTOMETRY SYSTEMS AND METHODS OF PROCESSING SAMPLES

CROSS-REFERENCES TO RELATED APPLICATIONS

This application is non-provisional and claims benefit of U.S. Provisional Application No. 63/230,568 filed Aug. 6, 2021, U.S. Provisional Application No. 63/162,222, filed Mar. 17, 2021, U.S. Provisional Application No. 63/119,769, filed Dec. 1, 2020, and U.S. Provisional Application No. 63/117,104 filed Nov. 23, 2020, the specifications of which are incorporated herein in their entirety by reference.

The present application incorporates by reference U.S. Design Pat. App. Ser. No. 29/815,327, filed Nov. 12, 2021, entitled MODULAR CYTOMETER SYSTEM (McDermot), and PCT App. No. PCT/US2021/059148, filed Nov. 12, 2021, entitled MODULAR FLOW CYTOMETRY SYSTEMS AND METHODS OF PROCESSING SAMPLES (Klas et al.).

FIELD OF THE INVENTION

The present invention relates to automated and semi-automated systems and methods for processing samples. More specifically, the present invention relates to systems and methods in a flow cytometer-based system for analyzing, handling, and processing fluids and components or particles in the sample.

The present invention features a modular flow cytometry system and methods for cleaning a sample pathway in a flow cytometer system.

The present invention also features optical systems used in the detection and sorting of particles in flow cytometry including particle sorting using electromagnetic emission and detection on microfluidic devices such as microfluidic chips.

The present invention further features mixing and collection systems for mixing particles or components in a sample with media and maintaining a desired suspension, such as a homogeneous mixture, of the particles or components in the sample and the media.

BACKGROUND

In the field of flow cytometry, it is often necessary to identify and sort particles, such as individual cells, after the particles have been properly aligned within the flow cytometer and either dispensed as a series of droplets with each droplet containing and individual particle, or moved through an internal detection region of the flow cytometer. In some applications it may be further necessary to remove certain particles from the flow stream or otherwise sort, inactivate, or deactivate particles in the flow stream.

In some systems, a microfluidic device such as a microfluidic chip is used to receive particle samples and/or a sheath or directing fluid and focus, organize, or otherwise position individual particles from the particle sample within a fluid flow in one or more channels in the microfluidic devices. The particles and fluids may flow through one or more interrogation and/or action locations in channels of the microfluidic device where detection, sorting, and/or destruction processes may be performed on the particles. The particles may then be expelled or otherwise removed from the microfluidic device such as by fluid flow or pressure.

Existing systems and methods for processing particles or components in a sample by flow cytometry-based systems comprise numerous steps, components, and elements, many of which rely on human intervention and manual processes. The extensive use of operator intervention, calibration, and operation in flow cytometry increases the likelihood of incorrect system parameters or calibration, sample mishandling, contamination, and overall error. Existing systems and methods which rely primarily on human operators in all aspects of the process are also subject to extended downtime and lengthy set-up and calibration steps based on the extensive expert manual intervention required. Manual processes may include preparing a sample, configuring flow rates for samples and sheath fluids, configuring or calibrating optical pathways for electromagnetic radiation emitters (e.g., laser modules), configuring laser module emission characteristics including power and duration, configuring detectors, configuring or programming sample processing characteristics, capturing or diverting samples, and mixing and storing processed samples.

Existing systems, apparatuses, and methods for processing samples, such as biological fluid samples comprising a plurality of cells, in flow cytometry devices, such as microfluidic systems, include using disposable microfluidic chips, cassettes, or cartridges. Other systems and methods include flow cytometry devices that may also run a cleaning fluid or air through a sample processing pathway. Still other systems and methods include a separate, stand-alone device for cleaning microfluidic chips, cassettes, or cartridges.

However, none of the existing systems completely isolate a sample pathway used by a fluid sample from the flow cytometry or microfluidic analysis device. For example, while in existing systems a portion of the sample pathway, such as a microfluidic chip or cassette, may be removed, other portions of the sample pathway contacted by a fluid sample are part of the flow cytometry device itself and cannot be removed from the system. These portions may include pathways between a sample storage or loading area and the microfluidic chip itself. Between sample runs, extensive cleaning and flushing of the flow cytometry device must be undertaken. This causes extensive downtime between the processing of separate fluid samples but is necessary to eliminate the possibility of biological or other contamination and to comply with various rules and regulations related to the processing of biological samples. For example, after processing a first fluid sample, such semen sample from a first male animal, the system would require extensive cleaning to eliminate the possibility of cross-contamination with a second fluid sample, such semen sample from a second male animal. Elimination of cross-contamination is necessary where the samples comprise different genetic material or traits and where contamination would render the samples unsuitable for use.

An additional problem with existing systems and methods is that while portions of the system may be removed for cleaning, the cleaning process itself is labor intensive and may require extensive manual input and configuration. However, many systems treat components such as microfluidic chips, cartridges, or cassettes as disposable, single-use items which greatly increases the amount of single-use plastic or glass waste by the lab.

What is needed is a replaceable and removable sample pathway module that may be removed from a flow cytometry device and cleaned on a separate cleaning device. The sample pathway module should be reusable and should be easily removable to provide for swapping between sample pathway modules on a flow cytometry device for near-continuous running of the flow cytometry device for sample processing.

Furthermore, existing systems and methods include means for determining one or more properties of a particle based upon a detected fluorescence of the particle by a detector, such as an avalanche photodiode. The particles may be caused to fluoresce by a directed and focused emission of electromagnetic radiation, such as by a laser. The detected fluorescence may be used as a basis for a sorting decision or a destruction decision.

In a sorting decision, certain particles having certain fluorescence characteristics with certain properties, or meeting certain thresholds as detected by one or more detectors, are sorted based on those characteristics. This sorting may include directing particles having certain characteristics into different flow streams and/or different collection containers by means including magnetic fields, microvalves, or pneumatic or hydraulic pressure pulses or jets.

There are advantages and disadvantages to using either a sorting decision or a destruction decision to process particles in flow cytometry. In a particular field of flow cytometry, the sorting of sperm cells as comprising either X-chromosome or Y-chromosome DNA for the purpose of sexing the sperm cells, it is important to preserve the viability or fertility of the sperm cells after being processed in the flow cytometer system. A sorting decision process or method may cause undue stress on the selected or desirable sperm cells, reducing viability or fertility of a collected sample of sperm cells. A destruction decision process or method may leave sperm cells that have not been completely deactivated in a collected sample, reducing the viability or fertility potential of the overall sample.

In a destruction decision, which may include an inactivation or damaging of the particle, certain particles having certain fluorescence characteristics, comprising certain properties, or meeting certain thresholds as detected by one or more detectors may be damaged or deactivated. This destruction may include ablation or photo-damaging by a directed and focused emission of electromagnetic radiation by a laser. For living cells, such as spermatozoa, this may be called a "kill event" or "cell kill event" as the destruction or deactivation decision will result in the death of the cell.

Additionally, with respect to destruction decision processes, aligning a laser or other electromagnetic radiation emission device used in the destruction process is a particularly time consuming process that requires extensive training and expertise to perform properly. This issue is particularly prevalent when changing between sample batches for a particular particle, such as when changing between unprocessed sperm samples from different male animals in semen processing. Existing systems and methods may only provide for the adjustment of the height (e.g., size of the kill beam or kill location in a longitudinal or flow direction) of the destruction or kill location within the interrogation or action location of the flow cytometer where the width is not controlled and is a function of laser divergence. Moreover, existing laser-based flow cytometer systems may comprise multiple optical systems and paths for providing fluorescence and "kill" lasers, and associated detector systems, at a single or set of adjacent interrogation or action locations. These existing systems may require complex, time-consuming, and precise setup and configuration to function properly. If set up incorrectly, these existing systems may not function as desired, if at all. The multiple optical pathways may also cause problems with crosstalk and interference between separate optical systems.

What is needed is an improved system and method for the detection and destruction of particles at an interrogation or action location in a flow cytometer system which improves the percentage, ratio, or rate of destruction for particles having certain fluorescence characteristics, comprising certain properties, or meeting certain thresholds as detected by one or more detectors. What is needed is a laser-based flow cytometer comprising an adjustable, tunable, or improved width for the laser kill location.

Further still, sample mixing in existing systems involves a manual mixing process in which an operator gently swirls the contents of a catch tube periodically, for example, every five minutes. This process results in several forms of errors, ranging from interpretation of what qualifies as a gentle swirl, variances from operator to operator in achieving mixing every five minutes, and the removal of the tube out of the path of the sample, e.g. cells, or causing sample to splash out of the tube due to over-mixing. Off-the-shelf orbital shakers can be automated, but have their own disadvantages. One is that they can take up space if they are too tall to fit underneath a dispensing instrument. Another is that the orbital travel may take the catch tubes away or outside of the path of the dripping sample. More compact mixers, such as vortexers, induce quick vibrational motion to rapidly result in mixing. However, these solutions may cause stress to the cells. What is needed is a system and method that improves the collection and mixing process of samples.

Additionally, there is a need to automate some or all of the processes involved in the processing of samples in flow cytometry systems, including the automation or semi-automation of at least the manual processes described above to improve efficiency, reduce downtime, and reduce operator induced errors.

Existing cytometer systems are large, bulky, and non-modular. Their components may be shipped separately or disassembled from each other, thus requiring expert or specialized training to set up and operate. Once assembled, the components are integrated onto the instrument itself and cannot be individually removed or repaired without extensive disassembly of the entire device or table of devices. These systems are intricate and complicated, and are not conducive to field repairs or calibration by relatively unskilled technicians. Additionally, these systems require prolonged downtime for maintenance, repairs, or cleaning, resulting in hours of interruption or longer if a skilled technician is unavailable. Hence, it is desirable to have a cytometer system with modular assemblies that are easy to set up, operate, and repair by any operator without requiring specialized training.

The problems or issues described here are exemplary and do not comprise all problems or issues that may be addressed, and a person having ordinary skill in the art would understand that a system, apparatus, or method that provides solutions to or addresses the problems defined above may solve or address other similar, complementary, or undefined problems.

SUMMARY OF THE INVENTION

Provided herein are automated and semi-automated systems, apparatuses, and methods for processing samples in a flow cytometry-based system. In some aspects, the present invention features a modular flow cytometry system for processing a sample.

In some embodiments, the modular flow cytometry system may comprise a support structure, an electronics module, a sample pathway module, a fluidics module, an interrogation module, and a sample mixing and collection module. Each module can be disposed in the support structure, and configured to be separately removed from the support structure and re-installed or replaced with another of the same module. In some embodiments, the system may further comprise a microfluidic device cleaning module for cleaning the sample pathway module.

In some other embodiments, the modular flow cytometry system for processing a sample may comprise a support structure, an electronics module comprising one or more of computer processors and electronic ports, a sample pathway module comprising a microfluidic module having at least one microfluidic channel, a fluidics module fluidically coupled to the sample pathway module for circulating one or more fluids through the sample pathway module, an interrogation module operatively coupled to the electronics module, the interrogation module including a detector, a detection laser and a kill laser for processing a sample flowing through the microfluidic chip, and a sample mixing and collection module configured to collect and mix the processed sample exiting the microfluidic module. Each module can be disposed in the support structure, and configured to be separately removed from the support structure and re-installed or replaced with another of the same module for near-continuous operation of the modular flow cytometry system. The kill laser and the detection laser may be disposed on a common side of the interrogation module with respect to each other. The sample mixing and collection module can rotate about a pivot so as to move in an arcuate path, which allows for mixing of the sample in a uniform and controlled motion. In some embodiments, the system may further comprise a microfluidic device cleaning module for cleaning the sample pathway module.

In some embodiments, the present invention features a modular flow cytometry system for sexing a sample. The system may comprise a chassis sectioned into a plurality of levels; an electronics module disposed in the first level of the chassis, the first level being the lowest of the plurality of levels, wherein the electronics module includes one or more computer processors and a plurality of electronic ports; a sample pathway module disposed in the second level of the chassis, wherein the sample pathway module includes a microfluidic module for holding a microfluidic chip; a fluidics module disposed in the second level of the chassis, wherein the fluidics module is fluidically coupled to the sample pathway module for circulating one or more fluids through the sample pathway module; an interrogation module disposed in the third level of the chassis and operatively coupled to the electronics module, the interrogation module including a detection laser operatively coupled to a detection assembly, and a kill laser operatively coupled to the detection assembly for processing a sample flowing through the microfluidic chip, wherein the kill laser and the detection laser are disposed on a common side of the interrogation module with respect to each other; and a sample mixing and collection module disposed below the microfluidic module in the same second level of the chassis, the sample mixing and collection module configured to collect and automatically mix the processed sample exiting the microfluidic chip. The sample mixing and collection module rotates about a pivot so as to move in an arcuate path, which allows for mixing of the sample in a uniform and controlled motion. Each module can be disposed in the support structure, and configured to be separately removed from the support structure and re-installed or replaced with another of the same module for near-continuous operation of the modular flow cytometry system.

In other embodiments, the sample pathway module may further comprise a distribution block fluidically coupled to the microfluidic module. The distribution block can deliver the sample to the microfluidic module via a first fluidic line, and a sheath fluid to the microfluidic module via a second fluidic line. In other embodiments, the system may not require sheath fluid, and the microfluidic module may receive inflow only from a single fluidic line delivering the sample. In some embodiments, the distribution block comprises a fluidic manifold. In other embodiments, the distribution block further comprises a sample tube loader.

In some embodiments, the system may further comprise a microfluidic device cleaning module for cleaning the sample pathway module. The microfluidic device cleaning system is adapted to clean the sample pathway module circulating a fluid through the sample pathway module. In some embodiments, the microfluidic device cleaning module may comprise a set of fluid reservoirs, a pump assembly, a distribution block interface comprising a distribution block securing element and a distribution block alignment element, the distribution block interface further comprising a set of fluid interfaces, at least one of the set of fluid interfaces in fluid communication with at least one of the set of fluid reservoirs, and a microfluidic device interface comprising a microfluidic device securing element and a microfluidic device alignment element, the microfluidic device interface further comprising a fluid interface, the fluid interface in fluid communication with at least one of the set of fluid reservoirs. The distribution block interface may be adapted to secure the distribution block thereon, and the microfluidic device interface may be adapted to secure the microfluidic module thereon.

According to some embodiments, the interrogation module may further include laser heat sinks for the lasers, which can draw in air via natural convection for cooling the optical module. In one embodiment, the kill laser and the detection laser are each disposed on a common side relative to a primary surface of the microfluidic chip. In another embodiment, the kill laser and the detection laser are each adapted to emit a laser beam comprising an elliptical beam profile at a focal plane. In preferred embodiments, the interrogation components in the interrogation module can be removed and replaced or reconnected.

In other embodiments, the sample mixing and collection module may comprise a rotary base, a set of collection tube holders disposed on top of the rotary base, a set of collection tubes, each tube configured to be disposed in a collection tube holder of the set of collection tubes, and a fluid level sensor. One of the collection tubes can be positioned below the microfluidic chip such that the processed sample is collected in said collection tube. When the fluid level sensor detects that said collection tube has reached a desired fill level, the sample mixing and collection module is configured to switch to another collection tube for collecting the processed sample. In some embodiments, the sample mixing and collection module may further comprise a mechanical diverter configured to prevent the processed sample exiting the microfluidic module from entering sample mixing and collection module.

In other embodiments, the electronics module includes an electronics box with a removable lid for housing the computer processors and other electronic components. The electronic components can be removed from the electronics box and replaced or reconnected. In some embodiments, the electronics box is disposed on rails for ease of movement. In other embodiments, the electronics module includes one or more fans for cooling the electronic components.

In some embodiments, the microfluidic chip may have one or more identifying elements disposed on a surface or etched into said surface of the microfluidic chip. Examples of the one or more identifying elements include, but are not limited to, alpha-numeric sequences, bar codes, QR-codes, fiducial markers, or combinations thereof. In one embodiment, the one or more identifying elements can be used to identify the chip that is currently loaded in the microfluidic module. In another embodiment, the one or more identifying elements can be used for automatically aligning and positioning the microfluidic chip relative to the detection and kill lasers. For example, the microfluidic chip with the identifying elements can be mounted onto a multi-axis stage; a detector, camera, scanner or sensor reads the identifying elements, and based on this reading, the multi-axis stage can be adjusted to reposition the microfluidic chip as needed.

In some embodiments, the system may further comprise an automated sample level detector adapted to utilize a sample flow rate to determine the sample level. The sample flow rate is related to the cell rate. If the cell rate is lower or higher than a target cell rate or outside of a tolerance range, the automated sample level detector can adjust the sample flow rate by adjusting an input sample pressure. If the input sample pressure surpasses a threshold pressure, the automated sample level detector can provide notification that the sample level is low or below a threshold level.

In one embodiment, the sample is a semen sample comprising sperm cells from a non-human mammal. Non-limiting examples of non-human mammals include bovine, porcine, equine, ovine, and caprine.

According to other embodiments, the present invention provides methods of sperm sexing. In one embodiment, the sperm sexing method comprises classifying sperm cells as having a first characteristic, a second characteristic, or a third characteristic, and selectively damaging at least a portion of the sperm cells based on their classification. The first characteristic may be the presence of an X-chromosome from one sperm cell, referred to as a singlet. The second characteristic may be the presence of a Y-chromosome from one sperm cell. The third characteristic may be the presence of both X and Y chromosomes or a repetition of one of the chromosomes due to multiple sperm cells, also referred to as a multiplet. As a non-limiting example, the third characteristic may be X & X chromosomes, X & Y chromosomes, Y & X chromosomes, or Y & Y chromosomes due to two sperm cells.

In another embodiment, the sperm sexing method may comprise interrogating stained sperm cells with a first radiation source to produce fluorescence emissions therefrom, detecting said fluorescence emissions, classifying the sperm cells based on the detected fluorescence emissions, and selectively damaging the sperm cells with a second radiation source based on their classification.

In yet another embodiment, the method of sperm sexing may comprise delivering a fluid stream comprising stained sperm cells to an interrogation location, interrogating the stained sperm cells with a first laser to produce fluorescence emissions therefrom, detecting said fluorescence emissions, classifying the sperm cells based on the detected fluorescence emissions, and selectively damaging with a second laser one or more sub-populations of the classified sperm cells based on their classification. In other embodiments, the method may further comprise dyeing the sperm cells to produce the stained sperm cells. The sperm cells can be dyed with a fluorescent DNA-binding dye.

In some embodiments, interrogating the stained sperm cells produces a fluorescence emission corresponding to one sperm cell or a fluorescence emission corresponding to multiple sperm cells. In one embodiment, damaging the sperm cells can cause DNA and/or membrane damage to the cell. In one embodiment, damaging the sperm cells results in said sperm cells becoming infertile or dead sperm cells.

According to other embodiments, the present invention provides a method for producing a sexed semen product. In one embodiment, the method may comprise providing a modular flow cytometry system comprising an electronics module, a sample pathway module, a fluidics module, an interrogation module, and a sample mixing and collection module, wherein each module is disposed in a support structure, wherein each module is configured to be separately removed and re-installed or replaced with another of the same module; flowing a semen sample having stained sperm cells through the fluidics module and sample pathway module; flowing sheath fluid through the fluidics module and sample pathway module; fluorescing the stained sperm cells using a detection laser in the interrogation module; detecting a fluorescence of the stained sperm cells; damaging a subpopulation of stained sperm cells using a kill laser in the interrogation module based on the detected fluorescence, thereby producing the sexed semen product; collecting the sexed semen product flowing from the sample pathway module into the sample mixing and collection module; and mixing the collected sexed semen product.

In other embodiments, the method may further comprise dyeing a semen sample comprising sperm cells to produce the stained sperm cells. In yet other embodiments, the method may further comprise cleaning the sample pathway module using a microfluidic device cleaning module. In some embodiments, emissions from the detection laser and the kill laser may comprise an elliptical beam profile. In other embodiments, the sample mixing and collection module rotates about a pivot so as to move in an arcuate path, which allows for mixing of the sexed semen product in a uniform and controlled motion.

In another embodiment, the method for producing a sexed semen product may comprise providing a modular flow cytometry system as described herein; dyeing a semen sample comprising sperm cells to produce stained sperm cells; flowing the semen sample through the fluidics module and sample pathway module; flowing sheath fluid through the fluidics module and sample pathway module, wherein the sheath fluid, one or more channels in the microfluidic chip, or a combination thereof focus the stained sperm cells as they flow in the microfluidic chip; fluorescing the stained sperm cells by emissions from the detection laser, wherein the emissions from the detection laser comprise an elliptical beam profile; detecting a fluorescence of the sperm cells by the detection assembly; deactivating one or more subpopulations of the stained sperm cells by emissions from the kill laser based on the detected fluorescence, thereby producing the sexed semen product, wherein the emissions from the kill laser comprises an elliptical beam profile, wherein the detection laser and the kill laser are disposed on a same side of the microfluidic chip; collecting the sexed semen product flowing from the microfluidic chip into the sample mixing and collection module; and automatically mixing the collected sexed semen product based on a set of defined sample mixing parameters associated with the processed sample. The sample mixing and collection module can rotate about a pivot so as to move in an arcuate path, which allows for mixing of the sexed semen product in a uniform and controlled motion.

In some embodiments, the method may further comprise diverting the flow of the sexed semen product exiting from the microfluidic chip into a separate collector and away from the sample mixing and collection module. In other embodiments, the method may further comprise automatically aligning and positioning the microfluidic chip relative to the detection and kill lasers by using identifying elements disposed on the microfluidic chip. In some other embodiments, the method may further comprise determining a sample level using an automated sample level detector and providing notification of when the sample level is below a threshold level. In further embodiments, the method may include cleaning the sample pathway module using a microfluidic device cleaning module.

In some embodiments, the method may further comprise diverting the flow of the sexed semen product away exiting from the microfluidic chip when a collection tube of the sample mixing and collection module is filled to a desired level with the sexed semen product, rotating a rotary base of the sample mixing and collection module such that a second collection tube is positioned to collect the sexed semen product, and diverting the flow of the sexed semen product to the second collection tube.

According to other embodiments, the present invention features a system, method, and apparatus for providing a replaceable and removable sample pathway module for use in a flow cytometry device, and a microfluidic device cleaning system for automatically or semi-automatically cleaning the removable and replaceable sample pathway module. The sample pathway module comprises a distribution block in fluid connection or communication with a microfluidic module. The distribution block and microfluidic module of the replaceable and removable sample pathway module and fluid connection therebetween comprise the entire fluid pathway for a fluid sample to be processed through the replaceable and removable sample pathway module by a flow cytometry device. The distribution block and microfluidic module of the replaceable and removable sample pathway module connect to an interface with corresponding interfaces of either the flow cytometry device or microfluidic device cleaning system to receive one or more fluids for cleaning or processing. The replaceable and removable sample pathway module is releasably secured to the flow cytometry device or microfluidic device cleaning module and may be used, removed, cleaned, and re-used or replaced for processing of fluid samples.

The microfluidic device cleaning system comprises an automatic or semi-automatic system for cleaning sample pathway modules, such as the replaceable and removable sample pathway module described above. The microfluidic device cleaning system comprises interfaces for a distribution block and microfluidic module of a sample pathway module wherein one or more fluids may be processed through the sample pathway module to clean the sample pathway module. A set of one or more internal or external reservoirs hold one or more cleaning fluids to be used in the cleaning process. An internal or external control system, such as a computer, tablet, or special-purpose microprocessor, is used to control cleaning processes. The control system is used to control other internal device operation including the operation of one or more internal valves, the operation of one or more internal pumps, and the processing of signals from one or more sensors, such as proximity sensors, camera or image sensors, and flow sensors to control the operation of the valves or pumps.

Additionally, without wishing to limit the present invention to any theory or mechanism, it is believed that the methods and systems described herein are advantageous because the replaceable, removable, cleanable, and modular sample pathway module and the microfluidic device cleaning system eliminate or substantially reduce downtime typically experienced when changing between sample runs or microfluidic chips in a flow cytometry device used in processing particles in fluid samples.

In a first embodiment, what is provided is a replaceable and removable fluid pathway module for use in a flow cytometer system, the fluid pathway comprising: a distribution block comprising a set of fluid inlets and a set of fluid outlets, wherein at least one of the set of fluid inlets is in fluid communication with at least one of the set of fluid outlets forming a first sample pathway element; a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming a sample pathway; wherein a sample processed by the flow cytometer system via the replaceable and removable fluid pathway module is confined to the sample pathway during processing.

The microfluidic device retainer is adapted to secure one of a microfluidic chip or a microfluidic cassette in the microfluidic module. The microfluidic device retainer may comprise one or more adjustment means adapted to adjust the position of the microfluidic chip or the microfluidic cassette. The distribution block may comprise a fluidic manifold. The distribution block may further comprise a sample tube loader. The fluid pathway module may further comprise the distribution block where another inlet of the set of fluid inlets is in fluid communication with another outlet of the set of fluid outlets forming a first buffer fluid path element; the microfluidic module another inlet of the set of fluid inlets is in fluid communication with another outlet of the set of fluid outlets forming a second buffer fluid path element; the fluid pathway further comprises a second portion joining the first buffer fluid path element and the second buffer fluid path element in fluid communication forming a buffer fluid pathway; and wherein a buffer fluid processed through the replaceable and removable fluid pathway module is confined to the buffer fluid pathway during processing.

The distribution block and the microfluidic module may each further comprise a releasable securing means adapted to secure to the flow the replaceable and removable fluid pathway module to the flow cytometer system. The releasable securing means may comprise one at least one ferrous plate or at least one magnetic plate. The replaceable and removable fluid pathway module may be removable from the flow cytometer system by releasing the securing means. The releasable securing means of the replaceable and removable fluid pathway module may be further adapted to secure the replaceable and removable fluid pathway module to a fluid pathway cleaning system.

The sample may be a mammalian semen sample. In one embodiment, the sample may comprise sperm cells, such as non-human sperm cells including porcine, bovine, equine, and ovine. The sperm cells may be infused and stained with a dye. The flow cytometer system may process the sample to identify a subpopulation in the sample. The system may process the sample to perform a semen sexing operation.

In some embodiments, the fluid pathway module may comprise an identifying element. The identifying element may comprise an optical identifying element or a radio identifying element. The optical identifying element may comprise a set of characters or fiducials on a microfluidic chip in the microfluidic module.

In another embodiment, what is provided is a microfluidic device cleaning system, the system comprising: a set of fluid reservoirs; a pump assembly; a distribution block interface comprising a distribution block securing element and a distribution block alignment element, the distribution block interface further comprising a set of fluid interfaces, at least one of the set of fluid interfaces in fluid communication with at least one of the set of fluid reservoirs; and a microfluidic device interface comprising a microfluidic device securing element and a microfluidic device alignment element, the microfluidic device interface further comprising a fluid interface, the fluid interface in fluid communication with at least one of the set of fluid reservoirs; wherein the microfluidic device cleaning system is adapted to circulate a fluid through a replaceable and removable fluid pathway module secured to the distribution block interface and to the microfluidic device interface.

The replaceable and removable fluid pathway module is adapted for use in a flow cytometer system and further comprises: a distribution block comprising a set of fluid inlets and a set of fluid outlets, wherein at least one of the set of fluid inlets is in fluid communication with at least one of the set of fluid outlets forming a first sample pathway element; a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming a sample pathway; wherein a sample processed by the flow cytometer system via the replaceable and removable fluid pathway module is confined to the sample pathway during processing.

The set of fluid reservoirs comprises a cleaning fluid reservoir and a waste fluid reservoir. The set of fluid reservoirs may be disposed external to a housing of the system. The microfluidic device cleaning system may further comprise a plurality of releasable connections providing fluid connections to the external set of fluid reservoirs. The pump assembly may comprise a liquid pump and an air pump. At least one of the pumps comprises a peristaltic pump. The system may further comprise a set of valves for controlling fluid flow within the system. The system may further comprise a set of fluid flow sensors adapted to provide a signal indicating a rate of flow in one or more elements of the system. The system may further comprise a set of proximity sensors adapted to provide a signal indicating the presence or absence of the replaceable and removable fluid pathway module. The system may further comprise an imaging device for capturing a set of images of the replaceable and removable fluid pathway module, the distribution block interface, or the microfluidic device interface.

The microfluidic device cleaning system may further comprise a monitoring and interface system, the monitoring and interface system comprising a processor, a memory, and an input/output interface. The monitoring and interface system may be adapted to receive a set of inputs for selecting or configuring a cleaning protocol for the microfluidic device cleaning system. The set of inputs may comprise a set of user inputs. The set of inputs may be automatically determined based on a property or characteristic of the replaceable and removable fluid pathway module. The monitoring and input system may be adapted to receive a set of inputs from at least one sensor and alter the cleaning protocol based on the received set of inputs. The monitoring and input system may be adapted to transmit a set of control signals to one or more valves, actuators, or pumps based on the cleaning protocol. The microfluidic device cleaning system may further comprise a flow cytometry device. The flow cytometry device may comprise a fluorescence-based detection and laser ablation flow cytometry device.

In another embodiment, what is provided is a method for replacing and cleaning a sample pathway module for a flow cytometry system, the method comprising: releasing the sample pathway module from a flow cytometry device, the sample pathway module comprising an entire fluid pathway for processing a sample by the flow cytometry system; removing the sample pathway module from the flow cytometry device; connecting the sample pathway module to a corresponding receiving portion of a microfluidic device cleaning system; configuring a set of cleaning parameters for the microfluidic device cleaning system; and automatically cleaning the sample pathway module by the microfluidic device cleaning system based on the set of cleaning parameters.

In some embodiments, the sample pathway module is adapted for use in the flow cytometry system and further comprises: a distribution block comprising a set of fluid inlets and a set of fluid outlets, wherein at least one of the set of fluid inlets is in fluid communication with at least one of the set of fluid outlets forming a first sample pathway element; a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming the fluid pathway; wherein a sample processed by the flow cytometer system via sample pathway module is confined to the fluid pathway during processing. The method may further comprise removing the sample pathway module from the microfluidic device cleaning system. The method may further comprise a set of cleaning parameters comprising an amount or volume of cleaning fluid, a fluid pressure, and a cleaning procedure duration. The cleaning procedure duration may comprise a number of swept paths, which is the number of sample pathway volumes to be cleaned. The cleaning procedure duration may comprise at least one drying cycle.

In some embodiments, the method may further comprise detecting, using an imaging sensor, a blockage in the sample pathway module and halting the automatic cleaning. Halting the automatic cleaning may further comprise providing an error indication. The method may further comprise measuring, using at least one flow sensor, a volume of fluid used in the automatic cleaning. The measured volume may be used to determine a maintenance event for the microfluidic device cleaning system.

In other embodiments, the method may further comprise: transmitting a signal from at least one proximity sensor indicating that the sample pathway module is correctly connected to the microfluidic device cleaning system; and initiating the automatic cleaning based upon the transmitted signal. The sample pathway module may be adapted for use in the flow cytometry system. The entire fluid pathway for processing the sample may further comprise: a sample pathway comprising a fluid inlet and a fluid outlet, wherein at the fluid inlet is in fluid communication with at the fluid outlet; a microfluidic chip comprising a set of fluid inlets and a set of fluid outlets, wherein the set of fluid inlets are in fluid communication with the set of fluid outlets forming at least one microfluidic channel; wherein the microfluidic chip is disposed in the sample pathway between the fluid inlet and the fluid outlet of the sample pathway, the at least one microfluidic channel comprising an element of the sample pathway; and wherein the sample processed by the flow cytometry system via the sample pathway module is confined to the sample pathway during processing.

In another embodiment, what is provided is a fluid pathway module for use in processing fluid samples comprising a plurality of particles, the fluid pathway comprising: a sample pathway comprising a fluid inlet and a fluid outlet, wherein at the fluid inlet is in fluid communication with at the fluid outlet; a microfluidic chip comprising a set of fluid inlets and a set of fluid outlets, wherein the set of fluid inlets are in fluid communication with the set of fluid outlets forming at least one microfluidic channel; wherein the microfluidic chip is disposed in the sample pathway between the fluid inlet and the fluid outlet of the sample pathway, the at least one microfluidic channel comprising an element of the sample pathway; and wherein a fluid sample processed by a flow cytometry device via the fluid pathway module is confined to the sample pathway during processing.

The fluid pathway module of the above embodiment may further comprise a sheath fluid pathway comprising a fluid inlet and a fluid outlet, wherein the fluid inlet is in fluid communication with the fluid outlet. The microfluidic chip may be disposed in the sheath fluid pathway between the fluid inlet and the fluid outlet of the sheath fluid pathway, the at least one microfluidic channel comprising an element of the sample pathway. The fluid pathway module may further comprise: a distribution block comprising a set of fluid inlets and a set of fluid outlets, wherein at least one of the set of fluid inlets is in fluid communication with at least one of the set of fluid outlets forming a first sample pathway element; a microfluidic module comprising a set of fluid inlets, a set of fluid outlets, and a microfluidic device retainer adapted to retain the microfluidic chip, wherein at least one of the set of fluid inlets is in fluid communication with at least one of the set of fluid outlets forming a second sample pathway element; and a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming the sample pathway.

The distribution block may comprise a fluidic manifold. The distribution block may further comprise a sample tube loader. The fluid pathway module may further comprise a releasable securing means adapted to secure the fluid pathway module to the flow cytometer system. The releasable securing means may comprise one at least one ferrous plate or at least one magnetic plate. The fluid pathway module may be removable from the flow cytometer system by releasing the securing means. The releasable securing means of the replaceable and removable fluid pathway module may be further adapted to secure the replaceable and removable fluid pathway module to a fluid pathway cleaning system. The fluid sample may be a mammalian semen sample comprising a plurality of sperm cells. The flow cytometer system may process the sample to identify a subpopulation in the fluid sample. The flow cytometer system may process the sample to perform a semen sexing operation. The fluid pathway module may comprise an identifying element. The identifying element may comprise an optical identifying element or a radio identifying element. The optical identifying element may comprise a set of characters or fiducials on a microfluidic chip in the microfluidic module.

According to another embodiment, the present invention provides a flow cytometer system comprising an improved optical path and combination of elements for delivering electromagnetic radiation to an interrogation and/or action location in a flow cytometer. The new system of the present invention provides for the emission of both a detection laser and a kill or ablation laser from the same direction with respect to the direction of flow of a sample fluid.

The present invention addresses problems existing in known systems and methods for the optical detection and destruction of particles in a flow cytometer system. In existing systems, directing beams from two or more lasers through separate beam paths increases the number of components that may experience damage or deterioration over time. Additionally, emitting electromagnetic radiation from different sides of a flow stream may require complex beam paths and orientation or location of elements for focusing and detecting signals derived from the electromagnetic radiation. The present invention addresses these issues by providing for the emission of both a detection laser, for the fluorescing of a particle such as one that has been exposed to a dye process, and a kill or ablation laser from the same direction with respect to the direction of flow of a sample fluid.

Additionally, the shape of the kill beam spot in the ablation region of a flow cytometer system used in a sperm sexing process significantly impacts the photon dose delivered to particular points within the sample stream, impacting the efficacy of the kill laser on individual cells. The present invention provides for a kill beam or kill location of the kill laser that is as wide as or wider than a flow channel or droplet size in a flow cytometer system. The present invention provides for the adjustment of the width of a laser beam emission at a beam waist or focal plane in a flow cytometer system wherein the width is not a function of laser divergence as determined by an adjustment of a height of the beam at the focal plane.

Additionally, without wishing to limit the present invention to any theory or mechanism, it is believed that the methods and systems herein are advantageous because the present invention provides for faster kill alignment, a more reliable and consistent skew of sorted particles (i.e., more particles of a desired type are collected at the end of the sorting process), and a more consistent performance of a flow cytometer sorting system. The present invention may also provide for faster or simplified training and setup when compared to existing systems and methods based on the simplified optical pathways provided by the positioning and emission of a detection laser and kill laser from the same direction with respect to the flow of a sample fluid. The simplified system of the present invention is also applicable or usable in a broad range of microfluidic or flow cytometry systems, providing for increased implementation flexibility when compared to existing systems and methods.

Additionally, without wishing to limit the present invention to any theory or mechanism, it is believed that the methods and systems herein are advantageous because the combination of adjustable beam expanders, cylindrical lenses and aspheric lenses with a beam combiner, such as a polarizing beam splitter, provide for the positioning of kill and detection laser assemblies on a common side relative to a microfluidic chip while providing for an adjustable elliptical beam waist at a focal plane that may be specifically configured to a type or size of microfluidic channel or chip.

In a first embodiment the present invention provides a laser-based flow cytometry system for particle detection, the system comprising: a laser assembly comprising: a kill laser assembly; and a detection laser assembly; wherein the kill laser assembly and the detection laser assembly are disposed on a common side with respect to each other and relative to the flow cytometry system. The flow cytometry system may comprise a microfluidic device such a microfluidic chip or a microfluidic cassette. The kill laser assembly and the detection laser assembly may each be disposed on a common side relative to a primary surface of the microfluidic device. The primary surface may be a top surface or a bottom surface. The laser assembly may further comprise a polarizing beam splitter. Each of the kill laser assembly and the detection laser assembly may further comprise an optical pathway adapted to direct an electromagnetic radiation emission to a focal plane. The optical pathway of the kill laser assembly and the optical pathway of the detection laser assembly may each comprise a fast-axis beam expander and a slow-axis beam expander. The optical pathway of the detection laser may comprise a pair of cylindrical lenses. The fast-axis beam expander and the slow-axis beam expander of the optical pathway for the kill laser assembly may be adapted to provide for adjustment of a fast-axis beam width and a slow-axis beam width for the kill laser assembly. The fast-axis beam expander and the slow-axis beam expander of the optical pathway for the detection laser assembly may be adapted to provide for adjustment of a fast-axis beam width and a slow-axis beam width for the detection laser assembly. The cylindrical lenses of the optical pathway of the detection laser may be adapted to provide for the adjustment and beam shaping of a fast-axis beam width and a slow-axis beam width for the detection laser assembly.

In some embodiments, the kill laser assembly and the detection laser assembly may be adapted to emit a laser beam comprising an elliptical beam profile at a focal plane. The elliptical beam profile of the kill laser assembly may have a fast-axis beam width of 0.5-5 μm measured at a focal plane. The elliptical beam profile of the kill laser assembly may have a slow-axis beam width of 5-35 μm measured at a focal plane. The elliptical beam profile of the kill laser assembly may have a fast-axis beam width of 3.45-5 μm and a slow-axis beam width of 5-35 μm measured at a focal plane. The elliptical beam profile of the detection laser assembly may have a fast-axis beam width of 3.5-20 μm and a slow-axis beam width of 30-150 μm measured at a focal plane. The kill laser assembly may operate at a pulse energy of 1-5 μJ per pulse. The kill laser assembly may comprise a pulse laser module with a pulse duration of 1-500 nanoseconds. The kill laser assembly may comprise a pulse laser module with a pulse duration of 5-30 nanoseconds. The detection laser assembly may comprise a continuous wave laser module, a quasi-continuous wave laser module, or a pulse laser module. The system may further comprise a detection assembly. The detection assembly may be adapted to detect one or more fluorescence of a particle excited by an emission from the detection laser assembly, a deactivation of a particle by an emission from the kill laser assembly, an image of a detection event, or an image of a kill event. The detection assembly may comprise at least one avalanche photodiode. The at least one avalanche photodiode may be adapted to detect a fluorescence of a particle excited by an emission from the detection laser assembly. The at least one avalanche photodiode may be adapted to detect a deactivation of a particle by an emission from the kill laser assembly. The detection assembly may comprise a CCD camera. The CCD camera may be adapted to capture an image of a detection event. The CCD camera may be adapted to capture an image of a kill event.

In another embodiment, the present invention provides a laser assembly, the laser assembly comprising: a laser module; and an optical pathway; wherein the optical pathway is adapted to shape an electromagnetic radiation beam emission from the laser module into an elliptical profile at a focal plane.

In some embodiments, the laser assembly is one of a detection laser assembly and a kill laser assembly. The optical pathway may comprise a fast-axis beam expander and a slow-axis beam expander. The optical pathway may comprise a pair of cylindrical lenses. The fast-axis beam expander may be adapted to provide for adjustment of a fast-axis beam width for the beam emission. The slow-axis beam expander may be adapted to provide for adjustment of a slow-axis beam width for the beam emission. The pair of cylindrical lenses may be adapted to provide for adjustment of a beam profile at a focal plane for the beam emission. The elliptical beam profile of the laser assembly may have a fast-axis beam width of 0.5-5 μm measured at the focal plane. The elliptical beam profile of the laser assembly may have a slow-axis beam width of 5-35 μm at the focal plane. The elliptical beam profile of the laser assembly may have a fast-axis beam width of 3.45-5 μm and a slow-axis beam width of 5-35 μm at the focal plane. The elliptical beam profile of the laser assembly may have a fast-axis beam width of 3.5-20 μm and a slow-axis beam width of 30-150 μm at the focal plane. The laser module may operate at a pulse energy of 1-5 μJ per pulse. The laser module may comprise a pulse laser module with a pulse duration of 1-500 nanoseconds. The laser module may comprise a pulse laser module with a pulse duration of 5-30 nanoseconds. The laser module may comprise a continuous wave laser module, a quasi-continuous wave laser module, or a pulse laser module. The pair of cylindrical lenses may comprise an F25 cylindrical lens and an F150 cylindrical lens. The optical pathway may comprise an aspheric lens. The optical pathway may comprise a polarizing beam splitter. The optical pathway may comprise a harmonic separator. The optical pathway may comprise a wave plate.

In another embodiment, the present invention provides an optical pathway for a laser assembly for use in flow cytometry, the optical pathway comprising: a beam expander; a wave plate; an aspheric lens; and a polarizing beam splitter; wherein the beam expander is adapted to shape an emission of electromagnetic radiation beam emission from a laser module into an elliptical beam profile at a focal plane.

In some embodiments, the beam expander comprises a fast-axis beam expander and a slow-axis beam expander. The fast-axis beam expander may be adapted to provide for adjustment of a fast-axis beam width for the beam emission. The slow-axis beam expander may be adapted to provide for adjustment of a slow-axis beam width for the beam emission. The elliptical beam profile may have a fast-axis beam width of 0.5-5 μm and a slow-axis beam width of 5-35 μm measured at the focal plane. The laser module may operate at a pulse energy of 1-5 μJ per pulse. The laser module may comprise a pulse laser module with a pulse duration of 1-500 nanoseconds. The laser module may comprise a pulse laser with a duration of 5-30 nanoseconds. The optical pathway may further comprise a harmonic separator.

In another embodiment, the present invention provides a sexed non-human mammalian semen product, the product comprising: a collection of sexed, non-human mammalian sperm cells derived from a sample of un-sexed, non-human semen, the un-sexed, non-human semen having been sexed by a sexing process comprising: dyeing the sample of un-sexed, non-human semen; inserting the dyed sample of un-sexed, non-human semen into a flow cytometry device; inserting a sheath fluid into the flow cytometry device, wherein the sheath fluid and a channel in the flow cytometry device orient and position cells in the sample of un-sexed, non-human semen; fluorescing the dye in the dyed sample of un-sexed, non-human semen by an emission a first laser module, wherein the emission from the first laser module comprises an elliptical beam profile; detected a fluorescence of for each sperm cell in the dyed sample of un-sexed, non-human semen by a detector; deactivating a subset of the non-human semen by an emission from a second laser module based on the detected fluorescence to create sexed non-human semen, wherein the emission from the second laser module comprises an elliptical beam profile, and wherein the first laser module and the second laser module are disposed on a common side of the flow cytometry device, the common side being a side opposite to the detector; and collecting the sexed non-human semen.

In another embodiment, the present invention provides a method for sexing non-human mammalian semen, the method comprising: dyeing a sample of un-sexed, non-human semen; inserting the dyed sample of un-sexed, non-human semen into a flow cytometry device; inserting a sheath fluid into the flow cytometry device, wherein the sheath fluid and a channel in the flow cytometry device orient and position cells in the sample of un-sexed, non-human semen; fluorescing the dye in the dyed sample of un-sexed, non-human semen by an emission a first laser module, wherein the emission from the first laser module comprises an elliptical beam profile; detected a fluorescence of for each sperm cell in the dyed sample of un-sexed, non-human semen by a detector; deactivating a subset of the non-human semen by an emission from a second laser module based on the detected fluorescence to create sexed non-human semen, wherein the emission from the second laser module comprises an elliptical beam profile, and wherein the first laser module and the second laser module are disposed on a common side of the flow cytometry device, the common side being a side opposite to the detector; and collecting the sexed non-human semen.

According to yet another embodiment, the present invention provides automated or semi-automated systems for the routing or diverting of processed samples and for the mixing of processed samples in, for example, a microfluidic chip-based flow cytometry system. Providing automated or semi-automated systems for the handling of processed samples removes manual or operator intensive steps from the processing of a sample, improving the efficiency of the process and the quality of the processed samples. More consistent operation by way of automated sample routing and mixing reduces opportunities for operator-induced error by automating routine or repeatable steps in the sample processing operation.

It is another objective of the present invention to provide systems and methods that allow for automated mixing, more consistent mixing time, and a path to ensure that the inner diameter of the tube is constantly underneath the path of cells. Embodiments of the present invention comprise a mixing system that gently mixes along a pivot, allowing for automation of mixing for applications of limited space. Embodiments of the present invention can reduce cell stress by controlling the mixing motion, as well as reduce the time the cells are in an over-concentrated solution of fluid.

In some aspects, the present invention features a sample mixing system. The sample mixing system is used with a flow cytometry system for processing samples comprising a component or particle. For example, the sample mixing system may be used with a microfluidic chip based flow cytometry system wherein a sample, such as a biological or genetic sample comprising a plurality of cells, is processed by a set of electromagnetic beam emission devices, such as lasers. The cells in the sample may be processed in the microfluidic chip such that a subset of the sample is deactivated, destroyed, or removed following the processing in the microfluidic chip, the sample is expelled from the microfluidic chip by one or more outlets at a terminal end of the chip. Based on meeting a set of criteria or parameters, the processed sample is permitted to flow into a sample catch tube disposed on the sample mixing system or is diverted into a waste collection container.

In some embodiments, the sample mixing system may comprise a rotary base, a plurality of collection tube holders disposed on top of the rotary base, and a plurality of collection tubes. Each collection tube is configured to be disposed in a collection tube holder. The collection tubes may contain media, such as buffered media, for which mixing maintains buffering and controls a degree of buffering. The rotary base can rotate such that the collection tube holders and collection tubes revolve or move in an arcuate path. This movement causes mixing of the contents in the collection tubes.

In some embodiments, the rotary base may be a circular plate disposed on a platform. In one embodiment, the rotary base is operatively coupled to a motor that rotates said rotary base about its central axis. The rotary base is rotated based on one or more of a mixing arc defined in degrees, a mixing arc defined in steps, and a rotational speed. In some embodiments, the rotary base can rotate back and forth. A degree of rotation of the rotary base is about 10° to 180°.

In other embodiments, the rotary base may contain magnets that are positioned separately from each other. In conjunction, a base of each collection tube holder contains a magnet. Each collection tube holder can be attached to the rotary base by magnetic attraction between the magnet of said collection tube holder and one of the magnets of the rotary base.

In some embodiments, the sample mixing system may further comprise one or more Hall effect sensors. For example, one of the magnets in the rotary base has its south pole oriented towards the one or more Hall effect sensors and the other magnets are oriented with their north pole directed toward the one or more Hall effect sensors.

In other embodiments, the sample mixing system may comprise about 2 to 6 collection tube holders. Each collection tube holder may comprise two or more arms projecting upwardly from the base. The two or more arms are configured to hold the collection tubes upright on the base. In some embodiments, the two or more arms are expansible to accommodate various sizes of collection tubes.

In some embodiments, the system can be positioned under a dispensing instrument such that the dispensing instrument dispenses a sample into one of the collection tubes. Preferably, the collection tube that is receiving the sample remains under a dispensing path of the dispensing instrument as said collection tube moves in the arcuate path to mix the sample. After mixing the sample in the collection tube for a period of time (e.g. 5-10 minutes), the system automatically places another collection tube under the dispensing instrument such that the sample is dispensed into the other collection tube.

In other embodiments, the sample mixing system may further comprise a sensor for detecting a liquid level inside the collection tube. The sensor can be positioned at or near an outer surface of the collection tube. In yet other embodiments, the sample mixing system may further comprise an auto dump configured to prevent flow from entering the collection tube.

In other aspects, the sample mixing system described herein may be used in a method of mixing a sorted sample. The method may comprise collecting the sorted sample into a collection tube of the sample mixing system, and automatically mixing the collected sample in the collection tube by rotating the rotary base such that collection tube disposed in the collection tube holder revolve or move in an arcuate path to mix the collected sample in a uniform and controlled motion. In further embodiments, the method may include diverting a flow of the sorted sample from the collection tube to a separate collector when the collection tube is filled to desired level, rotating the rotary base such that a second collection tube is positioned to collect the sorted sample, and diverting the flow of the sorted sample to the second collection tube.

One of the unique and inventive technical features of the present invention is the automatically induced mixing of a sample tube back and forth in an arc. Without wishing to limit the invention to any theory or mechanism, it is believed that the technical feature of the present invention advantageously allows for automated and more consistent mixing of the collection tubes underneath the dispensing instruments, such as microfluidic-based or droplet-based flow cytometers. The motion ensures a uniform concentration between cell media and cells inside a sample tube, while the cells drip into the tube over media over time. After mixing of one tube is completed, a swap capability allows for the motor to flip between an "in-use" to "in-queue" tube. The sample mixing system of the present invention is also compact enough to fit in the space allotted within the sexing instrument and requires less human intervention. None of the presently known prior references or work has the unique inventive technical feature of the present invention.

According to other embodiments, the present invention features a particle processing system comprising a flow cytometry assembly for processing particles or components in a sample based on at least one characteristic, and an automatic sample mixing system configured to automatically mix the sample processed by the flow cytometry assembly based on a set of defined parameters. In one embodiment, the automatic sample mixing system can rotate about a pivot so as to move in an arcuate path, which allows for mixing of the sample in a uniform and controlled motion. The set of defined parameters comprises one or more of a mixing arc defined in degrees, a mixing arc defined in steps, and a rotational speed.

In one embodiment, the automatic sample mixing system further comprises a rotary base, a set of collection tube holders disposed on top of the rotary base, and a set of collection tubes, each tube configured to be disposed in a collection tube holder of the set of collection tubes. In another embodiment, the automatic sample mixing system further comprises a fluid level sensor. The automatic sample mixing system is configured to switch between a first tube and a second tube in the set of collection tubes when the fluid level sensor detects that the first tube has reached a desired fill level.

In some embodiments, the particle processing system further comprises a mechanical diverter configured to prevent an output stream comprising the processed sample from the flow cytometer from entering the automated sample mixing system.

According to another embodiment, the particle processing system may comprise a flow cytometry assembly for processing particles or components in a sample based on at least one characteristic, and a mechanical diverter configured to prevent an output stream comprising the processed sample from the flow cytometer from entering a sample collection container based on a set of defined parameters. The mechanical diverter is configured to prevent the output stream comprising the processed sample from the flow cytometer from entering the automated sample mixing system. The set of defined parameters for the mechanical diverter may comprise one or more of a purity of the sample, a number of particles in the sample, and a fill level of a collection container.

In other embodiments, the particle processing system may further comprise an automatic sample mixing system configured to automatically mix the sample processed by the flow cytometry assembly and collected in the sample collection container based on a set of defined parameters. The set of defined parameters for the automatic sample mixing system comprises one or more of a mixing arc defined in degrees, a mixing arc defined in steps, and a rotational speed. In a non-limiting embodiment, the automatic sample mixing system may comprise a rotary base, a set of collection tube holders disposed on top of the rotary base, and a set of collection tubes, each tube configured to be disposed in a collection tube holder of the set of collection tubes. The automatic sample mixing system is configured to switch between a first tube and a second tube in the set of collection tubes when the fluid level sensor detects that the first tube has reached a desired fill level. In some embodiments, the automatic sample mixing system further comprises a fluid level sensor.

In further embodiments, the present invention provides a method for producing a sexed, non-human semen product. The method may comprise processing a semen sample in a flow cytometry apparatus to select a first sub-population of the sample comprising at least one desirable characteristic from a second sub-population of the sample comprising at least one non-desirable characteristic, collecting the sample primarily comprising the first sub-population comprising the at least one desirable characteristic in a sample collection container, and automatically mixing the collected sample in the sample collection container using any one of the sample mixing systems described herein. Mixing the collected sample may be based on a set of defined sample mixing parameters associated with the processed sample, such as one or more of a mixing arc defined in degrees, a mixing arc defined in steps, and a rotational speed. The sample mixing system can rotate about a pivot so as to move in an arcuate path, which allows for mixing of the sample in a uniform and controlled motion.

In some embodiments, the method further comprises mechanically diverting a portion of the processed sample from being collected in the sample collection container after the processed sample has exited the flow cytometry apparatus. Mechanically diverting the processed sample may be based on one or more defined parameters comprising a purity of the sample, a number of particles in the sample, and a fill level of a collection container. In other embodiments, the method includes switching between a first tube and a second tube in the set of collection tubes when a fluid level sensor detects that the first tube has reached a desired fill level.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

In order to facilitate a full understanding of the present invention, reference is now made to the exemplary embodiments provided in the accompanying drawings, in which like elements are referenced with like numerals. These drawings should not be construed as limiting the present invention but are intended to be exemplary and for reference.

FIG. 9A shows the internal components of the fluidics module.

FIG. 9B illustrates how the fluidics module is connected to the back end fluidics ports of the system.

FIG. 10 provides a flowchart illustrating an embodiment of a process and method for using a replaceable and removable sample pathway in a flow cytometer system and for cleaning the replaceable and removable sample pathway using a microfluidic device cleaning system.

FIG. 20A shows an embodiment of an electronics module disposed in the cytometry system of the present invention.

FIG. 20B shows the electronics module covered with a lid.

FIG. 20C shows the internal components of the electronics module.

FIGS. 36A-38B show the sample mixing system integrated into a sample dispensing instrument.

FIGS. 37A-37C show another embodiment of the sample mixing system with larger collection tubes.

FIG. 38A shows one embodiment of a liquid level sensor being used with the sample mixing system.

FIG. 38B shows a close-up view of the liquid level sensor in FIG. 38A.

DETAILED DESCRIPTION

Figure 1:
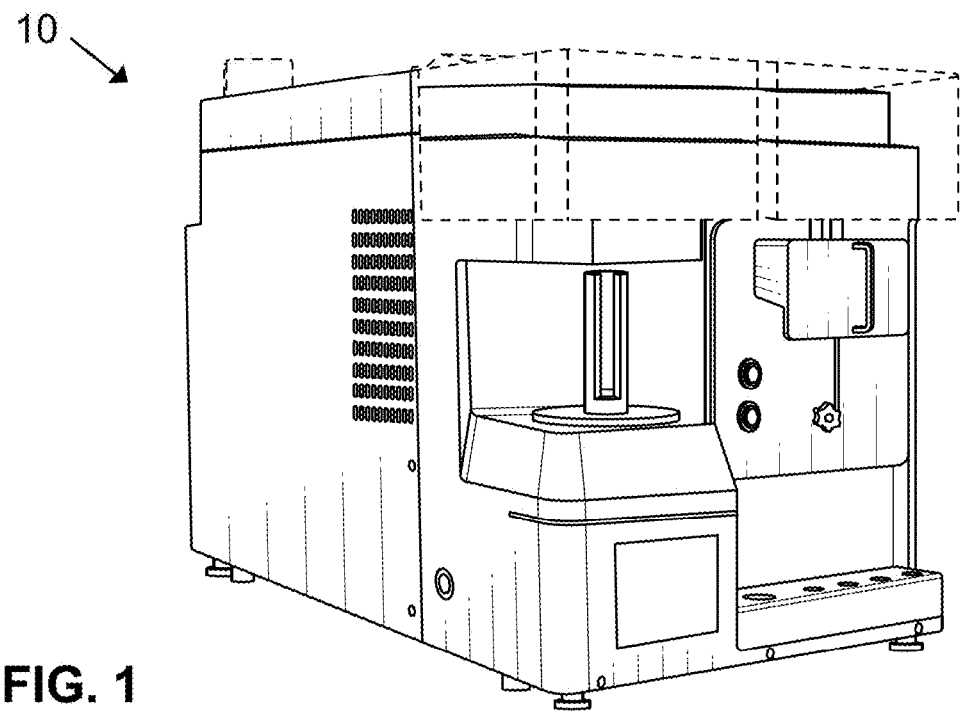
FIG. 1 shows a non-limiting embodiment of a modular flow cytometry system of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one aspect, the present disclosure relates to flow cytometry systems and methods that can isolate particles or cellular materials, such as sperm and other particles or cells, into various components and fractions. For example, the various embodiments of the present invention provide for isolating components in a mixture, such as isolating viable and motile sperm from non-viable or non-motile sperm; isolating sperm by gender, and other sex sorting variations; isolating stems cells from cells in a population; isolating one or more labeled cells from un-labeled cells distinguishing desirable/undesirable traits; isolating genes in nuclear DNA according to a specified characteristic; isolating cells based on surface markers; isolating cells based on membrane integrity (viability), potential or predicted reproductive status (fertility), ability to survive freezing, etc.; isolating cells from contaminants or debris; isolating healthy cells from damaged cells (i.e., cancerous cells) (as in bone marrow extractions); red blood cells from white blood cells and platelets in a plasma mixture; and isolating any cells from any other cellular components, into corresponding fractions.

As used herein, the sperm sample is understood to be sourced from a non-human mammal. The sperm sample may be a freshly collected sample or a thawed, previously cryopreserved sample from a source animal. Examples of the source animal include, but are not limited to, bovine, ovine, caprine, equine, porcine, or other mammalian sources such as rabbit, alpaca, dog, cat, ferret, rat, mouse, or buffalo. For example, bovine sperm cells can include sperm cells from domestic cattle, bison, African buffalo, water buffalo, or yak. Moreover, the sample may be a single ejaculate, multiple pooled ejaculates from the same mammal, or multiple pooled ejaculates from two or more animals.

As used herein, the term "pathway" refers to a fluid line, channel, or tubing in which fluid can flow. For example, a sheath fluid pathway refers to a line, channel, or tubing in which sheath fluid can flow; a sample pathway refers to a line, channel, or tubing in which a sample fluid can flow; an air pathway refers to a line, channel, or tubing in which air can flow; and so forth. In the sample pathway module described herein, said module comprises the entire sample pathway in which the sample flows through, thus isolating the sample fluid from the other modules during processing, except for collection. This can prevent cross-contamination between different sample fluids and also allows for the sample pathways to be cleaned separately from the other modules. The entire sample pathway refers to all the pathways in which the sample fluid flows, including pathways that are distinct and physically separated from each other by another component. In a similar manner, the term "entire pathway" can apply to sheath fluids, air, or any other fluids, mainly in that the entire pathway comprises all the pathways in which a particular fluid flows through, including pathways that are distinct and physically separated from each other by another component.

As used herein, the term "swept path" refers to a number of sample pathway volumes to be cleaned.

As used herein, the term "module" refers to a plurality of components that can be removed, re-installed, or replaced as a unit. While an individual component may be removed, re-installed, or replaced, the individual component is not a module.

Figure 2:
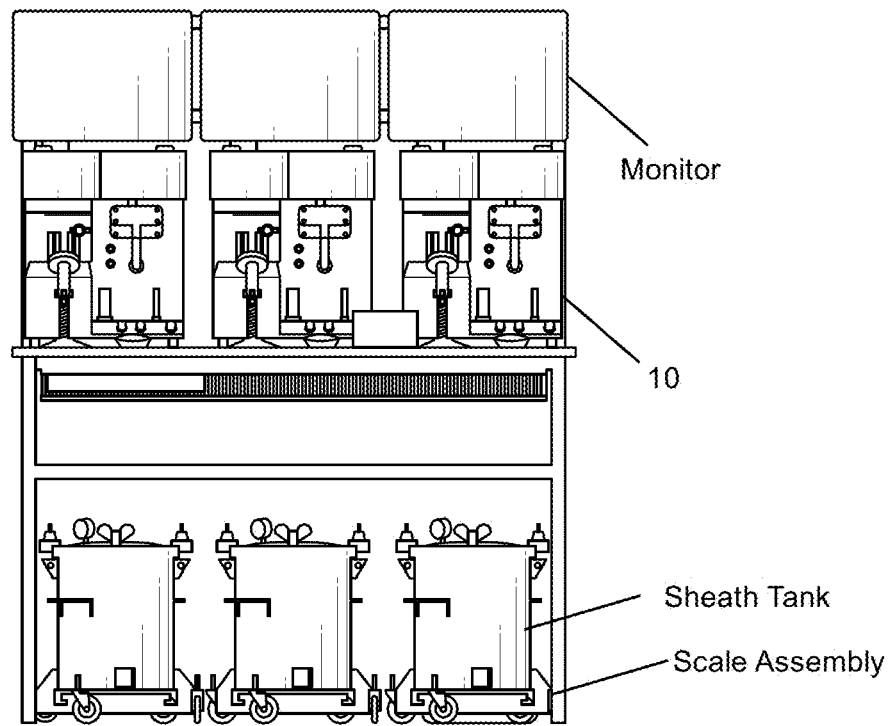
FIG. 2 is a front view of three modular flow cytometry systems, each with its respective monitor, sheath tank and scale assembly, mouse, collection tray, and scanner.

According to some embodiments, the present invention features a modular flow cytometry system comprising a chassis and a plurality of modules disposed therein, as shown in FIGS. 1-2. These modules include, but are not limited to, an electronics and control module, an interrogation (or optics) module, a fluidics module, a sample pathway module, a microfluidic device cleaning module, and an automix and collection module. Ventilation holes or slots can be located in several locations along the chassis to allow for proper and sufficient air flow and cooling to the electronics. Without wishing to limit the present invention to a particular theory or mechanism, the modular flow cytometry system can have automated features that include, but are not limited to: automated adjustment of chip position via a chip stage, automated adjustment of the detection spot, automated adjustment of the kill spot, automated sample and sheath throughput, automated collection and stirring, automated waste dumping (e.g., from failure states in sample collection, e.g., dead cell percent too high, resolution too low, contamination error, alignment errors, etc.). The automated features can be controlled and operated by a computer system component of the cytometer.

As shown in FIG. 2, a sheath tank may be fluidically coupled to the modular flow cytometry system. The sheath tank may include a wheeled assembly for easy transport and a scale for monitoring the amount of sheath fluid in the tank. Additional components that may be operatively coupled to the modular flow cytometry include, but are not limited to, a mouse, a monitor, a touchscreen, a keyboard, and an identification scanner such as a barcode, QR-code, or RFID scanner.

Figure 3A:
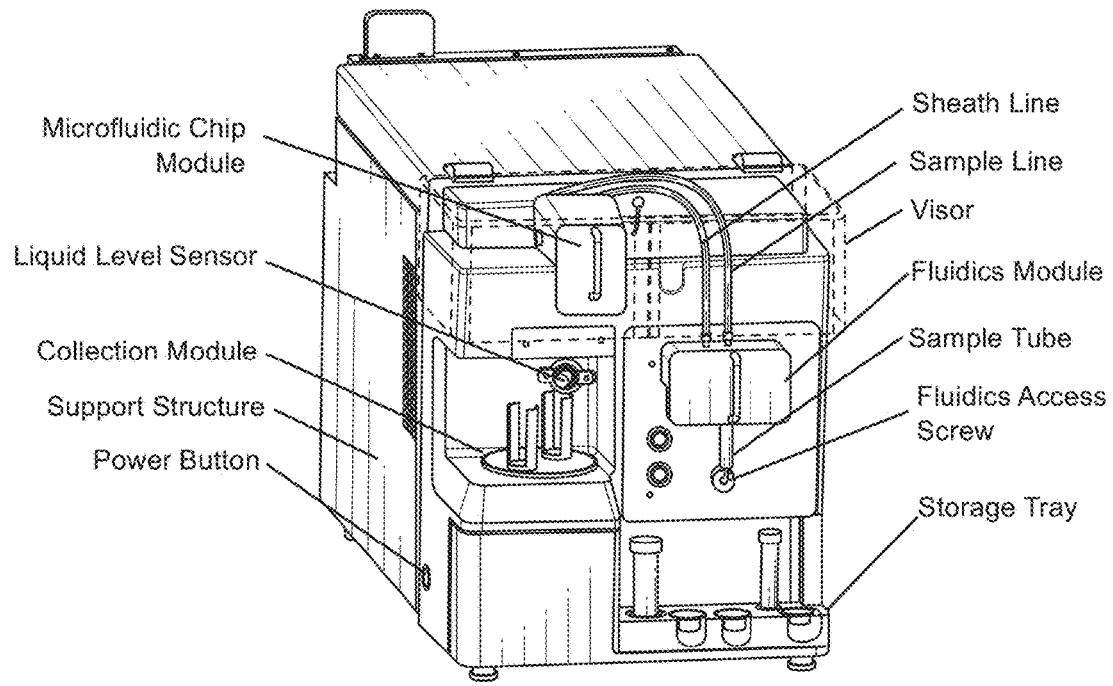
FIGS. 3A and 3B show a front view and back view, respectively, of the modular flow cytometry system of the present invention.

FIG. 3A shows the different components of the modular flow cytometry system in greater detail. In some embodiments, the microfluidic module contains a chip cartridge and microfluidics chip that is magnetically held to the system. A sheath line is a tubing path between the fluid in from the sheath inlet port and the microfluidic chip sheath channel. A sample line is a tubing path between the fluid from the sample tube and the microfluidic chip's sample channel. The fluidics module directs fluids from the sample and sheath inlets from the fluidics assembly to their respective ports in the microfluidic chip. A fluidics access screw allows maintenance into the fluidics assembly. The liquid level sensor may be a capacitive sensor that detects collection fill in the sample tubes. The collection module comprises a turntable system which contains collection tube holders that hold collection tubes which switch between the 'in queue' and 'collection' positions. The visor is a swing cover protecting the chip module from environmental disturbances during collection. The sample tube is a reservoir that can hold a sample containing a semen sample or a cleaning sample to expel into the microfluidic sample channel. The storage tray can hold additional tubes and caps for convenience while operating.

Figure 3B:
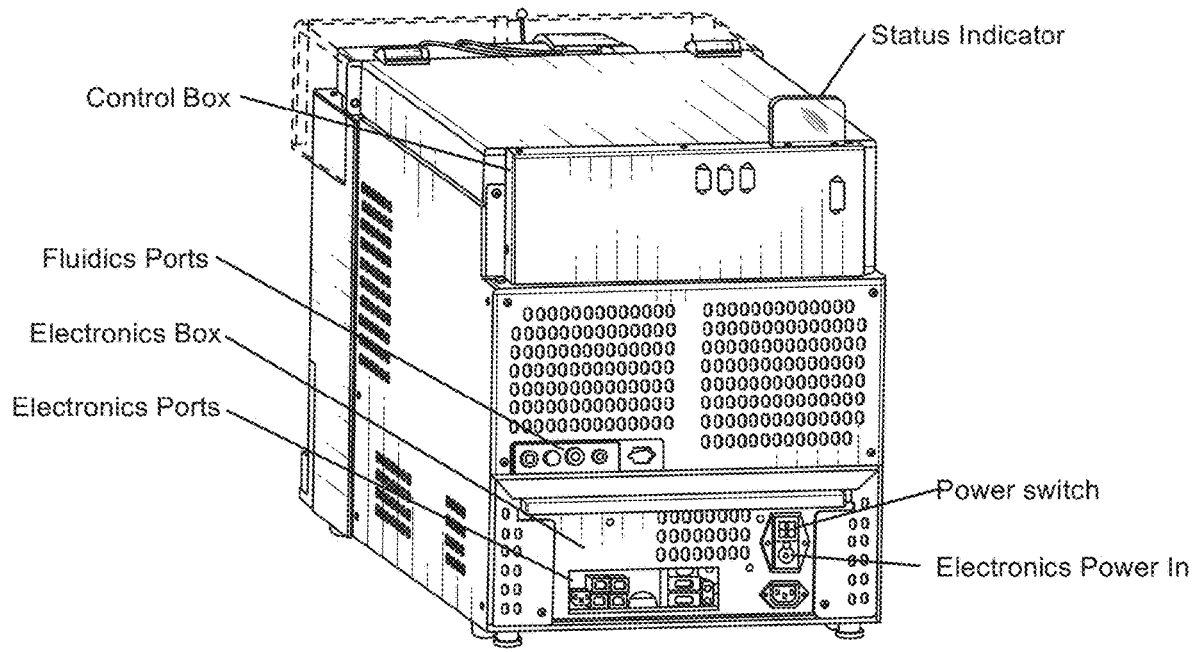
Figure 4:
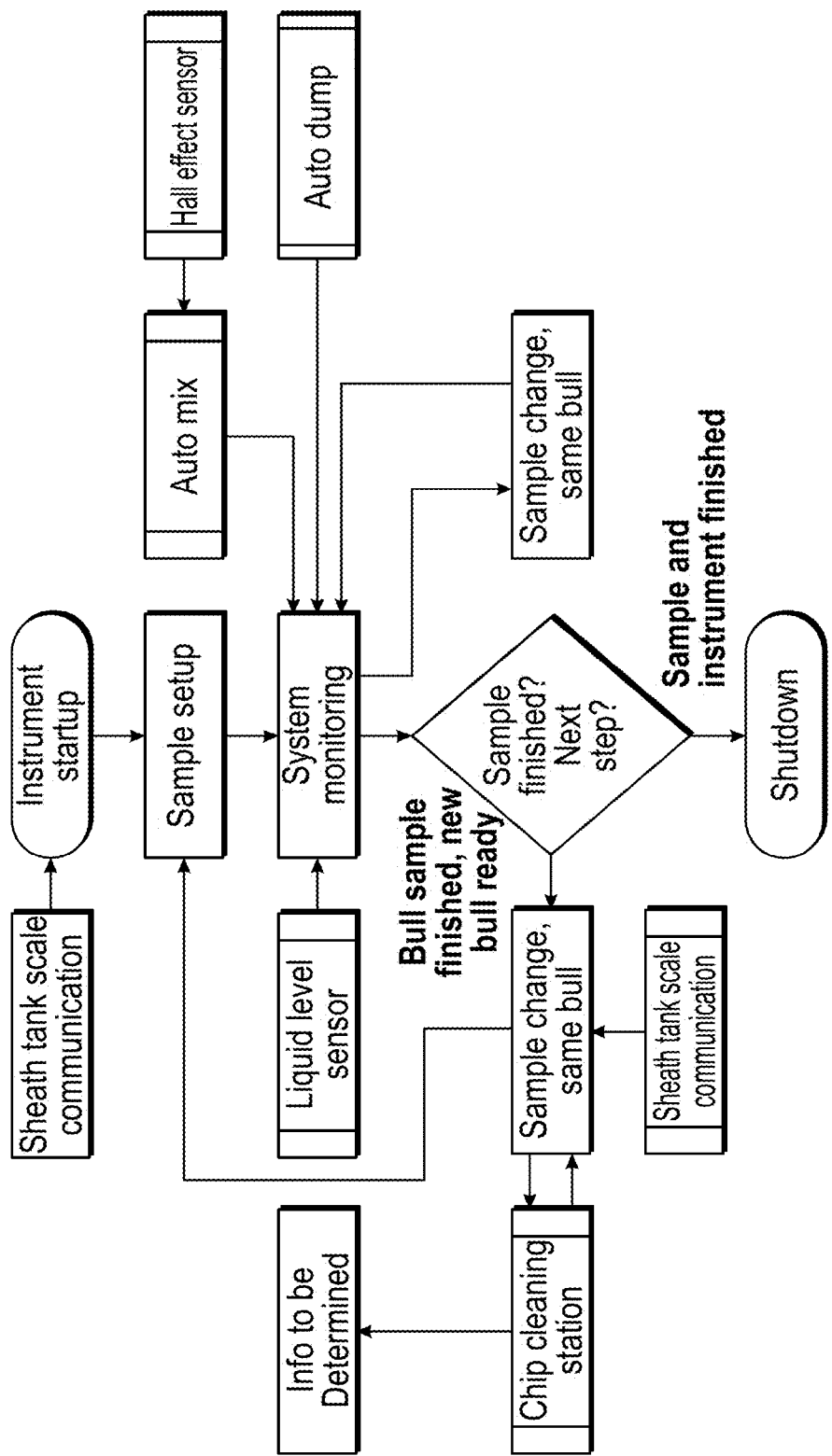
FIG. 4 illustrates an instrument workflow block diagram for the modular flow cytometry system of the present invention.

Referring to FIG. 3B, the back components of the modular flow cytometry system include a control box module containing the control board and covers, fluidics ports containing a quick disconnect to the sheath inlet, waste output, air input, and air output to the sheath tank, an electronics box module containing the power supplies and main computer, an electronics power port to plug in a cable for powering the electronics box, electronics ports for connecting external devices to the electronics box, and a status indicator that shows the overall system status.

The optics assembly is responsible for the alignment and shaping of the beam paths from the kill and detection lasers to the microfluidic chip. The chip is viewed through a focal lens, and into a camera. When cells are flowing through the microfluidic chip, the detection laser is responsible for emitting light through each individual cell and collecting the emission through the APD detection sensor to evaluate the sex of the cell. The kill laser is then responsible for sending a pulse of light at each cell that isn't gated within the software, slicing and inactivating each of the ungated cells. From the software, operators are able to control movement of the chip stage and the detection beam to optimize cell sex detection resolution and kill slice accuracy.

In a non-limiting embodiment of a sexing method implemented in the present invention, a sperm sample is introduced into a microchannel, surrounded by sheath fluid, and focused in all four directions. When the modular cytometry system is running, stained sperm cells within the sample are illuminated by a laser (either pulsed or continuous wave) so as to cause fluorescence. A decision process begins at the sensors in the system when light or photons from the cell fluorescence hit the avalanche photodiode ("APD"). The signal from the APD is processed and sent to the Field Programmable Gate Array ("FPGA"). In the FPGA, if an appropriate amount of deadtime has passed since the last detected event, then a new event state begins, otherwise, no event can occur.

Within the beginning of an event state determination, if the signal value is above a threshold value, and the signal value is above a declining hysteresis value, then an event counter is incremented. It is next determined if the event is a multipeak event or a single peak event. For the signal or peak, the direction of the inflection change of the signal is determined, and the signal is determined to be the first peak in a multipeak event (e.g., a doublet) or a second or subsequent peak in a multipeak event. If the event is a multipeak event, the peak count, peak voltage, and peak time are used to process the multipeak event. Since singlets and doublets have about the same peak height, they show up in the same place on a 1-D histogram of peak height ("intensity"). However, they show up in different places on a 2-D histogram with peak height vs. area because the areas are significantly different.

If the event is not a multipeak event, the following data are updated for each data point in the event as the signal is being processed, until the end of the event is determined: peak voltage, peak time, the integrated area, and the span value for the event. If the span value exceeds the minimum value for an event, the event is a valid event and the FPGA enters "Gate Mode" to determine a gating result and use this result to determine whether or not to fire. Peaks corresponding to already dead cells result in a determination not to fire. The FPGA results, including peak voltage, area, and span, are sent to the digital signal processor ("DSP"). The DSP can either make an additional gating determination or it can use the FPGA result to determine whether to fire. In DSP gating, the event data from the FPGA is processed to determine if the event data point is within a predefined gating polygon.

The FPGA waits for the DSP gating result after sending the signal to the DSP, and based on the DSP gating result, one or more peaks are added to the kill schedule based on the timestamp for the peak in the event. For a single peak, one event is added to the laser trigger schedule, and for multi-peak events, one or all peaks in a multipeak event are added to the laser trigger schedule based on the current setting. For laser triggering, the FPGA constantly checks to see if a new trigger request has been added to the schedule, and if a trigger request has been added to the schedule, a delay is set based on the request. After the delay, an output from the FPGA causes the laser to fire at the sperm cell corresponding to a particular bigger request.

In some embodiments, the fluidics module is a liquid handling apparatus that can precisely control the rates of flow between the sheath and sample lines, from the fluidics manifold to the microfluidic chip, to allow for optimal cell flow rates through the microfluidic chip and allow for the maximum allowable spacing between the cells within the chip. The fluidics module is removable from the system.

In some embodiments, the fluidics module includes fluid regulators and valves to control the rate of flow for the sheath and sample fluids through the system. The fluidics module may also include a double air regulator assembly near the back of the system that can drop the house air pressure to ~55 psi within the instrument and drop the air pressure to less than 25 psi to the sheath tank. The fluidics module houses the fluidics control PCB and the controllable devices to precisely control the flow rates of fluid through the instrument. The fluidics module can be accessed by activating a release mechanism, such as opening a latch or by twisting a knob until loosened, then sliding the module out. Referring to FIG. 9A, once the fluidics module is pulled out from the instrument, maintenance personnel can quickly access the module by first unplugging the electrical port to the fluidics board, then taking a hold of the handle located on the top of the module and pulling the unit up. The fluidics module can be disconnected and removed from the system, e.g., for maintenance or diagnosis, and replaced with a backup fluidics module so that the system still remains operational. For example, the fluidics module may be removed to replace the sheath line filter once a month for preventative maintenance.

In order for any fluids to flow through the system, both the microfluidic module and the fluidics module need to be properly seated in their respective spots. There are sensors to detect manifolds are in place to reduce the chance of accidental leaking. Both manifolds have handles attached for easy grip. In some embodiments, both the chip and fluidics manifold are intended to be handled at the same time. To load the fluidics and chip modules, the visor is lifted, and then the modules are brought up to their intended positions on the system. With the fluidics module, the two dowel pins from the module are aligned to the holes on the fluidic module base, and then pushed into place. With the chip module, the locating balls on the back of the module are aligned with the location holes at the chip module base, and then pushed forward to slide into place on the system. Both modules should click into place as they are held magnetically. The sheath and sample lines are inserted into their respective slots on the clip underneath the visor to hold the lines in place. Lastly, the visor is closed. Unloading the fluidics and chip modules from the system is the reverse of the loading procedure.

In some embodiments, the 5 mL tube sample with the desired fluid is loaded into the fluidics module by placing the tube onto the sample tube loader, and positioning the loaded sample tube loader underneath the fluidics module perpendicular to the instrument face. Once the sample tube is aligned to the center of the sample tube, the sample tube loader is pushed up until the top face contacts the fluidics module. The sample tube loader locks into place with the magnetic force between the loader and the fluidics module. To unload the sample tube, the sample tube loader is twisted to break the magnetic force with the fluidics module and pulled down to disengage it from the fluidics manifold.

In other embodiments, the collection module can automate several parts of the system's collection process. It has a sensor to detect when a collection tube is full. The liquid level sensor is calibrated to trip when a sample tube is filled to a pre-defined level. The collection module can switch in a full collection tube with an in queue empty collection tube and automatically mix the contents within the tube every five minutes. In some embodiments, the automated collection module contains a turntable base, which holds two sample tubes. The collection base also contains magnets to hold the sample tube holders in place, at a specific orientation, during collection. While a collection is being performed, the collection module can mix the contents frequently. When a sample is finished being collected in a tube, the module will switch out the tube collecting the sample with the tube in queue. Finally, there is an automated system to redirect the sample flow to the waste line without having to turn off the flows.

During sexing system monitoring, the operator will mainly be interacting with the collection module. Upon the software startup, the collection module will home into place. Unless the collection module is moving, there will always be one sample tube holder directly in line with the sample collection zone, referred to as the 'Collection' position. Directly across from the sample tube holder underneath the sample collection zone is a second sample tube holder. The second sample tube holder is referred to as the 'In Queue' position.

During sample collection, the collection tube will automatically mix. The mixing protocol will pivot the collection tube back and forth for a few seconds, and then will return back to the collection position. When a new collection tube is switched into the collection position, and a finished tube is switched back into the Queue position, the full collection tube is removed and placed in the collection tray. A new collection tube is placed in the collection tube holder, and loaded back into the In Queue position.

Without wishing to be bound to a particular theory or mechanism, a novel and inventive feature of the modular flow cytometry system is the configuration and location of the modules relative to each other to allow for efficient use of space. The system can be divided into three distinct levels or floors. In the first floor (e.g., the bottom floor), the electronics module can slide in and out of the chassis. It includes a bulkhead plate or plate for protection from fluids in the upper levels. Thus, the electronic module is physically isolated from the other modules. In the second floor (e.g., the middle floor), the fluidics module resides in the front portion for easy access to the operator. The third floor (e.g., the top floor) houses the optics module that contains the lasers, detector, and other optical components. The optics module is isolated from moving air so as to not disturb the optical components. Since the lasers generate the most heat, the optics module is at the uppermost level for optimal ventilation. Instead of using fans which can disturb the air around the optical components, the heat sinks for the lasers can draw in air via natural convection for cooling the components. The optics module must be separated from the electronics module because both of these modules generate heat. Fans may be placed at the first floor and/or near the electronics module for cooling the electronic components. The module layout further allows for access to areas of frequent maintenance.

Another unique and inventive feature of the present invention is the modular nature of the overall system that advantageously allows for ease of assembly of the various modules, as well as removal for maintenance and/or replacement, which results in less down time and near-continuous operation. For example, the computer may be disposed on rails for ease of movement and can be replaced with a similar electronics module. In the optics module, the lasers can be removed and replaced or reconnected. Other optical components such as the detector, camera, lenses, etc. can also be removed and replaced or reconnected. The sample pathway module can be removed and cleaned using a cleaning module. The fluidics module can also be removed and cleaned. While in maintenance, the fluidics module and sample pathway module can be replaced with other cleaned modules. Replacement of the fluidics module or components thereof can allow for the flow cytometer continuing operation. The system can be easily operated and maintained without the need of an expert technician or specialized training. Furthermore, the modular nature also allows for easy shipment of the system with little to no assembly required after delivery.

Yet another unique and inventive feature of the present invention is the automated or semi-automated nature of the modular flow cytometry system that results in less down time of the system, reduced product contamination, and improved product consistency and purity. For example, a microfluidic chip's physical location can be adjusted relative to where it needs using an automated chip stage adjustment procedure. Mixing of the sample tubes containing the processed sample is also automated by rotating said tubes as the sample is being collected, thus reducing sample loss and sperm cell damage. Further examples of the automated features of the system include the auto-dump module which allows for the processed sample stream to be redirected to a waste collection, and the automated sample level detection that notifies the operator of when the sample level is low.

The following sections describe the various modules of the modular flow cytometry system in greater detail. Substitutes and equivalents are within the scope of the present invention.

Sample Pathway Module and Microfluidic Device Cleaning Module

In the field of commercial semen processing, for example semen sexing operations, there is a requirement that microfluidic chips, cassettes, or cartridges be cleaned to prevent contamination between sample runs.

Within the semen sexing process is a fluid sample changing subprocess, for example a bull change subprocess, wherein the processing of one fluid sample (e.g., semen sample) is completed and the system must be prepared for processing a subsequent sample. During a bull change, the microfluidic chip being used for a sexing process for a semen sample from a first bull must be cleaned and cleared of all the previous bull's semen in order for the next sexing process using a new bull's semen to be performed. Alternatively, a new or separate microfluidic chip could be used. Bull to bull, or more generally animal to animal or genetic fluid sample to genetic fluid sample, contamination is a possible result of a non-thoroughly cleaned microfluidic chip. Cross-contamination is a major issue if a contaminated product reaches a farmer, as incorrect breeds or genders of offspring could be the result.

In existing systems and methods, reducing bull to bull contamination is achieved by keeping the microfluidic chip fixed within a flow cytometry device or instrument. A chip cleaning procedure occurs on the flow cytometry device where a cleaning solution or fluid, such as PARVOSOL, and a sheath or buffer fluid are processed through the microfluidic chip in the flow cytometry device for a cleaning process of approximately ten minutes in duration between bull changes. The procedure is done in a semi-autonomous process, where the operator sets the pressures for cleaning, configures cleaning fluid flows, and sets the 10-minute cleaning timer.

However, in a commercial semen processing setting, a flow cytometry device loses valuable time for semen processing when it is being used instead for cleaning a chip. There also is the potential for a less thoroughly cleaned microfluidic chip in a semi-autonomous cleaning procedure. A semi-autonomous cleaning procedure performed on the flow cytometry device leaves it up to the operator to set the cleaning flows correctly, set the timer correctly and not end the cleaning cycle early, and to monitor and ensure there is enough cleaning solution, for example PARVOSOL, in the sample tube during the entire cleaning cycle.

Thus, it is an objective of the present invention to provide flow cytometry systems that includes a replaceable or removable sample pathway module comprising a microfluidic module with a microfluidic chip, cassette, or cartridge, and further comprising a distribution block or fluid manifold. In some embodiments, the flow cytometry system may include a microfluidic device cleaning system providing for automatic cleaning of a sample pathway module using a pre-programmed or configured cleaning protocol.

Without wishing to limit the present invention to any theory or mechanism, it is believed that the methods and systems described herein are advantageous because a replaceable and removable fluid or sample pathway module comprises a microfluidic module holding the microfluidic chip and a distribution block or manifold and is portable and can be brought to a chip cleaning station, which provides a fully autonomous cleaning cycle and which provides for near-continuous operation of the flow cytometry device.

In an exemplary embodiment, the replaceable and removable fluid or sample pathway module comprising the microfluidic module holding the microfluidic chip and the distribution block or manifold are releasably held (e.g., magnetically) to the flow cytometry system and can be releasably removed, such as detachment by an outward force, by an operator to remove the sample pathway module from the flow cytometry system. The sample pathway module can then be brought over to the chip cleaning station, which is a microfluidic device cleaning system, where a magnetic force may releasably secure the sample pathway module to the microfluidic device cleaning system, so an operator can easily attach the sample pathway module to the microfluidic device cleaning system.

Once on the microfluidic device cleaning system, the operator removes the sample tube loader, used to press a sample tube onto the distribution block, and replaces it with a sample reservoir on the microfluidic device cleaning system. The operator begins the cleaning procedure by selecting a cleaning protocol or cleaning parameters through a user interface of an integral or attached control system or computer. This begins the automated cleaning procedure, which pulls a cleaning solution (e.g., PARVOSOL) from a vessel or reservoir connected to the back of the microfluidic device cleaning system and fills the sample reservoir to a level predetermined by the cleaning protocol (e.g., 4.5 mL). Then the microfluidic device cleaning system primes deionized or microbiological grade water through a sheath or buffer fluid line or flow path of the sample pathway module, and flows it through the sample pathway module. Then pressure is applied to the sample reservoir to push the cleaning solution (e.g., PARVOSOL) through the sample line or flow path, thus through the sample pathway module. The procedure then flows both the cleaning solution and deionized water through the sample pathway module for an amount of time as determined by the cleaning protocol, for example ten minutes. Finally air is blown through both the sample and sheath lines through the chip.

In some embodiments, the microfluidic device cleaning system comprises a set of manifolds and valves within the microfluidic device cleaning system which allow for switching between various liquids. This provides for the microfluidic device cleaning system to also be able to perform the same procedures for startup and shutdown chip cleaning as on a flow cytometry system.

The replaceable and removable fluid or sample pathway module comprising the microfluidic module holding the microfluidic chip and the distribution block or manifold are now portable versus being fixed. This provides for an operator to remove the sample pathway module from the flow cytometry system after running a biological fluid sample, such as a bull sample, bring the sample pathway module to the microfluidic device cleaning system to be cleaned off instrument (i.e., away from the flow cytometry device), and obtain a clean sample pathway module from storage to be brought and installed onto the flow cytometry device without excessive or unnecessary system processing downtime. The chip cleaning station is automated, where the parameters of the cleaning protocol, for example flow rates and timers, are pre-configured or programmed as part of the cleaning protocol. The microfluidic device cleaning system and cleaning protocols comprise built in logic and algorithms to ensure flow rates are met, and manifolds are in place to provide for a complete cleaning of a microfluidic chip in the sample pathway module.

Using an automated system and a replaceable and removable fluid or sample pathway module comprising the microfluidic module holding the microfluidic chip and the distribution block or manifold, cleaning results as good as or better than existing systems and methods which require cleaning process be performed at or on the flow cytometry system, while reducing the minutes of downtime of the flow cytometry system. In some embodiments, it may take approximately between 13 and 16 minutes for an operator to run a bull change cleaning process on the microfluidic device cleaning system. The duration of the cleaning process may be further optimized through future optimization and training+.

Generally, the microfluidic device cleaning system and the replaceable and removable fluid or sample pathway module comprising the microfluidic module holding the microfluidic chip and the distribution block or manifold eliminates or substantially reduces 10 minutes of downtime per fluid sample change, per flow cytometry system, which previously were caused by the requirement to clean a microfluidic chip on the flow cytometry device.

An autonomous cleaning cycle provides for a thorough cleaning and requires less monitoring from operators. Cleaning solutions, such as PARVOSOL, are shared in one or more larger reservoirs instead of requiring operators to fill individual 5 mL tubes per cleaning routine. Additionally, the replaceable and removable fluid or sample pathway module comprising the microfluidic module holding the microfluidic chip and the distribution block or manifold is easier to swap out or replace if clogs are apparent, reducing downtime of replacing microfluidic chips in existing systems.

Figure 5:
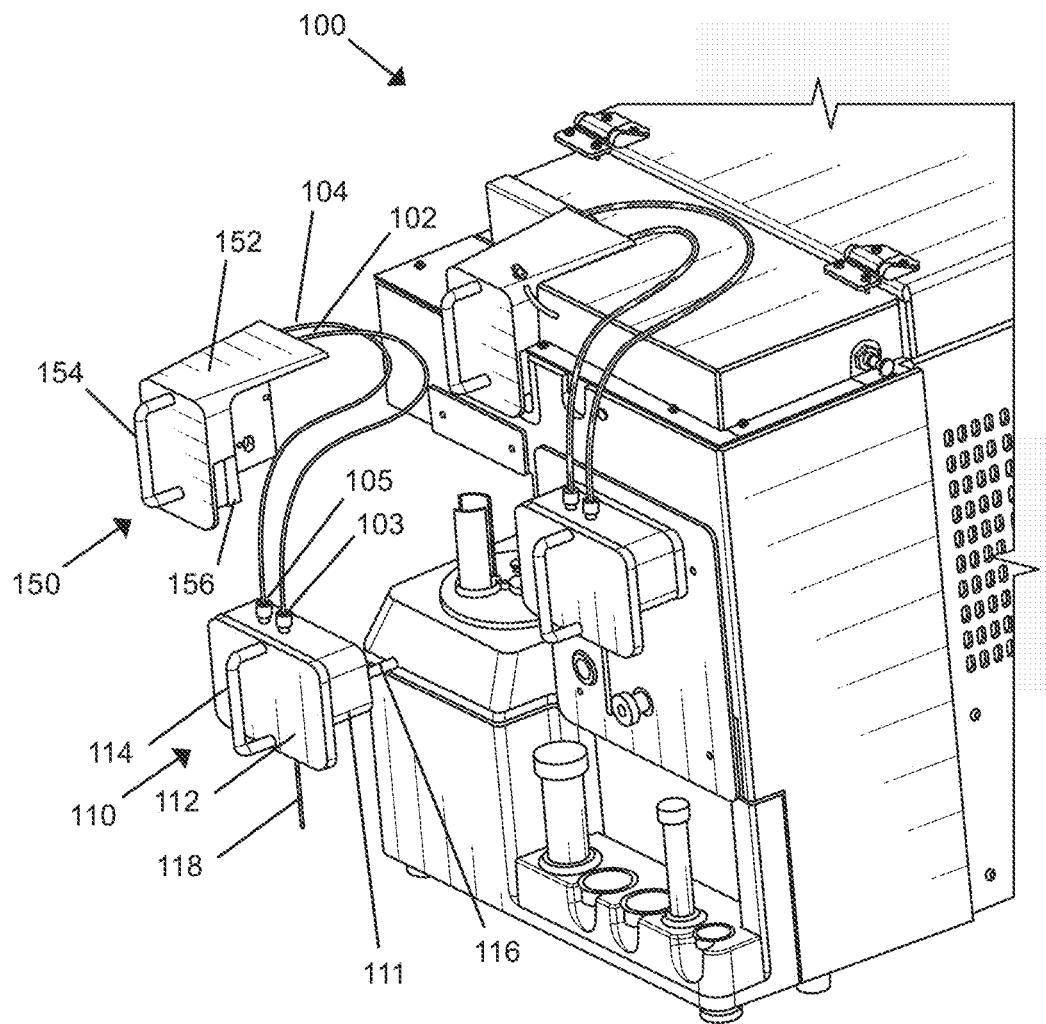
FIG. 5 provides a front perspective view illustrating an embodiment of a replaceable and removable sample pathway module and a flow cytometry device for processing and analyzing a sample.

With respect to FIG. 5, a front perspective view illustrating an embodiment of a replaceable and removable sample pathway module 100 and a flow cytometry system 10 for processing and analyzing a sample is provided. The flow cytometry system 10 may be any type of particle processing system capable of discriminating between one or more particle types based upon observed and determined characteristics of the particles. For example, the flow cytometry system 10 may be a laser-based detection and deactivation system, using one or more lasers and detectors for determining characteristics of particles, such as cells, in a sample stream and for deactivating a subset of the particles. Other methods of sorting, separating, or deactivating particles, such as fluid sorting, jet sorting, laser steering, holographic optical trapping, or electrophoresis may also be used in the flow cytometry system 10.

The replaceable and removable sample pathway module 100 comprises the entire fluid pathway for a sample being processed by the flow cytometry system 10. The sample pathway module 100 comprises a distribution block 110 and a microfluidic module 150. The distribution block 110 comprises a body 112, device face 111, handle 114, set of aligning pins or rods 116, and sample straw 118. A set of releasable couplings, including a sample pathway coupling 103 and sheath or buffer fluid coupling 105, are used to join sample fluid pathways and sheath or buffer fluid pathways in the distribution block 110 to corresponding pathways in the microfluidic module 150 via respective sample fluid tubing 102 (e.g. first fluidic line) and sheath or buffer fluid tubing 104 (e.g. second fluidic line). In alternative embodiments, which do not require sheath fluid, sample fluid pathways in the distribution block 110 may be coupled to corresponding pathways in the microfluidic module 150 via sample fluid tubing 102, while eliminating the need for buffer fluid tubing 104. The sample fluid tubing 102 and sheath or buffer fluid tubing 104 may be secured to the microfluidic module 150 by a set of releasable couplings similar to those used on the distribution block 110. The set of releasable couplings used on the distribution block 110 and the microfluidic module 150 may be fittings such as barbed fittings, locking collar fittings, threaded fittings, or other suitable fittings capable of securing the tubing 102 and 104 under the operational and pressure conditions of sample processing by the flow cytometry system 10.

Figure 14:
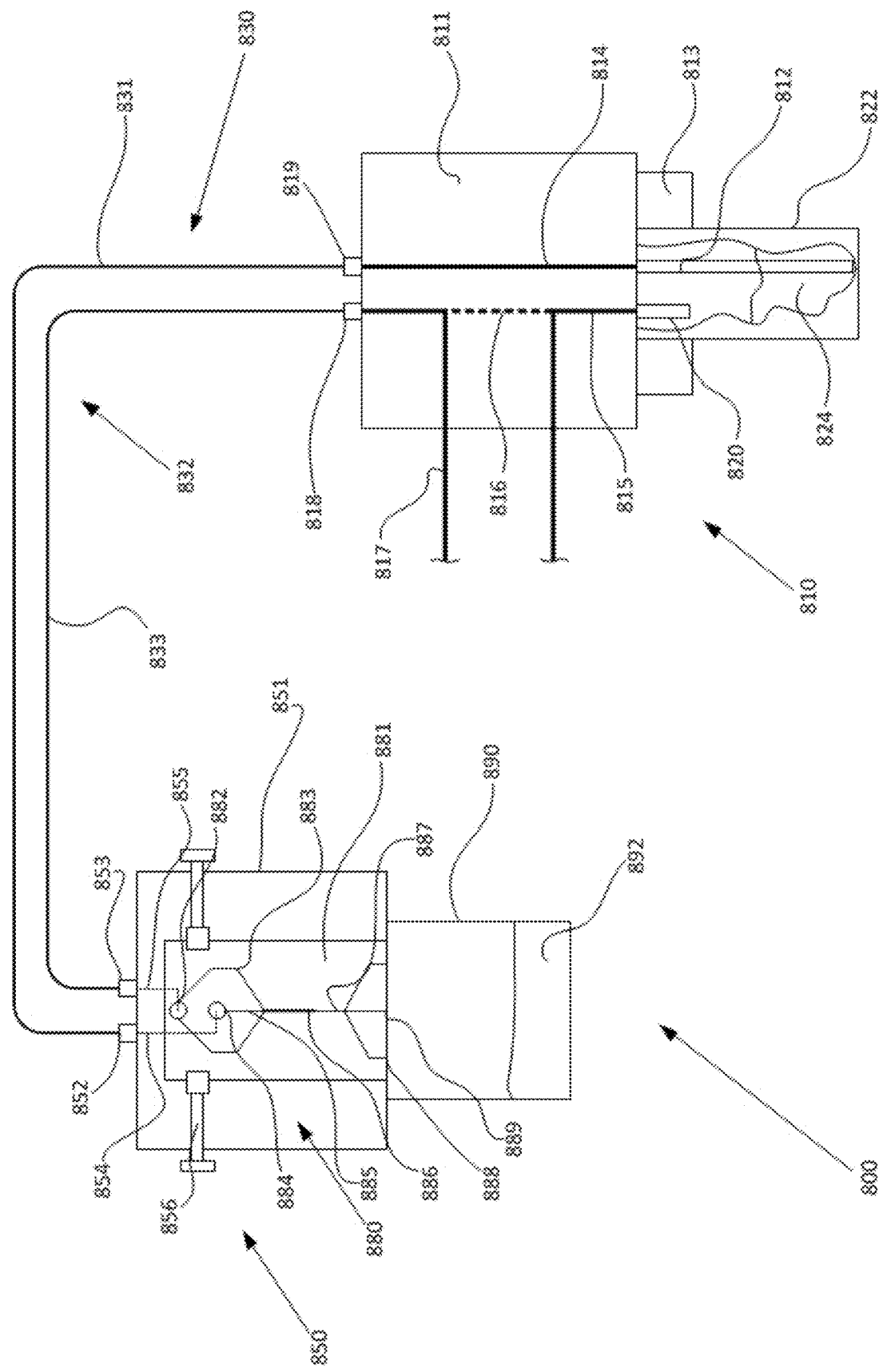
FIG. 14 provides a block diagram illustrating an embodiment of a replaceable and removable sample pathway module with a microfluidic module and a distribution block.
Figure 15A:
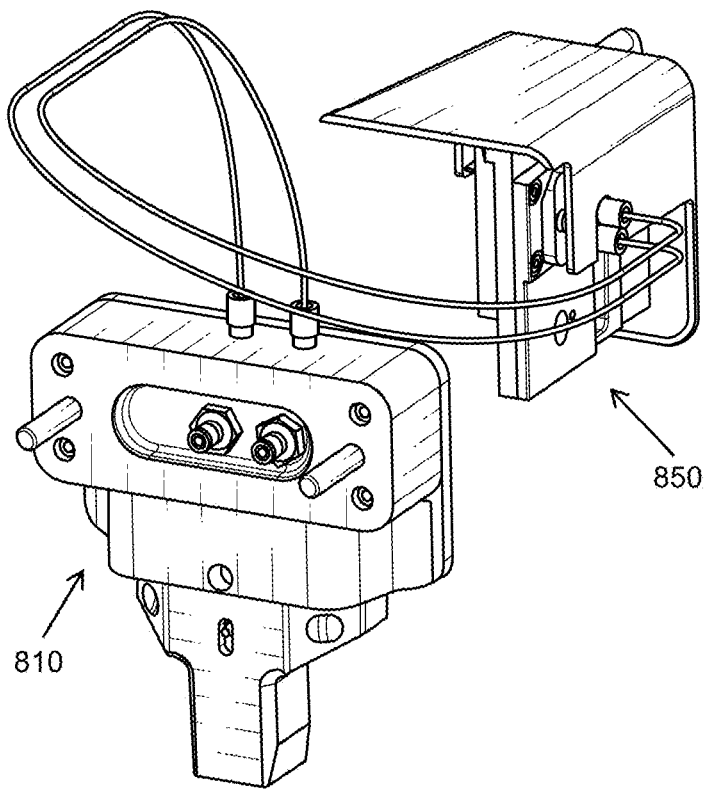
FIG. 15A shows another diagram illustrating an embodiment of a replaceable and removable sample pathway module with a microfluidic module and a distribution block.
Figure 15B:
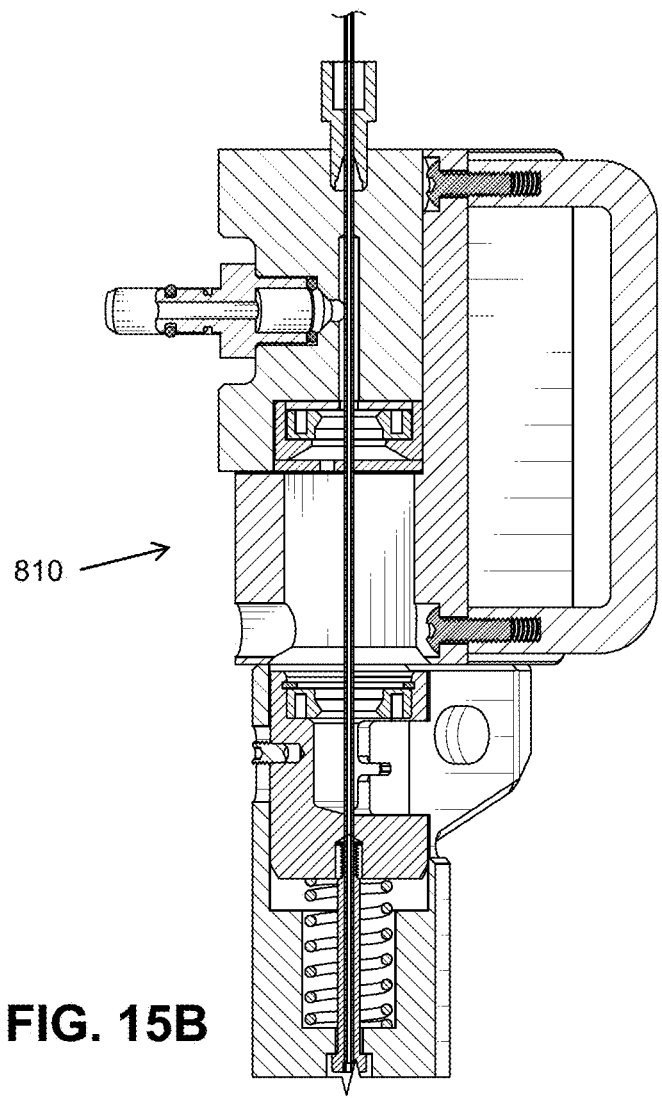
FIG. 15B shows a cross-sectional view of the distribution block in FIG. 15A.

The microfluidic module 150 comprises a body 152, handle 154, and microfluidic device holder 156. The microfluidic device holder 156 is used to secure and position a microfluidic chip or cassette within the microfluidic device holder 156. As shown in FIG. 14, knobs, handles, threaded rods, or other positioning devices may be used to secure and adjust the position of a microfluidic chip or cassette within the microfluidic device holder 156 to align the chip or cassette with detection and/or deactivation optics within the flow cytometry system 10.

The microfluidic device holder and distribution block 110 may each comprise one or more ferrous, ferro- or ferrimagnetic, or other magnetic plates or blocks that may be used to releasably secure the sample pathway module 100 to the flow cytometry system 10. Additionally, or in the alternative to using a magnet-based securing system, other latches, locks, or fasteners may be used to releasably secure the sample pathway module 100 to the flow cytometry system 10. However, a securing system that provides for quick and easy securing and releasing of the sample pathway module 100 from the flow cytometry system 10, such as a magnet-based securing system, may provide for additional benefits related to ease of use and simplistic operation.

When secured to the flow cytometry system 10, the sample pathway module 100 comprises the entire fluid pathway for a sample being processed by the flow cytometry system 10. For example, a sample stored in a sample tube 12 would be pumped, pushed, or fed through the sample pathway module 100 via the sample straw 118 when the sample tube 12 is loaded or secured to the distribution block, for example by action of a fluid pressure such as a pneumatic or gas pressure in the sample tube 12 forcing the sample through the sample straw 118 into the distribution block 110. The fluid pressure into the sample tube 12 is provided from the flow cytometry system 10 via one or more fluid inlets, such as a set of fluid inlets, on the device face 111 of the distribution block 110. A pump, such as a peristaltic pump within the flow cytometry system 10, or an external air pressure source provides an air pressure into the sample tube 12.

A fluid sample, which may comprise particles such as sperm cells, passes through the distribution block 110 and to the microfluidic module 150 via the sample fluid tubing 102. In the microfluidic module 150, a microfluidic chip or cassette is used in the processing of the fluid sample. After processing, the fluid sample is collected in the automatic fluid collection system 14, or may automatically be diverted into a waste collection tube, reservoir, or container. At no time during processing does the fluid sample from the sample tube 12 contact any portion of the flow cytometry system 10 other than a waste collection reservoir after processing. In this manner, the sample pathway module 100 may be removed from the flow cytometry system 10 after a fluid sample has been processed without any risk of contamination of other, subsequently processed samples.

For example, if a first fluid sample such as a semen sample comprising sperm cells is processed by the flow cytometry system 10 via the sample pathway module 100, the sample pathway module 100 may be released or removed from the flow cytometry system 10 after processing and replaced with another similar or identical sample pathway module to process a second fluid sample without any risk of cross-contamination between the first and second fluid samples. This is especially critical in processing biological samples where cross-contamination is not only undesirable, but may be against laws, rules, or guidelines for the processing and distribution of the biological samples. Cross-contamination may further create problems where genotyping or genetic sequencing is to be performed on the samples. The sample pathway module 100 provides an isolated, fully-contained, removable sample pathway for use in or with the flow cytometry device that effectively eliminates, or least greatly reduces, the possibility of cross-contamination between individual samples.

Figure 6:
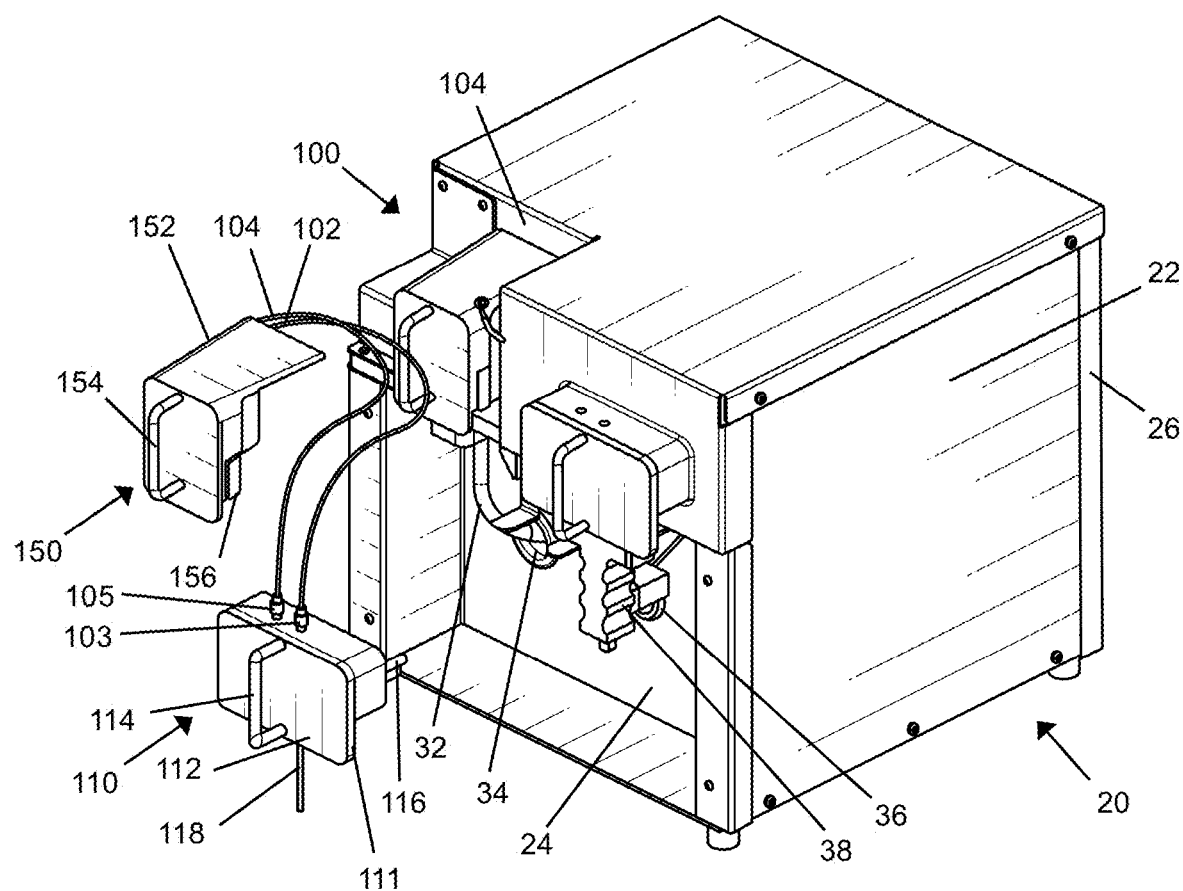
FIG. 6 provides a front perspective view illustrating an embodiment of a replaceable and removable sample pathway module and a microfluidic device cleaning system for cleaning the replaceable and removable sample pathway module.
Figure 7:
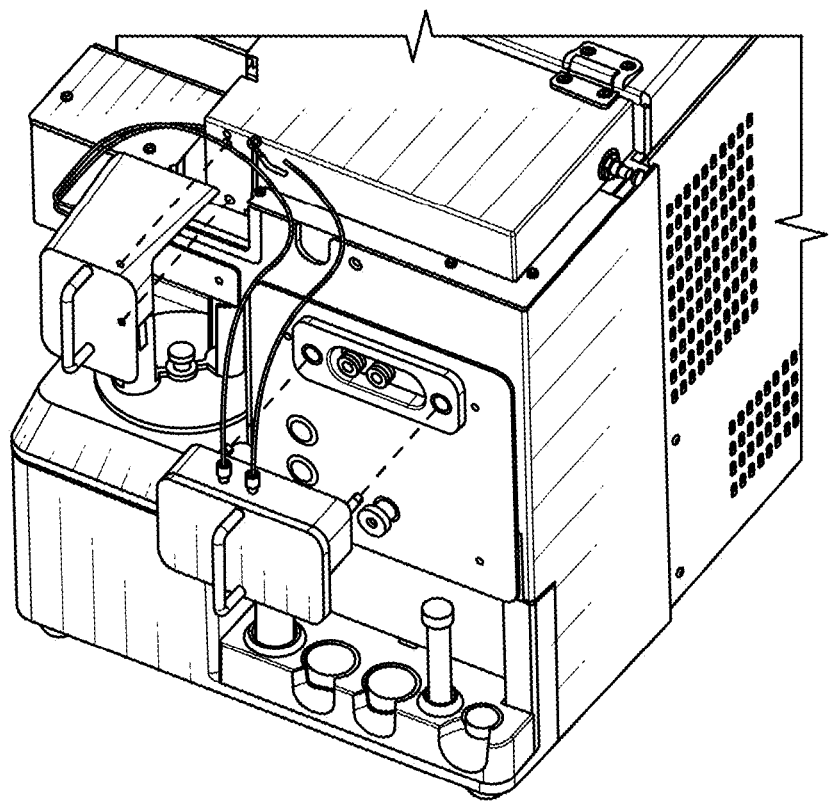
FIG. 7 illustrates a path between dowel pins and balls from the distribution block and the microfluidic module to their respective dowel holes.
Figure 8:
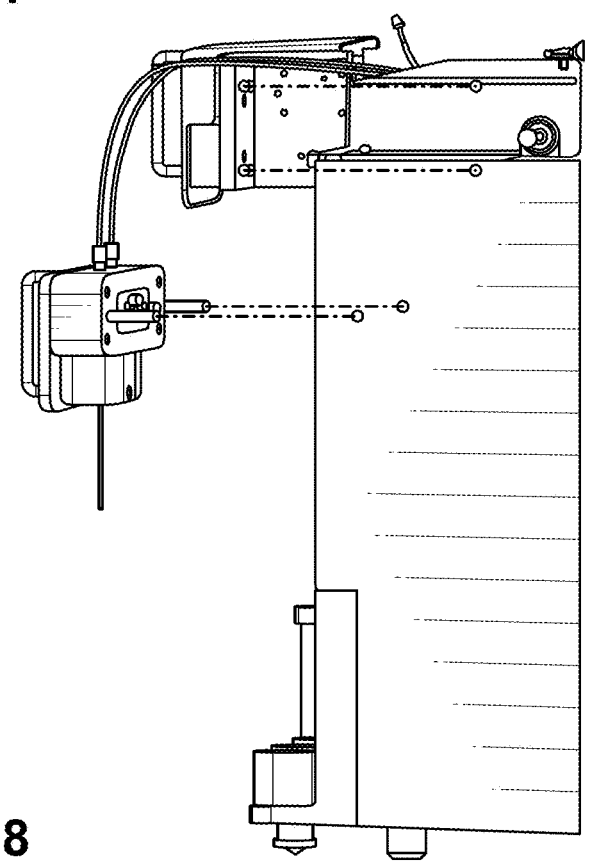
FIG. 8 is another illustration of the path between dowel pins and balls from the distribution block and the microfluidic module to their respective dowel holes.

With reference now to FIG. 6, a front perspective view illustrating an embodiment of a replaceable and removable sample pathway module 100 and a microfluidic device cleaning system 20 (or cleaning module) for cleaning the replaceable and removable sample pathway module 100 is provided. As shown in FIG. 6, the sample pathway module 100 may be removed from the flow cytometry system 10, as shown in FIG. 5, and may be aligned with and placed on, secured to, or fastened to the microfluidic device cleaning system 20.

Figure 12:
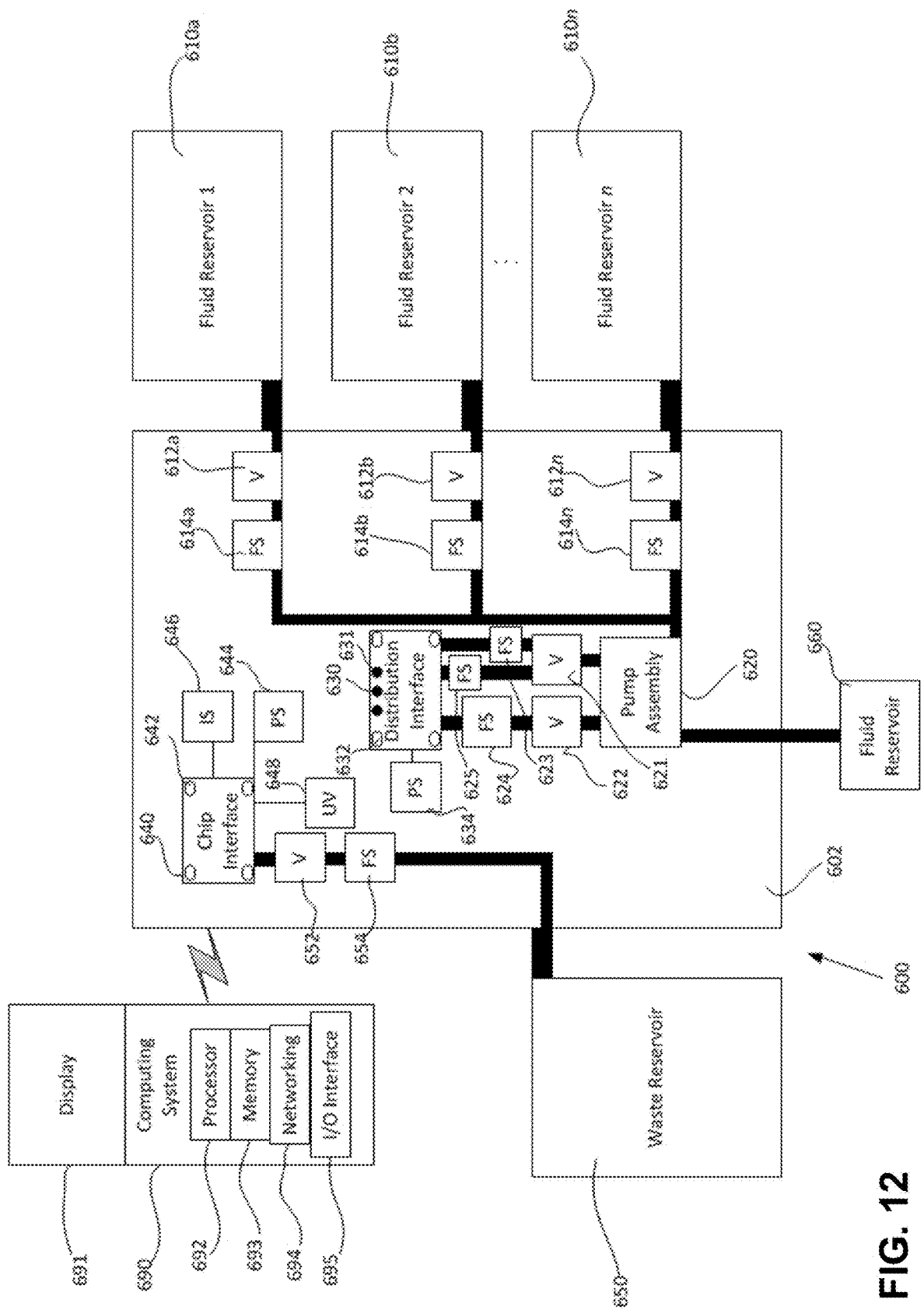
FIG. 12 provides a block diagram illustrating an embodiment of a microfluidic device cleaning system with external fluid reservoirs.
Figure 13:
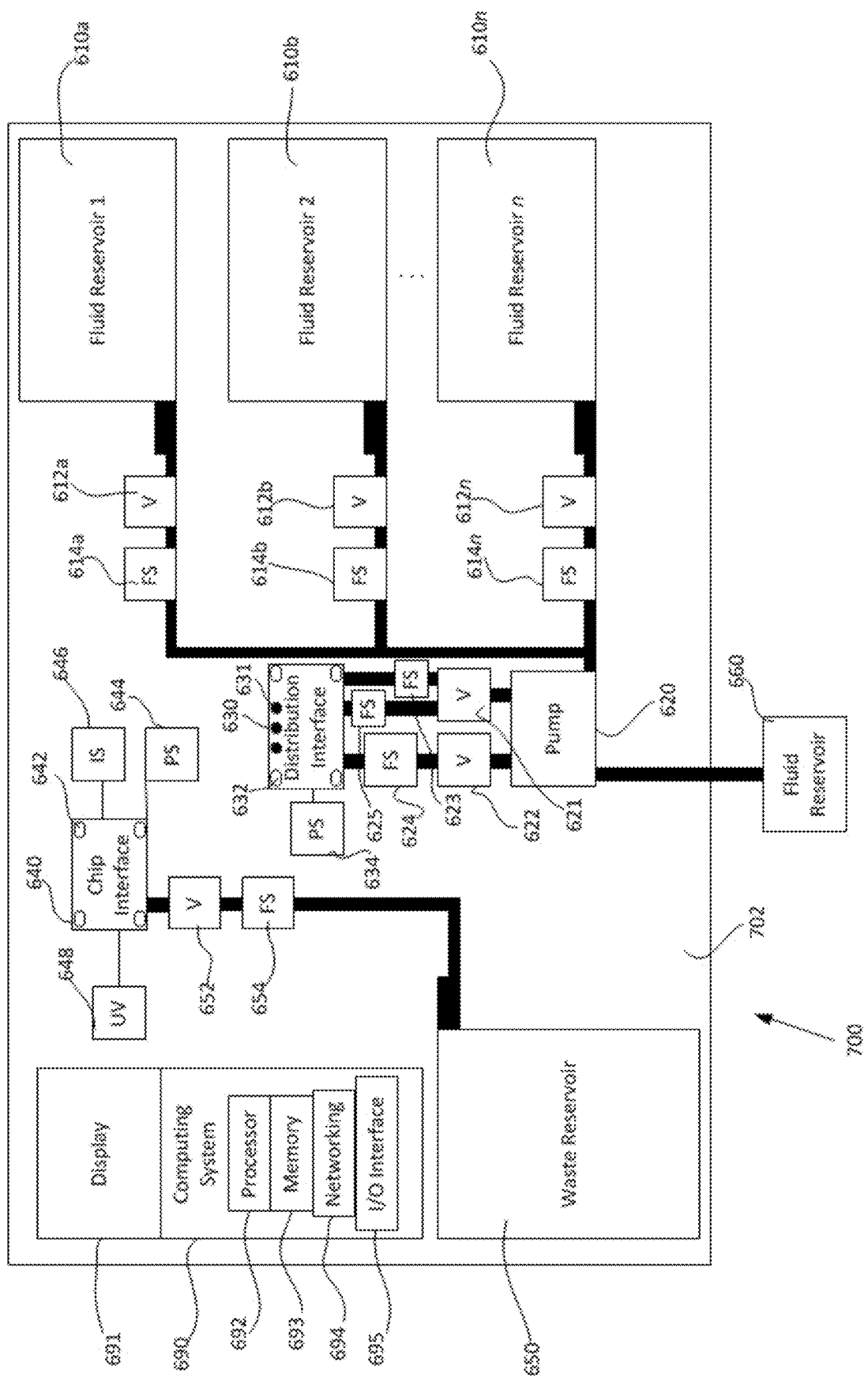
FIG. 13 provides a block diagram illustrating an embodiment of a microfluidic device cleaning system with internal fluid reservoirs and control system.

The microfluidic device cleaning system 20 of FIG. 6 (block diagram embodiments of which are shown in FIG. 12 and FIG. 13) comprises a housing 22, front 24, back 26, a microfluidic module or chip interface 28, and a distribution block or fluid manifold interface 30. A waste collection tube 32 directs waste from a microfluidic chip or cassette in the microfluidic module 150 into a waste collection reservoir through the grommet or opening 34 in the front 24 of the housing 22. Fluids, such as cleaning fluids or pressurized air, are provided to the cleaning fluid reservoir 38 from one or more internal or external fluid reservoirs via a connection through the opening or grommet 36.

In one embodiment, and with reference to the flow cytometry system 10 of FIG. 5 and the microfluidic device cleaning system 20 of FIG. 6, a set of valve fittings may be used at the interface of the distribution block 110 or microfluidics module 150 of the sample pathway module 100. The valve fittings comprise fittings that open a valve when the fittings are connected and close a valve when the fittings are disconnected such that no fluid in the flow cytometry system 10, microfluidic device cleaning system 20, or sample pathway module 100 is permitted to leak from or exit the system as connections are made or disconnected. This prevents biological contamination and further prevents the exposure of devices or operators to hazardous waste or materials such as cleaning solvents. The valves or ports would have a position of closed when disengaged or disconnected and would only open to permit fluid flow when a connection is made. In one embodiment, the valve fittings further comprise fittings that are actuated by an actuator or motor, or by manual operation of the valve.

Operation of a flow cytometry system, such as flow cytometry system 10, and a microfluidic device cleaning system, such as microfluidic device cleaning system 20, using a replaceable and removable sample pathway module, such as sample pathway module 100, will now be described with reference to the process 300 shown in the flowchart provided in FIG. 10. The process 300 describes an exemplary method for operating a flow cytometer using a replaceable and removable sample pathway module and for removing the sample pathway module from the flow cytometer for cleaning on a microfluidic device cleaning system.

The process 300 begins at step 302 where a sample pathway module is prepared for a processing run on a flow cytometry device. Preparing a sample pathway module for a processing run may include installing or securing the sample pathway module to the flow cytometry device. Securing the sample pathway module to the flow cytometry device may include aligning the sample pathway module to one or both of a distribution block interface and a microfluidic device or chip interface on the flow cytometry device. In one embodiment, the aligning of the microfluidic device may include using aligning pins or rods on the sample pathway module to correctly position the sample pathway module relative to the flow cytometry device for installation. Other aligning devices may be used and may include a set of indexing marks on the sample pathway module and flow cytometry device, complementary geometrically corresponding faces or surfaces of the sample pathway module and flow cytometry device, or alignment channels, guides, or rails for aligning and positioning the sample pathway module relative to the flow cytometry device for installation.

In some embodiments, the sample pathway module may be secured to the flow cytometry device by ferrous or ferro- or ferrimagnetic or other magnetic material plates on the face of the sample pathway module or flow cytometry device and corresponding magnetic plates on the opposing surface. For example, in one embodiment a set of four plates may be disposed on the face of the distribution block and a corresponding set of four magnets may be disposed on the interface surface of the flow cytometry device to align and releasably secure the distribution block of the sample pathway module to the flow cytometry device. One or more magnets and corresponding plates may be used to secure either or both of the microfluidic module and distribution block of the sample pathway module. In another embodiment, a set of latches, a set of locking tabs, a set of fasteners such as a set of bolts, spring-loaded retaining pins, or retaining or locking lugs may be used to secure the sample pathway module to the flow cytometry device.

Additionally, a sample tube may be manually or automatically secured to a sample tube loader on the distribution block. For example, in one embodiment a sample tube is retrieved or removed from a storage area, a lid or cover is removed, and the sample tube is positioned and pressed into the sample tube loader and secured by a spring-loaded mechanism, such as a set of securing lugs or tabs that are displaced by action of the sample tube and which return by action of a biasing spring to secure the sample tube in place on the distribution block. In another embodiment, the sample tube is threaded into or onto the distribution block via correspondingly threaded neck of the sample tube and opening of the distribution block. In another embodiment, an actuator-driven loader moves the sample tube from a storage area and secures the sample tube to the distribution block, such as by the spring-loaded sample tube loader.

Once secured to the flow cytometry system, the sample pathway module may be primed for the processing of a fluid sample. The priming may include flushing or priming the sample pathway module with air, a fluid such as a buffer fluid, or both prior to processing the fluid sample. In step 304, the sample is processed through the sample pathway module by a flow cytometry device. The sample tube loaded onto the distribution block is pressurized via a pressurized gas source in the flow cytometry device, such as a compressor, air pump, or by an external pressurized air source. The pressurized gas is passed through the distribution block to the sample tube and the pressurized gas in the sample tube forces the fluid sample through the sample straw of the distribution block. At the same time the sample tube is being pressurized, a buffer or sheath fluid is pumped from an internal or external reservoir of the flow cytometry device by a pump or by a pressurized gas. The sheath or buffer fluid and the fluid sample from the sample tube move through the distribution block to the microfluidic module via fluid connections, such as flexible hoses or tubes held in place by releasable fasteners. In the microfluidic module, the fluid sample and the sheath or buffer fluid pass or flow through a microfluidic chip, cartridge, or cassette.

Particles in the fluid sample are analyzed by the flow cytometry device to determine one or more qualities or characteristics of the particles for the purpose of identifying one or more subgroups or subsets of the particles, such as by the methods described hereinabove. After processing, the sheath or buffer fluid and the fluid sample are collected in a sample collection tube and may be collected in a sample collection media in the sample collection tube. If undesirable characteristics or conditions, such as contamination, improper identification, instrument miscalibration, or other system or sample issues creating non-ideal sorting conditions are identified, then a portion of or all of the fluid sample or the sheath or buffer fluid may be diverted to a waste collection reservoir instead of being collected in a sample collection tube. After the entire fluid sample in the sample tube loaded on the distribution block has been processed, the processing of the sample by the flow cytometry device is complete.

Next, in step 306 the sample tube is removed from the sample pathway module and the sample pathway module is removed from the flow cytometry system. The sample pathway module may simply be pulled from the flow cytometry system if held in position by magnetic attraction, or a set of latches or fasteners may be removed or released to permit the sample pathway module to be disconnected from the flow cytometry system. After the sample pathway module has been removed from the flow cytometry system, the sample tube loader, which may be a spring-loaded mechanism, may optionally be removed from the distribution block. This step may not be required where the cleaning fluid reservoir used in the cleaning step by the microfluidic device cleaning system is compatible with the sample tube loader.

In step 307, a replacement sample pathway module of a similar or different configuration to the one just removed is installed or connected to the flow cytometry system in a similar manner as described above. No additional cleaning or sanitization of the flow cytometry system prior to processing a sample by the replacement sample pathway module is required as the fluid sample processed by the first sample pathway module did not contact any portion of the flow cytometry system itself, thereby ensuring that no cross-contamination will occur between sample processing runs or between sample pathway modules. After installation on the flow cytometry system, the replacement sample pathway module may be used immediately to process a new fluid sample.

In step 308, the first sample pathway module that was removed from the flow cytometry system is installed or connected to a cleaning station, which in one embodiment is a microfluidic device cleaning module. The connection or installation of the sample pathway module on the microfluidic device cleaning module is similar to the installation of the sample pathway module on the flow cytometry system. However, instead of connecting a sample tube to the distribution block, a cleaning fluid reservoir is connected to the distribution block. Where compatible, the sample tube loader may be used to secure the cleaning fluid reservoir, otherwise the cleaning fluid reservoir may be secured by a set of fasteners or by magnetic attraction.

In step 310, a cleaning protocol for cleaning the sample pathway module is selected. In a semi-automatic operation, a cleaning protocol is selected by an operator based upon a configuration of the sample pathway module including on a type of microfluidic chip, cassette, or cartridge in the microfluidic module of the sample pathway module, and further based upon a fluid sample type processed by the sample pathway module. The cleaning protocol is selected using a user interface which provides for the selection of one of a plurality of cleaning protocols and for the configuration of one or more parameters of the cleaning protocol. For example, in one embodiment, a display and a set of user interface elements (e.g., switches, buttons, joysticks, knobs, etc.) are used to select the cleaning protocol. In another embodiment, a touchscreen display and one or more graphical user interface elements are used to select the cleaning protocol. In another embodiment, the display and interface elements, whether presented in a graphical user interface or as physical controls, are on or integral to the microfluidic device cleaning system. In another embodiment, a separate control computer or system is provided which comprises the display and interface elements. In one embodiment, a common control system is provided for the flow cytometry device and for the microfluidic device cleaning system.

In a fully automatic operation, the cleaning protocol for the sample pathway module is automatically determined by the microfluidic device cleaning system. An identifier on the sample pathway module is used to identify the type of sample pathway module and may further be used to identify the type of fluid sample last processed by the sample pathway module. In one embodiment, an optically readable identifier is used on the sample pathway module. The optically readable identifier may be a bar code, a quick response ("QR") code, or other optically readable code or identifier capable of identifying an individual sample pathway module. In another embodiment, a radio wave identifier is used on the sample pathway module. The radio wave identifier may be a radio-frequency identification ("RFID") tag or chip, a near-field communication ("NFC") tag or chip, a Bluetooth radio-based device, or other radio wave identifier capable of identifying an individual sample pathway module.

For any type of identifier used with the sample pathway module, the type of sample pathway module may be determined locally on the microfluidic device cleaning system, or the identifier read from the sample pathway module may be transmitted or sent to a central system or server for processing or lookup. For example, an identifier read from a sample pathway module may be compared to a database or table of known sample pathway modules to identify the specific sample pathway module. A set of characteristics may be read from at least one database entry, field, or record associated with the sample pathway module, wherein one of the database entries, fields, or records comprises a cleaning protocol or a set of cleaning protocol configuration information.

The "cleaning protocol" comprises a set of parameters defining the cleaning operation of the microfluidic device cleaning system for the sample pathway module. The "cleaning protocol" may comprise a type of cleaning fluid to be used (e.g., PARVOSOL, a quaternary ammonium cleaning solution, a biocide (i.e., antiviral, antibacterial, antifungal) cleaning solution, a bleaching agent (e.g., sodium hypochlorite solution), an alcohol (e.g., isopropyl alcohol)), a volume of cleaning fluid to be used, a type of rinsing fluid to be used (e.g., deionized water, molecular biology grade water, a biologically neutral solvent), a duration of cleaning (e.g., 0-5 minutes, at least 5 minutes, 5 minutes, 5-10 minutes, at least 10 minutes, 10 minutes, 10-15 minutes, at least 15 minutes, 15 minutes, 15-20 minutes, at least 20 minutes, 20 minutes, 20-25 minutes, at least 25 minutes, 25 minutes, 25-30 minutes, at least 30 minutes, 30 minutes), a volume of the sample pathway in the sample pathway module, a number of sample pathway volumes to be cleaned ("swept paths"), a pressure to be used (e.g., 5 PSI, 10 PSI, 15 PSI, 20 PSI, 25 PSI, 30 PSI, 35 PSI, 40 PSI, 45 PSI, 50 PSI, 55 PSI, 60 PSI, 65 PSI, 70 PSI, 75 PSI, 80 PSI, 85 PSI, 90 PSI, 95 PSI, 100 PSI, at least 20 PSI, at least 30 PSI, at least 40 PSI, at least 50 PSI), a number of cleaning cycles (e.g., at least 1, 1, 1 or more, continuous), a temperature to be used (e.g., at least 20° C., at least 30° C., at least 40° C., at least 50° C., at least 60° C., at least 70° C., at least 80° C., at least 90° C., at least 100° C.), a clog detection procedure, an alert procedure, a drying procedure (e.g., dry all fluid pathways with a pressurized gas for a specified amount of time, dry all fluid pathways until a detected moisture content drops below a specified level), and a set of maintenance or logging procedures (e.g., log all cleaning protocol parameters and sensor data for each cleaning cycle or operation).

Additionally, a "cleaning protocol" may comprise one or more of a disinfection procedure or operation, a sanitization procedure or operation, or a cleaning procedure or operation. A cleaning procedure may comprise the physical removal of contaminants or debris with or without a reduction in an amount of "germs", bacteria, fungi, or viruses. A sanitization procedure may comprise the reduction in amount of "germs", bacteria, fungi, or viruses with or without the physical removal of contaminants or debris. A disinfection or sterilization procedure fully kills all "germs", bacteria, fungi, or viruses with or without the physical removal of contaminants or debris. A cleaning protocol may comprise specific parameters or configurations to achieve one or more of a cleaning procedure or operation, a sanitization procedure or operation, or a disinfection procedure or operation. The set of parameters described above with respect to the cleaning protocol may further comprise the irradiation of one or more portions of the sample pathway module (e.g., by UV radiation), or the increase in temperature of one or more portions of the sample pathway module to achieve disinfection or sanitization in addition to disinfection or sanitization by a fluid and in addition to cleaning.

For example, in one embodiment the cleaning protocol may comprise identifying a cleaning fluid (e.g., PARVOSOL), a duration of cleaning (e.g., 10 minutes), a number of swept paths to be performed (e.g., 20), a temperature (e.g., 24° C.), a pressure (e.g., 138 kPa), an alert procedure (e.g., halt cleaning and sound alarm), a clog detection procedure (e.g., increase fluid pressure to a defined limit), a rinsing or flushing fluid (e.g., deionized water or microbiological grade water), and a drying procedure (e.g., running pressurized air through the sample pathway module for a defined duration). A person having ordinary skill in the art would understand that these are exemplary cleaning protocol parameters, and that other configurable cleaning protocol parameters are considered to be within the scope of this disclosure.

Determining a cleaning protocol to be used may be based upon identifying the sample pathway module being cleaned. In one embodiment, the sample pathway module is identified based on one or more identifying elements on a microfluidic chip. For example, the identifying elements may be characters or fiducials on the microfluidic chip that are visually identified by processing a signal or image from an image sensor. In one embodiment, the sample pathway module is identified based on one or more identifying elements on a sample pathway module. For example, an optical or radio identifier on an external surface of the sample pathway module is scanned by a scanning device to identify the sample pathway module. In any embodiment, based upon the identification of the sample pathway module a cleaning protocol or a set of cleaning protocol parameters may be automatically identified by the system. Alternatively, or in addition to the automatic identification, a set of information associated with the sample pathway module may be presented to a user in a graphical user interface. In one embodiment, a user may select from a set of cleaning protocols based in part upon the information presented in the graphical user interface.

In one embodiment, an algorithm for clog detection monitors signal data from flow sensors in a fluid pathway to identify any flow resistance downstream of any device. For example, a flow sensor downstream of a component that is transmitting a signal indicative of a lower than expected flow rate may be interpreted as showing a clog, blockage, or other obstruction in the component that is upstream of the flow sensor. The system would respond based upon the specific flow sensor that is indicating a lower than expected flow rate. In one embodiment, a flow sensor that is downstream of a microfluidic module comprising a microfluidic chip transmits a signal indicative of a low flow rate. The system identifies that the source of the lower flow rate is likely to be the microfluidic chip based upon the transmitted signal from the downstream flow sensor. In one embodiment, based upon the determination that a clog exists in the microfluidic chip, a flow rate or pressure is increased to attempt to clear the clog. In another embodiment, a visual, auditory, or audiovisual alarm, alert, or notification is provided to a user such that a user may take appropriate action to clear the clog. In another embodiment, operation is halted to permit a clogged component to be removed or manually cleaned. In another embodiment, in addition or in alternative to use of a flow sensor, an image sensor may be used to visually identify a clog, such as in a transparent component, for example a microfluidic chip. In another embodiment, a secondary operation mode is initiated when a clog or blockage is detected. In another embodiment, a manual override mode is initiated when a clog or blockage is detected.

In step 312, after a cleaning protocol has been determined and selected, the cleaning protocol is used by the microfluidic device cleaning system to perform a cleaning operation on the sample pathway module according to the parameters of the cleaning protocol.

In some embodiments, alternative cleaning protocols may be used for samples to be used in specific applications or jurisdictions. For example, for a sample to be produced, used, or sold in a jurisdiction or for an application requiring a higher cleaning or safety standard, system elements, such as flow cytometry devices, microfluidic device cleaning systems, or sample pathway modules that are specific to that application or jurisdiction may be used. The jurisdiction or application specific system components would not be used in or for the processing or cleaning of any other component used for any other jurisdiction or application. In one embodiment, a jurisdiction or application specific system may comprise one or more flow cytometry devices, microfluidic device cleaning systems, and sample pathway modules used to process fluid samples for a specific jurisdiction or application. In one embodiment, the jurisdiction may be a geographic, economic, or politically organized area. In one embodiment, the application may be for processing a specific fluid sample from a specific source. In one embodiment, the application may be for processing a semen sample from a mammalian animal associated with a specific jurisdiction.

After the cleaning protocol is complete, in step 314 the sample pathway module is removed from the microfluidic device cleaning system and is either placed in a sanitized and secure storage location in step 316, or is installed on the same or another flow cytometry system in step 307.

Figure 11A:
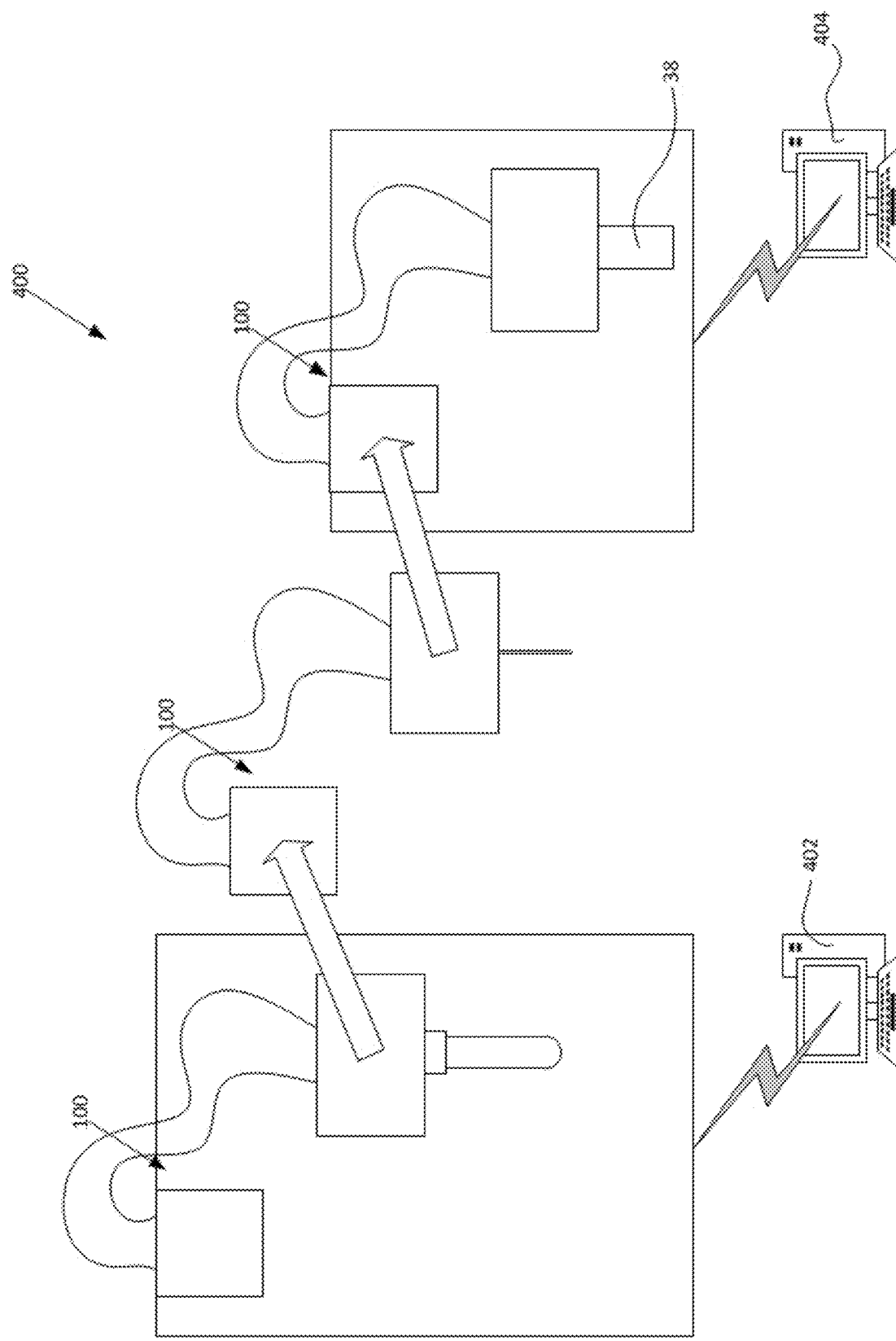
FIGS. 11A-11B provide block diagrams illustrating embodiments of a system and method for using a replaceable and removable sample pathway in a flow cytometer system and for cleaning the replaceable and removable sample pathway using a microfluidic device cleaning system.
Figure 11B:
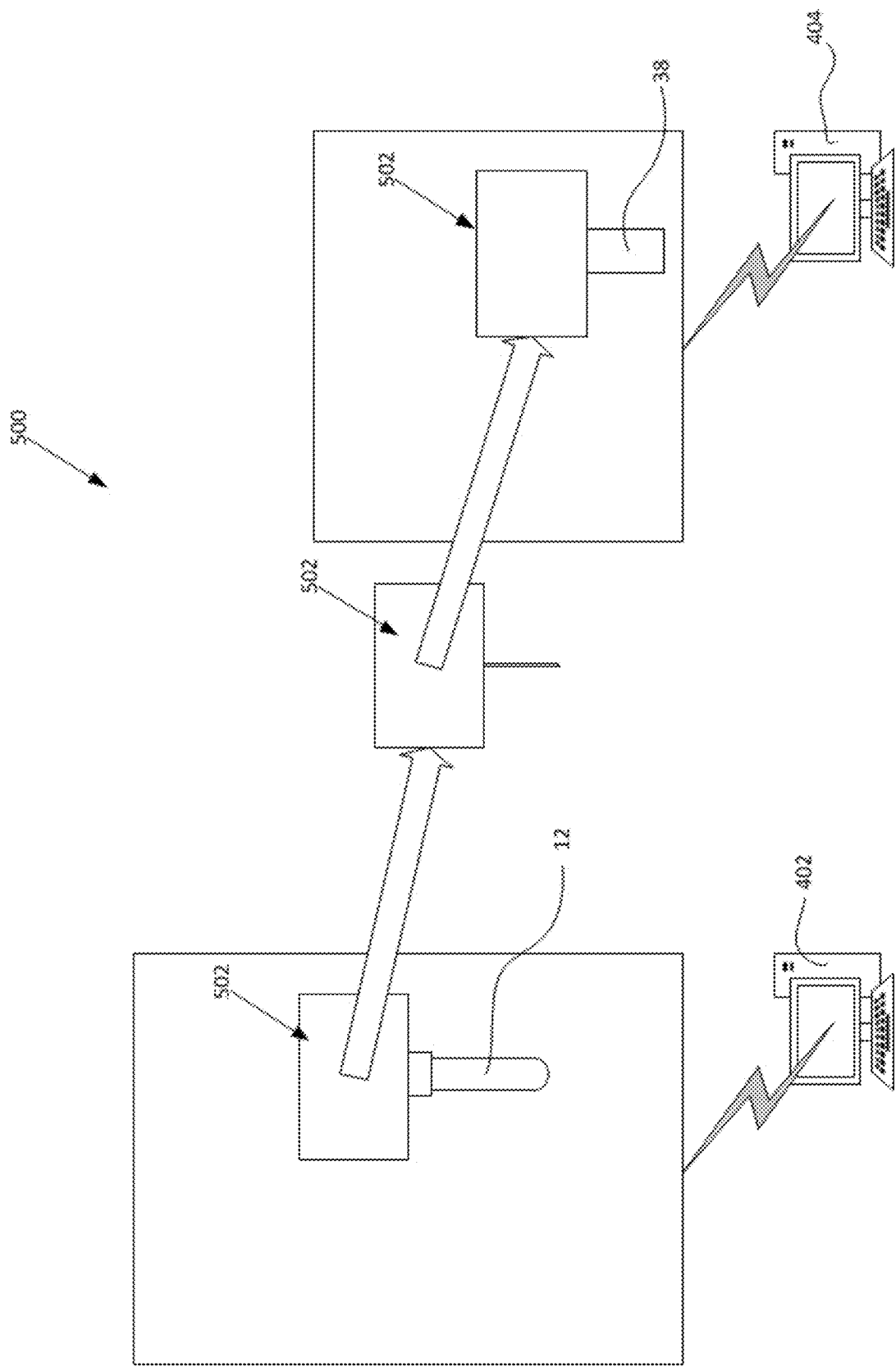

With reference now to FIGS. 11A-11B, a block diagram 400 illustrating an embodiment of a system and method for using a replaceable and removable sample pathway 100 in a flow cytometer system 10 and for cleaning the replaceable and removable sample pathway 100 using a microfluidic device cleaning system 20, and a block diagram 500 illustrating an embodiment of a system and method for using a replaceable and removable sample pathway 502 in a flow cytometer system or device 10 and for cleaning the replaceable and removable sample pathway 502 using a microfluidic device cleaning system 20 are provided respectively.

In FIG. 11A, the sample pathway module 100 is shown positioned or installed on a flow cytometry system 10. The sample pathway module 100 may be installed and operated as described in the flowchart 300 and as controlled by the control system 402. In one embodiment, the control systems 402 and 404 are a common system, or are remote or "thin" clients connected to a central server or datacenter which provides for information storage, management, and processing. A sample tube 12 provides a fluid sample to the sample pathway module 100 for processing by the flow cytometry system 10. After processing of the fluid sample in the sample tube 12 by the flow cytometry system 10, the sample pathway module 100 may be removed from the flow cytometry system 10. The sample pathway module 100 may then be positioned, connected to, or installed on the microfluidic device cleaning system 20. A cleaning fluid reservoir 38 is connected to the distribution block of the sample pathway module 100. The cleaning fluid reservoir 38 holds a small amount of cleaning fluid necessary for a single cleaning operation of the sample pathway module 100 and is filled from one or more larger internal or external fluid reservoirs.

In FIG. 11B, the sample pathway module 502 is shown positioned or installed on a flow cytometry system 10. The sample pathway module 502 may be installed and operated as described in the flowchart 300 and as controlled by the control system 402. The sample pathway module 502 differs from the sample pathway module 100 shown in FIG. 11A in that the sample pathway module 502 combines the microfluidic module and the distribution block or distribution manifold into a single element. Whereas the sample pathway module 100 comprises a separate microfluidic module 150 and distribution block 110 joined by one or more fluid connections, both components are combined in a single element in the sample pathway module 502. This configuration of the sample pathway module 502 provides for a more simplistic design and operation of the sample pathway module 502 where the configuration of the flow cytometry system 10 allows for a combined microfluidic module and distribution block to be used. A sample tube 12 provides a fluid sample to the sample pathway module 502 for processing by the flow cytometry system 10. After processing of the fluid sample in the sample tube 12 by the flow cytometry system 10, the sample pathway module 502 may be removed from the flow cytometry system 10. The sample pathway module 502 may then be positioned, connected to, or installed on the microfluidic device cleaning system 20. A cleaning fluid reservoir 38 is connected to the distribution block of the sample pathway module 502. The cleaning fluid reservoir 38 holds a small amount of cleaning fluid necessary for a single cleaning operation of the sample pathway module 502 and is filled from one or more larger internal or external fluid reservoirs.

With reference now to FIG. 12, a block diagram illustrating an embodiment of a microfluidic device cleaning system 600 with external fluid reservoirs. The microfluidic device cleaning system 600 comprises a primary housing or body 602 to which a set of fluid reservoirs (fluid reservoir 1 610a, fluid reservoir 2 610b, and fluid reservoir n 610n) and a waste reservoir 650 are releasably and fluidically connected. The fluid reservoirs 610a-610n hold one or more cleaning fluids or other fluids which may include PARVOSOL, 7×, deionized water, microbiological grade water, isopropyl alcohol, ethanol, or other suitable cleaning, wetting, or rinsing solutions or solvents.

A computing or control system 690 is in electronic communication with one or more elements of the microfluidic device cleaning system 600 and comprises a processor 692, which may be a commercially available microprocessor, an FPGA, or other suitable processor (e.g., RISC, ARM, x86, x64, etc.), a memory 693, a networking interface or transceiver 694, and an input/output ("I/O") interface 695. A display 691 may be integral to or in electrical communication with the computing system 690 and displays outputs from the computing system 690 including any user interfaces, graphical user interfaces, alerts, system information, or other output required by the system or desired by the user. The computing or control system 690 stores in the memory 693 a set of cleaning protocols or procedures which control or govern the operation of the microfluidic device cleaning system 600. The protocols may comprise parameters or features as described hereinabove, but may be modified or adjusted based upon user inputs or sensor signals from flow sensors, proximity sensors, or image sensors of the microfluidic device cleaning system 600. Additionally, the cleaning protocol may include algorithms or processes to control fault detection and response, such as when a clog or low fluid flow is detected. Fault responses may include temporarily increasing fluid flow or pressure, halting operation, or providing an audio, visual, or audiovisual alarm.

The fluid reservoirs 610a-610n are releasably connected to ports or openings of the body 602 of the microfluidic device cleaning system 600. A set of valves 612a, 612b, through 612n controls the fluid flow from the respective reservoirs and are operated based on control signals received from the computing system 690. A set of flow sensors 614a, 614b, through 614n provide a signal to the computing system 690 related to a volume or rate of flow from the respective fluid reservoirs into the microfluidic device cleaning system 600. A pump assembly 620, which may be a single pump or a plurality of pumps including a liquid pump and an air pump, of which one or more may be peristaltic pumps, pumps fluids from the reservoirs 610a-610n to the distribution interface 630. The fluids pumped by the pump assembly 620 may include pressured gas including pressurized air. The pump assembly 620 pumps fluids through one or more fluid pathways, which may have separate control valves 621 and 622, and flow sensors 623, 624, and 625. The valves 621 and 622 provide for fluid flow control and may be used, as in valve 621, to divert fluid flow from between one or more fluid flow pathways.

In one embodiment, the distribution interface 630 comprises a set of magnets 632 for retaining a distribution block or distribution manifold of a sample pathway module. Other retaining devices such as latches, locking lugs, or fasteners may be used. A proximity sensor 634 may be an optical, ultrasonic, or magnetic proximity sensor configured to provide a signal to the computing system 690 indicating that a distribution block is properly aligned, positioned, or secured to the distribution interface 630. A set of fluid inlets from a pump side of the distribution interface 630 lead to a set of fluid outlets 631. The fluid outlets 631 permit fluids, such as compressed gas or cleaning fluids, to pass from the microfluidic device cleaning system 600 into a distribution block. The fluids would pass or be processed through the distribution block of the sample pathway module to the microfluidic chip, cassette, or cartridge in the microfluidic module of the sample pathway module during a cleaning process as controlled by a cleaning procedure.

In one embodiment, the chip interface 640 comprises a set of magnets 642 for retaining a microfluidic module of a sample pathway module. Other retaining devices such as latches, locking lugs, or fasteners may be used. A proximity sensor 644 may be an optical, ultrasonic, or magnetic proximity sensor configured to provide a signal to the computing system 690 indicating that a microfluidic module is properly aligned, positioned, or secured to the chip interface 640. An image sensor 646, which may be a charge-coupled device ("CCD") sensor or an active-pixel sensor such as a complementary metal-oxide-semiconductor ("CMOS") sensor, captures image information which may be processed by the computing system 690 to determine if a clog is present in a microfluidic chip, cassette, or cartridge in the microfluidic module. A more simplistic sensor, such as a photoresistor or photodiode, may also be used to determine if a clog is present. For any sensor type, the image sensor 646 would provide image data to the computing system 690 indicating a clog in a fluid pathway. Such image data may include a reduced light level, an increased black level, an on signal, or an off signal, which may indicate that some object or debris is blocking a fluid flow path. The computing system 690 may process this input data to begin a fault process or a clog clearance process. The image sensor 646 may also be used to capture images of identifying markings on a microfluidic chip, such as characters, fiducial markers, reference images, or reference markings, that may be processed by the computing system 690 to identify a specific microfluidic chip and to provide calibration or adjustment information for optical or sensor components. Identifying a microfluidic chip optically may be used to automatically determine a cleaning protocol or a set of cleaning parameters for the microfluidic chip or sample pathway module.

A valve 652 and a flow sensor 654 may be used to respectively control and monitor the flow of fluids, including gas, cleaning solutions, and rinsing or other solutions, as they exit the microfluidic chip, cassette, or cartridge and flow to the waste reservoir 650. In one embodiment, an ultra-violet ("UV") light emitting sterilizing device 648, which may be a UV light emitting diode ("ED") is used in combination with fluid-based cleaning and sterilization to further sterilize and clean a microfluidic chip.

The set of valves, the image sensor, and the proximity sensors provide signal outputs that are processed by the computing system 690 to determine one or more states or conditions of the microfluidic device cleaning system 600 and to compare the determined or detected states against ideal or desired system states. For example, the flow sensors may be used to determine an amount of fluid that has flowed from one or more reservoirs, which may then be used to determine an amount of fluid remaining in a reservoir and to signal to an operator that a reservoir is low on fluid and requires replacement. The flow sensors may also be used to determine an amount of fluid that has flowed through a particular component, tube, or tubing run to be used in determining a maintenance event for that component, such as replacing a pump or tube at the end of a maintenance life or cycle. For example, a peristaltic pump may have a predetermined life and must be replaced at the end of that working life. By measuring a fluid flow before or after the pump, an accurate determination can be made as to when the pump must be replaced.

Similar measurements and feedback may be provided for any system component where a measured value may be compared to a stored value, such as maintenance term or useful life, to provide an indication as to when a component or device must be replaced. In another example, an image sensor alone or in combination with one or more flow sensors may be used to detect or determine when a component of the microfluidic device cleaning system 600 has clogged. Based upon the type of clog as determined by the measured system conditions, a signal may be sent to an operator or a fault condition operation may be triggered, such as halting operation or increasing flow speed or pressure to break the clog. The sensors, including the flow sensors, may also be used to track the swept volume (e.g., number of swept paths) of the sample pathway module to accurately determine when the sample pathway module is sufficiently clean so as to end the cleaning operation.

The valves in the microfluidic device cleaning system are used to control the flow of fluids within the microfluidic device cleaning system 600, and may be used, for example, to divert fluid flow or halt the flow of a fluid to or from a particular component of the microfluidic device cleaning system 600. The valves may be solenoid valves, actuator-controlled valves, or pneumatically or hydraulically controlled valves operated by control signals from the computing system 690.

FIG. 13 provides a block diagram illustrating an embodiment of a microfluidic device cleaning system 700 with internal fluid reservoirs and control system. The microfluidic device cleaning system 700 is substantially similar to the microfluidic device cleaning system 600, differing in that all system elements, including the computing device 690, display 691, waste reservoir 650, and fluid reservoirs 610a, 610b, through 610n are disposed within the body or housing 702. In both the microfluidic device cleaning system 600 and 700, the number and location of the reservoirs and the configuration of the computing system 690 may be modified (i.e., included or omitted, or internal or external) based upon a particular implementation or processing need. For example, in one embodiment the microfluidic device cleaning system may comprise a single external fluid reservoir 660 that is used for both cleaning and waste fluids, wherein the fluids are filtered or recycled. In another embodiment, the microfluidic device cleaning system may comprise an internal waste reservoir and one external fluid reservoir. In another embodiment, the microfluidic device cleaning system may comprise two internal fluid reservoirs and one external waste reservoir. In any of the embodiments, the microfluidic device cleaning system may comprise an internal gas compressor or pump, or a connection to an external pressurized gas source.

With reference now to FIG. 14, a block diagram illustrating an embodiment of a replaceable and removable sample pathway module 800 with a microfluidic module 850 and a distribution block 810 is provided. The sample pathway module 800 comprises a sample fluid pathway 830 and a sheath fluid pathway 832 that are contiguous from the distribution block 810 to the microfluidic module 850. The sample pathway module 800 may be used with a flow cytometry device or with a microfluidic device cleaning system. As represented in the embodiment in FIG. 14, the sample pathway module 800 should be understood to be in a configuration that would be common to either a flow cytometry device or a microfluidic device cleaning system.

The distribution block 810 comprises a body or manifold 811 comprising sample pathway element 814, gas path element 815, sheath or buffer fluid path element 817, and connection path element 816. A spring-loaded sample tube loader 813 retains and seals a fluid reservoir 822 against a surface, such as a bottom surface, of the distribution block body 811. Alternatively, such as with a microfluidic device cleaning system, the sample tube loader 813 may be removed and the fluid reservoir 822 may be held in position against the distribution block 810 by other suitable means. In one embodiment, the fluid reservoir 822 is a cleaning fluid reservoir that is retained against the distribution block 810 by corresponding threads or lugs and a set of magnets. In one embodiment, the fluid reservoir 822 is a sample fluid reservoir that is fully held and retained within the sample tube loader 813, and the sample tube loader 813 is releasably secured to the distribution block 810 by a set of magnets. In another embodiment, the sample tube loader 813 further comprises a spring or spring biasing means to apply a pressure to a fluid reservoir 822, such as a sample tube, to ensure a seal against a sample straw 812 extends into the fluid reservoir 822 and a fluid 824 contained therein. In a flow cytometry system, when processing a biological fluid sample, the fluid 824 may be a semen sample, and the fluid reservoir 822 may be a sample tube. In a microfluidic device cleaning system, the fluid 824 in the fluid reservoir 822 may be a cleaning fluid, solution, or solvent, or water such as deionized water or microbiological grade water.

A pressurized fluid, such as a pressurized gas, enters the sample tube through the port or opening 820. The pressure from the pressurized gas causes the fluid 824 to be forced or flow through the sample straw 812 and into the sample pathway element 814. A sheath or buffer fluid, or a flushing or rinsing fluid or solvent, is flowed or pumped through the sheath or buffer fluid path element 817. The pressurized gas may also be diverted, such as by an internal or external valve, from the gas path 815 through the connection path element 816 to the sheath or buffer fluid path element 817 to provide a pressurized gas, such as for flushing or drying, in the sheath fluid pathway 832. Similarly, the pressurized gas may be run through the sample pathway element 814 to clear or dry the sample fluid pathway 830. Hoses, tubes, or pipes 831 and 833 releasably held in place by fitting sets 819 and 852, and 818 and 853, join the distribution block 810 and microfluidic module 850 in fluid connection and form part of respectively the sample fluid pathway 830 and sheath or buffer fluid pathway 832.

The microfluidic module 850 comprises a body 851 in which a microfluidic chip (which may also be a microfluidic cassette or cartridge) 880 is positioned and held by microfluidic device holders 856. The device holders 856 are used to secure and position the microfluidic chip 880 within the body 851. The device holders 856 are used to adjust the relative position and angle of the microfluidic chip 880, such as by thumbscrews, threaded rods, or other suitable positioning means, to align the microfluidic chip 880 with detection optics or laser kill optics systems in a flow cytometry device, or with a image sensor in a microfluidic device cleaning system. In another embodiment, the position microfluidic chip 880 is fixed in the microfluidic module 850, such as by pins or by corresponding geometry of the microfluidic module 850, and a position of a kill laser, a detection laser, or other optical device are adjusted in X, Y, or Z directions relative to the microfluidic chip 880 in a flow cytometer or in a microfluidic device cleaning system.

In an exemplary embodiment, the microfluidic chip 880 comprises a body 881 and a set of internal fluid channels. A channel 855 in the microfluidic module body 851 directs a sheath fluid, cleaning fluid, or pressurized gas into a sheath input 882, through a sheath channel 883, into a common channel 886, through a detection region 887, and out through one or more outlets 888 and 889 to be collected in a waste reservoir 890 as waste fluid 892. A channel 854 in the microfluidic module body 851 directs a sample fluid, cleaning fluid, or pressurized gas into a sample input 884, through a sample channel 885, into a common channel 886, through a detection region 887, and out through one or more outlets 888 and 889 to be collected in a waste reservoir 890 as waste fluid 892.

The sample pathway module 800 is a fully modular device that may be removed from a flow cytometry device and placed on a microfluidic device cleaning system for a fully automated cleaning process. The components of the sample pathway module 800, such as the distribution block 810 and the microfluidic module 850, may be removed, separated, and replaced separately for cleaning or maintenance purposes. The sample fluid pathway 830 of the sample pathway module 800 comprises the entire sample fluid pathway for a sample fluid when the sample pathway module 800 is used with a flow cytometry device. A sample fluid processed by the sample pathway module 800 in a flow cytometry device would not contact any portion of the flow cytometry device other than when the sample is collected in a sample collection tube or diverted to a waste collection container. This provides for simple and quick replacement of the sample pathway module 800 between sample runs, such as for changes in the source of the sperm sample. The replaceable, removable, reusable, and modular nature of the sample pathway module 800 reduces or eliminates downtime of a commercial flow cytometry instrument and further reduces waste that could be caused by the use of disposable or one-time use microfluidic devices.

Figure 16A:
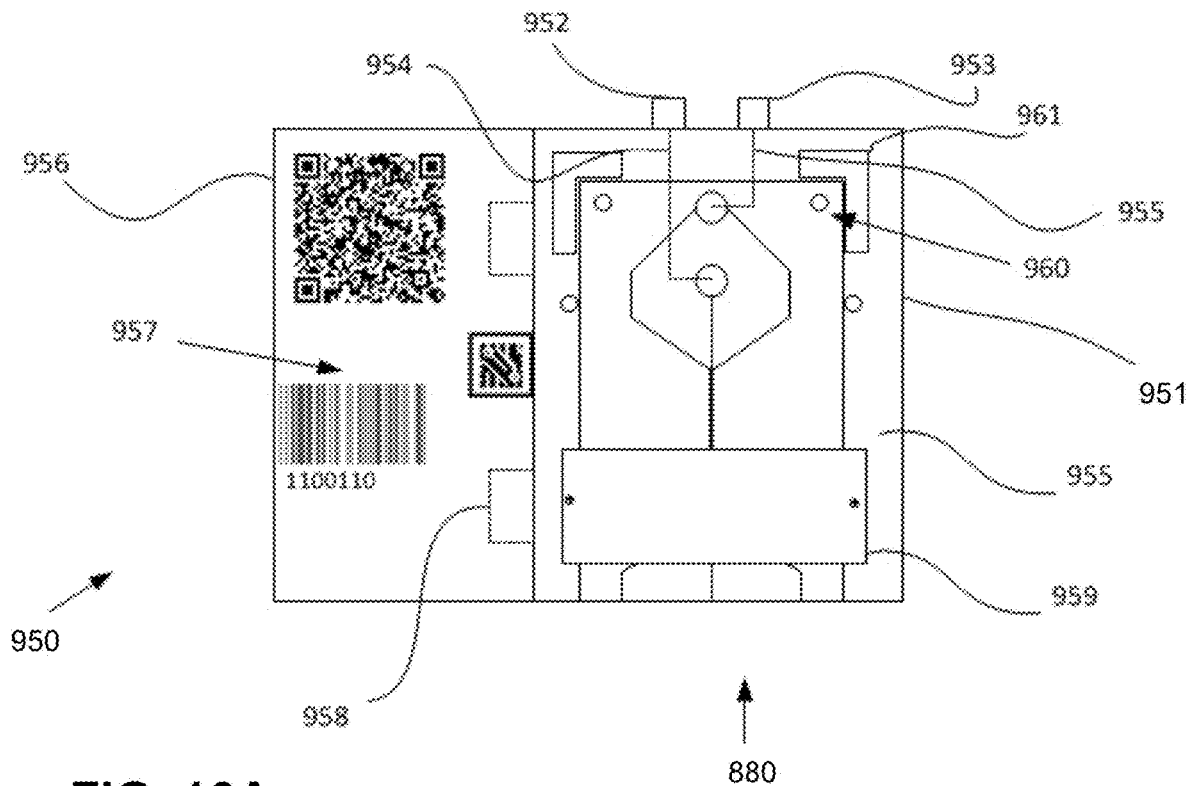
FIG. 16A provides a block diagram illustrating a side view of an embodiment of a microfluidic module of a replaceable and removable sample pathway module.

With reference now to FIG. 16A, a block diagram illustrating a side view of an embodiment of a microfluidic module 950 of a replaceable and removable sample pathway module is provided. A microfluidic chip 880, which may be a microfluidic chip with internal sample and buffer or sheath fluid flow channels as depicted, or which may comprise any configuration of sample and buffer or sheath fluid flow channels which would have been apparent to one having ordinary skill in the art, is disposed in the chip retainer 955 of the body 951 of the microfluidic module 950. A sample line would be connected to connection 952 and fed through internal pathway 954 to the microfluidic chip 880 and a sheath or buffer fluid line would be connected to the connection 953 and fed through internal pathway 955 to the microfluidic chip 880. The connections 952 and 953 may be releasable connections as described above, and the features and function of the microfluidic chip 880 may be as described above and as subject to modification known to one of ordinary skill in the art.

Additional details and embodiments of microfluidic chips that may be used in accordance with the systems and methods of the present invention can be found in the following co-owned patents and patent applications: U.S. Pat. Nos. 8,961,904, 9,588,100, U.S. Ser. Nos. 10/488,320, 10/928,298, 10/532,357, 16/279,430, 16/419,756, 16/597,235, 16/704,175, and 16/741,608, the contents and specifications of which are incorporated herein by reference.

The microfluidic chip 880 is retained in the chip retainer 955 by a plate and fasteners 959, by a set of retaining pins 960, by a set of corresponding geometric features 961 on the face of the chip retainer 955, or by any combination of these elements. A front, face, or front plate element 956 of the microfluidic module 950 is generally perpendicular to the chip retainer 955. The front 958 comprises one or more magnets 956 which are used to releasably secure the microfluidic module 950 to a flow cytometer or microfluidic device cleaning system.

Figure 17:
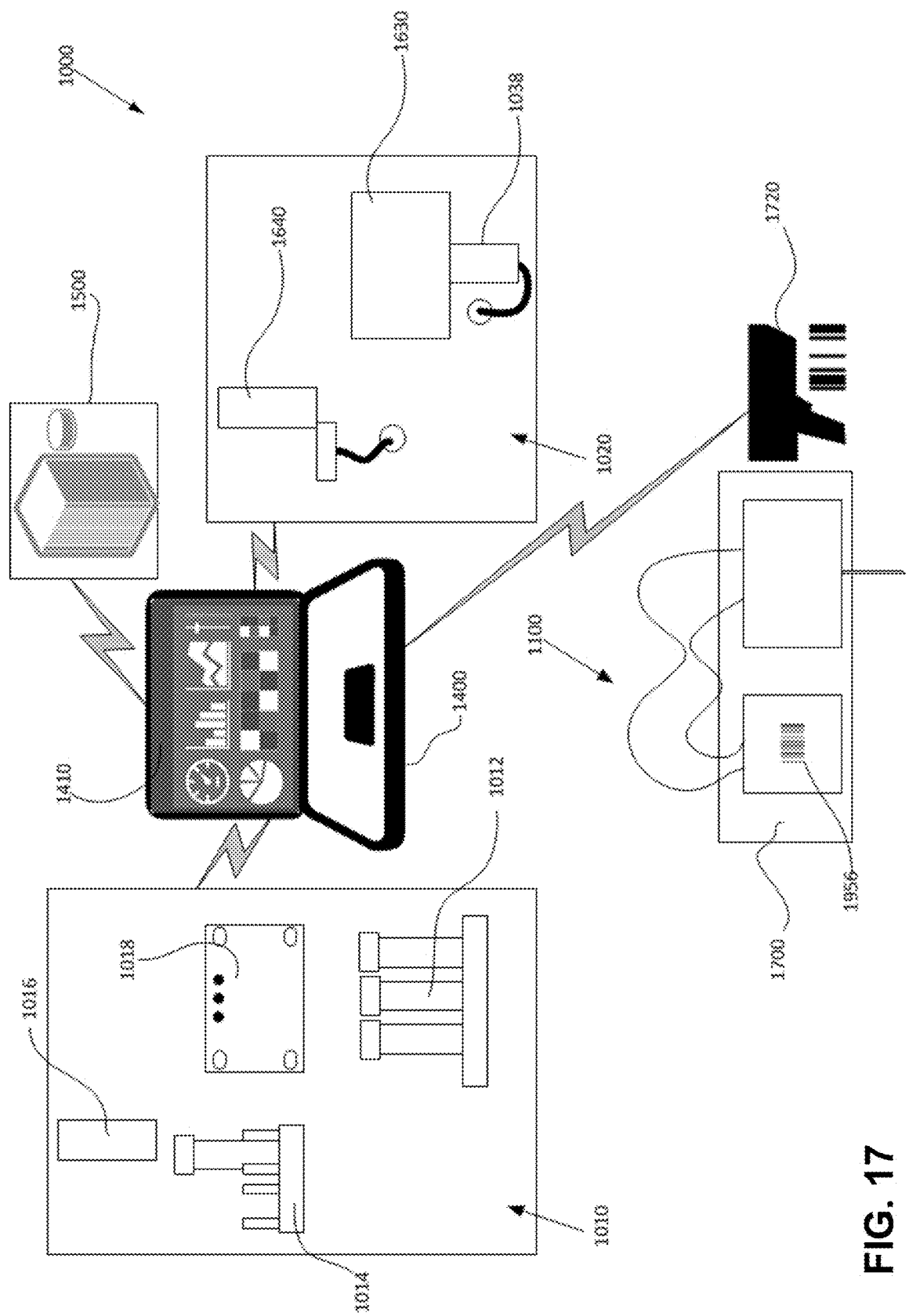
FIG. 17 provides a block diagram illustrating an embodiment of a system comprising a flow cytometry device, a microfluidic device cleaning system, a sample pathway module, a local control system, and a remote server.

With reference now to FIG. 17, a block diagram illustrating an embodiment the modular flow cytometry system 1000 comprising a flow cytometry device 1010, a microfluidic device cleaning system 1020, a sample pathway module 1100, a local control system 1400, and a remote server 1500 is provided. In the system 1000, a replaceable and removable sample pathway module 1100 is used with a flow cytometry device 1010 and a microfluidic device cleaning system 1020. In one embodiment, the flow cytometry device 1010 comprises a distribution block interface 1018, a microfluidic module interface 1016, a set of unprocessed sample tubes 1012 retained in sample tube holders, and an automatic processed sample mixing station 1014. In one embodiment, the microfluidic device cleaning system 1020 comprises a distribution block interface 1630, a microfluidic device interface 1640, and a cleaning fluid reservoir 1038. A cleaning fluid may be supplied to the reservoir 1038 from one or more internal or external fluid tanks, and waste cleaning fluids may be returned to the microfluidic device cleaning system 1020 for internal or external storage.

The microfluidic module interface 1016 and microfluidic device interface 1640 each comprise adjustable elements for positioning optical imaging devices (e.g., cameras, microscopy imaging devices), detectors (e.g., photomultiplier tubes, avalanche photodiodes), or irradiation devices (e.g., kill or detection lasers) relative to a microfluidic chip in a microfluidic module of the sample pathway module 1100. The position and angle of the adjustable elements may be adjusted manually (such as by set screws) or by an element of the flow cytometry system 1010 or microfluidic device cleaning system 1020 (e.g., by actuators, stepper motors). This provides for the positioning of any optical or detection element of the flow cytometry device 1010 or microfluidic device cleaning system 1020 to be positioned correctly relative to a portion of a microfluidic chip in the sample pathway module 1100 (e.g., an action region, detection region, or calibration markings). The adjustable elements may be moved in an X, Y, or Z direction, any combination of those directions, or may be tilted relative to the microfluidic chip to properly and align the adjustable elements.

The sample pathway module 1100 is held and retained, such as by a set of magnets, at a holding or storage station 1700, which is physically adjacent to one or both of the flow cytometry device 1010 and microfluidic device cleaning system 1020. Prior to being connected to or installed on a flow cytometry device 1010 for use in processing a fluid sample, a scanning device 1720, which is a device capable of reading or scanning optical or radio identification tags (e.g., a barcode scanner or RFID reader), is used to read or scan the identifying element 1956 on the sample pathway module 1100. This information is sent to the local control system 1400. The local control system 1400 is one or more computing devices, such as a desktop computer, laptop computer, tablet computer, thin-client computer, or other suitable computer and may be external to the flow cytometry device 1010 and microfluidic device cleaning system 1020, may be integral to one or both of the flow cytometry device 1010 and microfluidic device cleaning system 1020, may be shared by the flow cytometry system 1010 and microfluidic device cleaning system 1020, or may comprise separate stations or terminals for each of the flow cytometry system 1010 and microfluidic device cleaning system 1020.

The local control system 1400 receives and processes the identifying information scanned by the scanning device 1720 from the sample pathway module 1100. A graphical user interface 1410 displays information associated with the sample pathway module 1100, such as configuration, microfluidic chip type, appropriate flow cytometry or cleaning protocols or parameters, maintenance information, or warning information such that a user is informed as to how the sample pathway module 1100 is to be used and configured. Additionally, this information may be used by the flow cytometry system 1010 and microfluidic device cleaning system 1020 to automatically configure respectively a flow cytometry protocol or a cleaning protocol based on the configuration of the sample pathway module 1100. Additionally or alternatively, the scanning may be used to track the location or status of the sample pathway module 1100 and similar identifying elements may be scanned on the flow cytometry device 1010 and microfluidic device cleaning system 1020 to specifically track how and when a sample pathway module 1100 has been used and to identify where a sample pathway module 1100 is at any given time.

The information used by the local control system 1400 may be stored locally or may be stored in a remote server 1500 which comprises one or more databases. The databases stored in the remote server 1500 comprise information relating to specific sample pathway modules 1100, including usage logs, maintenance information, configuration information, flow cytometry protocols, and cleaning protocols. This information may alternatively be stored in the local control system 1400. In one embodiment, the information stored in the local control system 1400 or the remote server 1500 may be shared between a plurality, that is, more than one system. For example, in one embodiment configuration information and usage information from one flow cytometry device 1010 may be shared with other flow cytometry systems, configuration information and usage information from one microfluidic device cleaning system 1020 may be shared with other microfluidic device cleaning systems, and information related to a sample pathway module 1100 may be communicated and shared between any connected device or system.

The user interface 1410 provides a user with a GUI and a set of user-operable or controllable elements, such as graphical user interface elements, to provide for the viewing and control of parameters or information associated with any aspect of the system 1100. For example, in one embodiment a user is provided with a set of user interface elements in the user interface 1410 for configuring a flow cytometry protocol for a specific sample pathway module 1100 and for the specific sample being processed, such as a semen sample. In another embodiment, the user is provided with a set of user interface elements in the user interface 1410 for configuring a cleaning protocol for a specific sample pathway module 1100. The user interface 1410 is further configured to provide alerts and information related to the current operational status of the flow cytometry device 1010 or microfluidic device.

In one embodiment, for any flow cytometry system (e.g., flow cytometry system 10), microfluidic device cleaning system (e.g., microfluidic device cleaning system 20), and sample pathway module (e.g., sample pathway module 100), any fluid pathway, that is any components that are in physical contact with a fluid, must be chemically inert. For example, silicate glass, polyvinylidene difluoride ("PVDF"), polytetrafluoroethylene ("PTFE"), perfluoroalkoxy alkane ("PFA"), polyether ether ketone ("PEEK"), or other suitable materials may be used to prevent damage, corrosion, or other undesirable reactions in components which may be exposed to corrosive materials (e.g., acids, oxidizers, bases) or other hazardous materials that may be used in the cleaning processes or procedures. Specifically, material selection for components in any fluid pathway must prioritize materials that may safely be placed in contact with any chemicals used in a cleaning or sample processing operation or process and should use materials that are substantially chemically inert.

Figure 18:
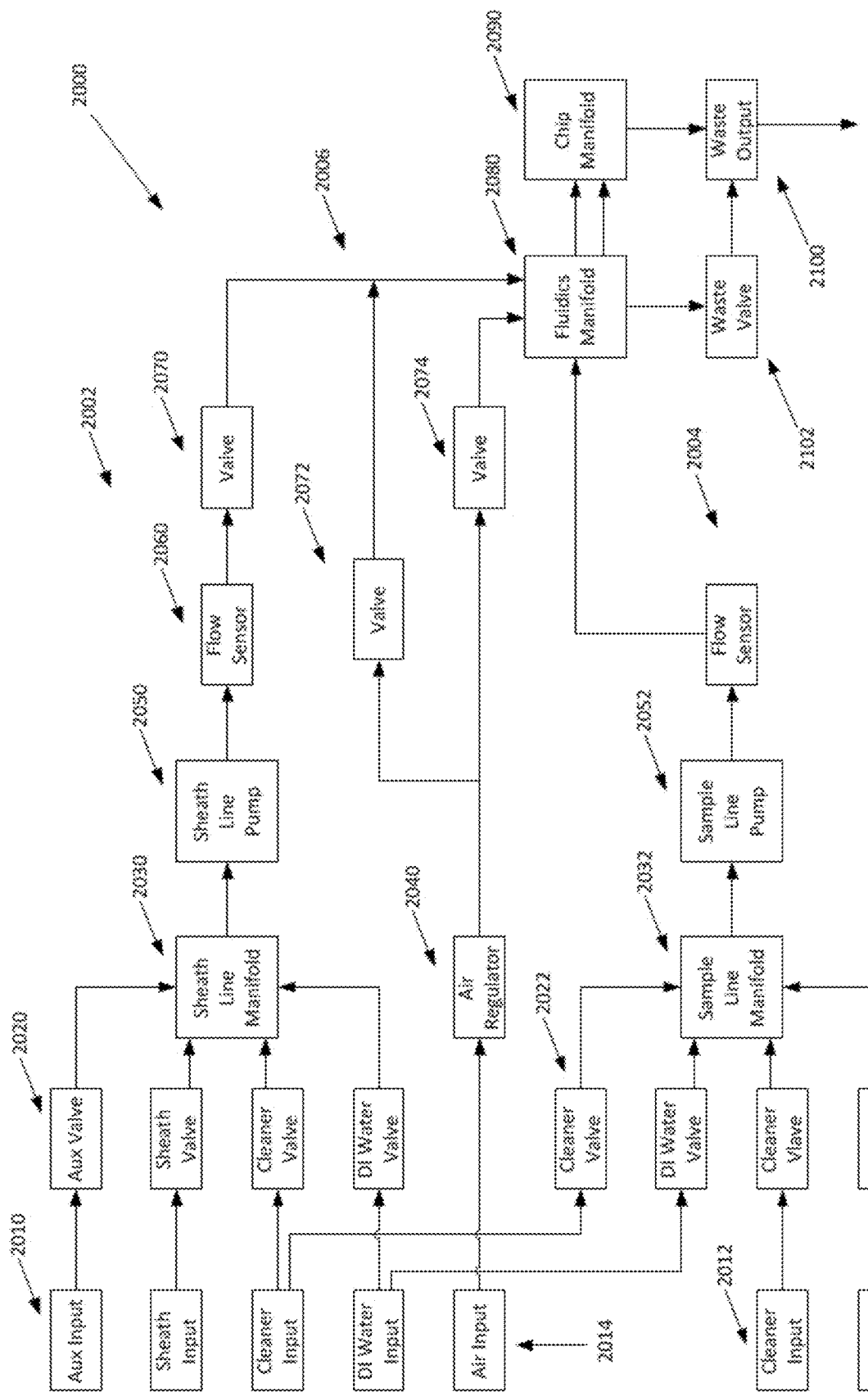
FIG. 18 provides a block diagram illustrating an embodiment of fluid flows within a microfluidic device cleaning system.

With reference now to FIG. 18, a block diagram 2000 illustrating an embodiment of fluid flows within a microfluidic device cleaning system, such as the microfluidic device cleaning systems 20, 600, 700, or 1020, is provided. The diagram 2000 illustrates an embodiment of the movement and control of fluids into, through, and out of a microfluidic device cleaning system. A set of fluid sources including sheath line sources 2010, sample line sources 2012, and gas source 2014, each of which may be internal or external sources and which may be provided from fluid reservoirs (e.g., bags, containers, tanks), compressed gas sources or tanks, and which may comprise cleaning solutions, solvents such as water, and compressed air, comprise the set of inputs for the fluid system. Generally, three fluid pathways are provided: a sheath fluid line or path 2002; a gas line or path 2006; and a sample line or path 2004. In the sheath fluid line 2002, the flow of a fluid from one of the sources 2010 is controlled by a corresponding valve 2020 to permit or restrict flow to a sheath line manifold 2030. In the sample fluid line 2004, the flow of a fluid from one of the sources 2012 is controlled by a corresponding valve 2022 to permit or restrict flow to a sample line manifold 2032. One or more of the fluid inputs, such as certain cleaning fluids or solutions, solvents such as water, or other fluids may be shared or provided to both of the sheath fluid line 2002 and the sample line 2004. Control of the fluid path for the shared fluids is achieved by operation of an appropriate corresponding valve in the set of valves 2020 or 2022. For the gas line 2006, gas pressure from a gas or air input 2014, which may be from a pressurized external or internal gas source, is regulated by an air regulator 2040 to permit or regulate the pressurized gas within the fluid system.

In the sheath line 2002, a sheath line pump 2050, which may be a peristaltic pump or other suitable pump, draws or pumps one or more fluids from the sources 2010 to a main fluidics manifold 2080. Flow of the fluids as pumped by the sheath line pump 2050 is measured by a flow sensor 2060 downstream of the pump and is controlled by a valve 2070. In the sample line 2004, a sample line pump 2052, which may be a peristaltic pump or other suitable pump, draws or pumps one of the fluids from the sources 2010 or 2012 to a main fluidics manifold 2080. Flow of the fluids as pumped by the sample line pump 2052 is measured by a flow sensor 2060 and may be controlled by operation of a valve downstream of the flow sensor. The flow sensors 2060 are used to measure an amount of fluid that has moved through a flow line or a rate of fluid flow through a flow line and may be used to detect or identify a lower than desired fluid flow rate which may indicate a clog or obstruction in a fluid flow line. A compressed gas from the air input 2014 is regulated by the air regulator 2040 and flow of the compressed gas is controlled by valves 2072 and 2074 to permit the gas to flow into the fluidics manifold 2080 or into the sheath fluid line 2002. The gas is used to clear the sample line 2004 or the sheath fluid line 2002 and is used to dry the fluid lines after a cleaning operation.

Fluids, including gases, flow into the fluidics manifold 2080 and through a sample pathway module before returning at the chip manifold 2090. Waste fluids, including used cleaning fluids and rinsing agents, flow to and are received at the waste output 2100 which directs the waste fluids to an internal or external waste fluid reservoir or drain line. A waste valve 2102 is used to divert any fluid from the sample line 2004, sheath fluid line 2002, or gas line 2006 directly into the waste output 2100 without passing through a sample pathway module. Diversion of fluids may be done by manual or automatic operation as a result of an error or failure state including based on a detected clog or obstruction.

On-Chip Identification

Figure 16B:
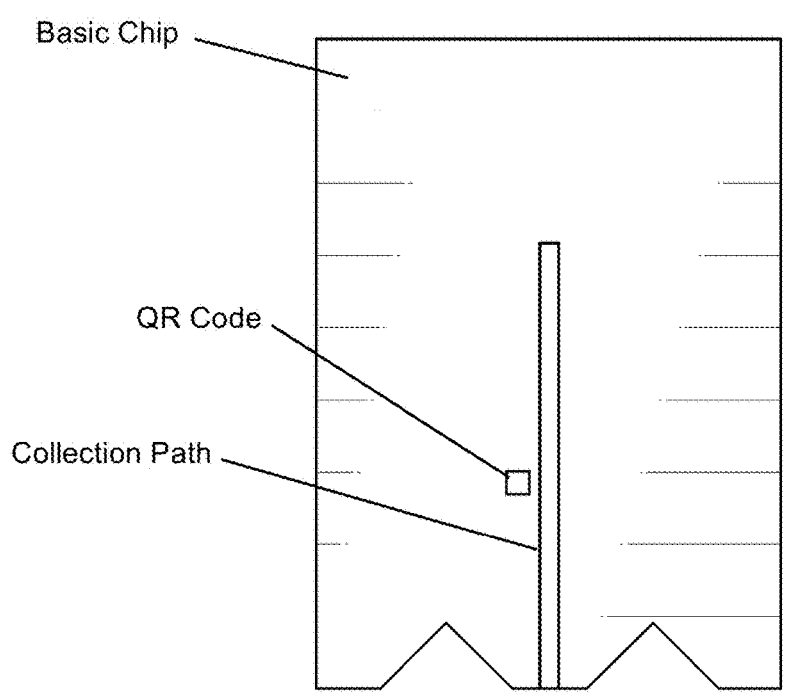
FIG. 16B shows a non-limiting embodiment of a microfluidic chip with an identification element.

Referring now to FIGS. 16A and 16B, the microfluidic chip may include identifying elements 957 for on system identification and reference object for auto-focusing the microfluidic chip. For example, one or more identifying elements 957 may be disposed on the front 956 of the chip. The identifying elements 957 may be visual or optical identification elements such as QR codes or barcodes, fiducial markers, or may be radio identification elements such as a RFID or NFC tag, or may be a combination of optical or visual and radio identification elements.

Although each microfluidic chip is intended to be geometrically the same, variations in manufacturing cause the chips to differ slightly. The identifying elements can allow for comparison of a chip to instrument performance, which is useful in eliminating poorly performing chips and identifying high performance chips. The identifying elements also allows for an automated tracking of how long a chip has been in use to inform the user when it should be removed for cleaning.

In some embodiments, the identifying elements 957 are used to identify a specific microfluidic module 950 and the microfluidic chip 880 installed or disposed in the module 950. This provides for easy identification of elements for the purposes of avoiding cross-contamination, for cleaning, for storage and retrieval, and for configuration of flow cytometry or cleaning parameters or protocols based on the type and configuration of the microfluidic chip 880 and module 950 as identified by the identifying elements 957.

Figure 16C:
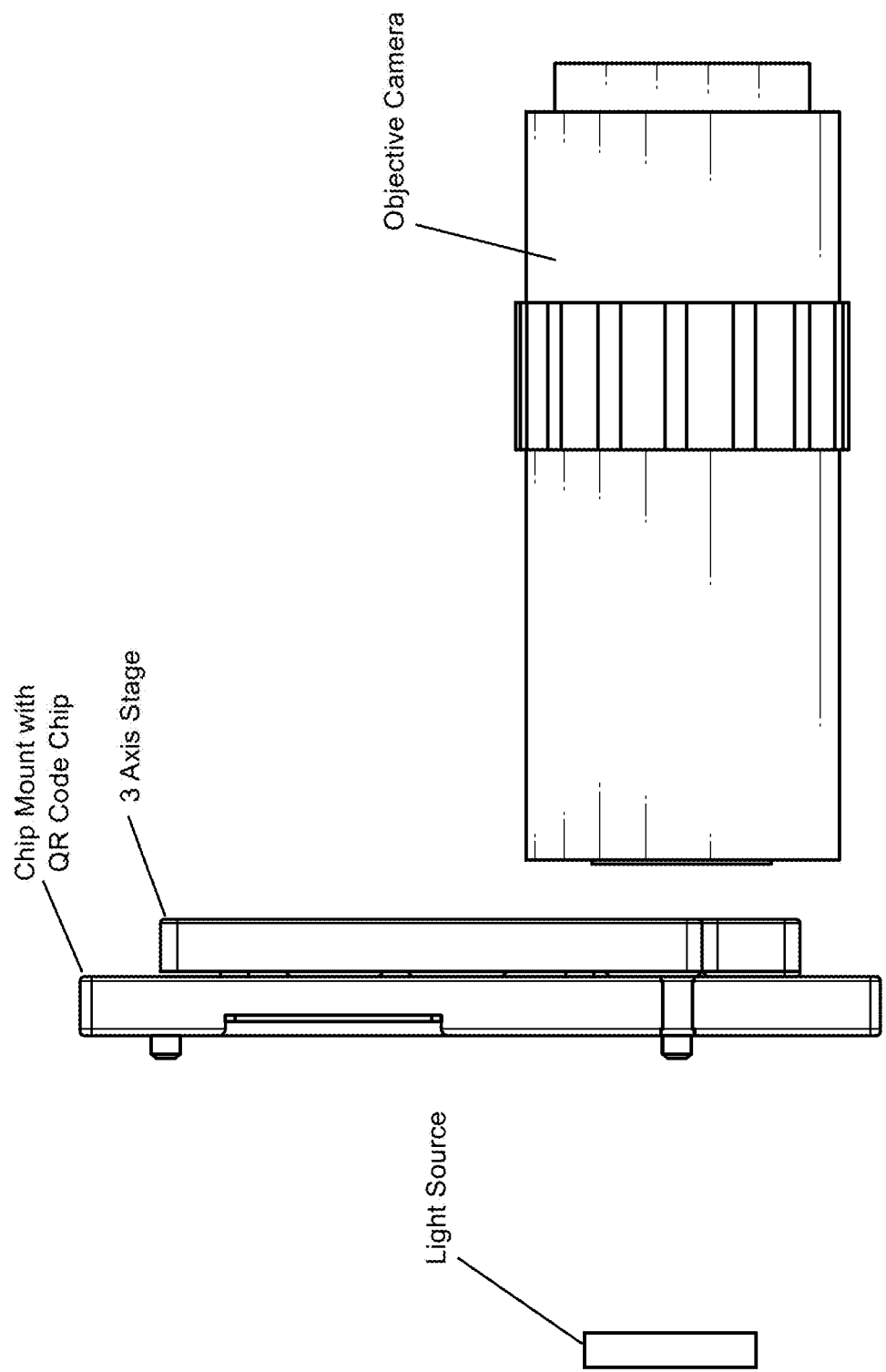
FIG. 16C shows a non-limiting arrangement that utilizes the identification element of the microfluidic chip to automatically align and position the microfluidic chip.

In other embodiments, the identifying elements can also be used to automatically align and position the microfluidic chip in the flow cytometry device. This can save operator time by not having to manually focus and align the microfluidic chip. As shown in FIG. 16C, in one embodiment, a microfluidic chip with an identifying element is mounted onto a 3-axis stage, which is a stage that can move on three axes. A camera and a light source, such as a brightfield LED light, may be used to image the microfluidic chip and provide feedback to the 3-axis stage to properly align the chip. The camera and light source are fixed in place, and alternative levels of illumination may be needed. The dimensions of the identifying element should be small enough to be fully visible within the camera's field of view. The 3-axis stage allows for repositioning of the chip to be brought into focus by moving the chip, and thus the etched pattern, instead of refocusing and repositioning the camera.

In some embodiments, the chip may have one or more identifying elements 957. For example, multiple identifying elements 957 may be required to achieve the correct focus and position. In some embodiments, the identifying elements 957 can be laser etched into each chip. The identifying elements could be any pattern that can be interpreted through image analysis. Patterns including, but not limited to, alpha-numeric sequences, bar codes, QR-codes, etc., are applicable and equivalent.

In further applications, the identifying elements 957 may be used to identify what chip is currently loaded on the microfluidic module. Since etched patterns can store information, the flow cytometry device may be able to read an etched pattern on the chip to identify what chip is on the instrument.

Optics and Electronics Modules

Without wishing to limit the present invention to a particular application or embodiment, the systems, apparatuses, and methods described herein, such as the replaceable and removable sample pathway module 100, may be used with a particle processing system such as a semen sorting system (e.g., flow cytometry system 10). In one embodiment, the semen sorting system may comprise a flow cytometry apparatus or a microfluidic chip or device, comprising a flow chamber configured to direct a fluid stream including sample particles through a particle interrogation location. The sample particles may be cells such as spermatozoa which have been stained or otherwise processed prior to entering the flow cytometry apparatus or microfluidic device. The flow cytometry apparatus or microfluidic device may further comprise a laser configured to emit electromagnetic radiation along a beam path to the particle interrogation location and a detector configured to detect an emission from the particle. Subsequent to the detection, the particle may be sorted or deactivated, such as by ablation by electromagnetic radiation, prior to or after exiting the flow cytometry apparatus or microfluidic device. An additional detector may be used to determine the efficacy of the deactivation of the particle, such as to determine or detect an amount or quantity of the electromagnetic radiation to which an individual particle was exposed, and to determine if an individual particle was sufficiently deactivated or damaged. The particles, which may be X-chromosome or Y-chromosome sorted or sexed semen, e.g., X-chromosome sexed semen, are then collected in one or more collection containers.

The replaceable and removable sample pathway module 100 may also be used with or in a method for analyzing particles, such as sperm cells, contained in a fluid stream as the particles flow through an interrogation location in a flow cytometry apparatus or in a microfluidic chip or device. Such a method comprises using electromagnetic radiation emitted from a laser to illuminate a fluid stream and the particles contained therein. A detector detects electromagnetic radiation emitted from the interrogation location by the particle, and a processor determines characteristics of the particle in the fluid stream based in part on a signal from the detector. Subsequent to the detection, the particle may be sorted or deactivated, such as a physical soring and removal process or by deactivation by ablation or photo-damaging by electromagnetic radiation, prior to or after exiting the flow cytometry apparatus or microfluidic device. The particles, which may be X-chromosome or Y-chromosome sorted or sexed semen, e.g., X-chromosome or Y-chromosome bearing sexed semen, are then collected in one or more collection containers.

The replaceable and removable sample pathway module 100 may also be used with or in a method for assessing an amount of DNA within a nucleus of a sperm cell using a flow cytometry apparatus or a microfluidic chip or device. The method may include staining the DNA within the nucleus of the sperm cell and then irradiating the stained DNA within the nucleus of the sperm cell by an electromagnetic emission device such as a laser as the sperm cells pass by the laser in a corresponding region of the flow cytometry apparatus or microfluidic device. A detector, such as an avalanche photodiode, detects fluorescent light emitted from the irradiated and stained DNA within the nucleus of the sperm cell at a detection or interrogation location within the flow cytometry apparatus or microfluidic device. The method may further include differentiating X chromosome bearing sperm cells and Y chromosome bearing sperm cells by first determining a sex of a sperm cell using the detected amount of DNA within the nucleus of the sperm cell and then differentiating between a plurality of sperm cells based upon said sex determination. The characteristics of the sperm cells may include corresponding amounts of DNA within the nuclei of the sperm cells. The method may further include deactivating a given sperm cell based upon the determined amount of DNA within the nucleus of the given sperm cell. Said deactivating may include photo-damaging or ablating the given sperm cell by an emission of electromagnetic radiation. The method may further include forming droplets, a plurality having one of said sperm cells entrained, charging each of said droplets differentially based upon said sex differentiation characteristic of said sperm cells entrained in said droplets, deflecting each of said droplets, and differentially collecting each of said droplets based upon said sex differentiation characteristic of said sperm cells entrained in said droplets. The method may further include collecting the sperm cells after the determination, sorting, or deactivation as the sperm cells exit the microfluidic device. The particles, which may be X-chromosome or Y-chromosome sorted or sexed semen, e.g., X-chromosome or Y-chromosome bearing sexed semen, are collected in one or more collection containers.

In some embodiments, the present invention provides an optical and opto-mechanical modules for both a larger emitted electromagnetic radiation kill beam having an adjustable, elliptical beam waist profile at a focal plane, wherein the height and width are independently adjustable and not a factor of or derived from each other, and for the positioning and emission of a detection laser and kill laser from the same direction with respect to the flow of a sample fluid or from a common side with respect to a flow cytometry device.

Figure 19A:
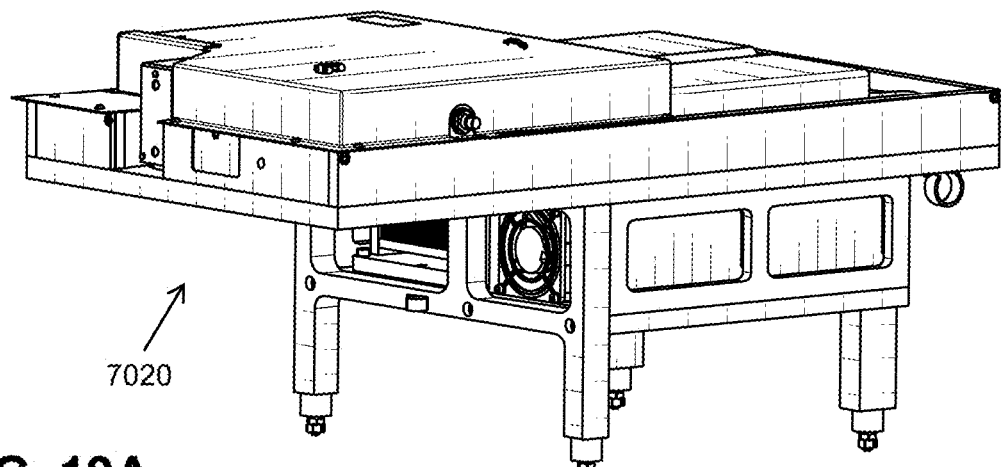
FIG. 19A shows an embodiment of an optics module (interrogation module) of the present invention. The optics module can float separately from the rest of the cytometry system and is isolated with rubber feet.
Figure 19B:
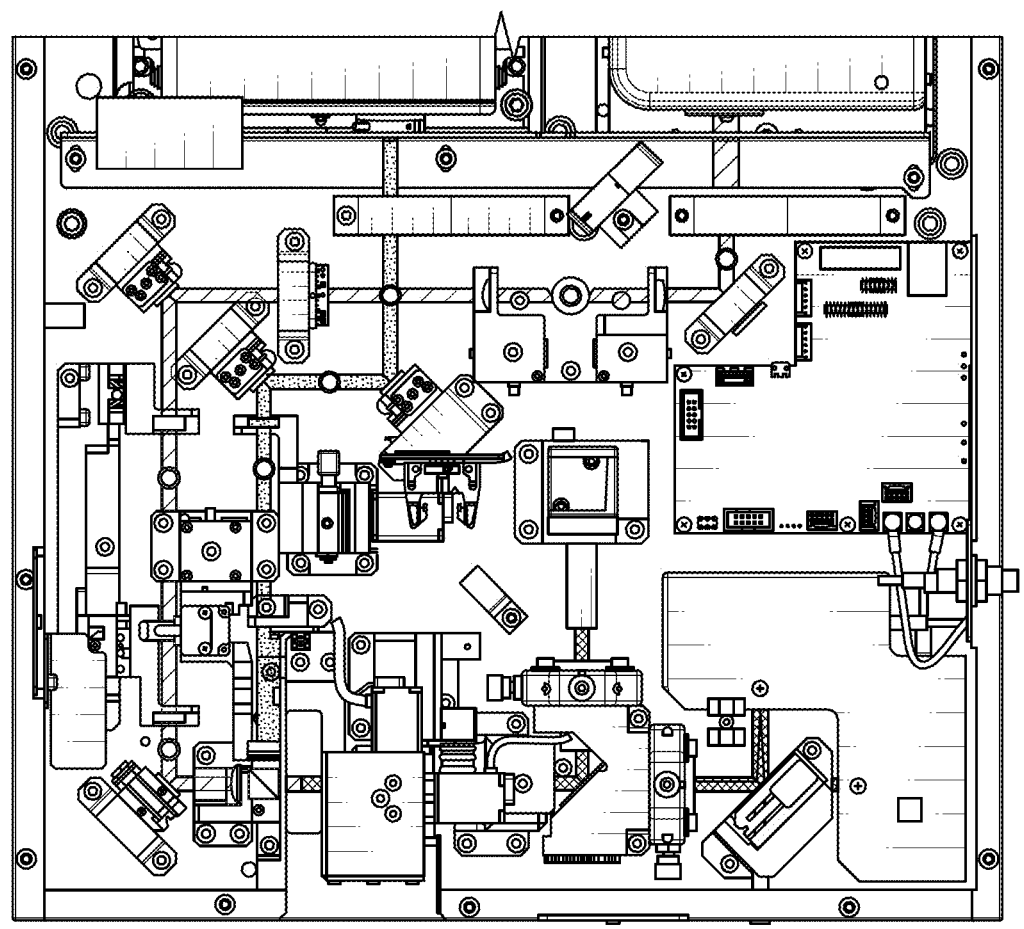
FIG. 19B shows an internal layout of the optics module in FIG. 19A.
Figure 21A:
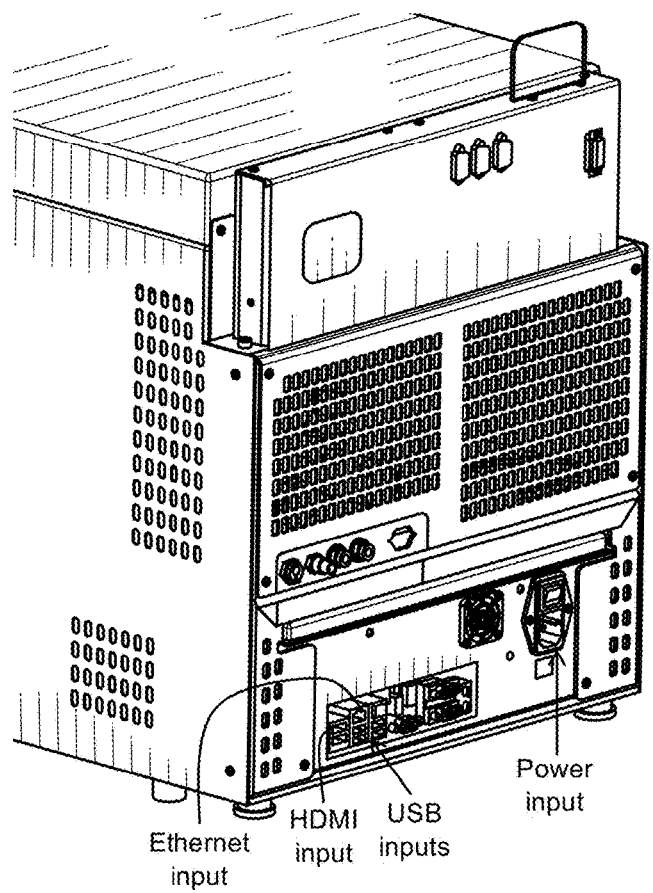
FIGS. 21A and 21B show a control board disposed in the back of the cytometry system. The control board includes electronic and fluidic ports.
Figure 21B:
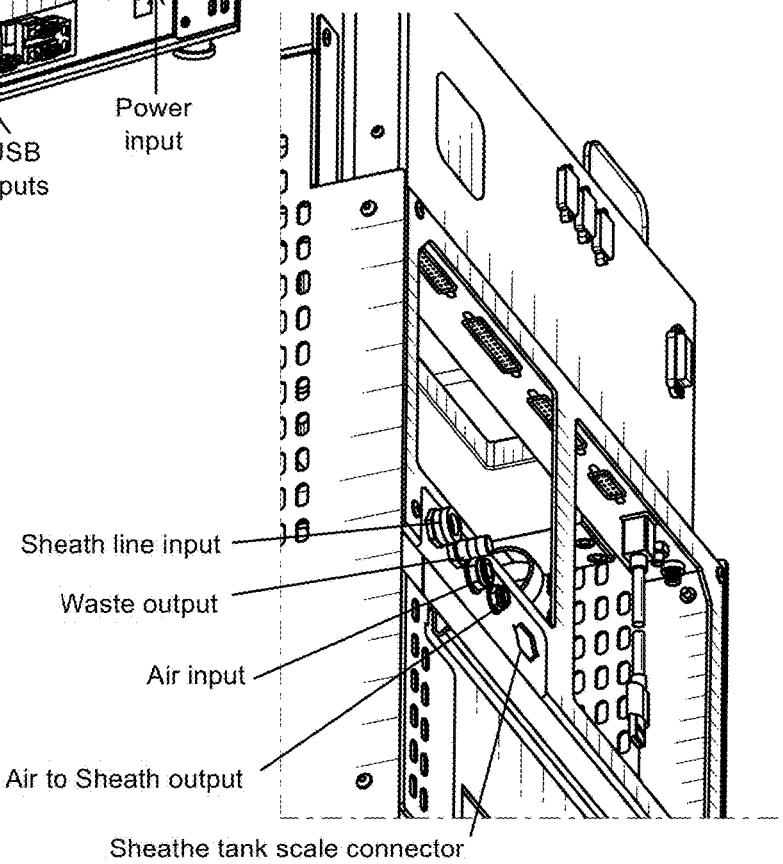

FIG. 19 shows an embodiment of the interrogation or optics module 7020 containing the detection optics and the detection and kill lasers. The optics module floats separately from the rest of the modular system and may be isolated with rubber feet; it is removable from the chassis. FIG. 20 shows an internal layout of the optics module. Both detection and kill come from one side, combined using a beam cube. The optical module combines 'S' & 'P' polarized beams of the same wavelength. A filter in front of the objective to protect it from damage. Aspheric lens focuses the kill laser rather than the objective. Both lasers have shaping lenses to control spot size at chip location.

Figure 22A:
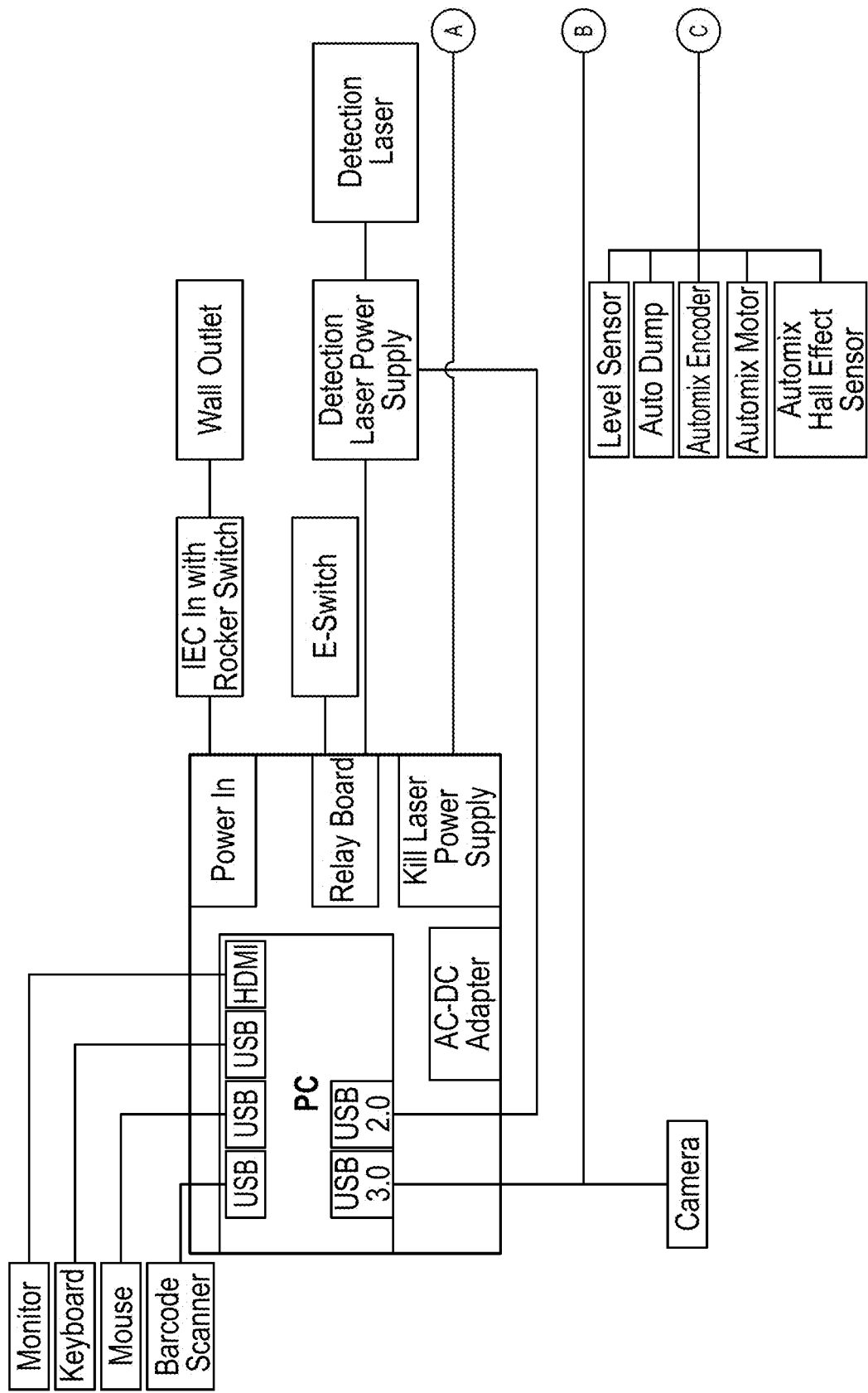
FIGS. 22A and 22B show an electronic block diagram of the cytometry system.
Figure 22B:
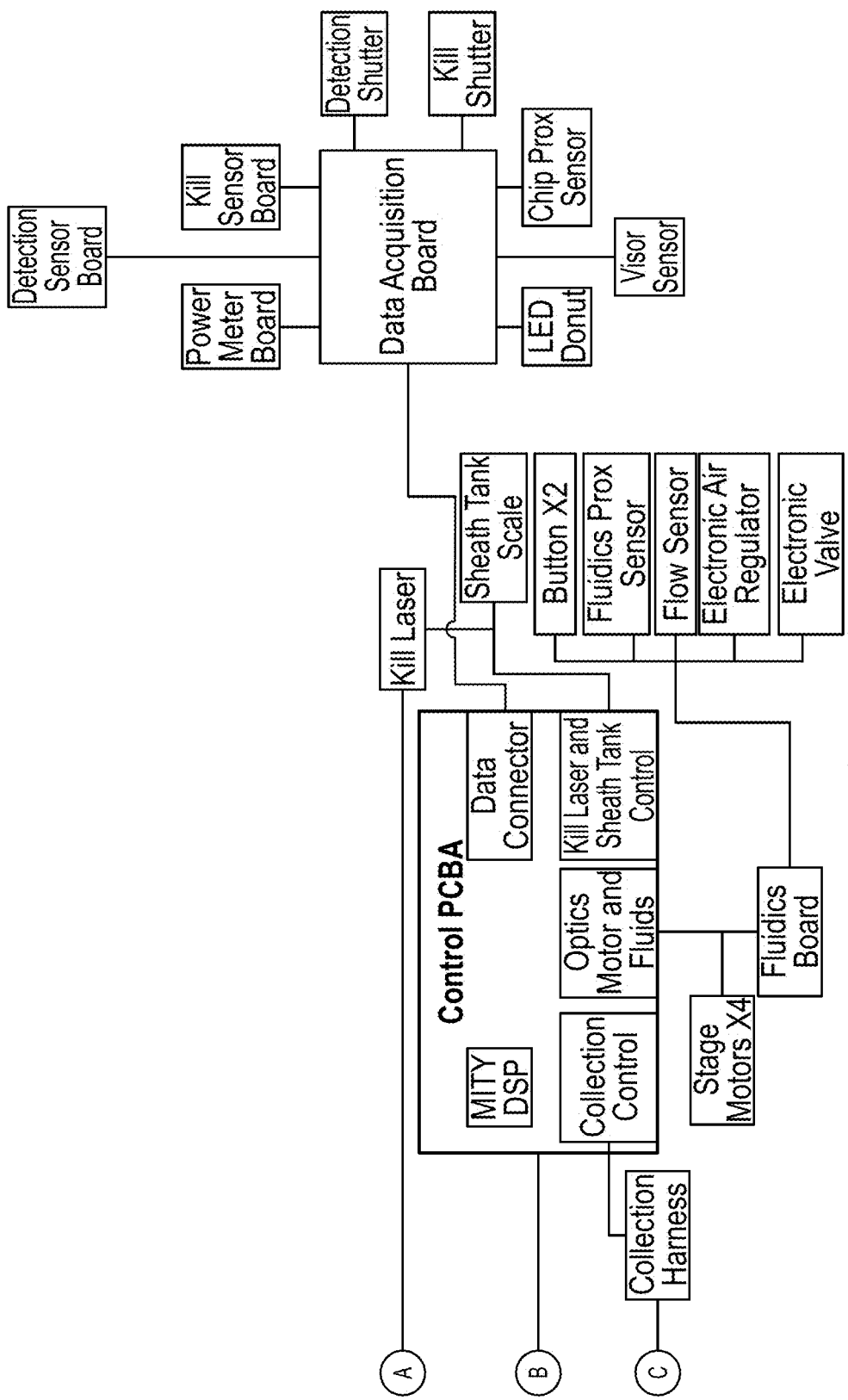

FIGS. 20A-20B and 21A-21B show the electronics module 7010 comprising an electronics box housing the electrical components and the control board. The box includes a removable lid that protects the interior of the box. The electronics module can be removed from the chassis as well. FIG. 22 is a schematic of electronic components of the modular flow cytometry system.

Figure 23:
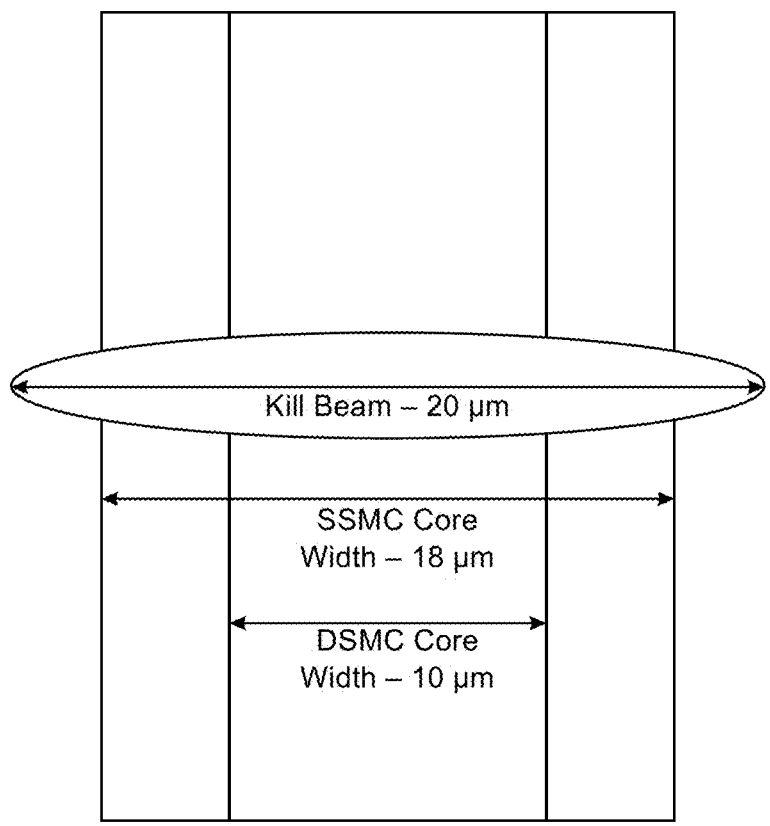
FIG. 23 provides a diagram of a beam width for an electromagnetic radiation emission of a kill laser according to an embodiment of the present invention.

With reference now to FIG. 23, a diagram illustrating the beam width of the electromagnetic radiation emission of a kill laser having an elliptical profile at a focal plane according to an embodiment of the present invention is provided. The width of the beam is configured, calibrated, or adjusted to be between 5 µm and 35 µm in width in an X direction, wherein the Y direction is a longitudinal direction along the flow path or length of a channel in a microfluidic device through which a sample comprising a set of particles, and/or a sheath fluid flows. The width of the kill beam as shown is 20 µm, which is wider than the exemplary core width shown. The core width of 5-20 µm is the width of a fluid, such as a sample fluid, that is bounded by other focusing fluids and not necessarily by a physical channel wall. The physical channel in the flow cytometer may be over 100 µm wide, but the constrained fluid, the core in which particles or samples are disposed, is 5-20 µm wide. For example, a single sheath design microfluidic chip ("SSMC") channel may have a core width of 5-20 µm, and a dual sheath design microfluidic chip ("DSMC") may have a core width of 5-15 µm. The width of the kill beam is configured by adjustment of one or more optical or opto-mechanical components, as provided in for example FIGS. 25A, 25B, and 26B, to provide for a beam width equal to or greater than the core width at the action or interrogation area of the microfluidic channel.

The kill beam comprises an elliptical profile at a focal plane and has a Gaussian intensity profile wherein the highest concentration of the electromagnetic radiation emission, e.g., photons, is at the center of the kill beam. A factor in the effectiveness of the kill beam in deactivating or destroying particles that pass through a focal plane in an action or interrogation area of a microfluidic channel or in a droplet in a droplet-based flow cytometer is the amount of electromagnetic radiation emission, e.g., photons, in a unit space that hit particles, e.g., sperm cells, that pass through that space. The kill beam must have enough intensity over the surface area of the particle to ensure that the particle is sufficiently deactivated, such as by photo-damaging or ablation. The laser module that is used to generate the kill beam is a pulse laser module, such as a pulse laser module with a pulse duration of 1-500 nanoseconds, and having an available pulse energy of 1-5 µJ of energy available per pulse. In another embodiment, the pulse laser module has a pulse duration of 5-30 nanoseconds. Increasing the pulse energy causes the size of the kill beam to increase. In existing systems and methods, this may cause a circular shaped beam to have an increased beam waist, such as by increasing the radius and circumference of the beam at the focal plane. However, it is more efficient to use the elliptical profile of the kill beam, which can deliver the same amount of electromagnetic radiation per unit area at a lower pulse energy and over a wider area at the focal plane than existing circular profile beams. Expanding the width and not the height, thereby giving an elliptical profile, of the kill beam provides for an increased kill width or effective area at the same pulse energy level for the laser module compared to a circular kill beam of the same area.

Figure 24A:
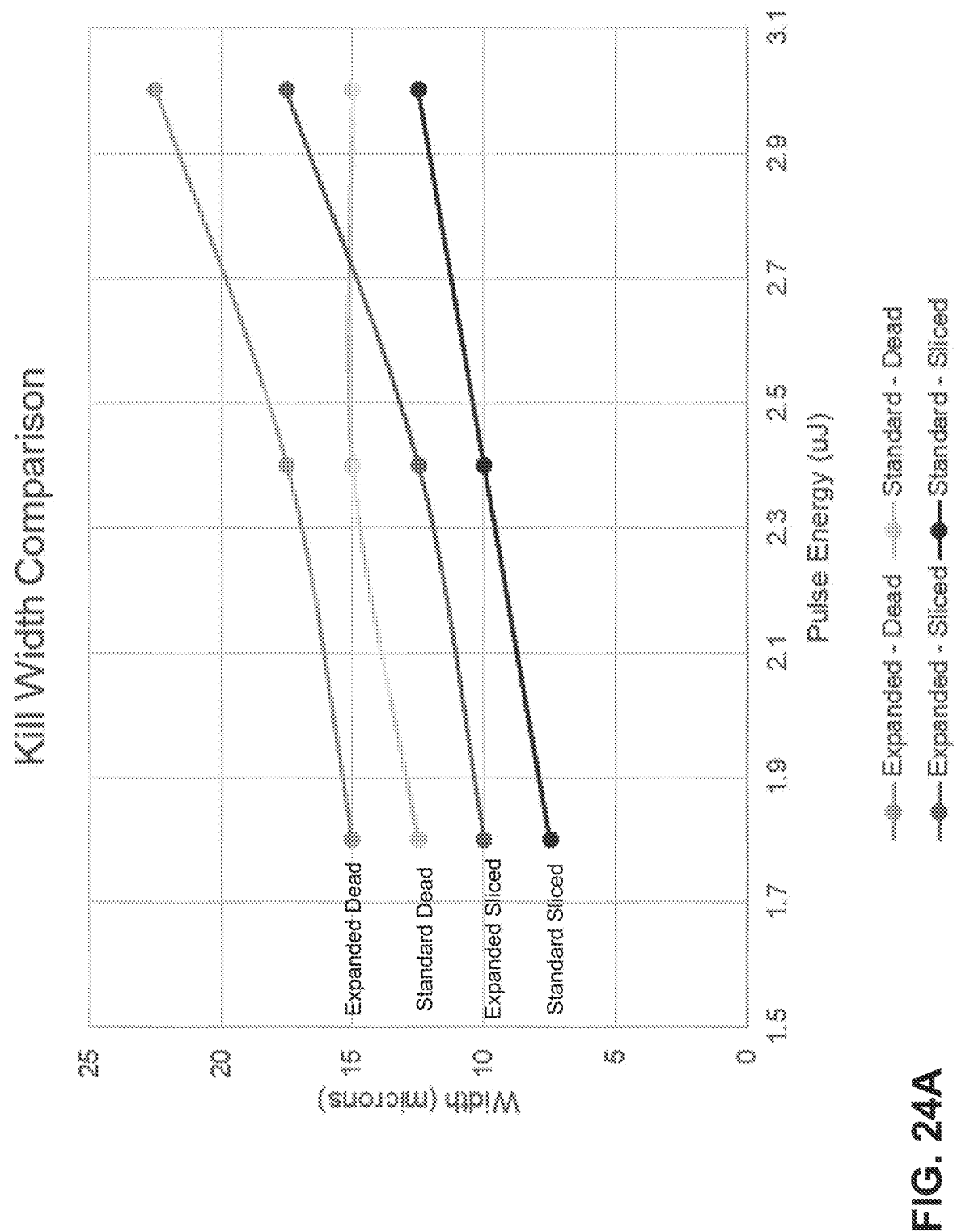
FIGS. 24A-24B show charts illustrating performance of a kill laser beam having an elliptical beam waist profile at a focal plane relative to a kill laser beam having a circular beam waist profile at a focal plane according to an embodiment of the present invention.

With reference now to FIG. 24A, a diagram illustrates how increasing the pulse energy, in µJ, for a beam increases the beam width, in µm, for a particular beam shape according to an embodiment of the present invention. The kill width, or effective area at the focal plane in which there is a sufficient quantity of electromagnetic radiation emission to deactivate or destroy a particle, of the expanded or elliptical beam shape of the present invention increases significantly as laser pulse energy is increased, but is higher at any given pulse energy level when compared to a standard, circular, beam. The expanded, elliptical beam has a larger kill width in µm than the standard, circular beam where there is sufficient electromagnetic radiation at the focal plane to fully deactivate a particle. In the exemplary embodiment provided in the diagram in FIG. 24A, this difference between the expanded beam and standard beam is approximately 2.5 µm at lower pulse energies, e.g., 1.8 µJ, but may be as much as 7.5 µm at higher pulse energies, such as 3 µJ. The expanded beam has a larger kill width in µm than the standard beam where there is sufficient electromagnetic radiation at the focal plane to partially deactivate or slice a particle. This difference between the expanded beam and standard beam is approximately 2.5 µm at lower pulse energies, e.g., 1.8 µJ, but may be as much as 5 µm at higher pulse energies, such as 3 µJ. Similar results would be achieved at lower pulse energies, e.g., 1 µJ, and higher pulse energies, e.g., 5 µJ.

When the beam width of the elliptical kill beam, such as the beam shown in FIG. 23, is increased to 30 µm, the difference between the elliptical kill beam and a standard, circular kill beam may be 1.33+/−0.06% in sliced particle width and 1.29+/−0.15% in dead or fully deactivated particle width. This difference is present at laser emission pulse energies of 1 µJ to 5 µJ and may further increase as laser emission pulse energy increases.

Without wishing to limit the invention to a particular theory or mechanism, the optical and opto-mechanical systems of the present invention increase the kill width of the beam emitted by the kill laser and provide for similar kill performance or efficiency with respect to kill volume in the X or Z dimensions (wherein the Y dimension is the dimension of the flow direction in the flow cytometer system).

Figure 24B:
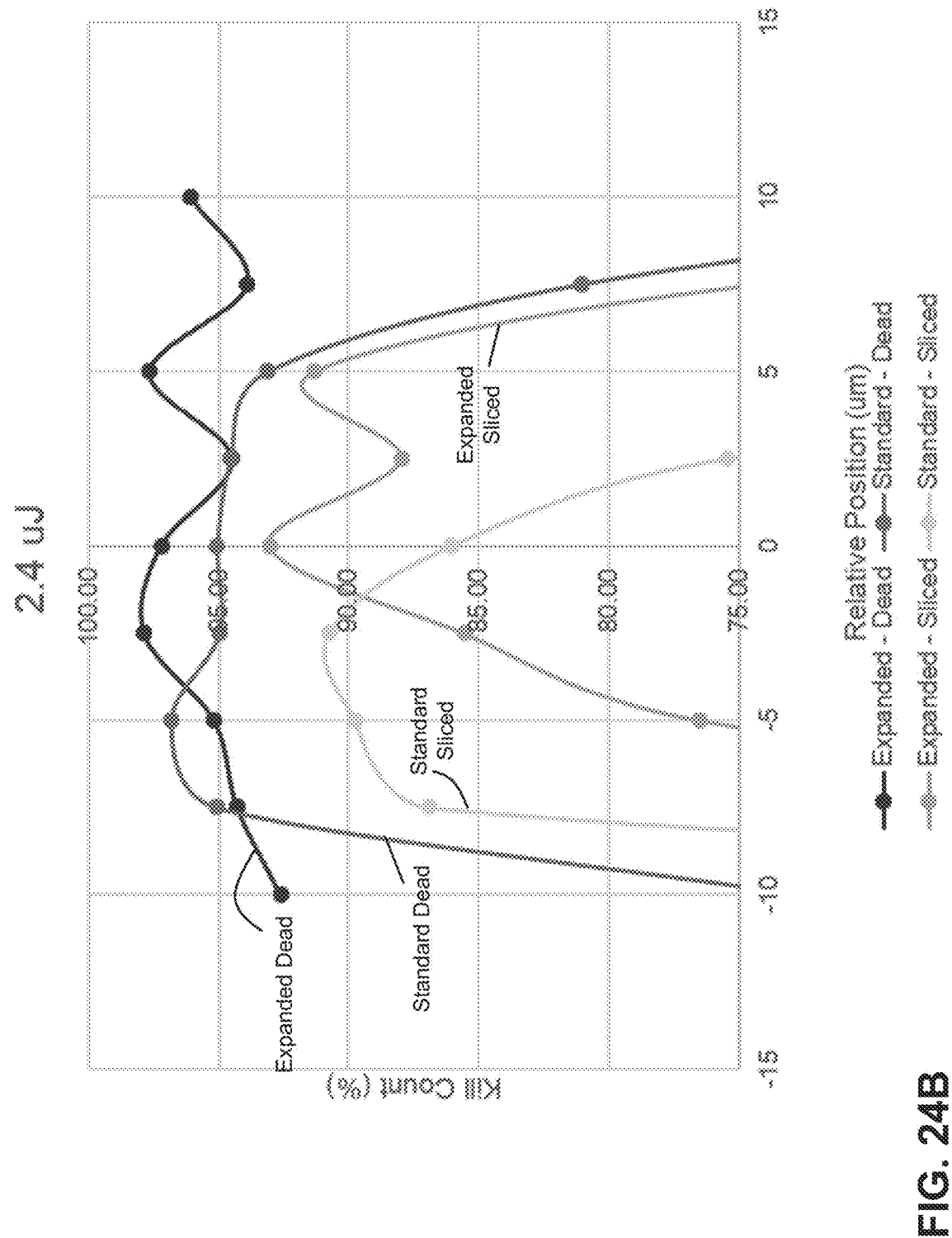

For example, with reference to the chart shown in FIG. 24B, in one non-limiting, exemplary embodiment a 30 µm wide kill beam having an elliptical profile at a focal plane was used at an emission energy of 2.4 µJ. However, the emitted pulse energy may be in the range of 1-5 µJ per pulse and the pulse duration may be 1-500 nanoseconds, or in one embodiment 5-30 nanoseconds. In this exemplary embodiment, the 30 µm wide kill beam showed an improved kill count as a percentage of particles ablated or photo-damaged by the electromagnetic emission of the kill laser. The 30 µm wide kill beam having an elliptical profile at a focal plane provided distinct improvements at relative positions of +/−10 µm from an ideal or determined kill or action location. Where a typical kill beam or location of less than 18 µm wide and having a circular profile at a focal plane could not effectively kill, deactivate, significantly photo-damage, or ablate particles more than +/−10 μm from the ideal or determined kill location, the improved 30 μm wide kill beam having an elliptical profile at a focal plane provides for the deactivating, killing, destruction, or significant photo-damaging or ablation of at least 90% of particles subjected to the kill laser. Comparing particles, such as sperm cells, that were either killed or dead or sliced by a narrower, circular beam, the improvements of the wider, elliptical beam are readily apparent with relation to kill efficacy or slicing.

Without wishing to limit the present invention to a particular embodiment, the wider kill beam as described above may be used with existing flow cytometry systems and in existing flow cytometry optics configurations. However, additional benefits are provided when the wider kill beam as described herein is used with a flow cytometry system having a detection laser and a kill or deactivation laser positioned on a common side relative to a primary or main surface of a flow cytometry apparatus such as a microfluidic chip. These benefits include further adjustability and configurability and the ease of doing so with respect to beam size, shape, and positioning as provided by having the optical components or optical pathways positioned on a common side of the system.

Figure 25A:
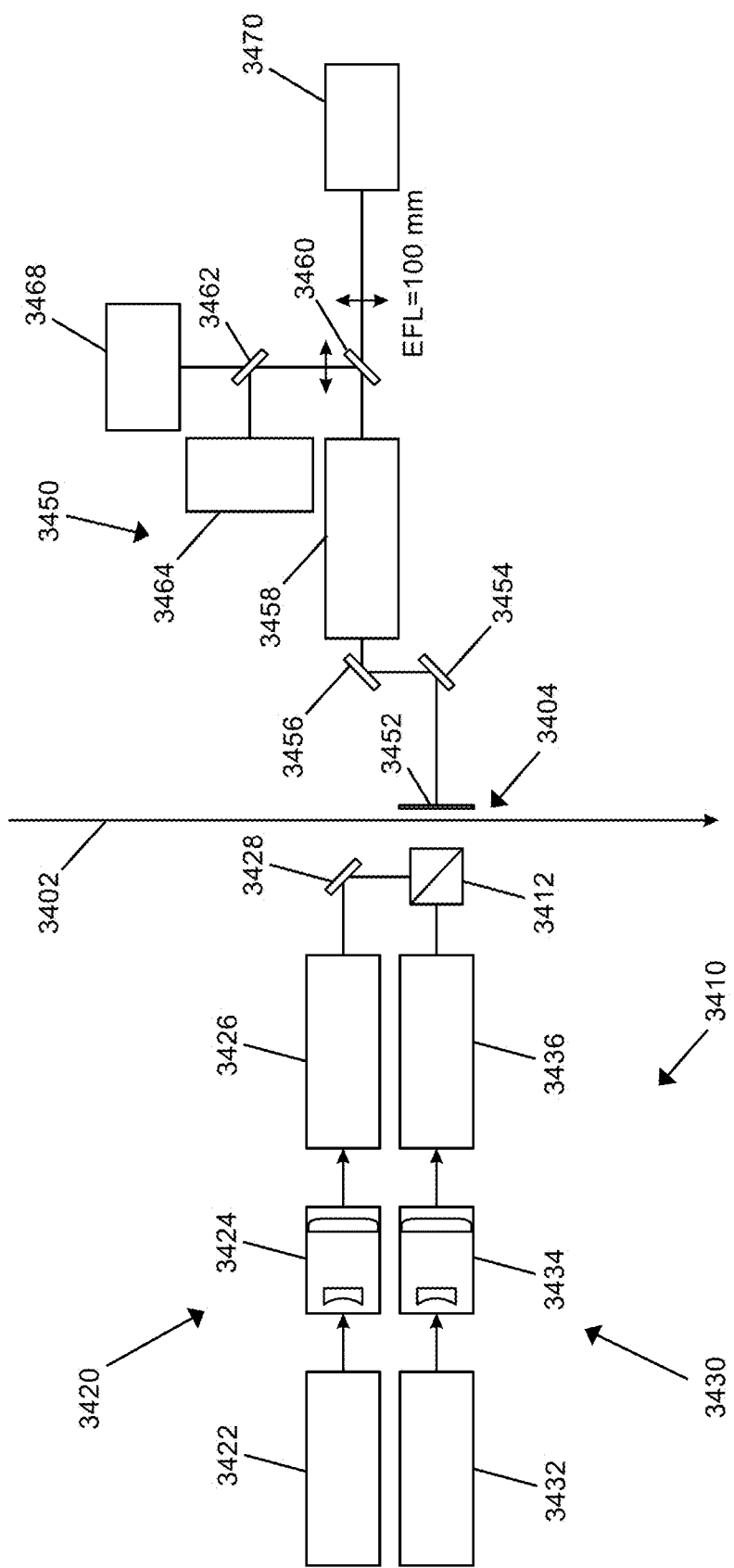
FIGS. 25A-25B are block diagrams of electrical, optical, and opto-mechanical elements of a laser-based particle processing system according to an embodiment of the present invention.

With reference now to FIG. 25A, a block diagram of an opto-mechanical system 3400 for positioning a set of laser assemblies 3410 comprising a detection laser assembly 3430 and a kill laser assembly 3420 on the same side of a primary (e.g., top or bottom) surface of a microfluidic chip and on the opposite side of a detection assembly 3450 according to an embodiment of the present invention is provided. The opto-mechanical system 3400 is used to detect certain characteristics of particles, and for the deactivation, killing, photo-damaging, or ablation of particles, such as sperm cells, passing through an action or interrogation area 3404 in a flow path 3402 of a flow cytometer system, such as in a channel of a microfluidic chip. The opto-mechanical system 3400 may further be used to detect the result (e.g., success, failure, partial success) of the kill action or photo-damaging ablation event. A kill laser assembly 3420 comprises a killer laser 3422, which may be a pulse laser module with a pulse duration of 1-500 nanoseconds, a set of one or more beam expander optics 424, and a cylindrical lens pair 3426. The profile or shape and configuration of the lenses the beam expander 3424 and of the lenses of the cylindrical lens pair 426 provides for a misalignment compensation of up to +/−5°. This provides for a simpler alignment and calibration process and further provides some margin for operator error in alignment or calibration. A detection laser assembly 3430 comprises a detection laser 3432, which may be a coherent continuous wave ("CW") laser, a quasi-CW laser, or a pulse laser, a set of one or more beam expander optics 3434, and a cylindrical lens pair 3436. A mirror 3428 directs the electromagnetic radiation emission ("beam") of the killer laser 3422 towards the beam combiner 3412 to combine the beam emission of the killer laser 3422 with the beam emission of the detection laser 3432 to further direct both beam emissions towards the focal plane 3452 which is in the action or interrogation area 3404 of the flow path 3402. Here, "combine" may refer not only to a physical combination or overlap of the beam emissions, but may also refer to a re-orientation of one or more of the beams to be directed in the same direction and positioned in a close physical proximity where the beam emissions are not coincident.

On the detector side of the opto-mechanical system 3400, the detection assembly 3450 comprises one or more filters such as a short or long-pass filter 3454, a mirror 3456, a near ultra-violet ("NUV") objective lens 3458, a mirror 3460, mirror 3462, kill sensor 3464, camera 3468, and detection sensor 3470. The kill sensor 3464 and detection sensor 3470 may be an avalanche photodiode type sensor, and the camera 3468 may be a charge-coupled device ("CCD") camera. In another embodiment, the kill sensor 3464 and detection sensor 3470 may each comprise a photomultiplier tube ("PMT"), a complementary metal-oxide semiconductor ("CMOS") sensor, or an electron multiplying charge coupled device ("EMCCD") type sensor. In another embodiment, the camera 3468 may comprise a complementary metal-oxide semiconductor ("CMOS"), or an electron multiplying charge coupled device ("EMCCD") type sensor.

Without wishing to limit the present invention to a particular application or embodiment, the systems, apparatuses, and methods of the present invention, such as the opto-mechanical system 3400, may be used with a particle processing system such as a semen sorting system. In one embodiment, the semen sorting system may comprise a flow cytometry apparatus or a microfluidic chip or device, comprising a flow chamber configured to direct a fluid stream including sample particles through a particle interrogation location (e.g., action or interrogation location 3404). The sample particles may be cells such as spermatozoa which have been stained or otherwise processed prior to entering the flow cytometry apparatus or microfluidic device. The flow cytometry apparatus or microfluidic device may further comprise a laser (e.g., detection laser assembly 3430) configured to emit electromagnetic radiation along a beam path to the particle interrogation location and a detector (e.g., detection assembly 3450) configured to detect an emission from the particle. Subsequent to the detection, the particle may be sorted or deactivated, such as by ablation by electromagnetic radiation (e.g., by the kill laser assembly 3420), prior to or after exiting the flow cytometry apparatus or microfluidic device. An additional detector may be used to determine the efficacy of the deactivation of the particle, such as to determine or detect an amount or quantity of the electromagnetic radiation to which an individual particle was exposed, and to determine if an individual particle was sufficiently deactivated or damaged. The particles, which may be X-chromosome or Y-chromosome sorted or sexed semen, e.g., X-chromosome sexed semen, are then collected in one or more collection containers.

The opto-mechanical system 3400 may also be used with or in a method for analyzing particles, such as sperm cells, contained in a fluid stream as the particles flow through an interrogation location (e.g., action or interrogation location 3404) in a flow cytometry apparatus or in a microfluidic chip or device. Such a method comprises using electromagnetic radiation emitted from a laser (e.g., detection laser assembly 3430) to illuminate a fluid stream and the particles contained therein. A detector (e.g., detection assembly 3450) detects electromagnetic radiation emitted from the interrogation location by the particle, and a processor determines characteristics of the particle in the fluid stream based in part on a signal from the detector. Subsequent to the detection, the particle may be sorted or deactivated, such as a physical soring and removal process or by deactivation by ablation or photo-damaging by electromagnetic radiation (e.g., by the kill laser assembly 3420), prior to or after exiting the flow cytometry apparatus or microfluidic device. The particles, which may be X-chromosome or Y-chromosome sorted or sexed semen, e.g., X-chromosome or Y-chromosome bearing sexed semen, are then collected in one or more collection containers.

The opto-mechanical system 3400 may also be used with or in a method for assessing an amount of DNA within a nucleus of a sperm cell using a flow cytometry apparatus or a microfluidic chip or device. The method may include staining the DNA within the nucleus of the sperm cell and then irradiating the stained DNA within the nucleus of the sperm cell by an electromagnetic emission device such as a laser (e.g., detection laser assembly 3430) as the sperm cells pass by the laser in a corresponding region (e.g., action or interrogation location 3404) of the flow cytometry apparatus or microfluidic device. A detector (e.g., detection assembly 3450), such as an avalanche photodiode, detects fluorescent light emitted from the irradiated and stained DNA within the nucleus of the sperm cell at a detection or interrogation location (e.g., action or interrogation location 3404) within the flow cytometry apparatus or microfluidic device. The method may further include differentiating X chromosome bearing sperm cells and Y chromosome bearing sperm cells by first determining a sex of a sperm cell using the detected amount of DNA within the nucleus of the sperm cell and then differentiating between a plurality of sperm cells based upon said sex determination. The characteristics of the sperm cells may include corresponding amounts of DNA within the nuclei of the sperm cells. The method may further include deactivating a given sperm cell based upon the determined amount of DNA within the nucleus of the given sperm cell. Said deactivating may include photo-damaging or ablating the given sperm cell by an emission of electromagnetic radiation (e.g., by the kill laser assembly 3420). The method may further include forming droplets, a plurality having one of said sperm cells entrained, charging each of said droplets differentially based upon said sex differentiation characteristic of said sperm cells entrained in said droplets, deflecting each of said droplets, and differentially collecting each of said droplets based upon said sex differentiation characteristic of said sperm cells entrained in said droplets. The method may further include collecting the sperm cells after the determination, sorting, or deactivation as the sperm cells exit the microfluidic device. The particles, which may be X-chromosome or Y-chromosome sorted or sexed semen, e.g., X-chromosome or Y-chromosome bearing sexed semen, are collected in one or more collection containers.

Without wishing to limit the present invention to a particular application or embodiment, the opto-mechanical system 3400 provides improvements over existing systems and methods for interrogating, detecting, and deactivating particles by positioning the kill laser assembly 3420 and detection laser assembly 3430 of the set of laser assemblies 3410 on a common side of a flow cytometry device such as a microfluidic chip. For example, the kill laser assembly 3420 and detection laser assembly 3430 may be positioned or disposed on the same or common side relative to a top or front face of a microfluidic chip, or to a bottom or back face of the microfluidic chip, and the detection assembly 3450 may be positioned or disposed on an opposite side relative to the laser assemblies 3410. This configuration provides advantages over configurations where the kill laser assembly and detection laser assembly are positioned on opposite sides of a flow plane of a flow cytometry apparatus.

For example, in a configuration comprising positioning the kill laser assembly and detection laser assembly on opposite sides of a flow plane of a flow cytometry apparatus, the emission beam of the kill laser assembly may be required to pass through the objective lens of the detection assembly. This can cause damage or degradation of one or more optical components of the detection assembly. By positioning the kill laser assembly 3420 on a common side with the detection laser assembly 3430, the emission beam of the kill laser assembly 3420 does not have to first pass through any optical components of the detection assembly 3450 which may cause unnecessary or undesirable degradation, damage, or wear.

Additionally, positioning the kill laser assembly 3420 and detection laser assembly 3430 on a common side of a flow cytometry apparatus simplifies setup, alignment, and assembly of the optical and mechanical elements of the system 3400. This provides for better stability for the system 3400 and further provides for improvements in detection resolution and a reduction in signal-to-noise ratio. Commonly positioning the kill laser assembly 3420 and detection laser assembly 3430 provides for a better ability to eliminate undesirable wavelengths on the detection assembly 3450 side of the system 3400. Moreover, when the kill laser assembly 3420 and detection laser assembly 3430 are commonly positioned, the set of laser assemblies 3410 may share optical components which reduces system complexity and provides for inherent compensation for physical vibrations or movement of the system as the assemblies share a subset of the components in the optical pathway. If the kill laser assembly 3420 and detection laser assembly 3430 do not share optical components and are not commonly positioned, a vibration of the system 3400 may cause emission beams from both assemblies 3420 and 3430 to move or vibrate independently, causing issues with accuracy and efficiency of detection and deactivation. However, when commonly positioned, a vibration would cause the emission beams of the kill laser assembly 3420 and detection laser assembly 3430 to commonly vibrate, reducing losses in detection and deactivation efficiency and accuracy.

Continuing with reference to the opto-mechanical system 3400 in FIG. 25A, the configuration of the kill laser assembly 3420 not only provides for the benefits described above, but may also be used with the wider kill beam as shown and described in FIGS. 1-3. For example, an electromagnetic radiation emission or a laser beam is emitted from the laser head which may be the killer laser module 3422 (e.g., a pulse laser module with a pulse duration of 1-500 nanoseconds and at a pulse energy of 1-5 µJ). The beam passes through a series of optical components, the beam expander 3424, to shape the beam into a desired shape and size, which is typically circular. The beam continues to pass through a pair of cylindrical lenses 3426 which continue shaping the beam from a circular profile to an elliptical profile. The beam is then directed by a mirror 3428 towards a beam combiner 3412 where beams from the kill laser module 3422 and detection laser module 3432 are combined and projected towards the focal plane.

Additionally, the positions of the kill laser assembly 3420 and detection laser assembly 3430 may be swapped or reversed, such that the beam or emission from the kill laser assembly 3420 passes directly through the polarizing beam splitter or combiner 3412, and the beam or emission from the detection laser assembly 3430 is redirected 90 degrees towards the focal plane. The emissions from the kill laser assembly 3420 and detection laser assembly 3430 may or may not be fully combined, that is, the emissions may not be fully coincident at the focal plane 3452, depending on the flow cytometer and particle processing operation in which the assemblies are used.

Figure 25B:
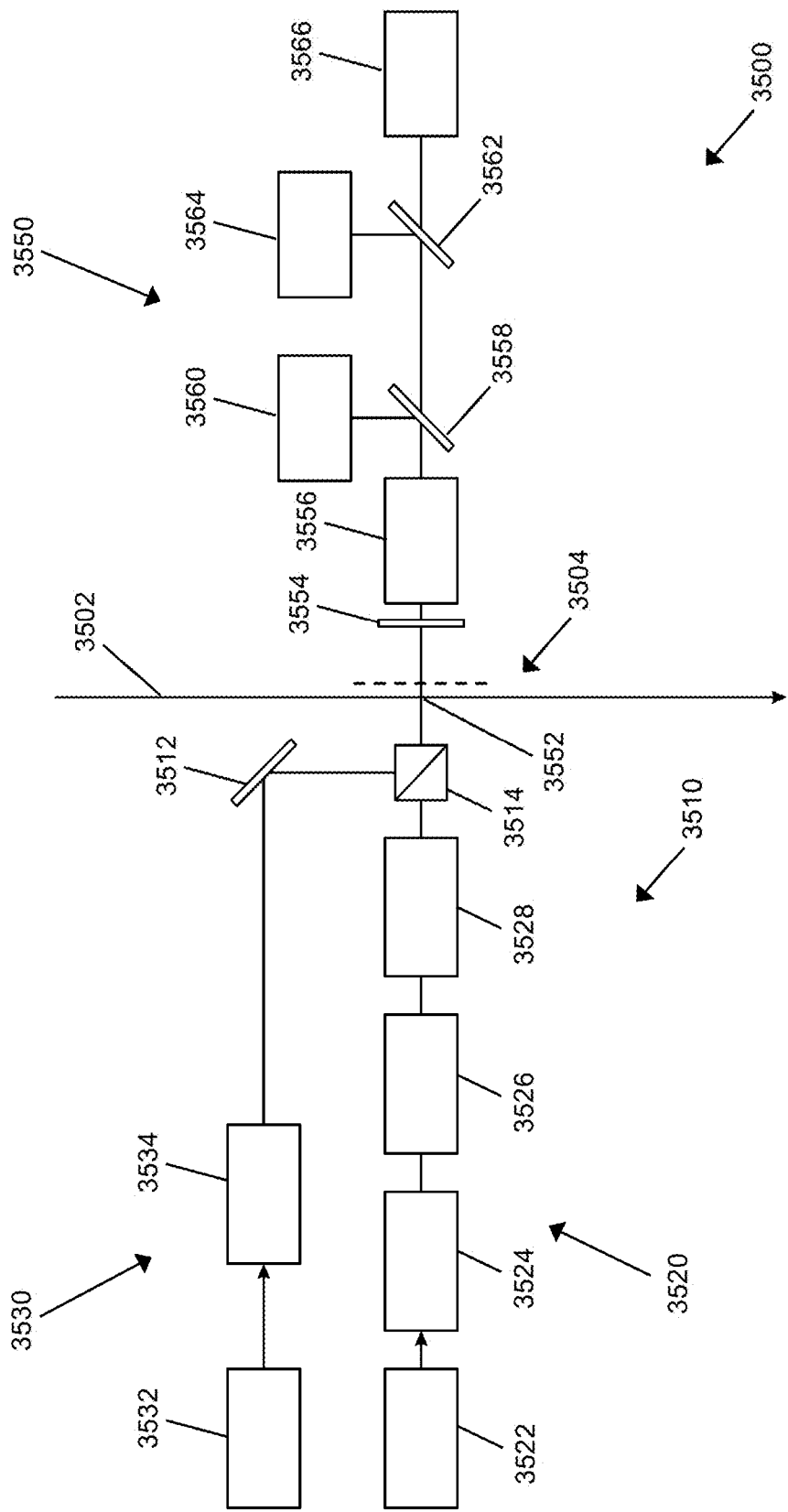

With reference now to FIG. 25B, a block diagram of an opto-mechanical system 3500 for positioning a set of laser assemblies 3510 comprising a detection laser assembly 3530 and a kill laser assembly 3520 on the same side of a primary (e.g., top or bottom) surface of a microfluidic chip and on the opposite side of a detection assembly 3550 according to an embodiment of the present invention is provided. The opto-mechanical system 3500 is used to detect certain characteristics of particles, and for the deactivation, killing, photo-damaging, or ablation of particles, such as sperm cells, passing through an action or interrogation area 3504 in a flow path 3502 of a flow cytometer system, such as in a channel of a microfluidic chip. The opto-mechanical system 3500 may further be used to detect the result (e.g., success, failure, partial success) of the kill action or photo-damaging ablation event. A kill laser assembly 3520 comprises a kill laser 3522, which may be a pulse laser module with a pulse duration of 1-500 nanoseconds, a set of one or more beam expander optics 3524, a wave plate 3526, and an aspheric lens 3528. A detection laser assembly 3530 comprises a detection laser 3532, which may be a coherent continuous wave ("CW") laser, a quasi-CW laser, or a pulse laser, and a cylindrical lens pair 3534. A mirror 3512 directs the electromagnetic radiation emission ("beam") of the detection laser 3532 towards the beam combiner 3514, which is a polarizing beam splitter, to combine the beam emission of the kill laser 3522 with the beam emission of the detection laser 3532 to further direct both beam emissions towards the focal plane 3552 which is in the action or interrogation area 3504 of the flow path 3502. Here, "combine" may refer not only to a physical combination or overlap of the beam emissions, but may also refer to a re-orientation of one or more of the beams to be directed in the same direction and positioned in a close physical proximity.

On the detector side of the opto-mechanical system 3500, the detection assembly 3550 comprises a filter such as a high-pass filter 3554, a NUV objective lens 3556, a dichroic mirror 3558, a kill sensor 3564, a camera 3560, a beam splitter 3562 and a detection sensor 3566. The kill sensor 3564 and detection sensor 3566 may be an avalanche photodiode type sensor, and the camera 3560 may be a CCD camera. In another embodiment, the kill sensor 3564 and detection sensor 3566 may each comprise a PMT, a CMOS sensor, or an EMCCD type sensor. In another embodiment, the camera 3560 may comprise a CMOS, or an EMCCD type sensor.

Without wishing to limit the present invention to a particular application or embodiment, the systems, apparatuses, and methods of the present invention, such as the opto-mechanical system 3500, may be used with a particle processing system such as a semen sorting system described above with respect to the system 3400 shown in FIG. 25A.

The opto-mechanical system 3500 may also be used with or in a method for analyzing particles, such as sperm cells, contained in a fluid stream as the particles flow through an interrogation location (e.g., action or interrogation location 3504) in a flow cytometry apparatus or in a microfluidic chip or device, such as the method described above with respect to the system 3400 shown in FIG. 25A.

The opto-mechanical system 3500 may also be used with or in a method for assessing an amount of DNA within a nucleus of a sperm cell using a flow cytometry apparatus or a microfluidic chip or device such as the method described hereinabove with respect to the system 3400 shown in FIG. 25A.

Without wishing to limit the present invention to a particular application or embodiment, the opto-mechanical system 3500 provides improvements over existing systems and methods for interrogating, detecting, and deactivating particles by positioning the kill laser assembly 3520 and detection laser assembly 3530 of the set of laser assemblies 3510 on a common side of a flow cytometry device such as a microfluidic chip. For example, the kill laser assembly 3520 and detection laser assembly 3530 may be positioned or disposed on the same or common side relative to a top or front face of a microfluidic chip, or to a bottom or back face of the microfluidic chip, and the detection assembly 3550 may be positioned or disposed on an opposite side relative to the laser assemblies 3510. This configuration provides advantages over configurations where the kill laser assembly and detection laser assembly are positioned on opposite sides of a flow plane of a flow cytometry apparatus.

For example, in a configuration comprising positioning the kill laser assembly and detection laser assembly on opposite sides of a flow plane of a flow cytometry apparatus, the emission beam of the kill laser assembly may be required to pass through the objective lens. This can cause damage or degradation of one or more optical components of the detection assembly. By positioning the kill laser assembly 3520 on a common side with the detection laser assembly 3530, the emission beam of the kill laser assembly 3520 does not have to first pass through any optical components of the detection assembly 3550 which may cause unnecessary or undesirable degradation, damage, or wear.

Additionally, positioning the kill laser assembly 3520 and detection laser assembly 3530 on a common side of a flow cytometry apparatus simplifies setup, alignment, and assembly of the optical and mechanical elements of the system 3500. This provides for better stability for the system 3500 and further provides for improvements in detection resolution and a reduction in signal-to-noise ratio. Commonly positioning the kill laser assembly 3520 and detection laser assembly 3530 provides for a better ability to eliminate undesirable wavelengths on the detection assembly 3550 side of the system 3500. Moreover, when the kill laser assembly 3520 and detection laser assembly 3530 are commonly positioned, the set of laser assemblies 3510 may share optical components which reduces system complexity and provides for inherent compensation for physical vibrations or movement of the system. If the kill laser assembly 3520 and detection laser assembly 3530 do not share optical components and are not commonly positioned, a vibration of the system 3500 may cause emission beams from both assemblies 3520 and 3530 to move or vibrate independently, causing issues with accuracy and efficiency of detection and deactivation. However, when commonly positioned, a vibration would cause the emission beams of the kill laser assembly 3520 and detection laser assembly 3530 to commonly vibrate, reducing losses in detection and deactivation efficiency and accuracy.

Continuing with reference to the opto-mechanical system 3500 in FIG. 25B, the configuration of the kill laser assembly 3520 not only provides for the benefits described above, but may also be used with the wider kill beam as shown and described in FIGS. 1-3. For example, an electromagnetic radiation emission or a laser beam is emitted from the laser head which may be the kill laser module 3522 (e.g., a pulse laser module with a pulse duration of 1-500 nanoseconds). The beam passes through a series of optical components, the beam expander 3524, to shape the beam into a desired shape and size, which is typically circular. The beam continues to pass through a wave plate 3526 which alters the polarization state of the beam as it passes through the plate, and then through the aspheric lens 3528, changing the profile from circular to elliptical. These components may be adjusted to independently adjust the height and width of the elliptical profile of the beam at the focal plane 3552. The beam is then directed through beam combiner 3514 where beams from the kill laser module 3522 and detection laser module 3532 are combined and projected towards the focal plane. The emissions from the kill laser assembly 3520 and detection laser assembly 3530 may or may not be fully combined, that is, the emissions may not be fully coincident at the focal plane 3552, depending on the flow cytometer and particle processing operation in which the assemblies are used.

Figures 26A, 26B:
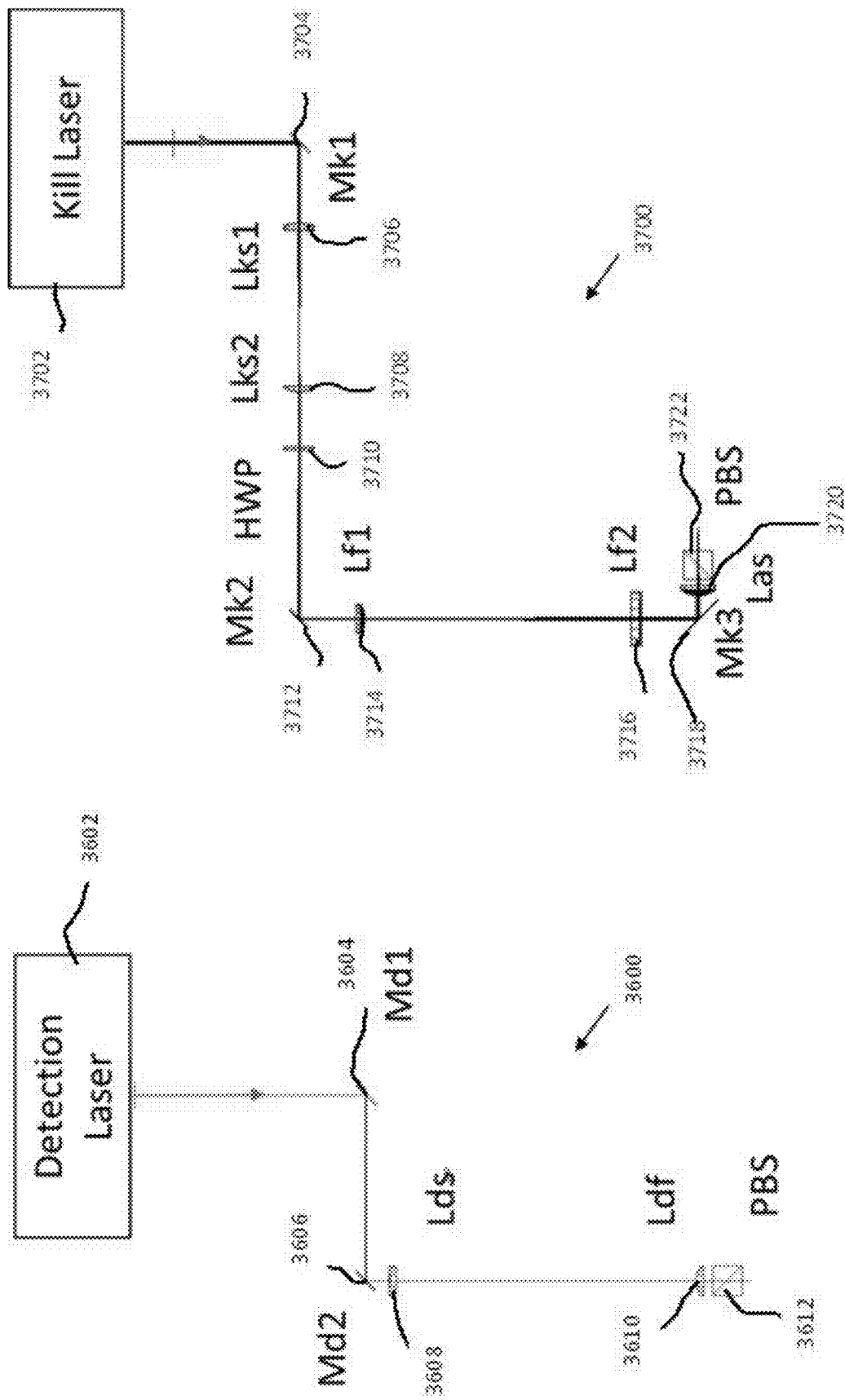
FIG. 26A provides a diagrammatic view of an optical pathway for an electromagnetic radiation beam emission from a detection laser module according to an embodiment of the present invention.
FIG. 26B provides a diagrammatic view of an optical pathway for an electromagnetic radiation beam emission from a kill laser module according to an embodiment of the present invention.

Optical pathways for a detection laser assembly (e.g., detection laser assemblies 3430 and 3530) and a kill laser assembly (e.g., kill laser assemblies 3420 and 3520), which may be used with the systems 3500 and 3400, are provided in the exemplary embodiments shown in FIG. 26A and FIG. 26B, respectively. A laser-based particle detection and deactivation system in the exemplary embodiment comprises a detection laser assembly having an optical pathway 3600, shown in FIG. 26A, and a kill laser assembly having an optical pathway 3700, shown in FIG. 26B. The optical pathway 3600 for the detection laser comprises a detection laser module 3602, a first harmonic separator 3604, a second harmonic separator 3606, an F150 cylindrical lens 3608, a F25 cylindrical lens 3610, a polarizing beam splitter 3612, and ends at a focal plane or microfluidic chip.

The optical pathway 3700 for the kill laser assembly comprises a kill laser module 3702, a first harmonic separator 3704, an F50 cylindrical lens 3706, an F25 cylindrical lens 3708, a wave plate 3710, a second harmonic separator 3712, an F–25 cylindrical lens 3714, an F150 cylindrical lens 3716, a third harmonic separator 3718, an aspheric lens 3720, a polarizing beam splitter 3722, and ends at a focal plane or microfluidic chip.

Without wishing to limit the present invention to a particular application or embodiment, the improved systems and optical pathways of the present invention, such as the opto-mechanical system 3400 shown in FIG. 25A, the opto-mechanical system 3500 shown in FIG. 25B, and the optical pathways 600 and 3700 shown respectively in FIG. 26A and FIG. 26B, improve over existing systems through at least the incorporation of an aspheric lens in the kill laser beam path and through the use of a polarizing beam splitter to combine emissions from a kill laser module and a detection laser module. Specifically, using an aspheric lens in the configurations such as those shown in the exemplary embodiments provides for shaping of a beam emission from a higher pulse energy laser without the risk of damage to the optical elements, including the aspheric lens. The aspheric lens further provides for precise tuning and/or calibration of a beam emission to obtain an optimal beam shape and size at a focal point. The use of these optical components further provides for independent adjustment of the height and width of the beam waist for a beam emission at a focal plane. Additionally, in an exemplary embodiment, a polarizing beam splitter may be used to combine the beam emissions from a kill laser module and a detection laser module where both beam emissions are at or near a common wavelength and where the emissions of both modules are polarized. Other methods for combining beam emissions, such as a dichroic mirror, may not be suitable or optimal in a flow cytometer system having a kill laser module and a detection laser module positioned on a common side of the flow cytometer and opposite of a detection module or assembly. In this type of exemplary configuration, the atypical use of a polarizing beam splitter achieves a superior result compared to other beam combination systems or methods.

Figure 27:
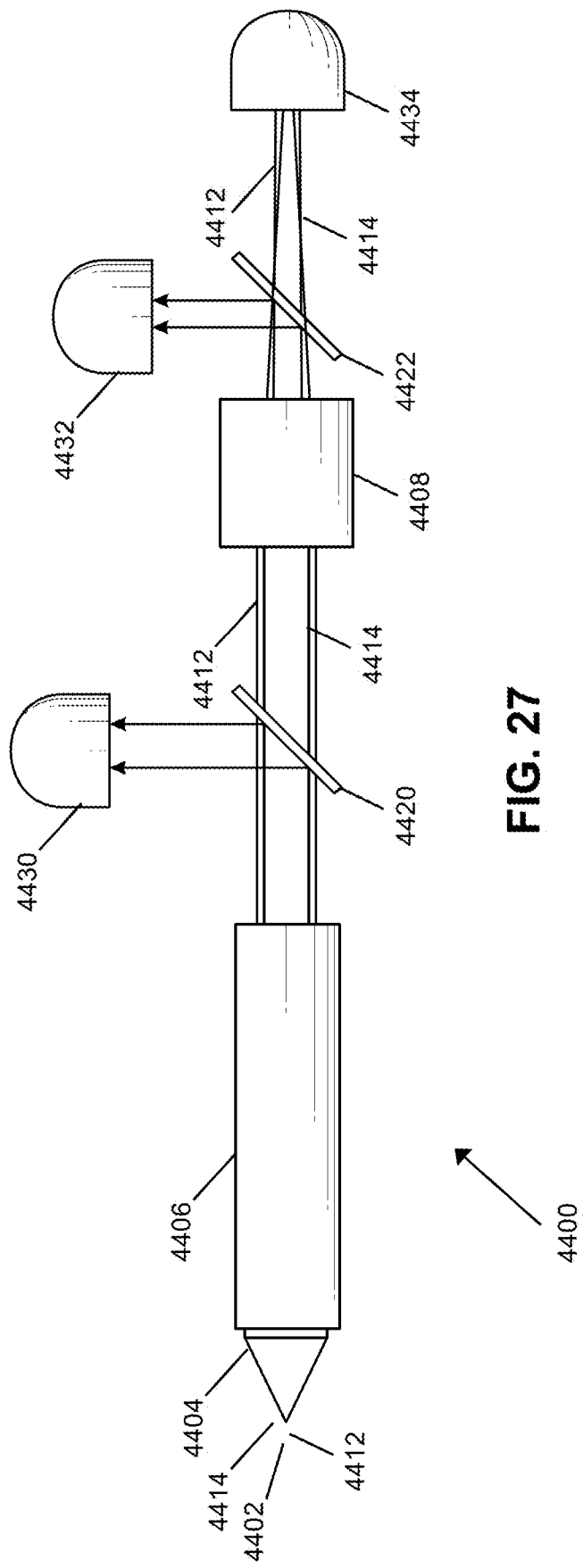
FIG. 27 provides a diagram view of optical and electrical elements of a detection assembly according to an embodiment of the present invention.
Figure 28:
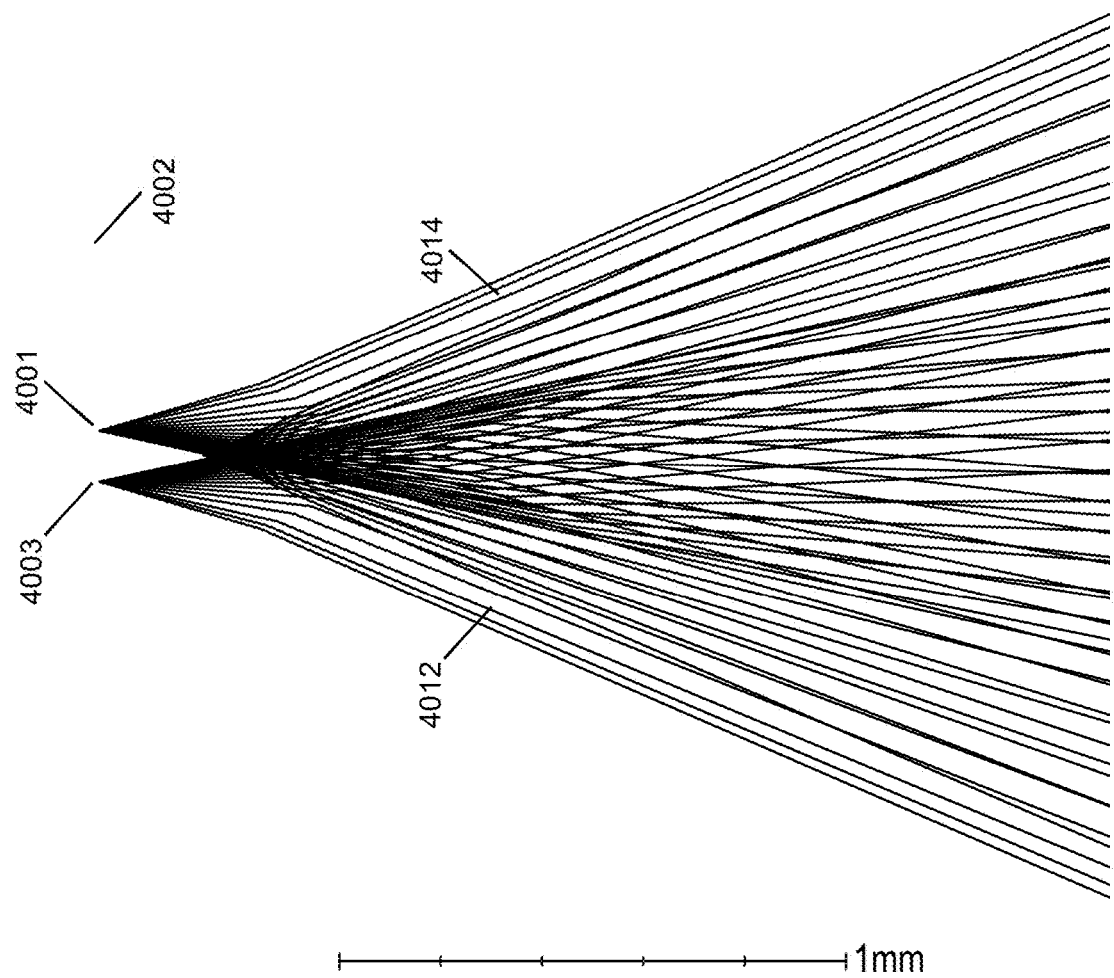
FIG. 28 provides a diagrammatic view of light emission at a kill spot and a detection spot in an action or interrogation area at a focal plane for detection by a detection assembly according to an embodiment of the present invention.

With reference now to FIG. 28, a diagrammatic view of emissions from a detection spot 4001 and a kill spot 4003 at a focal plane 4002 are provided. A detection emission 4014 originates at the detection spot 4001 at an action or interrogation location of the focal plane 4002, and the kill emission 4012 originates at the kill spot 4003 of the focal plane 4002. Optical elements of an optical pathway, such as those shown in FIG. 27, shape and direct the detection emission 4014 and kill emission 4012 such that both emissions may be separately analyzed, detected, and/or captured by one or more sensors or devices, such as in the system 4400 provided in FIG. 27.

With reference now to FIG. 27, a diagram view of optical, opto-mechanical, and electrical elements of a detection assembly 4400 according to an embodiment of the present invention are provided. The detection assembly 4400 comprises a filter 4404, which may be high-pass filter, an objective lens 4406, which may be a NUV 20× objective lens, a tube lens 4408, which may be a 100 mm or 200 mm tube lens, and one or more filters or splitters, such as dichroic mirror 4420 and splitter 4422, to filter, split, and/or redirect either the electromagnetic radiation emission from a detection laser excitation of a particle (detection emission 4414) or from a kill laser excitation of a particle (kill emission 4412). The detection emission 4414 originates at a detection spot at an action or interrogation location of the focal plane 4402, and the kill emission 4412 originates at the kill spot of the focal plane 4402. At least the filter 4404, objective lens 4406, and tube lens 4408 shape and direct the detection emission 4414 and kill emission 4412 such that both emissions may be separately analyzed, detected, and/or captured by one or more sensors or devices such as the CCD camera 4430, kill avalanche photodiode ("APD") or kill detector 4432, and detector 4434. The CCD camera 4430 is used to capture an image of the emissions 4412 and 4414 and may be used in the determination of a type or quality of the emission, such as a determination of the amount of fluorescence of a particle caused by the electromagnetic radiation emission of a kill laser or detection laser. The dichroic mirror 4420 is used to reflect a portion or fraction of the emissions 4412 and 4412 towards the CCD camera 4430, while allowing the remainder of the emissions to pass through towards the kill detector 4432 and detector 4434 The kill detector 4432 is used to detect whether or not a kill event by a kill laser to deactivate a particle has been successful. The detector 4434 is used to determine a type and quality of an emission of a particle, such as in the particle emission 4414, to determine a quality or characteristic of a particle, such as a DNA content of a sperm cell, based on a determined level of fluorescence of the cell.

Example 1

Without wishing to limit the present invention to a particular application or embodiment, the following exemplary embodiment is provided.

A flow cytometry particle sorting system comprises a detection laser assembly, a microfluidic ship, a detection sensor, a set of signal processing electronics, a graphical user interface, a CCD camera, a kill laser module, and a kill sensor. The detection laser assembly is configured to excite a dye, such as a Hoechst dye, within a particle, which may be an individual sperm cell. The beam from the detection laser is focused to a specific size, such as an elliptical shape having a fast axis of 3.5-20 μm and a slow axis of 30-150 μm. The microfluidic chip accepts a particle sample, such as an ejaculate sample comprising sperm, and focuses or orients the particles using a sheath fluid within one or more microchannels in the chip. The detection sensor collects light emission at the detection laser location. The signal processing electronics comprise digital electronic components comprising a processor and a memory, or may comprise analog electronic components, or a combination of digital and analog processing components. The signal processing electronics receive one or more signals from one or more sensors or cameras and convert or interpret the signals to make a determination based on the input signals. This determination may be a gender or sexing determination of sperm cells based on detected fluorescence based on the amount of DNA in a cell. The graphical user interface ("GUI") displays information on the status of the system including processing rate, laser pulse energy, kill rate, detection rate, fluid levels, sample collection levels, and further provides one or more user interface elements for configuring system elements such as laser pulse energy, flow rate, temperature, pressure, and desired sample skew. The CCD camera captures images of one or both of a kill location and a detection location and provides feedback via the GUI for user alignment of optical and opto-mechanical elements of the system. The kill laser kills or deactivates undesirable particles. The kill laser emission is focused to a small location or spot in order to effectively slice, ablate, photo-damage, or otherwise kill particles, such as sperm cells. The focused laser emission may be an elliptical profile shape having a fast axis of 3.5-5 μm and a slow axis of 5-35 μm.

A detection laser assembly comprises a CW laser module, a laser shutter, a set of one or more harmonic separators, a F150 cylindrical lens oriented in a horizontal direction, a F25 cylindrical lens oriented in a vertical direction, and a polarizing beam splitter. The CW laser module emits a CW laser beam that is used to cause a fluorescence in a particle. The laser shutter blocks the laser from reaching user access points if a safety switch is tripped. The harmonic separators reflect 355 nm light while transmitting light of other wavelengths and are used to remove carrier wavelengths of 352 nm and 1064 nm from the laser beam. The F150 cylindrical lens shapes the horizontal dimension of the detection laser at the chip or focal plane and is disposed on an adjustable base or stage that provides for adjustment of the beam position horizontally. The F25 cylindrical lens shapes the vertical dimension of the detection laser at the chip or focal plane and is disposed on a base or stage that provides for adjustment of the beam position vertically. The polarizing beam splitter reflects S polarized light while transmitting P polarized laser light and permits transmitting of the detection laser beam through the beam splitter and onto the chip or focal plane.

A kill laser assembly comprises a kill laser module, a set of one or more UV mirrors, a F−25 cylindrical lens oriented in a vertical direction, a F+150 cylindrical lens oriented in a vertical direction, an F25 aspheric lens, and a polarizing beam splitter. The kill laser module is a pulsed laser module emitting a pulsed laser beam at 1-5 μJ. The set of one or more UV lenses each reflect the laser beam 90 degrees and are mounted on tip/tilt mounts for steering or directing the kill laser beam. The F−25 cylindrical lens is used with the F+150 cylindrical lens to expand the kill laser beam vertically. Adjusting the separation of the F−25 cylindrical lens and the F+150 cylindrical lens provides for control of the height of the kill laser at the chip or focal plane. The F−25 and F+150 cylindrical lenses provide for expansion of the kill laser beam from 1 mm to 6 mm. The F25 aspheric lens may be used to condense the kill laser beam in all axes to a small, elliptical spot at the focal plane at the microfluidic chip. Aspheric lenses reduce spherical aberration when compared to a standard or typical spherical lens.

A cell detection assembly comprises an objective lens, a 390 long pass filter, a first F100 spherical tube lens, a 90:10 beam splitter, a detection sensor, a kill sensor, a second F100 spherical tube lens, and a CCD camera. The objective lens collects dye emission from both detection and kill locations at a focal plane in a fluid path within the flow cytometry device (e.g., microchannel of a microfluidic chip) and further collects a portion of the laser wavelength from the kill and detection lasers for measuring laser spot sizes. The 390 long pass filter transmits wavelengths longer than 390 nm and reflects wavelengths less than 390 nm and reflects a portion of light towards a CCD camera while allowing the remaining light to be transmitted to the kill and detection sensors. The 90:10 beam splitter transmits 90% and reflects 10% of all light which provides for 90% of light that passes through the 390 long pass filter to be transmitted to the detection sensor while reflecting 10% of the light to the kill sensor. The detection sensor is an avalanche photodiode that collects emitted light at the detection location. The kill sensor is an avalanche photodiode that collects light emitted at the kill location. The first F100 spherical tube lens focuses the light collected from the objective lens onto the detection and kill sensors, and the second F100 spherical tube lens focuses a portion of the light collected from the objective lens onto the CCD camera as reflected by the 390 long pass filter. The CCD camera images the light collected by the objective lens and is a user's feedback source for system alignment as well as measuring laser spot size.

Example 2

Without wishing to limit the present invention to a particular application or embodiment, the following exemplary embodiment is provided.

Typically, pulsed lasers are used for fluorescing dye in a particle in a flow cytometry system. For example, existing systems for semen sexing in sperm may use pulsed lasers to fluoresce a Hoechst dye, such as Hoechst 33324, in a sperm cell to determine an amount, and therefore type, of DNA in a sperm cell in a sexing process. However, using a CW laser provides benefits in efficiency, calibration, and setup compared to traditional pulsed lasers. The use of CW lasers in the present invention provides said improvements over existing pulsed detection lasers and detection laser assemblies while maintaining the same fertility or viability of sperm cells sorted in this manner within a statistically significant margin of error. The conception rate as a measurement of fertility for cells irradiated by a CW laser was at least as good as, if not better than in some circumstances, cells irradiated by a pulse laser. Specifically, the difference in fertility was approximately 1%, within the margin of measurement error. Therefore, the use of CW lasers in particle detection does not have a measurable impact on viability or fertility of sperm cells processed using a CW laser compared to a control.

Example 3

Without wishing to limit the present invention to a particular application or embodiment, the following exemplary embodiment is provided.

A laser-based particle detection and deactivation system comprises a kill laser assembly and a detection laser assembly. The kill laser assembly may operate at a power of 350 mW to 2 W. The power of the detection laser assembly may be set from 10 mW to 50 mW. Power delivered by the detection laser assembly can incur a power loss of approximately 10% and a measured power drift over a 24-hour period of less than +/−1%. Accurate and steady detection laser power may be achieved by increasing laser power over a first minute of operation and lowering laser power thereafter to provide for stable detection power with an increased temperature of approximately 4 degrees Celsius.

Figure 29A:
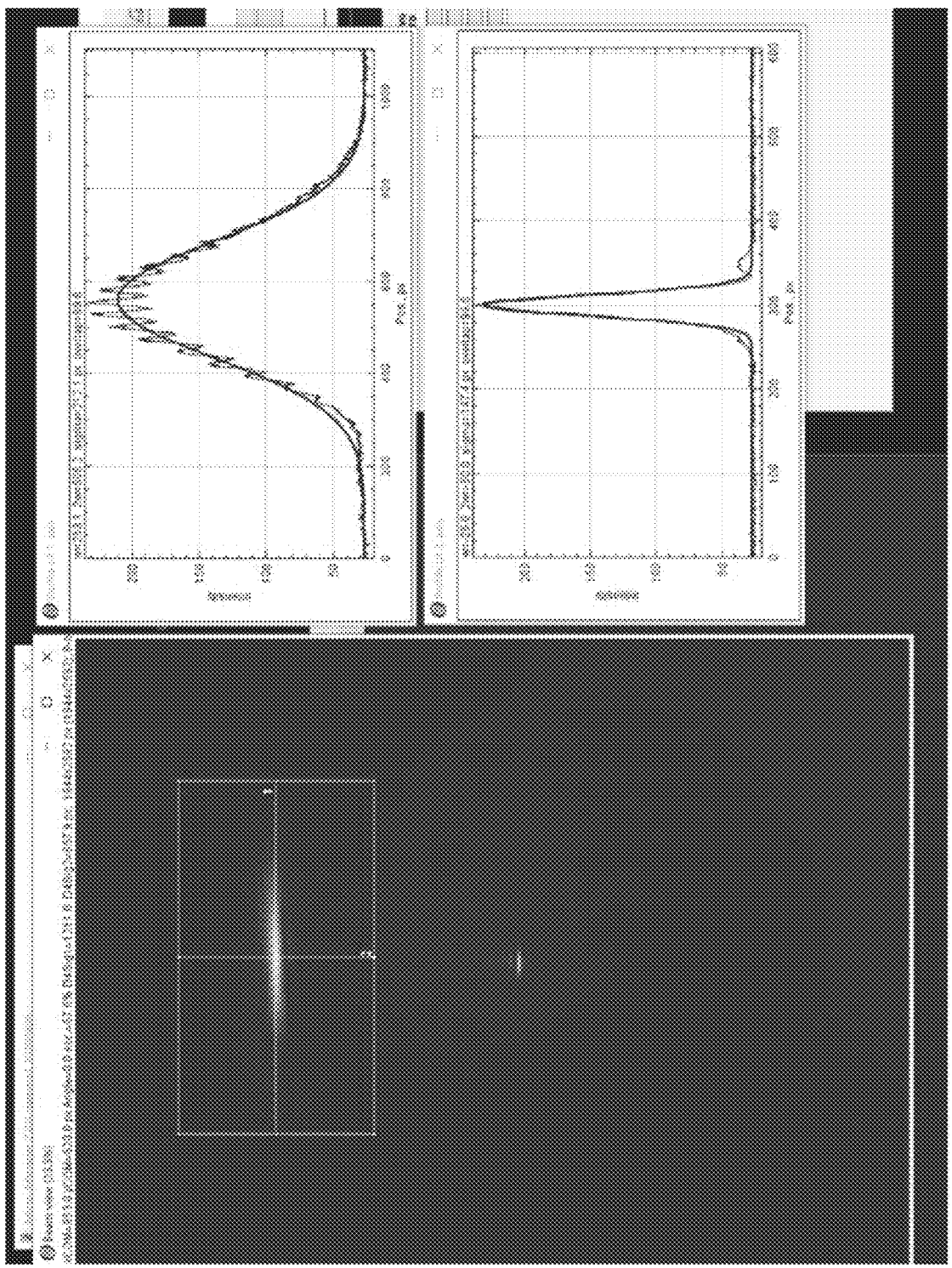
FIG. 29A provides an exemplary graphical user interface representing an output of a measurement of a detection laser beam according to an embodiment of the present invention.
Figure 29B:
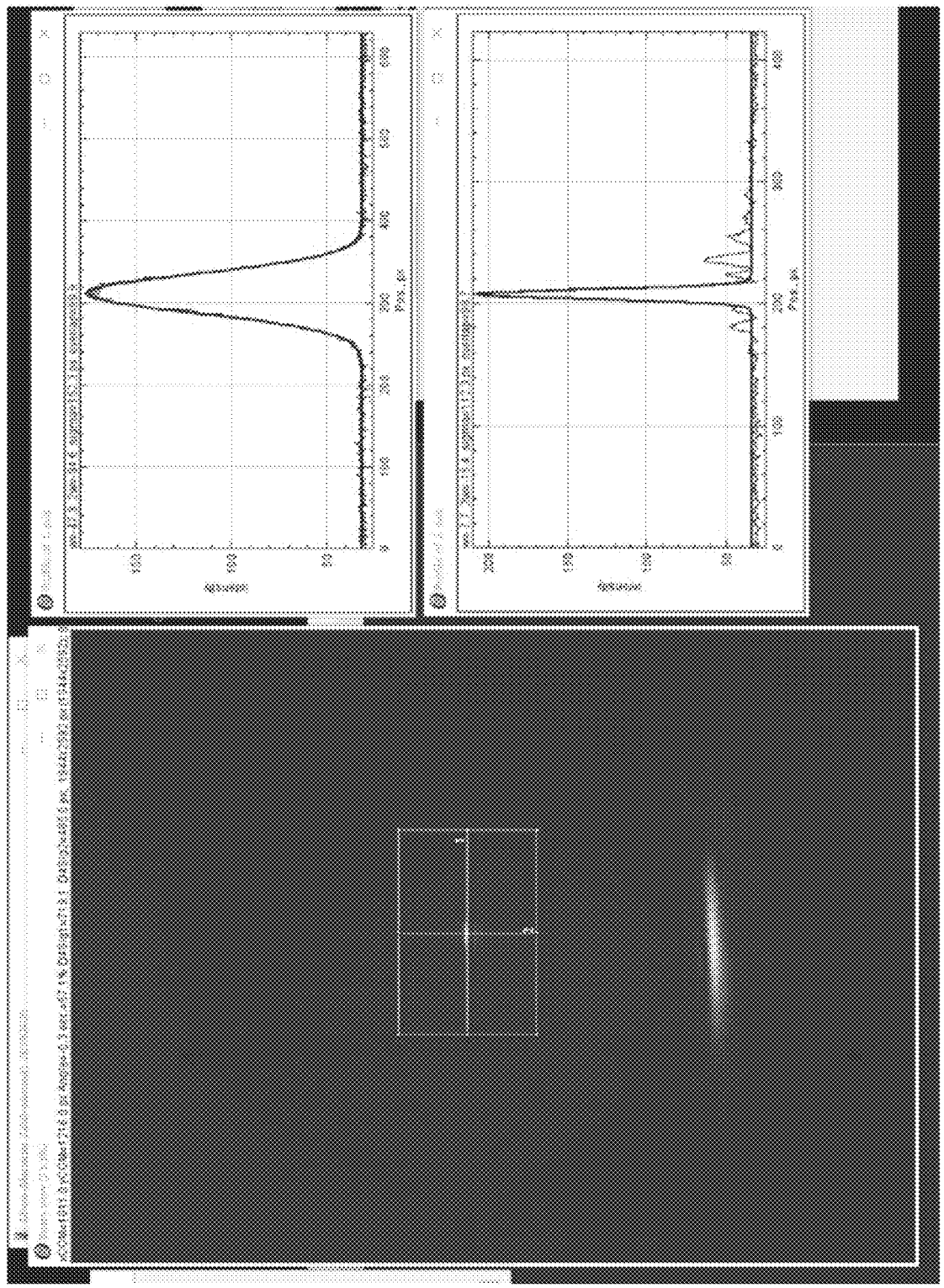
FIG. 29B provides an exemplary graphical user interface representing an output of a measurement of a kill laser beam according to an embodiment of the present invention.

With reference now to FIG. 29A and FIG. 29B, respective views of representative graphical user interface outputs measuring a detection laser beam size and intensity at a focal plane (FIG. 29A) and a kill laser beam size and intensity at a focal plane (FIG. 29B) are provided. The outputs as shown in FIG. 29A and FIG. 29B may be achieved using the laser module power settings described in Example 3, hereinabove. The major axis of the ellipse of the detection laser is between 95 and 110 μm and the minor axis of the ellipse is between 12 and 15 μm. Specifically as shown in FIG. 29A, the major or slow axis is 104.2 μm and the minor or fast axis is 11.2 μm. The major axis of the ellipse of the kill laser is between 20 and 25 μm and the minor axis of the ellipse is between 2 and 4 μm. Specifically as shown in FIG. 29B, the major or slow axis is 20.9 μm and the minor or fast axis is 3.45 μm. However, the positioning and placement of the optical elements may be adjusted or calibrated and the pulse energy for the laser module may be adjusted to shape the beam emissions as desired.

Example 4

Without wishing to limit the present invention to a particular application or embodiment, the following exemplary embodiment is provided.

A laser-based particle detection and deactivation system comprises a kill laser assembly and a detection laser assembly. The detection laser assembly comprises a ring light emitting diode ("LED") and a power sensor. The ring LED has an internal diameter of 6 mm and is positioned between a set of cylindrical lenses in an optical pathway of the detection laser. The power sensor comprises a TO-5 packaging and is disposed on a printed circuit board. The power sensor is positioned in or adjacent to the optical pathway for the detection laser, such as by a polarizing beam splitter, to detect a power of a detection laser beam. This is used to provide for the continuous monitoring of output power to and to provide operator feedback. The detected power may also be used in a feedback loop to automatically or semi-automatically adjust output power.

Example 5

The following is a non-limiting example of determining a velocity of a particle in the sample stream within the microfluidic chip, and can be used for the kill trigger delay timing, adjusting flow rates, etc.

For cell velocity calibration, the cell velocity is calculated as follows:

$$\text{Velocity} = \text{Detection spot } Y - \text{Kill Spot } Y / \text{trigger delay}$$

If the current velocity deviates significantly from a target velocity, a new flow rate is calculated using the following equation:

$$(Flow1 / Vel1) = (Flow2 / Vel2)$$

where Flow1 and Vel1 are the current values, Vel2 is the target velocity, and Flow2 is the new flow rate.

The cell rate (cells/s), which is equivalent to events/s, is the fluid parameter that is desired to be maintained constant. The flow cytometer keeps track of the number of cells or events that have been reported by the detector in the last second. This fluid parameter is controlled via the pressure regulator in the fluidics module, so if cells/s is too low, the pressure is increased, and if the cells/s is too high, the pressure is decreased. The pressure is applied to the sample, so the higher the pressure, the more of the sample is pushed through the flow cytometer. The sample is mixed with sheath fluid, which is kept at a constant flow rate by a PID controller which runs in the fluidics module. In some embodiments, the sheath flow is controlled by the opening or closing of a valve, such a pressure regulator.

Alignment Procedures

Existing systems require an operator to align a kill laser to a cell core stream in order to effectively kill targeted cells. Operators align the core stream to the laser in three dimensions using a two camera system where one camera monitors the cell location and another monitors the kill laser. Each spot is given a centroid location within their image. The positional relationship between each spot is then maintained during the collection. Alignment is achieved using an image, a two axis stage and a time delay. The two axis stages enable alignment at the center of the laser and the time delay allows the laser to target the cell as it is traveling through the microfluidic channel. By focusing the core stream at the focal point, most of the laser energy is concentrated on the cell and results in a high purity product. After alignment, operators gate the proper population and cells outside that population are targeted by the kill laser. Problems that arise during operation include laser drift and cell velocity drift that cause system misalignments where cells that are targeted are not effectively killed or are missed. Operators are required to identify and correct the misalignment.

However, operators are not reliable in identifying and correcting misalignment at the required frequency to maintain product purity. Furthermore, operators cannot correct for the drift between cameras, in other words both measurement devices were drifting themselves and the measurement accuracy was not precise enough to maintain alignment within tolerance. Automating the alignment process will reduce labor costs, improve product consistency, and increase product quality by not relying on operators.

Thus in some embodiments, the present invention features an automated alignment correction by measuring misalignment and incrementally correcting stage position or delay until misalignment is within tolerance.

Figure 30:
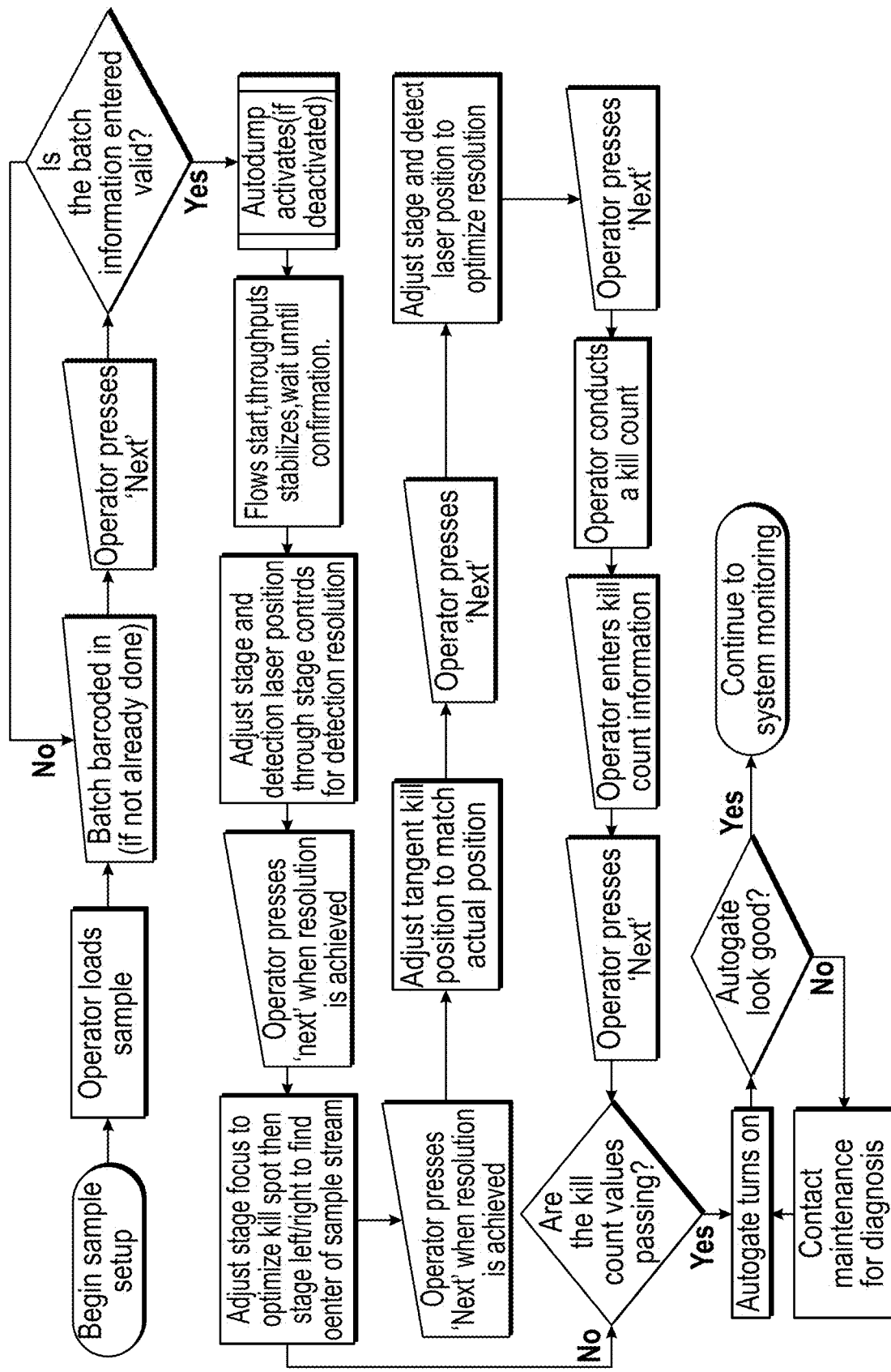
FIG. 30 shows a block diagram for a method of aligning the sample stream to the detection and kill lasers to achieve desired resolutions and kill count.

Referring to FIG. 30, a procedure for aligning the microfluidic chip stage with the detection laser and kill laser to achieve a desired resolution is illustrated therein. First, the microfluidic chip stage is aligned with the detection laser to achieve a desired detection resolution. Next, the position of the microfluidic chip stage is adjusted such that the kill laser is aligned with the center of the sample stream, thereby achieving a desired resolution. If the kill count is below a kill count threshold, the microfluidic chip stage is repositioned relative to the kill laser until the kill count threshold is reached or surpassed.

Figure 31:
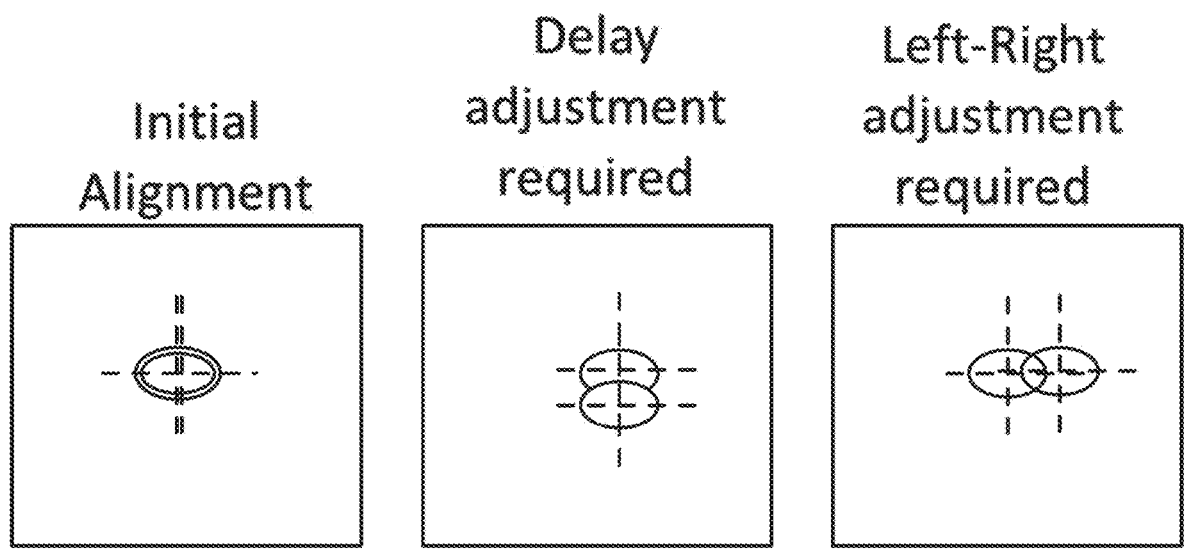
FIG. 31 shows an alignment procedure that can be utilized in the present invention.

FIG. 31 illustrates procedures for aligning an instrument by adjusting a position of a core stream relative to a kill laser and measuring characteristics of the fluorescence generated by a kill laser and cell core stream. During an initial alignment, operators optimize the position of the core stream relative to the core laser. This spot in a 2D image space is marked with a crosshair overlayed on the image. The orange crosshair is fixed and will be used as the position to maintain during collection. The red crosshair is an active measurement of the spot on the image. If the spot were to move, the red crosshair would follow but the orange crosshair would not.

In some embodiments, a left-right adjustment may be required if the core stream has shifted left or right from the original position. The distance between the crosshairs is measured and the chip/core stream is moved left or right until the distance between the crosshairs is zero. In other embodiments, the focus may be optimized by sweeping from one extreme in one direction until a zero slope condition is met with the focus optimization metric.

In some embodiments, delay adjustments may be required if the cell velocity or the distance between the detection laser and kill laser has changed. After left-right and focus optimization, a location of a spot on an image may be marked as a target location. A cell is fired upon and the current location of said cell in the image is measured relative to the target location. After measuring the distance between the crosshairs, the delay is adjusted until the current location relative to the target location is zero. For example, the delay is decreased or increased accordingly until the distance between the crosshairs is zero.

Without wishing to limit the invention to a particular theory or mechanism, the alignment procedures had the advantage of not requiring additional hardware to measure laser position. Furthermore, the system is optically stable where lasers only move 0 to 1 um during collection. This allows for maintaining initial alignment after verification without measuring the location of a moving kill laser or frequent re-alignment to maintain product quality.

Deleted Sample Detection

Semen processing requires that several samples are made over a period of operation in order to maintain the vitality of the semen. Hence, volumes of 3-5 mL are processed at a time and replaced with a freshly made sample when the previous sample runs out. Operators have identified when a sample is low by visually checking the sample tube level and making a judgment on when it should be swapped. This can lead to the sample being depleted completely, which can result in increased down time.

Thus, the present invention resolves this issue by providing an indicator for when a sample is depleting before it is completely depleted will help reduce burden on operators and reduce instrument downtime. The uniqueness of this solution is that it monitors the output of a controller as a means to detect a known pattern of change.

Figure 32:
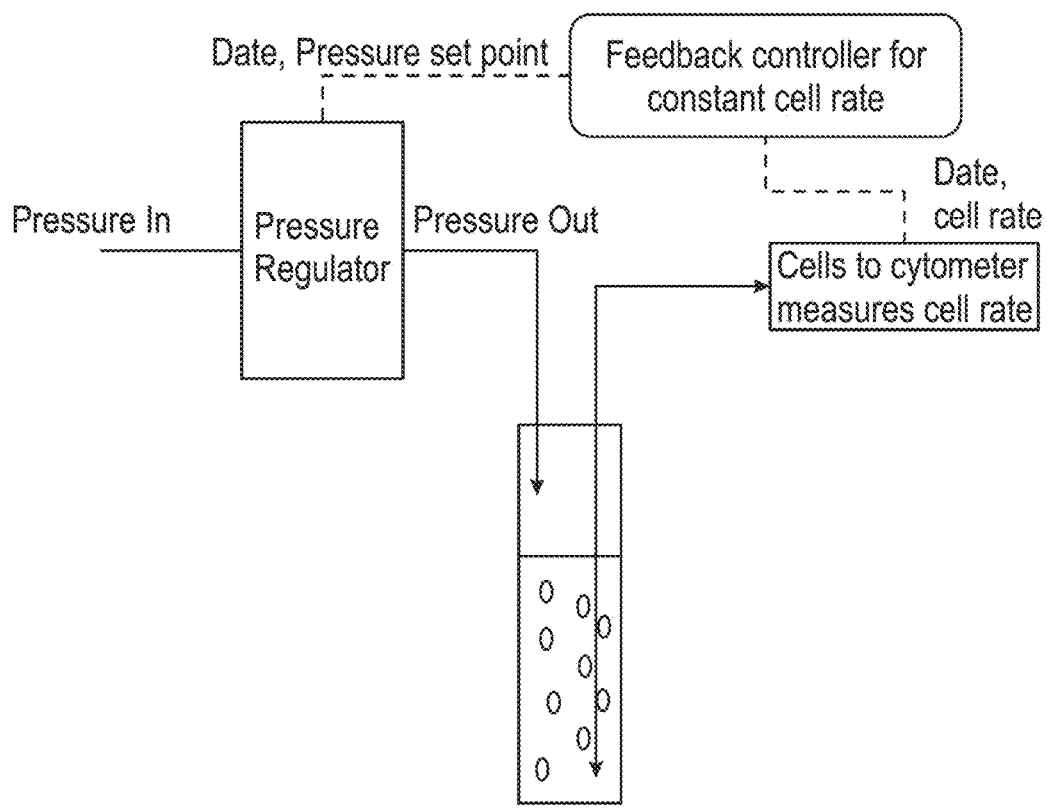
FIG. 32 illustrates a block diagram for automatically measuring sample levels and determining when the sample levels are low.

Referring to FIG. 32, a sample is flowed out of a 5 mL vessel and through a small diameter tubing by applying a pressure above the fluid. The sample in the tube is assumed to be a homogenous concentration, therefore the rate at which cells leave the vessel (or cell rate) is proportional to the pressure applied. An increase in pressure results in an increase in cell rate. Ideally the cell rate is held constant to maintain constant instrument performance. Small adjustments in pressure are required to maintain the cell rate at a target due to localized variation in concentration as well as downstream pressure.

In reality, the concentration does not remain homogenous throughout the duration of a sample. Settling occurs and cells fall towards the bottom, leaving the bottom portion of the sample more concentrated than the top portion. As the fluid level decreases, the local concentration near the tube exit will continuously decrease. In order to maintain a constant throughput, the required pressure will increase. This pressure increases exponentially as the sample begins to deplete. The method of the present invention involves monitoring this change in pressure during the collection. The operator is then notified when the change in pressure exceeds a threshold.

As shown in FIG. 32, a sample vessel contains sperm cells in solution. A pressure regulator receives constant pressure from a supply. The pressure set point is received from a PC/GUI. Pressure is outputted to the sample tube containing sperm cells and applied above the fluid level. Small diameter tubing is placed inside of the sample vessel with the end of the tubing near the bottom of the vessel. The other end of the tubing is inserted into the microfluidic chip used to focus cells within the flow cytometer for measurement of cell rate. Cells are driven outside of the vessel through the small diameter tubing when pressure is applied. The flow cytometer measures the cell rate and sex. The cell rate is inputted into a feedback loop for maintaining constant cell rate.

The feedback controller may be a PID-based controller using the cell rate as input and pressure as output. The objective of the PID controller is to maintain a constant cell rate, which may be user specified. If the constant cell rate deviates from baseline, e.g. the cell rate decreases, the feedback controller increases the pressure outputted from the pressure regulator and into the sample vessel in order to maintain the constant cell rate. If the pressure exceeds the pressure set point, this indicates that the amount of sample in the vessel is low and the operator is notified of the low levels.

The solution described above has the advantage of not requiring additional hardware to determine sample fluid levels. However, in alternative embodiments, the present invention may use one or more additional components, such as a liquid level sensor, to measure levels directly. Examples of liquid level sensors are described herein.

Particle Processing

Figure 33:
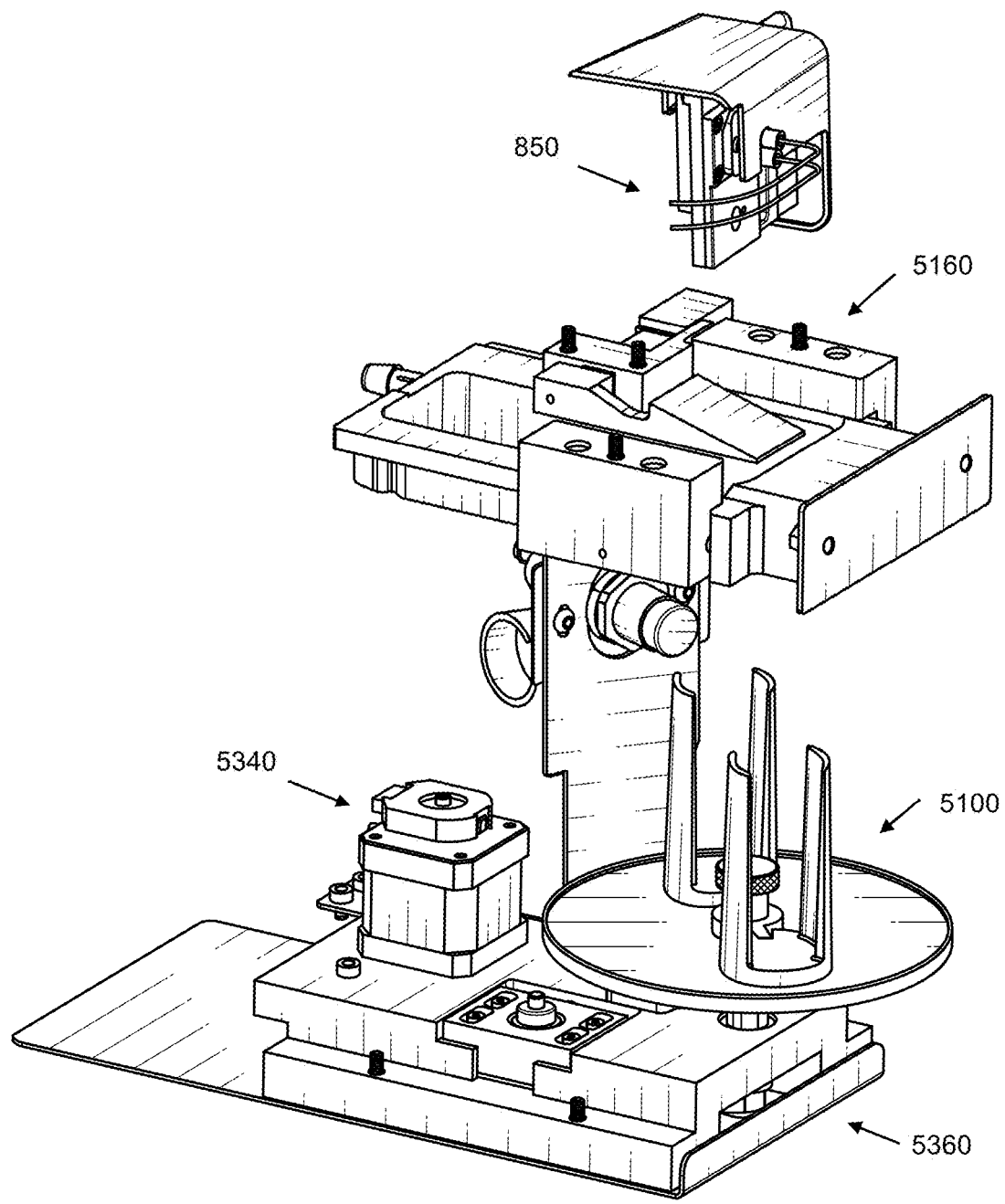
FIG. 33 shows a flow cytometry-based particle processing system that includes a sample mixing module and an auto dump component.

Referring to FIG. 33, a sample, which may be a semen sample comprising sperm cells, enters a microfluidic chip 850 through sample pathway, and a sheath fluid enters the chip through one or more sheath fluid pathways. The sample and sheath fluid may be pumped into the chip by a fluid pump, syringe pump, or other suitable pumping means at a rate and pressure suitable for the individual sample.

In some embodiments, one or more electromagnetic radiation emitters are directed at or to the chip using an optical pathway. A laser detection module may be based on a continuous wave laser and may be configured to cause a fluorescence in a dye infused in a particle or component in the sample. A laser kill module may be based on a pulsed or micro-pulsed laser and may be configured to deactivate, such as by photo-ablation, one or more particles or components in the sample based on a characteristic of the sample as detected by the laser detection module. The detection module collects or detects emissions from particles or components in the sample to identify one or more characteristics of the particles or components, such as an amount or type of DNA, and to provide feedback to the system and/or an operator. The detection module may comprise one or more of a camera, photo-multiplier tube, or avalanche photodiode based detector. Based on detected characteristics, a kill laser in the emission module emits a kill laser beam to deactivate or destroy a subset of particles or components in the sample.

The processed sample exits the chip 850 through one or more openings at a terminal end of the chip. The auto-dump assembly 5160 comprises an actuator and a mechanical diverter. The actuator may be a two-position linear actuator or other suitable mechanical or electro-mechanical actuation means. The actuator operates to move the diverter in or out of the path of a processed sample exiting the chip to either permit the sample to pass into a collection tube 5130 or to cause the sample to be diverted into a waste collection container or area. The determination is based upon one or more qualities of the sample, such as a purity, or based upon an operator input. The determination may also be based upon whether or not a sample tube is present in the sample collection path.

In some embodiments, the sample mixing assembly or module 5100 comprises one or more sample collection containers or tubes 5130 held in one or more collection tube holders 5120, which are integral to or secured to a rotary base 5110. The rotary base 5110 is magnetically secured to, or held on by a bolt or threaded cap, to a platform 5360. The rotary base 5110 is rotated, oscillated, or moved by the actuator or motor 5340, which may be a stepper motor, linear actuator, brushless motor, or other suitable driving means capable of rotating the rotary base 5110. The rotary base 5110 rotates in an arcuate path to mix a sample collected in a sample collection tube 5130, or to rotate sample collection tubes on the base into a sample collection path.

While optical means for detecting a sample has been described, it is understood that other detection means may be used in the modular flow cytometry system of the present invention. Alternatively to or in conjunction with the embodiments relating to detection of sample, the sample may be detected using electrodes, cameras, magnets, electroporation, impedance properties, or conductivity.

While kill lasers for damaging a sample have been described, it is understood that other means for damaging the cell may be used in the modular flow cytometry system of the present invention. Alternatively to or in conjunction with the embodiments relating to damaging cells, the cells may be rendered inactive or killed using physical deformation or electrical means, such as the use of electrodes or electroporation.

In other alternative embodiments, the sexed sperm cells may be separated into two or more sub-populations using separation means that include, but are not limited to, physical barriers, droplet separation, acoustic means, laser steering, electrodes, or combinations thereof.

Automix and Collection Module

Figure 34:
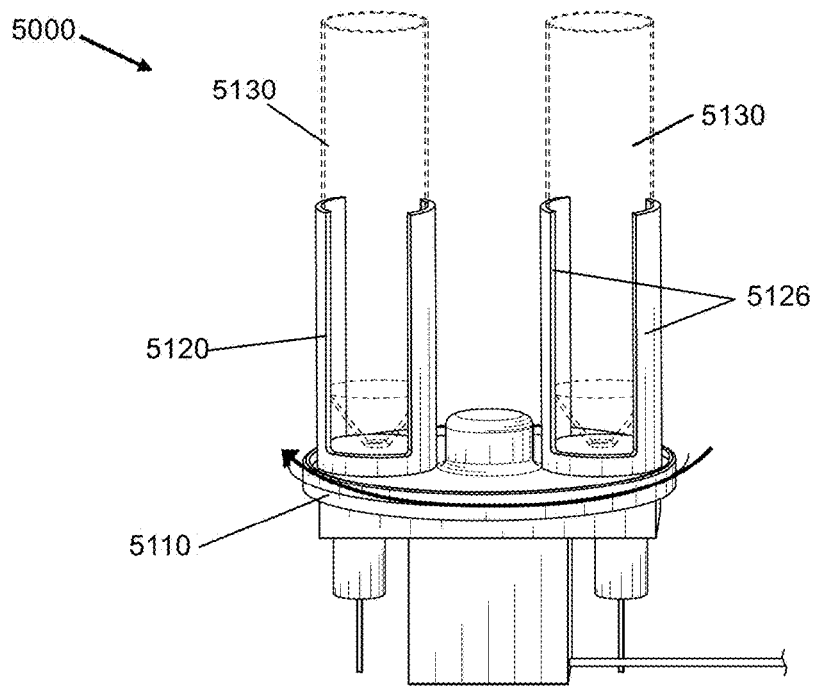
FIG. 34 shows a sample mixing system of the present invention, comprising magnetic collection tubes disposed on a rotary base.

Referring now to FIG. 34, the present invention features a sample mixing system 5100 comprising a rotary base 5110, a plurality of collection tube holders 5120 disposed on top of the rotary base, and a plurality of collection tubes 5130. Each tube is configured to fit and be disposed in a collection tube holder of the plurality of collection tubes. Without wishing to limit the present invention to a particular theory or mechanism, the rotary base 5110 can rotate such that the collection tube holders 5120 and collection tubes 5130 disposed therein revolve or move in an arcuate path and contents in the collection tubes 5130 are mixed by said motion.

In some embodiments, the rotary base 5110 can rotate back and forth atop a platform 5360 on which it is disposed. The rotary base 5110 may be operatively coupled to a motor 5340 that rotates said rotary base 5110 about its central axis. The rotary base 5110 can rotate about its central axis in a first direction, or in a second direction, or in both directions. For example, the rotary base 5110 can rotate in a first direction, or in a second direction, or in both directions to change from an "In Use" collection tube to the next or neighboring "in-queue" collection tube. For switching purposes, in some embodiments, the rotary base 5110 can rotate about 45° up to 360°.

In some embodiments, the motor is a stepper motor used to automatically induce mixing of a sample tube back and forth in an arc. From other mixing solutions, this is a pivot-based motion. It moves along an arc, which allows the collection tube 5130 to remain within the drip path below the microfluidic module. In some embodiments, for mixing purposes, the rotary base 5110 can rotate about 10° to 40°.

In other embodiments, the rotary base 5110 can move in an orbital path so as to induce mixing of a sample tube in a swirling motion, similar to the motions of an orbital shaker, i.e. orbital travel. Alternative to or in conjunction with axial rotation, the axis of the rotary base can move along a circular path that has a short radius such that the collection tube 5130 also moves in a circular path while remaining under the drip path of the microfluidic module.

In some preferred embodiments, the mixing technique enables gentle stirring or mixing of the collection tube. In some embodiments, the mixing technique is executed periodically. For example, the collection tube is mixed periodically for a duration of time. For example, the collection tube is mixed about every 3-8 minutes for a duration ranging from about 10-120 seconds. In some embodiments, the system 5100 enables automatic switching from an "In Use" collection tube to an "In Queue" collection tube while focusing on the main task of mixing the contents within. In some embodiments, the design is optimized such that the mixing apparatus is configured to fit within the space provided within the modular flow cytometry system.

In one embodiment, a mixing profile for a stepper motor 5340 may comprise, out of a possible 1600 steps, a motion of +/−50 steps left, return to center, and right. In a non-limiting embodiment, for example, a mixing profile of +/−50 steps for each of the left, return to center, and right motions may comprise a +/−11.25 degree arc for a total arcuate motion of 22.5 degrees. However, this range may increase or decrease based on the size of the sample output stream, the size of the sample collection container or tube, and the degree of mixing required. For example, a stronger mixing profile may be obtained using smaller steps causing shorter and quicker movements. This causes an impulse type motion on the stirred or mixed sample instead of a rocking motion. In another example, a mixing profile having a motion of greater than 50 steps in each direction and greater than 22.5 degrees of arcuate motion may be desired or required for any of larger sample containers, more viscous samples, samples that require more thorough or homogenous mixing, or larger sample sizes. Additionally, other means of rotating the rotary base 5110 may be used to rotate or move the base such as linear actuators to rotate the base or move the base in a reciprocating motion, a brushed or brushless electric motor to rotate or move the base, a fluid actuator such as a pneumatic actuator to rotate or move the base, or a piezoelectric actuator to agitate or move the base.

The specific configuration for the mixing profile may be manually configured by a user and may be unique for an individual sample being processed, or the specific configuration for the mixing profile may be automatically determined based on a sample type. For example, a code, read from an information storage means such as a barcode, QR code, or RFID tag, may be read from a sample container by the machine and may be used to configure or look up or otherwise identify a set of configuration information to be used to define the mixing profile for the sample. The information storage means may comprise the mixing profile information or may comprise a location, pointer, or address where such information may be found. The mixing profile entered into or read by the system of the present invention is used to automatically mix, stir, or agitate a processed sample on the sample mixer according to the mixing profile without or with minimal additional input or action from a user or operator.

Figure 35A:
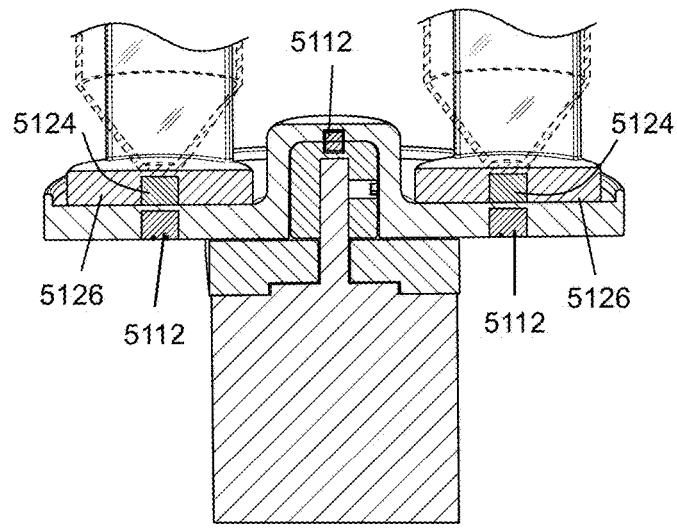
FIG. 35A is a cross-sectional view showing the magnetic attachment of the collection tube holder.

In some embodiments, the rotary base 5110 is a circular plate. Referring to FIG. 35A, the rotary base 5110 may contain magnets 5112 that are positioned separately from each other. A base 5122 of each collection tube holder also contains a magnet 5124. The collection tube holder 5120 can be attached to the rotary base 5110 by magnetic attraction between the magnet 5124 of said collection tube holder and one of the magnets 5112 of the rotary base. In another embodiment, a threaded nut or knob may be used to secure the rotary base 5110 to a correspondingly threaded rod or bolt instead of or in addition to the use of the magnet 5124.

In some embodiments, the system may comprise about 2 to 6 collection tube holders 5120. The number and location of the rotary base magnets 5112 may be determined by the number of collection tube holders. For example, if the system comprises 2 collection tube holders 5120, then the tube holders are diametrically opposed or 180° apart. For 4 collection tube holders 5120, the positioning may be 90° apart, and for 6 collection tube holders 5120, the positioning may be 60° apart.

In other embodiments, the collection tube holder may comprise two or more arms 5126 projecting upwardly from the base 5122. The two or more arms 5126 are configured to hold the collection tubes 5130 upright. In some embodiments, the tube holder base may be circular or square shaped. In a non-limiting embodiment, FIG. 34 shows the collection tube holder comprising two arms 5126 disposed on opposite sides of the tube holder base 5122 and projecting upwardly therefrom. Another embodiment may comprise 4 arms 5126 equidistant from each other, e.g. 90° apart or at a corner of a square base. In one embodiment, the arms 5126 may be connected to the edge of the tube holder base 5122, or alternatively, the arms 5126 may be attached to the top surface of the tube holder base 5122. In another embodiment, the arms 5128 may be curved when viewed from above and straight when viewed from the side. Alternatively, the arms 5126 can be straight when viewed from above and from the side. In yet other embodiments, the collection tube holder 5120 may comprise a circular or square tube with fully enclosed sides. In another embodiment the collection tube holder may comprise at least one arm or protrusion with a securing means for securing a collection tube or container to the collection tube holder. The securing means may be a friction fit opening, a set of magnets, a magnet and an element of magnetically receptive material, a metallic or plastic clip or fastener, a hook-and-loop fastener, or a retaining ring or collar.

In preferred embodiments, the two or more arms 5126 are expansible to accommodate various sizes of collection tubes 5130. In one embodiment, a volume capacity of the collection tubes ranges from about 50 mi to about 300 ml. For example, the collection tubes may have a volume of 50 mi or 250 ml. In another embodiment, a diameter of the collection tubes may range from about 100 mm to about 200 mm. In another embodiment, a diameter of the collection tubes may range from about 50 mm to about 150 mm. A height of the collection tubes may range from about 150 mm to about 250 mm. In other embodiments, the height of the tube holder may be shorter than the collection tubes. The height of the tube holder may range from 50 mm to 100 mm. However, any suitable collection tube or container as secured to a rotatable or movable base plate by any suitable means, such as those described herein, may be used.

Figure 35B:
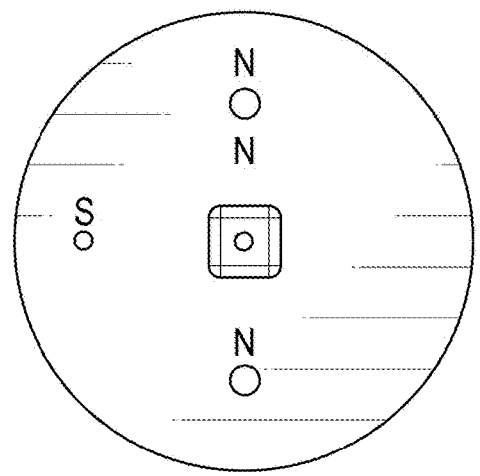
FIG. 35B is a top view of a Hall Effect sensor integrated into a motor of the sample mixing system. The Hall Effect sensor is activated by a south pole and used for position detection. A singular magnet has its south pole oriented toward the sensors; all other magnets will be oriented with their north pole toward the sensors.

In some embodiments, the sample mixing system 5100 may further comprise one or more Hall Effect sensors. In a non-limiting embodiment, as shown in FIG. 35B, one of the magnets 5112 in the rotary base 5110 may have its south pole oriented towards the one or more Hall effect sensors and the other magnets 5112 may be oriented with their north pole directed toward the one or more Hall effect sensors. The north end or pole of the magnets 5112 at the top and bottom of the base 5110 are configured to hold or retain sample tube loaders in position on the base 5110. The sample tube loaders hold and position sample collection tubes or containers at the position of the magnets. In another embodiment, one or more sample tube holders are integral to the base 5110. In another embodiment, the sample tube holders are retained by pressure fit into corresponding openings on the base, by one or more plastic clips, by spring loaded clamps, or by one or more fasteners such as screws, bolts, or rivets. In one embodiment, the magnet 5112 with the south end or pole disposed at the top of the base 5110 is used to track or home to a return position or a position 0. The Hall Effect sensor may be used to detect or identify this magnet to determine the position 0, and thereafter the base 5110 may be rotated or turned to a collection position. Other sensors may be used instead of Hall Effect sensors and a corresponding magnet to track or home to a return position or a position 0 such as an optical sensor and corresponding mark or physical feature of the base 5110, an electrical switch, an electrically conductive area on the base 5110 and corresponding conductive area at a fixed position, a mechanical switch, a hard stop such as a physical lip, edge, or engagement tab on the base 5110, or an absolute encoder. Any of these sensor types may be used to identify a return or position 0 and to cause the base 5110 to move to a specific or set position.

According to some embodiments, the sample mixing system 5100 may be implemented in a method of mixing a sample. For example, the present invention can be used in processing a semen sample, for instance, mixing sperm cells. When used in a sample processing system in this manner, the sample mixing system 5100 may be a component of a flow cytometry system, such as one that employs a microfluidic chip and one or more optical components in the processing of components or particles in a sample. This may be, for example, the determination of a characteristic of a particle, such as an amount or type of DNA in a sperm cell. Samples processed by a flow cytometry system in this manner would exit a processing region and would be collected in a sample collection container or tube and may be collected with additional media or fluids in which the sample is required to remain in a suspension, such as a homogeneously mixed suspension.

Figure 36A:
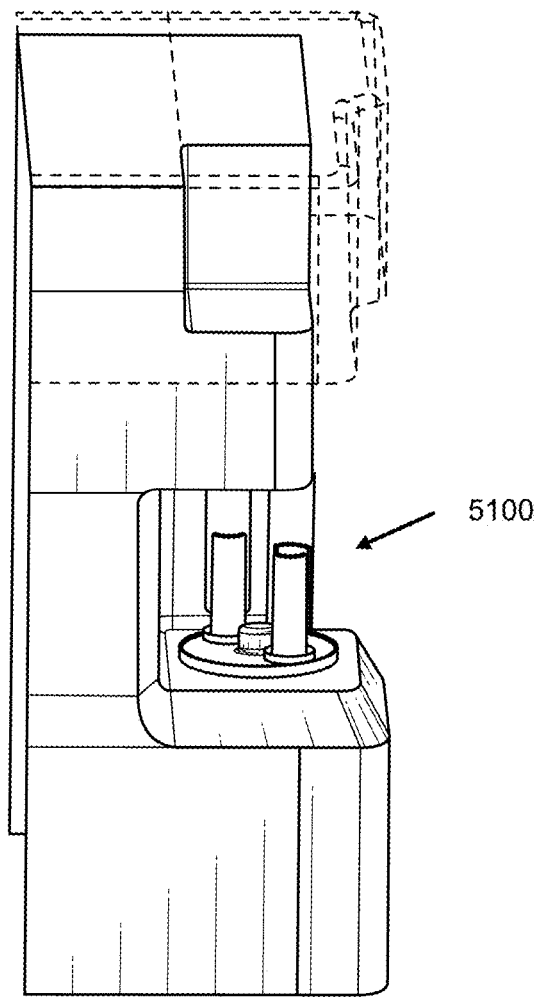
Figure 36B:
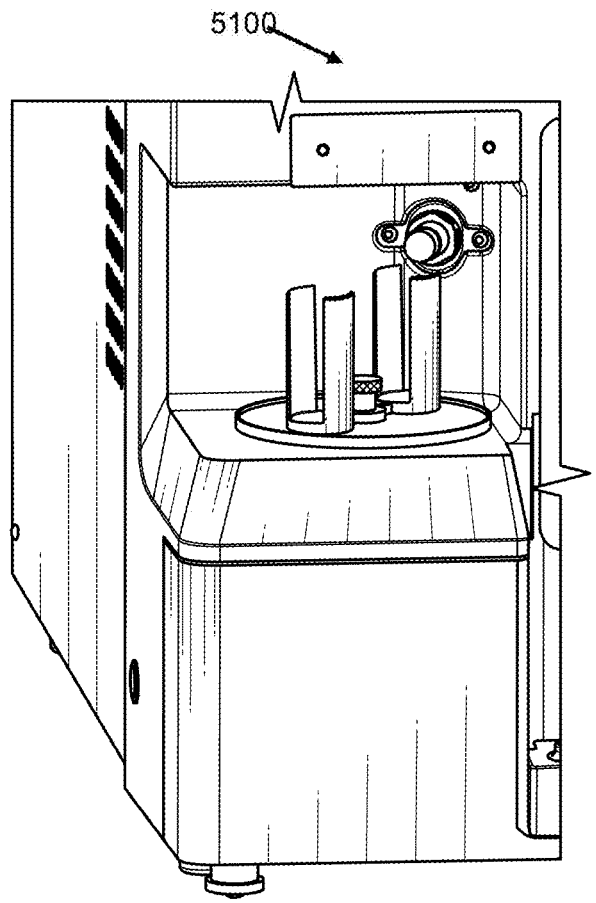

As shown in FIGS. 36A-36B, in one embodiment, the system 5100 can be positioned under a dispensing instrument. The dispensing instrument can dispense a sample into one of the collection tubes 5130 as the rotary base moves in the arcuate path. In a preferred embodiment, the collection tube 5130 receiving the sample remains under a dispensing path of the dispensing instrument as said collection tube 5130 moves in the arcuate path, thereby mixing the sample in the collection tube 5130. In a non-limiting embodiment, the sample may comprise sperm cells and the collection tubes 5130 can contain media. Without wishing to limit the present invention to a particular theory or mechanism, the method can reduce the time that the cells are in an overconcentrated solution of media. For example, the media may be buffered media that is in the tube prior to adding sample or added along with the sample. The media is mixed or agitated to maintain buffering and control a degree of buffering.

In some embodiments, the sample may be dripped into the collection tube. In other embodiments, the sample may be continuously dispensed into the collection tube. A fluid pump, such as a syringe pump, or other suitable hydraulic or pneumatic pump may be used to force the sample through a flow cytometer device such as through a microfluidic chip. The sample is inserted into the flow cytometer, is processed by one or more systems or elements of the flow cytometer, and is expelled through one or more outlets at a terminal end of the flow cytometer. For example, in one embodiment the sample and at least one sheath fluid are inserted into a microfluidic chip, the sample is processed at an action or interrogation region of the microfluidic chip such as by a set of electromagnetic radiation emission devices (e.g., laser modules and associated optics), and is expelled from one or more outlets at a terminal end of the microfluidic chip. The processed sample then drips, drops, or drains down, by operation of fluid pressure and/or gravity, through one or more channels or openings and into a sample collection tube.

After mixing the sample in the one collection tube 5130, e.g. "In use" tube", for a period of time, the system 5100 may automatically place another collection tube 5130, e.g. "In queue" tube, under the dispensing instrument such that the sample is dispensed into said collection tube 5130. In some embodiments, the period of time for mixing is about 3 to 8 minutes.

Liquid Level Sensor

Figure 39A:
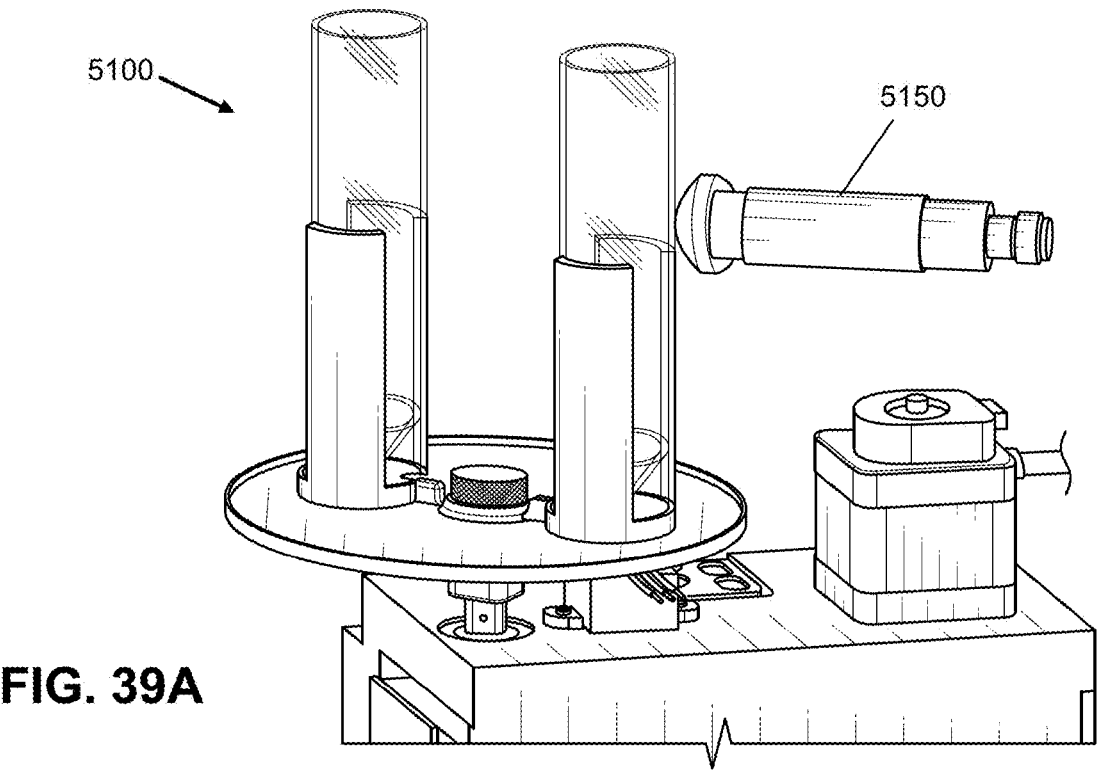
FIG. 39A shows another embodiment of the liquid level sensor being used with the sample mixing system. The liquid level sensor is positioned about 10 mm away from the collection tube.
Figure 39B:
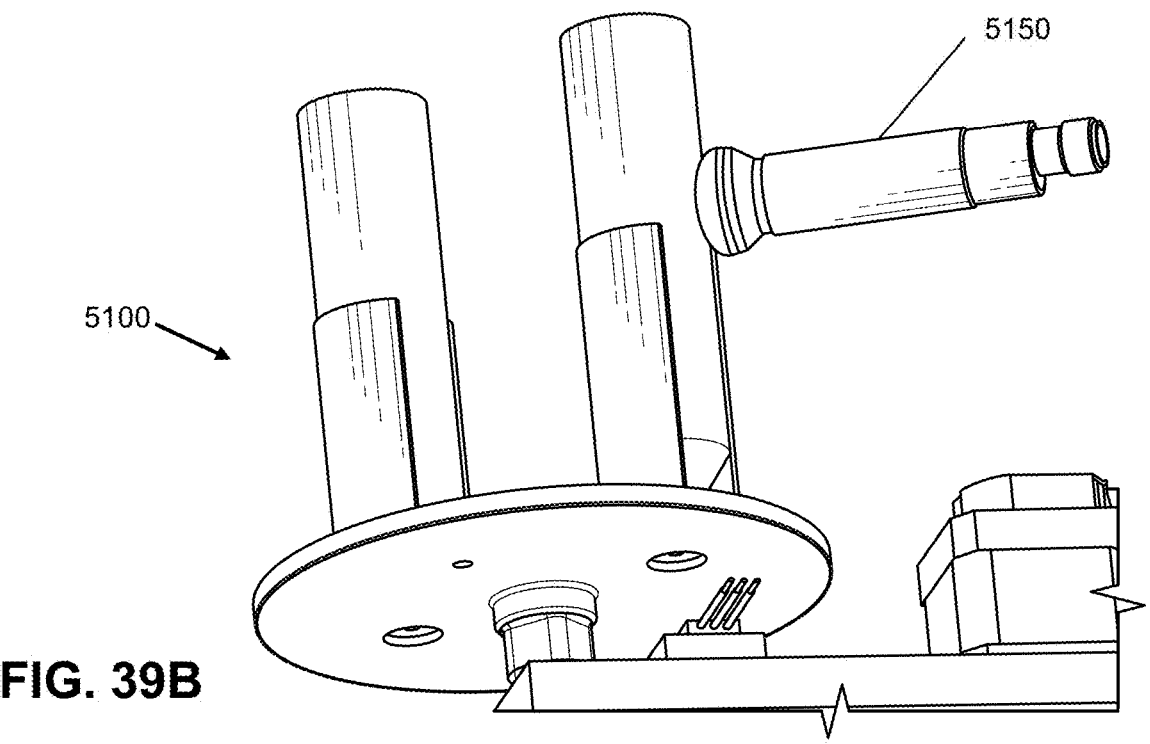
FIG. 39B shows the liquid level sensor is positioned about 6 mm away from the collection tube.

In some embodiments, the sample mixing system includes a sensor for detecting a liquid level inside the collection tube. The sensor may be positioned at or near a surface of the collection tube. For example, the sensor is positioned 1-10 mm from the surface. In one embodiment, FIGS. 38A-38B show an example of a square capacitive sensor for liquid level detection. In another embodiment, FIGS. 39A-39B show an example of a tubular capacitive sensor for liquid level detection. In other embodiments, the liquid level sensor is an infrared sensor.

Without wishing to be bound to a particular theory or mechanism, the liquid level sensor can detect when a desired level of fluid is reached in the collection tube. When the liquid level is met, the system 5100 automatically places another collection tube 5130 under the dispensing instrument and the liquid level sensor then detects the liquid level inside this collection tube. This may be done, for example, by rotating the base 110 to position another collection tube under a sample collection location or sample dispensing path. When a first tube is determined to be filled to a desired level, or when the sensor detects fluid at a certain level, such as when fluid is sloshed or elevated to a certain point by mixing the sample fluid in the first collection tube, the first collection tube may be rotated out of the sample dispensing path and a second tube may be rotated into the path. When no collection tube is under the sample dispensing path or at the sample dispensing location, the sample being processed may be dumped or diverted into a waste collection location as described below.

Auto Dump Module

Figure 40A:
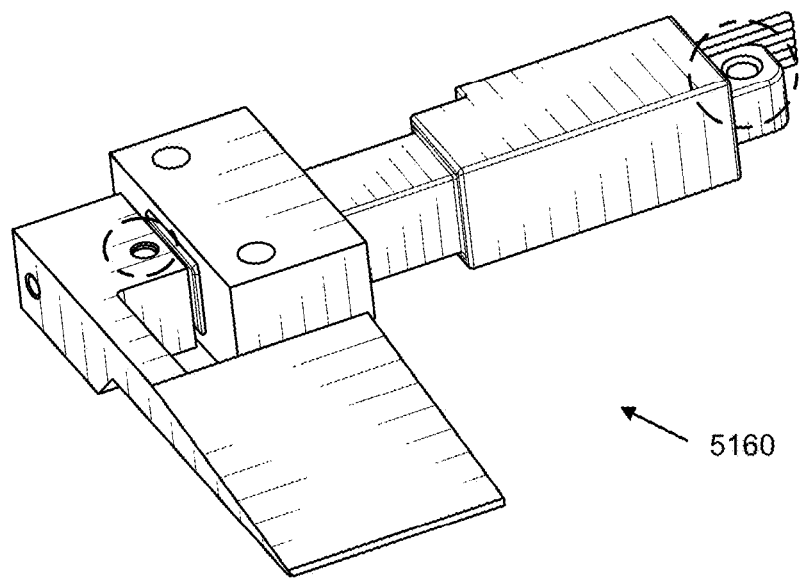
FIGS. 40A-40B show an auto dump component of the sample mixing system.
Figure 40B:
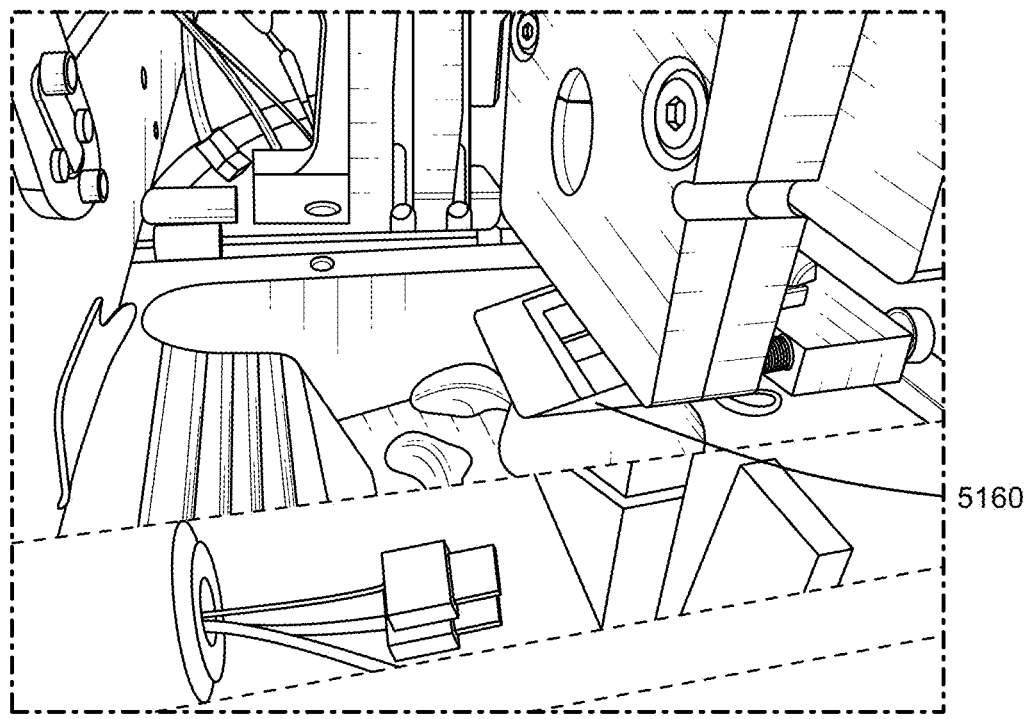

Referring to FIGS. 40A-40B, in some embodiments, an auto dump subsystem may be coupled with the sample mixing system. The "auto dump" system comprises a mechanical diverter that is configured to route the path of a sample processed by a flow cytometer, such as a microfluidic chip-based system. The mechanical diverter of the auto dump is used to automatically divert, re-route, or change the pathway of a processed sample based on a determined set of parameters. For example, the mechanical diverter of the auto dump may be configured to automatically divert or re-route the path of a processed sample based on a determination that the sample comprises components or particles (e.g., cells such as sperm cells) that were not properly processed by the flow cytometry system. In one embodiment, this may be one or more sperm cells in a semen sample that were not fully or properly deactivated by a laser-based "laser kill" system for the flow cytometer. If cells that should have been deactivated are present in a processed sample, the sample may be diverted into a waste collection location.

Without wishing to limit the invention, the mechanical diverter or auto dump is configured to prevent flow from entering the collection tube through an autonomous system at the software's discretion. In some embodiments, the auto dump may comprise a cap for dispersing sheath fluid away from a collection chute. The auto dump cap may be coated with a fluoropolymer, such as CYTOP™. In other embodiments, fluid droplets are unable to roll underneath the cap. In one embodiment, the cap may include an undercut to further ensure that no fluid goes underneath the cap.

In one embodiment, a flow cytometry system, such as a microfluidic chip based system, continuously processes a sample. The entire processed sample is collected in a sample collection tube, and no sample is diverted to another collection location, such as a waste collection location, within the microfluidic chip. However, it may be desirable to divert the processed sample after it has been expelled from an outlet in the microfluidic chip under certain circumstances. For example, if processing components, such as laser optical components, become uncalibrated or misaligned the sample being processed may comprise undesirable elements which should have been removed or deactivated by the processing system. This may be a subset of the sample that should have been removed or deactivated, such as cells in the sample that should have been removed or deactivated by the processing system. If this occurs, the improperly processed sample is mechanically diverted such that it is not collected in a sample collection tube. This prevents a processed sample comprising undesirable characteristics from mixing with or contaminating a sample comprising desirable characteristics.

This may be referred to as "filtering" or "not filtering." For example, a default position may be a normally-closed mechanical diverter that "filters" all samples from a microfluidic chip unless a set of desired conditions are met. This may be wherein the sample comprises only or primarily cells or particles having certain characteristics, such as DNA content, or when an appropriate sample collection tube is positioned to collect the processed sample. If the desired conditions are met, the mechanical diverter is opened such that it is not filtering the processed sample. When the diverter is opened, the processed sample may be collected, such as by a sample collection tube. A filtered sample may be dumped or diverted into a waste collection location, such as in a waste collection bin, or a sample collection tube designated for waste collection.

The mechanical diverter may be operated by a linear actuator, such as a two position linear actuator, a solenoid, or a fluid actuated rotary system, such as a pneumatic actuated rotary system comprising a rotary cap having at least one opening to permit a processed sample to be collected in a sample collection tube.

In some embodiments, the auto dump subsystem can tolerate all chemicals used in the process. The subsystem can also determine if the collection chute is opened or closed. In other embodiments, the subsystem can be disassembled and reassembled for maintenance inside of the instrument. For example, two screws, circled areas in FIG. 40A, can be removed to remove an actuator of the auto dump subsystem 5160.

Figure 41:
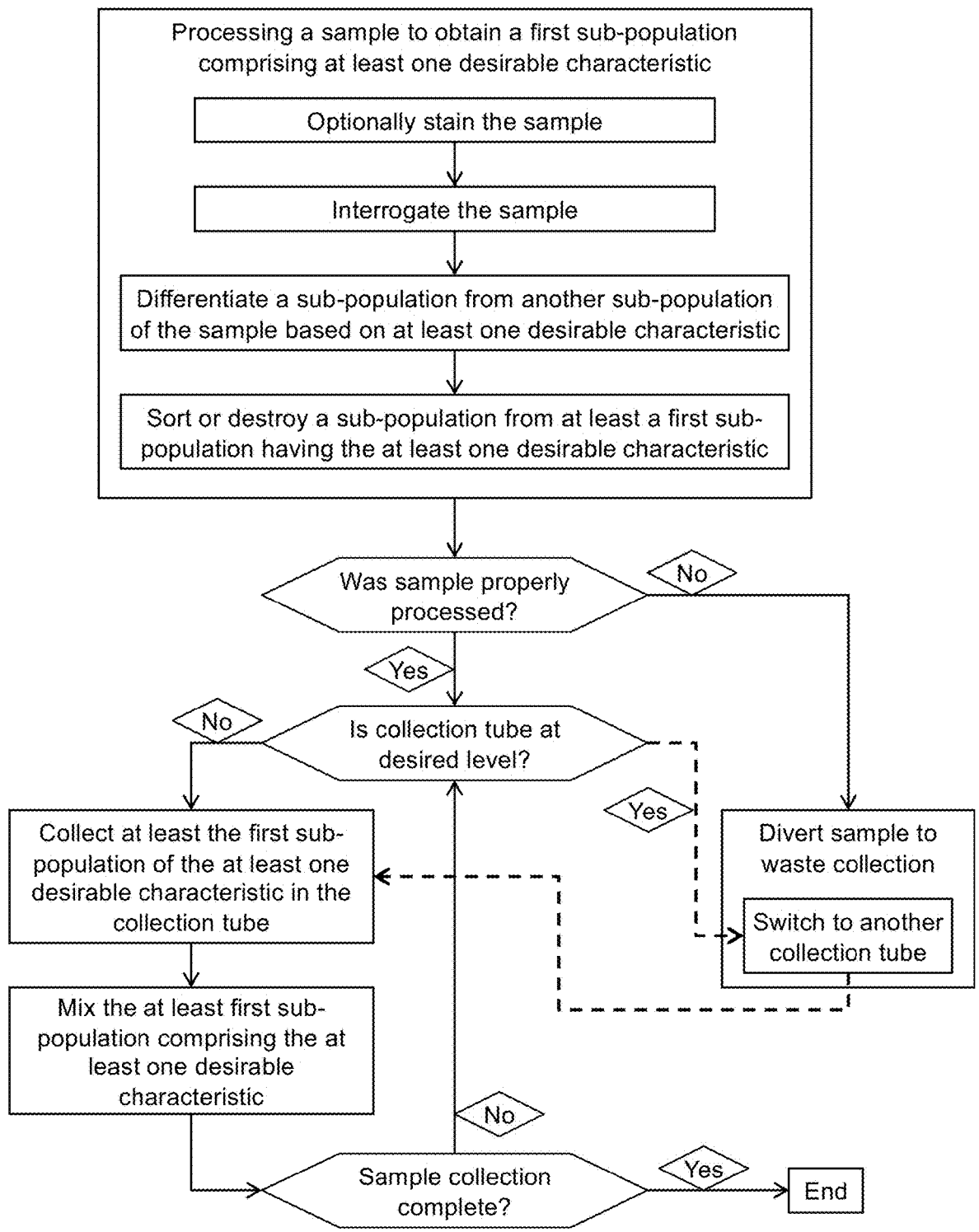
FIG. 41 is a non-limiting flow chart for processing a sample according to an embodiment of the present invention.
Figure 42A:
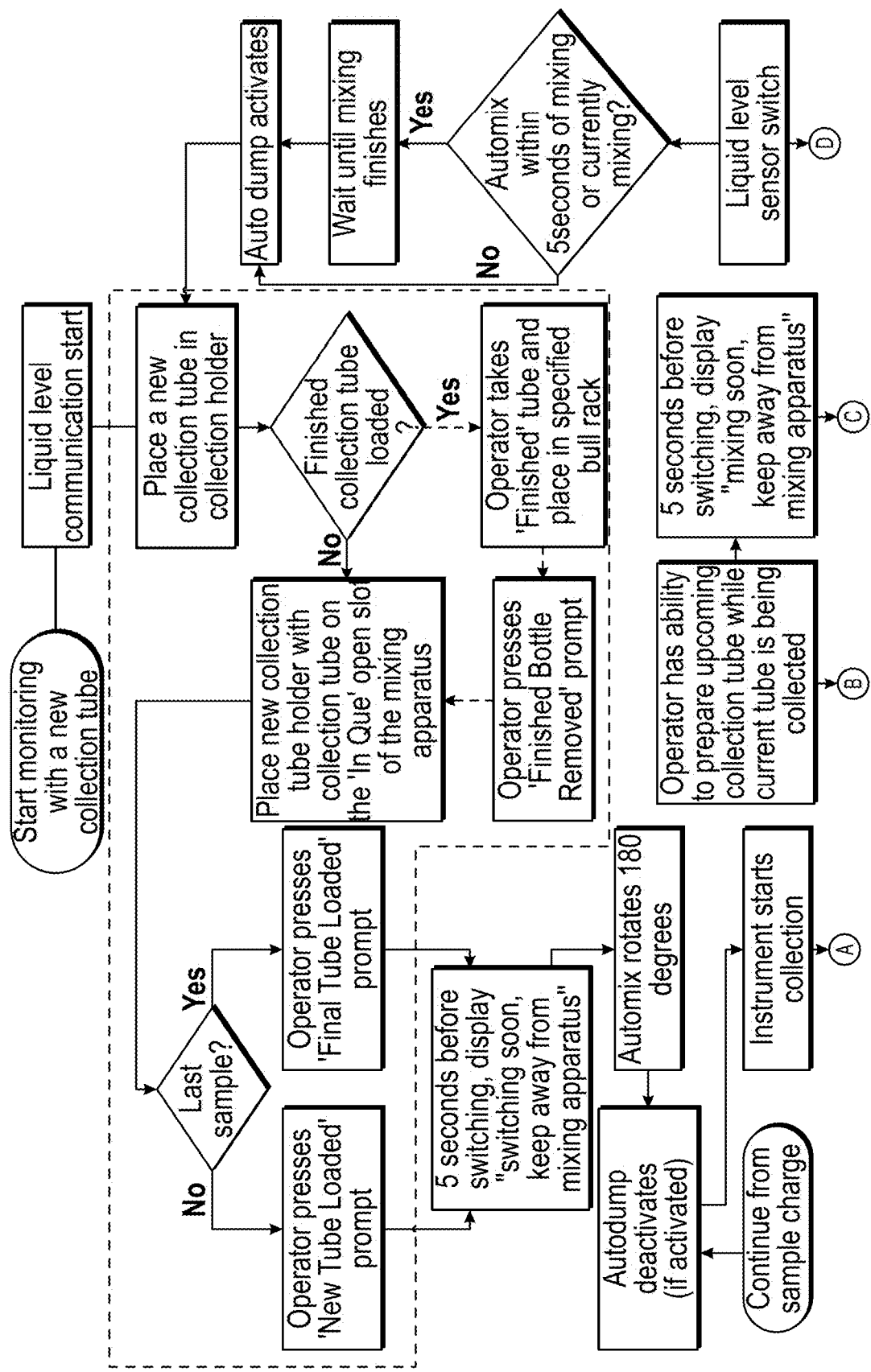
FIG. 42A-42B is a block flow diagram of a method for collecting and mixing a sample in accordance with the present invention.
Figure 42B:
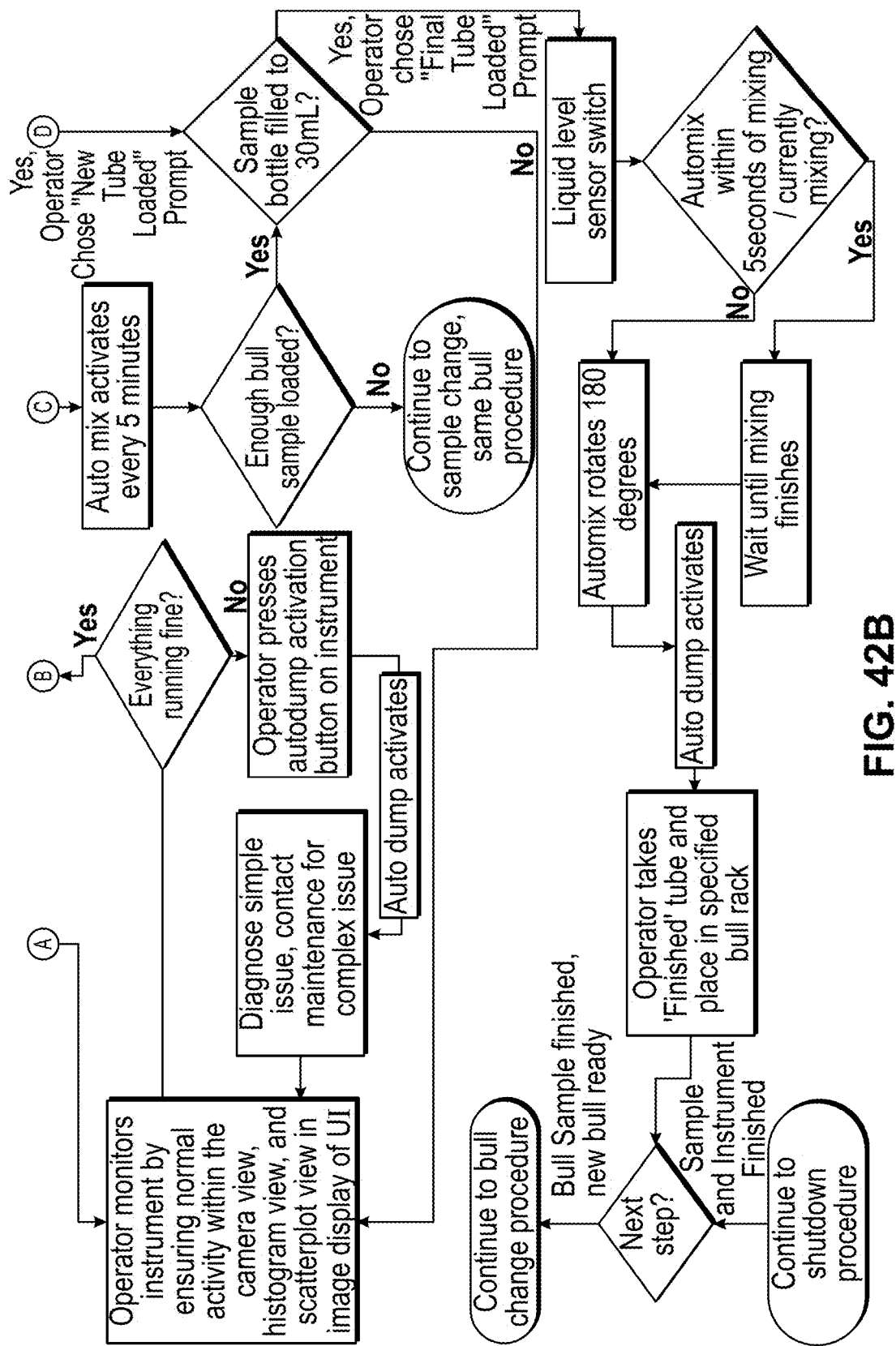

Without wishing to limit the present invention to a particular application or embodiment, the systems, apparatuses, and methods of the present invention may be used with a particle processing system such as a semen sexing system, demonstrated in FIG. 41. In one embodiment, the semen sexing system may comprise a flow cytometry apparatus or a microfluidic chip or device, comprising a flow chamber configured to direct a fluid stream including sample particles through a particle interrogation location. The sample particles may be cells such as spermatozoa which have been stained or otherwise processed prior to entering the flow cytometry apparatus or microfluidic device. The flow cytometry device may further comprise a laser configured to emit electromagnetic radiation along a beam path to the particle interrogation location and a detector configured to detect an emission from the particle. Subsequent to the detection, the particle may be sorted or destroyed, such as by ablation by electromagnetic radiation, prior to or after exiting the flow cytometry apparatus or microfluidic device. The sample mixing system of the present invention may be used to mix samples of particles and fluid collected subsequent to the interrogation, determination, and sorting or destruction processes.

The sample mixing system of the present invention may also be used with or in a method for analyzing particles, such as sperm cells, contained in a fluid stream as the particles flow through an interrogation location in a flow cytometry apparatus or in a microfluidic chip or device. Such a method comprises using electromagnetic radiation emitted from a laser to illuminate a fluid stream and the particles contained therein. A detector, such as an avalanche photodiode, detects electromagnetic radiation emitted from the interrogation location by the particle, and a processor determines characteristics of the particle in the fluid stream based in part on a signal from the detector. Subsequent to the detection, the particle may be sorted or destroyed, such as by ablation or photo-damaging by electromagnetic radiation, prior to or after exiting the flow cytometry apparatus or microfluidic device. The sample mixing system of the present invention may be used to mix samples of particles and fluid collected subsequent to the interrogation, determination, and sorting or destruction processes.

The sample mixing system of the present invention may also be used with or in a method for assessing an amount of DNA within a nucleus of a sperm cell using a flow cytometry apparatus or a microfluidic chip or device. The method may include staining the DNA within the nucleus of the sperm cell and then irradiating the stained DNA within the nucleus of the sperm cell by an electromagnetic emission device such as a laser as the sperm cells passes by the laser in a corresponding region of the flow cytometry apparatus or microfluidic device. A detector, such as an avalanche photodiode, detects fluorescent light emitted from the irradiated and stained DNA within the nucleus of the sperm cell at a detection or interrogation location within the flow cytometry apparatus or microfluidic device. The method may further include differentiating X chromosome bearing sperm cells and Y chromosome bearing sperm cells by first determining a sex of a sperm cell using the detected amount of DNA within the nucleus of the sperm cell and then differentiating between a plurality of sperm cells based upon said sex determination. The characteristics of the sperm cells may include corresponding amounts of DNA within the nuclei of the sperm cells. The method may further include deactivating a given sperm cell based upon the determined amount of DNA within the nucleus of the given sperm cell. Said deactivating may include photo-damaging or ablating the given sperm cell by an emission of electromagnetic radiation.

In other embodiments, the method may further include forming droplets a plurality having one of said sperm cells entrained, charging each of said droplets differentially based upon said sex differentiation characteristic of said sperm cells entrained in said droplets, deflecting each of said droplets, and differentially collecting each of said droplets based upon said sex differentiation characteristic of said sperm cells entrained in said droplets. The method may further include collecting the sperm cells after the determination, sorting, or deactivation as the sperm cells exit the microfluidic device. The sample mixing system of the present invention may be used to mix samples of particles and fluid collected subsequent to the interrogation, determination, and sorting or destruction processes.

Additional Automated Features

In some embodiments, in addition to automating the sample routing using the mechanical diverter or auto dump, and in addition to automating the sample mixing process using the sample mixing system, additional elements of a flow cytometry-based particle processing system may be automated. For example, parameters relating to a fluid pressure to be used with a sample, an amount, volume, or rate of sheath fluid to be used, a power or duration of a laser module, or a desired characteristic to be identified in a particle such as a cell, may be automatically determined based on a sample type detected by the flow cytometry system or entered by an operator. In one embodiment, this may comprise scanning, by an operator, a tag or identifier on a sample. The tag or identifier, which may be a barcode, OR code, RFID tag, or similar information encoding tag, on the sample may comprise a set of configuration information for the flow cytometry system or may comprise an address, pointer, or link to a location where such information is stored. Based upon the information scanned on the tag or identifier on the sample, the flow cytometry system may be automatically configured with optimal parameters for the individual sample or sample type.

For example, a semen sample from an individual *Bos taurus* bull may differ in consistency, sperm cell density, pH (e.g., acidity), fertility, or fragility, and may require specific parameters for successful processing of the semen sample, such as to identify and deactivate sperm cells from within the sample that comprise an amount or type of DNA, such as X chromosome containing sperm cells or Y chromosome containing sperm cells. The specific processing requirements may be stored on a tag or identifier on the sample, or in a database record or location identified by the tag or identifier, and those processing requirements may comprise configuration requirements for the flow cytometry-based system.

Flow rates and/or pressures for the sample and sheath fluid, a chromosome type to be detected, a laser power and/or duration, a pH for a media, an amount or type of additives to be automatically introduced by the system, and other parameters may be set and automatically executed by the system for that specific sample. In this manner, the sample may be processed under conditions ideal for the specific sample without requiring a human operator to look up, configure, or calibrate the flow cytometry system using this information in a piecemeal manner.

EMBODIMENTS

The following embodiments are intended to be illustrative only and not to be limiting in any way.

Embodiment Set A

Embodiment A1: A modular flow cytometry system for processing a sample, the system comprising:
- a support structure;
- an electronics module;
- a sample pathway module;
- a fluidics module;
- an interrogation module; and
- a sample mixing and collection module;
- wherein each module is disposed in the support structure, wherein each module is configured to be separately removed and re-installed or replaced with another of the same module.

Embodiment A2: The system of embodiment A1, further comprising a microfluidic device cleaning module for cleaning the sample pathway module.

Embodiment A3: A modular flow cytometry system for processing a sample, the system comprising:
- a support structure;
- an electronics module comprising one or more of computer processors and electronic ports;
- a sample pathway module comprising a microfluidic module having at least one microfluidic channel;
- a fluidics module fluidically coupled to the sample pathway module for circulating one or more fluids through the sample pathway module;
- an interrogation module operatively coupled to the electronics module, the interrogation module including a detector, a detection laser and a kill laser for processing a sample flowing through the microfluidic chip; and
- a sample mixing and collection module configured to collect and mix the processed sample exiting the microfluidic module;
- wherein each of the modules is disposed in the support structure, wherein each module is configured to be separately removed and re-installed or replaced with another of the same module for near-continuous operation of the modular flow cytometry system.

Embodiment A4: The system of embodiment A3, wherein the kill laser and the detection laser are disposed on a common side of the interrogation module with respect to each other.

Embodiment A5: The system of embodiment A3 or embodiment A4, wherein the sample mixing and collection module rotates about a pivot so as to move in an arcuate path, which allows for mixing of the sample in a uniform and controlled motion.

Embodiment A6: A modular flow cytometry system for sexing a sample, the system comprising:
- a chassis sectioned into a plurality of levels;
- an electronics module disposed in the first level of the chassis, the first level being the lowest of the plurality of levels, wherein the electronics module includes one or more computer processors and a plurality of electronic ports;
- a sample pathway module disposed in the second level of the chassis, wherein the sample pathway module includes a microfluidic module for holding a microfluidic chip;
- a fluidics module disposed in the second level of the chassis, wherein the fluidics module is fluidically coupled to the sample pathway module for circulating one or more fluids through the sample pathway module;
- an interrogation module disposed in the third level of the chassis and operatively coupled to the electronics module, the interrogation module including a detection laser operatively coupled to a detection assembly, and a kill laser operatively coupled to the detection assembly for processing a sample flowing through the microfluidic chip, wherein the kill laser and the detection laser are disposed on a common side of the interrogation module with respect to each other; and
- a sample mixing and collection module disposed below the microfluidic module in the same second level of the chassis, wherein the sample mixing and collection module is configured to collect and automatically mix the processed sample exiting the microfluidic chip, wherein the sample mixing and collection module rotates about a pivot so as to move in an arcuate path, which allows for mixing of the sample in a uniform and controlled motion;
- wherein each module is configured to be separately removed and re-installed or replaced with another of the same module for near-continuous operation of the modular flow cytometry system.

Embodiment A7: The system of any one of embodiments A3-A6, wherein the sample pathway module further comprises a distribution block fluidically coupled to the microfluidic module, wherein the distribution block delivers the sample to the microfluidic module via a first fluidic line, and a sheath fluid to the microfluidic module via a second fluidic line.

Embodiment A8: The system of embodiment A7, wherein the distribution block comprises a fluidic manifold.

Embodiment A9: The system of embodiment A7 or embodiment A8, wherein the distribution block further comprises a sample tube loader.

Embodiment A10: The system of any one of embodiments A3-A9, further comprising a microfluidic device cleaning module.

Embodiment A11: The system of embodiment A10, wherein the microfluidic device cleaning module comprising a microfluidic device cleaning module, comprising:
- a set of fluid reservoirs;
- a pump assembly;
- a distribution block interface comprising a distribution block securing element and a distribution block alignment element, the distribution block interface further comprising a set of fluid interfaces, at least one of the set of fluid interfaces in fluid communication with at least one of the set of fluid reservoirs; and
- a microfluidic device interface comprising a microfluidic device securing element and a microfluidic device alignment element, the microfluidic device interface further comprising a fluid interface, the fluid interface in fluid communication with at least one of the set of fluid reservoirs;
- wherein the distribution block interface is adapted to secure the distribution block thereon, wherein the microfluidic device interface is adapted to secure the microfluidic module thereon, wherein the microfluidic device cleaning system is adapted to clean the sample pathway module circulating a fluid through the sample pathway module.

Embodiment A12: The system of any one of embodiments A6-A11, wherein the kill laser and the detection laser are each disposed on a common side relative to a primary surface of the microfluidic chip.

Embodiment A13: The system of any one of embodiments A3-A12, wherein the kill laser and the detection laser are each adapted to emit a laser beam comprising an elliptical beam profile at a focal plane.

Embodiment A14: The system of any one of embodiments A1-A13, wherein the sample mixing and collection module comprises:
- a rotary base;
- a set of collection tube holders disposed on top of the rotary base;
- a set of collection tubes, each tube configured to be disposed in a collection tube holder of the set of collection tubes; and
- a fluid level sensor;
- wherein one of the collection tubes is positioned below the microfluidic chip such that the processed sample is collected in said collection tube,
- wherein when the fluid level sensor detects that said collection tube has reached a desired fill level, the sample mixing and collection module is configured to switch to another collection tube for collecting the processed sample.

Embodiment A15: The system of any one of embodiments A1-A14, wherein the sample mixing and collection module further comprises a mechanical diverter configured to prevent the processed sample exiting the microfluidic module from entering sample mixing and collection module.

Embodiment A16: The system of any one of embodiments A1-A15, wherein the interrogation module comprises laser heat sinks for the lasers, wherein the laser heat sinks can draw in air via natural convection for cooling the interrogation module.

Embodiment A17: The system of any one of embodiments A1-A16, wherein the sample is a semen sample comprising sperm cells.

Embodiment A18: The system of any one of embodiments A1-A17, wherein the electronics module includes an electronics box with a removable lid for housing the computer processors and other electronic components, wherein the electronic components can be removed and replaced or reconnected.

Embodiment A19: The system of embodiment A18, wherein the electronics box is disposed on rails for ease of movement.

Embodiment A20: The system of any one of embodiments A1-A19, wherein the electronics module includes one or more fans for cooling the electronic components.

Embodiment A21: The system of any one of embodiments A1-A20, wherein the interrogation components in the interrogation module can be removed and replaced or reconnected.

Embodiment A22: The system of any one of embodiments A6-A21, wherein the microfluidic chip includes one or more identifying elements disposed on a surface or etched into said surface of the microfluidic chip.

Embodiment A23: The system of embodiment A22, wherein the one or more identifying elements comprise alpha-numeric sequences, bar codes, QR-codes, fiducial markers, or combinations thereof.

Embodiment A24: The system of embodiment A22 or embodiment A23, wherein the one or more identifying elements are used to identify the chip that is currently loaded in the microfluidic module.

Embodiment A25: The system of any one of embodiments A22-A24, wherein the identifying elements are used for automatically aligning and positioning the microfluidic chip relative to the detection and kill lasers.

Embodiment A26: The system of any one of embodiments A22-A25, wherein the microfluidic chip with the identifying elements is mounted onto a multi-axis stage that readjusts the position of the microfluidic chip.

Embodiment A27: The system of any one of embodiments A1-A26, further comprising an automated sample level detector adapted to utilize a sample flow rate to determine the sample level and provide notification of when the sample level is below a threshold level.

Embodiment A28: A method of sperm sexing, comprising:
- classifying sperm cells as having a first characteristic, a second characteristic, or a third characteristic; and
- selectively damaging at least a portion of the sperm cells based on their classification.

Embodiment A29: The method of embodiment A28, wherein the first characteristic is the presence of an X-chromosome from one sperm cell, wherein the second characteristic is the presence of a Y-chromosome from one sperm cell, and wherein the third characteristic is the presence of both X and Y chromosomes or a repetition of one of the chromosomes due to multiple sperm cells.

Embodiment A30: A method of sperm sexing, comprising:
- interrogating stained sperm cells with a first radiation source to produce fluorescence emissions therefrom;
- detecting said fluorescence emissions;
- classifying the sperm cells based on the detected fluorescence emissions; and
- selectively damaging the sperm cells with a second radiation source based on their classification.

Embodiment A31: A method of sperm sexing, comprising:
- delivering a fluid stream comprising stained sperm cells to an interrogation location;
- interrogating the stained sperm cells with a first laser to produce fluorescence emissions therefrom;
- detecting said fluorescence emissions;
- classifying the sperm cells based on the detected fluorescence emissions; and
- selectively damaging with a second laser one or more sub-populations of the classified sperm cells based on their classification.

Embodiment A32: The method of any one of embodiments A28-A31, further comprising dyeing sperm cells to produce the stained sperm cells.

Embodiment A33: The method of any one of embodiments A28-A32, wherein said sperm cells are dyed with a fluorescent DNA-binding dye.

Embodiment A34: The method of any one of embodiments A30-A33, wherein interrogating the stained sperm cells produces a fluorescence emission corresponding to one sperm cell or a fluorescence emission corresponding to multiple sperm cells.

Embodiment A35: The method of any one of embodiments A28-A34, wherein damaging the sperm cells causes DNA and/or membrane damage to the cell.

Embodiment A36: The method of any one of embodiments A28-A35, wherein damaging the sperm cells results in said sperm cells becoming infertile or dead sperm cells.

Embodiment A37: A method for producing a sexed semen product, the method comprising:
- providing a modular flow cytometry system comprising an electronics module, a sample pathway module, a fluidics module, an interrogation module, and a sample mixing and collection module, wherein each module is disposed in a support structure, wherein each module is configured to be separately removed and re-installed or replaced with another of the same module;

flowing a semen sample having stained sperm cells through the fluidics module and sample pathway module;

flowing sheath fluid through the fluidics module and sample pathway module;

fluorescing the stained sperm cells using a detection laser in the interrogation module;

detecting a fluorescence of the stained sperm cells;

damaging a subpopulation of stained sperm cells using a kill laser in the interrogation module based on the detected fluorescence, thereby producing the sexed semen product;

collecting the sexed semen product flowing from the sample pathway module into the sample mixing and collection module; and mixing the collected sexed semen product.

Embodiment A38: The method of embodiment A37, wherein emissions from the detection laser and kill laser comprise an elliptical beam profile.

Embodiment A39: The method of embodiment A37 or embodiment A38, further comprising dyeing a semen sample comprising sperm cells to produce the stained sperm cells.

Embodiment A40: The method of any one of embodiments A37-A39, wherein the sample mixing and collection module rotates about a pivot so as to move in an arcuate path, which allows for mixing of the sexed semen product in a uniform and controlled motion.

Embodiment A41: The method of any one of embodiments A37-A40, further comprising cleaning the sample pathway module using a microfluidic device cleaning module.

Embodiment A42: A method for producing a sexed semen product, the method comprising:
  providing a modular flow cytometry system of any one of embodiments A6-A27;
  dyeing a semen sample comprising sperm cells to produce stained sperm cells;
  flowing the semen sample through the fluidics module and sample pathway module;
  flowing sheath fluid through the fluidics module and sample pathway module, wherein the sheath fluid, one or more channels in the microfluidic chip, or a combination thereof focus the stained sperm cells as they flow in the microfluidic chip;
  fluorescing the stained sperm cells by emissions from the detection laser, wherein the emissions from the detection laser comprise an elliptical beam profile;
  detecting a fluorescence of the sperm cells by the detection assembly;
  deactivating one or more subpopulations of the stained sperm cells by emissions from the kill laser based on the detected fluorescence, thereby producing the sexed semen product, wherein the emissions from the kill laser comprises an elliptical beam profile, wherein the detection laser and the kill laser are disposed on a same side of the microfluidic chip;
  collecting the sexed semen product flowing from the microfluidic chip into the sample mixing and collection module; and
  automatically mixing the collected sexed semen product based on a set of defined sample mixing parameters associated with the processed sample, wherein the sample mixing and collection module rotates about a pivot so as to move in an arcuate path, which allows for mixing of the sexed semen product in a uniform and controlled motion.

Embodiment A43: The method of embodiment A42, further comprising diverting the flow of the sexed semen product exiting from the microfluidic chip into a separate collector and away from the sample mixing and collection module.

Embodiment A44: The method of embodiment A42 or embodiment A43, further comprising:
  diverting the flow of the sexed semen product away exiting from the microfluidic chip when a collection tube of the sample mixing and collection module is filled to a desired level with the sexed semen product;
  rotating a rotary base of the sample mixing and collection module such that a second collection tube is positioned to collect the sexed semen product; and
  diverting the flow of the sexed semen product to the second collection tube.

Embodiment A45: The method of any one of embodiments A42-A44, further comprising automatically aligning and positioning the microfluidic chip relative to the detection and kill lasers by using identifying elements disposed on the microfluidic chip.

Embodiment A46: The method of any one of embodiments A42-A45, further comprising determining a sample level using an automated sample level detector and providing notification of when the sample level is below a threshold level.

Embodiment A47: The method of any one of embodiments A42-A46, further comprising cleaning the sample pathway module using a microfluidic device cleaning module.

Embodiment Set B

Embodiment B1: A replaceable and removable fluid pathway module for use in a flow cytometer system, the fluid pathway comprising:
  a distribution block comprising a set of fluid inlets and a set of fluid outlets, wherein at least one of the set of fluid inlets is in fluid communication with at least one of the set of fluid outlets forming a first sample pathway element;
  a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and
  a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming a sample pathway;
  wherein a sample processed by the flow cytometer system via the replaceable and removable fluid pathway module is confined to the sample pathway during processing.

Embodiment B2: The fluid pathway module of embodiment B1, wherein the microfluidic device retainer is adapted to secure one of a microfluidic chip or a microfluidic cassette in the microfluidic module.

Embodiment B3: The fluid pathway module of embodiment B2, wherein the microfluidic device retainer comprises one or more adjustment means adapted to adjust the position of the microfluidic chip or the microfluidic cassette.

Embodiment B4: The fluid pathway module of any one of embodiments B1-B3, wherein the distribution block comprises a fluidic manifold.

Embodiment B5: The fluid pathway module of any one of embodiments B1-B4, wherein the distribution block further comprises a sample tube loader.

Embodiment B6: The fluid pathway module of any one of embodiments B1-B5, further comprising:
the distribution block further comprising wherein an other of the set of fluid inlets is in fluid communication with an other of the set of fluid outlets forming a first buffer fluid path element;
the microfluidic module further comprising wherein an other of the set of fluid inlets is in fluid communication with an other of the set of fluid outlets forming a second buffer fluid path element;
the fluid pathway further comprising a second portion joining the first buffer fluid path element and the second buffer fluid path element in fluid communication forming a buffer fluid pathway; and
wherein a buffer fluid processed through the replaceable and removable fluid pathway module is confined to the buffer fluid pathway during processing.

Embodiment B7: The fluid pathway module of any one of embodiments B1-B6, wherein the distribution block and the microfluidic module each further comprise a releasable securing means adapted to secure the replaceable and removable fluid pathway module to the flow cytometer system.

Embodiment B8: The fluid pathway module of embodiment B7, wherein the releasable securing means comprises one at least one ferrous plate or at least one magnetic plate.

Embodiment B9: The fluid pathway module of embodiment B7 or embodiment B8, wherein the replaceable and removable fluid pathway module is removable from the flow cytometer system by releasing the securing means.

Embodiment B10: The fluid pathway module of any one of embodiments B7-B9, wherein the releasable securing means of the replaceable and removable fluid pathway module is further adapted to secure the replaceable and removable fluid pathway module to a fluid pathway cleaning system.

Embodiment B11: The fluid pathway module of any one of embodiments B1-B10, wherein the sample is a mammalian semen sample.

Embodiment B12: The fluid pathway module of any one of embodiments B1-B11, wherein the flow cytometer system processes the sample to identify a subpopulation in the sample.

Embodiment B13: The fluid pathway module of any one of embodiments B1-B12, wherein the flow cytometer system processes the sample to perform a semen sexing operation.

Embodiment B14: The fluid pathway module of any one of embodiments B1-B13, wherein the fluid pathway module comprises an identifying element.

Embodiment B15: The fluid pathway module of embodiment B14, wherein the identifying element comprises an optical identifying element or a radio identifying element.

Embodiment B16: The fluid pathway module of embodiment B15, wherein the optical identifying element comprises a set of characters or fiducials on a microfluidic chip in the microfluidic module.

Embodiment B17: A microfluidic device cleaning system, the system comprising:
a set of fluid reservoirs;
a pump assembly;
a distribution block interface comprising a distribution block securing element and a distribution block alignment element, the distribution block interface further comprising a set of fluid interfaces, at least one of the set of fluid interfaces in fluid communication with at least one of the set of fluid reservoirs; and
a microfluidic device interface comprising a microfluidic device securing element and a microfluidic device alignment element, the microfluidic device interface further comprising a fluid interface, the fluid interface in fluid communication with at least one of the set of fluid reservoirs;
wherein the microfluidic device cleaning system is adapted to circulate a fluid through a replaceable and removable fluid pathway module secured to the distribution block interface and to the microfluidic device interface.

Embodiment B18: The microfluidic device cleaning system of embodiment B17, wherein the replaceable and removable fluid pathway module is adapted for use in a flow cytometer system and further comprises:
a distribution block comprising a set of fluid inlets and a set of fluid outlets, wherein at least one of the set of fluid inlets is in fluid communication with at least one of the set of fluid outlets forming a first sample pathway element;
a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and
a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming a sample pathway;
wherein a sample processed by the flow cytometer system via the replaceable and removable fluid pathway module is confined to the sample pathway during processing.

Embodiment B19: The microfluidic device cleaning system of embodiment B17 or embodiment B18, wherein the set of fluid reservoirs comprises a cleaning fluid reservoir and a waste fluid reservoir.

Embodiment B20: The microfluidic device cleaning system of any one of embodiments B17-B19, wherein the set of fluid reservoirs are disposed external to a housing of the system.

Embodiment B21: The microfluidic device cleaning system of any one of embodiments B17-B20, wherein the system further comprises a plurality of releasable connections providing fluid connections to the external set of fluid reservoirs.

Embodiment B22: The microfluidic device cleaning system of any one of embodiments B17-B21, wherein the pump assembly comprises a liquid pump and an air pump.

Embodiment B23: The microfluidic device cleaning system of embodiment B22, wherein at least one of the pumps comprises a peristaltic pump.

Embodiment B24: The microfluidic device cleaning system of any one of embodiments B17-B23, wherein the system further comprises a set of valves for controlling fluid flow within the system.

Embodiment B25: The microfluidic device cleaning system of any one of embodiments B17-B24, wherein the system further comprises a set of fluid flow sensors adapted to provide a signal indicating a rate of flow in one or more elements of the system.

Embodiment B26: The microfluidic device cleaning system of any one of embodiments B17-B25, wherein the system further comprises a set of proximity sensors adapted to provide a signal indicating the presence or absence of the replaceable and removable fluid pathway module.

Embodiment B27: The microfluidic device cleaning system of any one of embodiments B17-B26, wherein the system further comprises an imaging device for capturing a set of images of the replaceable and removable fluid pathway module, the distribution block interface, or the microfluidic device interface.

Embodiment B28: The microfluidic device cleaning system of any one of embodiments B17-B27, further comprising a monitoring and interface system, the monitoring and interface system comprising a processor, a memory, and an input/output interface.

Embodiment B29: The microfluidic device cleaning system of embodiment B28, wherein the monitoring and interface system is adapted to receive a set inputs for selecting or configuring a cleaning protocol for the microfluidic device cleaning system.

Embodiment B30: The microfluidic device cleaning system of embodiment B29, wherein the set of inputs comprise a set of user inputs.

Embodiment B31: The microfluidic device cleaning system of embodiment B29 or embodiment B30, wherein the set of inputs are automatically determined based on a property or characteristic of the replaceable and removable fluid pathway module.

Embodiment B32: The microfluidic device cleaning system of any one of embodiments B29-B31, wherein the monitoring and input system is adapted to receive a set of inputs from at least one sensor and alter the cleaning protocol based on the received set of inputs.

Embodiment B33: The microfluidic device cleaning system of any one of embodiments B29-B32, wherein the monitoring and input system is adapted to transmit a set of control signals to one or more valves, actuators, or pumps based on the cleaning protocol.

Embodiment B34: The microfluidic device cleaning system of any one of embodiments B17-B33, further comprising a flow cytometry device.

Embodiment B35: The microfluidic device cleaning system of embodiment B34, wherein the flow cytometry device comprises a fluorescence-based detection and laser ablation flow cytometry device.

Embodiment B36: A method for replacing and cleaning a sample pathway module for a flow cytometry system, the method comprising:
  releasing the sample pathway module from a flow cytometry device, the sample pathway module comprising an entire fluid pathway for processing a sample by the flow cytometry system;
  removing the sample pathway module from the flow cytometry device;
  connecting the sample pathway module to a corresponding receiving portion of a microfluidic device cleaning system;
  configuring a set of cleaning parameters for the microfluidic device cleaning system; and
  automatically cleaning the sample pathway module by the microfluidic device cleaning system based on the set of cleaning parameters.

Embodiment B37: The method of embodiment B36, wherein the sample pathway module is adapted for use in the flow cytometer device and further comprises:
  a distribution block comprising a set of fluid inlets and a set of fluid outlets, wherein at least one of the set of fluid inlets is in fluid communication with at least one of the set of fluid outlets forming a first sample pathway element;
  a microfluidic module comprising a set of fluid inlets, a set of fluid outlets, and a microfluidic device retainer, wherein at least one of the set of fluid inlets is in fluid communication with at least one of the set of fluid outlets forming a second sample pathway element; and
  a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming the fluid pathway;
  wherein a sample processed by the flow cytometer system via sample pathway module is confined to the fluid pathway during processing.

Embodiment B38: The method of embodiment B36 or embodiment B37, further comprising removing the sample pathway module from the microfluidic device cleaning system.

Embodiment B39: The method of any one of embodiments B36-B38, wherein the set of cleaning parameters comprises an amount or volume of cleaning fluid.

Embodiment B40: The method of any one of embodiments B36-B39, wherein the set of cleaning parameters comprises a fluid pressure.

Embodiment B41: The method of any one of embodiments B36-B40, wherein the set of cleaning parameters comprises a cleaning procedure duration.

Embodiment B42: The method of embodiment B41, wherein the cleaning procedure duration comprises a number of swept paths.

Embodiment B43: The method of embodiment B41 or B42, wherein the cleaning procedure duration comprises at least one drying cycle.

Embodiment B44: The method of any one of embodiments B36-B43, further comprising detecting, using an imaging sensor, a blockage in the sample pathway module and halting the automatic cleaning.

Embodiment B45: The method of embodiment B44, wherein the halting the automatic cleaning further comprises providing an error indication.

Embodiment B46: The method of any one of embodiments B36-B45, further comprising measuring, using at least one flow sensor, a volume of fluid used in the automatic cleaning.

Embodiment B47: The method of embodiment B46, wherein the measured volume is used to determine a maintenance event for the microfluidic device cleaning system.

Embodiment B48: The method of any one of embodiments B36-B47, further comprising:
  transmitting a signal from at least one proximity sensor indicating that the sample pathway module is correctly connected to the microfluidic device cleaning system; and
  initiating the automatic cleaning based upon the transmitted signal.

Embodiment B49: The method of any one of embodiments B36-848, wherein the sample pathway module is adapted for use in the flow cytometer device and wherein the entire fluid pathway for processing the sample further comprises:
- a sample pathway comprising a fluid inlet and a fluid outlet, wherein at the fluid inlet is in fluid communication with at the fluid outlet;
- a microfluidic chip comprising a set of fluid inlets and a set of fluid outlets, wherein the set of fluid inlets are in fluid communication with the set of fluid outlets forming at least one microfluidic channel;
- wherein the microfluidic chip is disposed in the sample pathway between the fluid inlet and the fluid outlet of the sample pathway, the at least one microfluidic channel comprising an element of the sample pathway; and
- wherein the sample processed by the flow cytometer device via the sample pathway module is confined to the sample pathway during processing.

Embodiment B50: A fluid pathway module for use in processing fluid samples comprising a plurality of particles, the fluid pathway comprising:
- a sample pathway comprising a fluid inlet and a fluid outlet, wherein at the fluid inlet is in fluid communication with at the fluid outlet;
- a microfluidic chip comprising a set of fluid inlets and a set of fluid outlets, wherein the set of fluid inlets are in fluid communication with the set of fluid outlets forming at least one microfluidic channel;
- wherein the microfluidic chip is disposed in the sample pathway between the fluid inlet and the fluid outlet of the sample pathway, the at least one microfluidic channel comprising an element of the sample pathway; and
- wherein a fluid sample processed by a flow cytometry device via the fluid pathway module is confined to the sample pathway during processing.

Embodiment B51: The fluid pathway module of embodiment B50, further comprising a sheath fluid pathway comprising a fluid inlet and a fluid outlet, wherein at the fluid inlet is in fluid communication with at the fluid outlet.

Embodiment B52: The fluid pathway module of embodiment B51, further comprising wherein the microfluidic chip is disposed in the sheath fluid pathway between the fluid inlet and the fluid outlet of the sheath fluid pathway, the at least one microfluidic channel comprising an element of the sample pathway.

Embodiment B53: The fluid pathway module of any one of embodiments 650-652, wherein the fluid pathway module further comprises:
- a distribution block comprising a set of fluid inlets and a set of fluid outlets, wherein at least one of the set of fluid inlets is in fluid communication with at least one of the set of fluid outlets forming a first sample pathway element;
- a microfluidic module comprising a set of fluid inlets, a set of fluid outlets, and a microfluidic device retainer adapted to retain the microfluidic chip, wherein at least one of the set of fluid inlets is in fluid communication with at least one of the set of fluid outlets forming a second sample pathway element; and
- a fluid pathway providing fluid communication between the set of fluid outlets of the distribution block and the set of fluid inlets of the microfluidic module, wherein a portion of the fluid pathway joins the first sample pathway element and the second sample pathway element in fluid communication forming the sample pathway.

Embodiment B54: The fluid pathway module of embodiment B53, wherein the distribution block comprises a fluidic manifold.

Embodiment B55: The fluid pathway module of embodiment B53 and embodiment B54, wherein the distribution block further comprises a sample tube loader.

Embodiment B56: The fluid pathway module of any one of embodiments B50-B55, further comprising a releasable securing means adapted to secure the fluid pathway module to the flow cytometer system.

Embodiment B57: The fluid pathway module of embodiment B56, wherein the releasable securing means comprises one at least one ferrous plate or at least one magnetic plate.

Embodiment B58: The fluid pathway module of embodiment B56 or embodiment B57, wherein the fluid pathway module is removable from the flow cytometer system by releasing the securing means.

Embodiment B59: The fluid pathway module of any one of embodiments B56-B58, wherein the releasable securing means of the replaceable and removable fluid pathway module is further adapted to secure the replaceable and removable fluid pathway module to a fluid pathway cleaning system.

Embodiment B60: The fluid pathway module of any one of embodiments B50-B59, wherein the fluid sample is a mammalian semen sample comprising a plurality of sperm cells.

Embodiment B61: The fluid pathway module of any one of embodiments B50-B60, wherein the flow cytometer system processes the sample to identify a subpopulation in the fluid sample.

Embodiment B62: The fluid pathway module of any one of embodiments B50-B61, wherein the flow cytometer system processes the sample to perform a semen sexing operation.

Embodiment B63: The fluid pathway module of any one of embodiments B50-B62, wherein the fluid pathway module comprises an identifying element.

Embodiment B64: The fluid pathway module of embodiment B63, wherein the identifying element comprises an optical identifying element or a radio identifying element.

Embodiment B65: The fluid pathway module of embodiment B64, wherein the optical identifying element comprises a set of characters or fiducials on a microfluidic chip in the microfluidic module.

Embodiment Set C

Embodiment C1: A laser-based flow cytometry system for particle detection adapted to discriminate between particles in a sample stream flowing in a channel of the flow cytometry system, the system comprising:
- a laser assembly comprising:
- a kill laser assembly; and
- a detection laser assembly;
- wherein the kill laser assembly and the detection laser assembly are disposed on a common side with respect to each other and relative to the flow cytometry system.

Embodiment C2: The system of embodiment C1, wherein the flow cytometry system comprises a microfluidic device.

Embodiment C3: The system of embodiment C2, wherein the microfluidic device is a microfluidic chip.

Embodiment C4: The system of embodiment C2 or embodiment C3, wherein the kill laser assembly and the detection laser assembly are each disposed on a common side relative to a primary surface of the microfluidic device.

Embodiment C5: The system of embodiment C4, wherein the primary surface is a top surface or a bottom surface.

Embodiment C6: The system of any one of embodiments C1-C5, wherein the laser assembly further comprises a polarizing beam splitter.

Embodiment C7: The system of any one of embodiments C1-C6, wherein each of the kill laser assembly and the detection laser assembly comprises an optical pathway adapted to direct an electromagnetic radiation emission to a focal plane.

Embodiment C8: The system of embodiment C7, wherein the optical pathway of the kill laser assembly comprises a fast-axis beam expander and a slow-axis beam expander.

Embodiment C9: The system of embodiment C8, wherein the fast-axis beam expander and the slow-axis beam expander of the optical pathway for the kill laser assembly are adapted to provide for adjustment of a fast-axis beam width and a slow-axis beam width for the kill laser assembly.

Embodiment C10: The system of any one of embodiments C7-C9, wherein the optical pathway for the detection laser assembly comprises a pair of cylindrical lenses adapted to provide for adjustment of a fast-axis beam width and a slow-axis beam width for the detection laser assembly.

Embodiment C11: The system of any one of embodiments C1-C10, wherein the kill laser assembly and the detection laser assembly are each adapted to emit a laser beam comprising an elliptical beam profile at a focal plane.

Embodiment C12: The system of embodiment C11, wherein the elliptical beam profile of the kill laser assembly comprises a fast-axis beam width of 3.45-5 μm and a slow-axis beam width of 5-35 μm at the focal plane or at a beam waist.

Embodiment C13: The system of embodiment C11 or embodiment C12, wherein the elliptical beam profile of the detection laser assembly comprises a fast-axis beam width of 3.5-20 μm and a slow-axis beam width of 30-150 μm at the focal plane or at a beam waist.

Embodiment C14: The system of any one of embodiments C1-C13, wherein the kill laser assembly operates at a pulse energy of 1-5 μJ.

Embodiment C15: The system of any one of embodiments C1-C14, wherein the kill laser assembly comprises a pulse laser module with a pulse duration of 1-500 nanoseconds.

Embodiment C16: The system of any one of embodiments C1-C15, wherein the detection laser assembly comprises one of a continuous wave laser module or a quasi-continuous wave laser module.

Embodiment C17: The system of any one of embodiments C1-C16, wherein the system further comprises a detection assembly.

Embodiment C18: The system of embodiment C17, wherein the detection assembly is adapted to detect one or more of a fluorescence of a particle excited by an emission from the detection laser assembly, a deactivation of a particle by an emission from the kill laser assembly, an image of a detection event, or an image of a kill event.

Embodiment C19: The system of embodiment C17 embodiment C18, wherein the detection assembly comprises at least one avalanche photodiode.

Embodiment C20: The system of embodiment C19, wherein the at least one avalanche photodiode is adapted to detect a fluorescence of a particle excited by an emission from the detection laser assembly.

Embodiment C21: The system of embodiment C19 or embodiment C20, wherein the at least one avalanche photodiode is adapted to detect a deactivation of a particle by an emission from the kill laser assembly.

Embodiment C22: The system of any one of embodiments C17-C21, wherein the detection assembly comprises a CCD camera.

Embodiment C23: The system of embodiment C22, wherein the CCD camera is adapted to capture an image of a detection event.

Embodiment C24: The system of embodiment C22 or embodiment C23, wherein the CCD camera is adapted to capture an image of a kill event.

Embodiment C25: A laser assembly for use in a flow cytometry system adapted to discriminate between particles in a sample stream flowing in a channel of the flow cytometry system, the laser assembly comprising:
a laser module; and
an optical pathway;
wherein the optical pathway is adapted to shape an electromagnetic radiation beam emission from the laser module into an elliptical profile at a focal plane.

Embodiment C26: The assembly of embodiment C25, wherein the laser assembly is one of a detection laser assembly and a kill laser assembly.

Embodiment C27: The assembly of embodiment C26, wherein the optical pathway of the kill laser assembly comprises a fast-axis beam expander and a slow-axis beam expander.

Embodiment C28: The assembly of embodiment C27, wherein the fast-axis beam expander is adapted to provide for adjustment of a fast-axis beam width for the beam emission, and the slow-axis beam expander is adapted to provide for adjustment of a slow-axis beam width for the beam emission.

Embodiment C29: The assembly of any one of embodiments C26-C28, wherein the optical pathway for the detection laser assembly comprises a pair of cylindrical lenses adapted to provide for shaping and adjustment of a slow-axis beam width and a fast-axis beam width for the beam emission.

Embodiment C30: The assembly of any one of embodiments C25-C29, wherein the elliptical beam profile of the laser assembly has a fast-axis beam width of 3.45-5 μm and a slow-axis beam width of 5-35 μm.

Embodiment C31: The assembly of any one of embodiments C25-C30, wherein the elliptical beam profile of the laser assembly has a fast-axis beam width of 3.5-20 μm and a slow-axis beam width of 30-150 μm.

Embodiment C32: The assembly of any one of embodiments C25-C31, wherein the laser module operates at a pulse energy of 1-5 μJ.

Embodiment C33: The assembly of any one of embodiments C25-C32, wherein the laser module comprises a pulse laser with a pulse duration of 1 to 500 nanoseconds.

Embodiment C34: The assembly of any one of embodiments C25-C33, wherein the laser module comprises one of a continuous wave laser module or a quasi-continuous wave laser module.

Embodiment C35: The assembly of any one of embodiments C25-C34, wherein the optical pathway comprises a pair of cylindrical lenses.

Embodiment C36: The assembly of embodiment C35, wherein the positioning of the pair of cylindrical lenses is adjustable.

Embodiment C37: The assembly of embodiment C35 or embodiment C36, wherein the pair of cylindrical lenses comprises an F25 cylindrical lens and an F150 cylindrical lens.

Embodiment C38: The assembly of any one of embodiments C25-C37, wherein the optical pathway comprises an aspheric lens.

Embodiment C39: The assembly of any one of embodiments C25-C38, wherein the optical pathway comprises a polarizing beam splitter.

Embodiment C40: The assembly of any one of embodiments C25-C39, wherein the optical pathway comprises a harmonic separator.

Embodiment C41: An optical pathway for a laser assembly for use in a flow cytometry system adapted to discriminate between particles in a sample stream flowing in a channel of the flow cytometry system, the optical pathway comprising:
- a fast-axis beam expander;
- a slow-axis-beam expander; and
- a polarizing beam splitter;
- wherein the fast-axis beam expander and the slow-axis beam expander are adapted to shape an emission of electromagnetic radiation beam emission from a laser module into an elliptical beam profile at a focal plane.

Embodiment C42: The pathway of embodiment C41, wherein the fast-axis beam expander is adapted to provide for adjustment of a fast-axis beam width for the beam emission.

Embodiment C43: The pathway of embodiment C41 or embodiment C42, wherein the slow-axis beam expander is adapted to provide for adjustment of a slow-axis beam width for the beam emission.

Embodiment C44: The pathway of any one of embodiments C41-C43, wherein the elliptical beam profile has a fast-axis beam width of 3.45-5 μm and a slow-axis beam width of 5-35 μm.

Embodiment C45: The pathway of any one of embodiments C41-C44, wherein the elliptical beam profile has a fast-axis beam width of 3.5-20 μm and a slow-axis beam width of 30-150 μm.

Embodiment C46: The pathway of any one of embodiments C41-C45, wherein the laser module operates at a pulse energy of 1-5 μJ.

Embodiment C47: The pathway of any one of embodiments C41-C46, wherein the laser module comprises a pulse laser module with a pulse duration of 1 to 500 nanoseconds.

Embodiment C48: The pathway of any one of embodiments C41-C47, wherein the laser module comprises one of a continuous wave laser module or a quasi-continuous wave laser module.

Embodiment C49: The pathway of any one of embodiments C41-C48, wherein the optical pathway comprises a pair of cylindrical lenses.

Embodiment C50: The pathway of embodiment C49, wherein the positioning of the pair of cylindrical lenses is adjustable.

Embodiment C51: The pathway of embodiment C49 or embodiment C50, wherein the pair of cylindrical lenses comprises an F25 cylindrical lens and an F150 cylindrical lens.

Embodiment C52: The pathway of any one of embodiments C41-C51, wherein the optical pathway further comprises an aspheric lens.

Embodiment C53: The pathway of any one of embodiments C41-C52, wherein the optical pathway further comprises a polarizing beam splitter.

Embodiment C54: The pathway of any one of embodiments C41-C53, wherein the optical pathway further comprises a harmonic separator.

Embodiment C55: A sexed non-human mammalian semen product, the product comprising:
- a collection of sexed, non-human mammalian sperm cells derived from a sample of un-sexed, non-human semen, the un-sexed, non-human semen having been sexed by a sexing process comprising:
  - dying the sample of un-sexed, non-human semen;
  - inserting the dyed sample of un-sexed, non-human semen into a flow cytometry device;
  - inserting a sheath fluid into the flow cytometry device, wherein the sheath fluid and a channel in the flow cytometry device orient and position cells of the sample of un-sexed, non-human semen;
  - fluorescing the dye in the dyed sample of un-sexed, non-human semen by an emission a first laser module, wherein the emission from the first laser module comprises an elliptical beam profile;
  - detected a fluorescence of for each sperm cell in the dyed sample of un-sexed, non-human semen by a detector;
  - deactivating a subset of the non-human semen by an emission from a second laser module based on the detected fluorescence to create sexed non-human semen, wherein the emission from the second laser module comprises an elliptical beam profile, and wherein the first laser module and the second laser module are disposed on a common side of the flow cytometry device, the common side being a side opposite to the detector; and
  - collecting the sexed non-human semen.

Embodiment C56: A method for sexing non-human mammalian semen, the method comprising:
- dying a sample of un-sexed, non-human semen;
- inserting the dyed sample of un-sexed, non-human semen into a flow cytometry device;
- inserting a sheath fluid into the flow cytometry device, wherein the sheath fluid and a channel in the flow cytometry device orient and position cells in the sample of un-sexed, non-human semen;
- fluorescing the dye in the dyed sample of un-sexed, non-human semen by an emission a first laser module, wherein the emission from the first laser module comprises an elliptical beam profile;
- detecting a fluorescence of for each sperm cell in the dyed sample of un-sexed, non-human semen by a detector;
- deactivating a subset of the non-human semen by an emission from a second laser module based on the detected fluorescence to create sexed non-human semen, wherein the emission from the second laser module comprises an elliptical beam profile, and wherein the first laser module and the second laser module are disposed on a common side of the flow cytometry device, the common side being a side opposite to the detector; and
- collecting the sexed non-human semen.

Embodiment Set D

Embodiment D1: A particle processing system, the system comprising:
- a flow cytometry assembly for processing particles or components in a sample based on at least one characteristic; and
- an automatic sample mixing system configured to automatically mix the sample processed by the flow cytometry assembly based on a set of defined parameters, wherein the automatic sample mixing system rotates about a pivot so as to move in an arcuate path, which allows for mixing of the sample in a uniform and controlled motion.

Embodiment D2: The particle processing system of embodiment D1, wherein the flow cytometry assembly comprises a microfluidic chip.

Embodiment D3: The particle processing system of embodiment D1 or embodiment D2, wherein the sample is a semen sample and the particles or components are sperm cells.

Embodiment D4: The particle processing system of any one of embodiments D1-D3, wherein the at least one desired characteristic is an amount or type of DNA.

Embodiment D5: The particle processing system of any one of embodiments D1-D4, wherein the automatic sample mixing system further comprises:
- a rotary base;
- a set of collection tube holders disposed on top of the rotary base; and
- a set of collection tubes, each tube configured to be disposed in a collection tube holder of the set of collection tubes.

Embodiment D6: The particle processing system of embodiment D5, wherein the automatic sample mixing system further comprises a fluid level sensor.

Embodiment D7: The particle processing system of embodiment D6, wherein the automatic sample mixing system is configured to switch between a first tube and a second tube in the set of collection tubes when the fluid level sensor detects that the first tube has reached a desired fill level.

Embodiment D8: The particle processing system of any one of embodiments D1-D7, wherein the set of defined parameters comprises one or more of a mixing arc defined in degrees, a mixing arc defined in steps, and a rotational speed.

Embodiment D9: The particle processing system of any one of embodiments D1-D8, wherein the system further comprises a mechanical diverter configured to prevent an output stream comprising the processed sample from the flow cytometer from entering the automated sample mixing system.

Embodiment D10: The particle processing system of any one of embodiments D1-D9, wherein the components or particles of the sample comprise components or particles infused with a dye.

Embodiment D11: A sexed, non-human semen product comprising the sample processed by the flow cytometry assembly and mixed by the automatic sample mixing system according to embodiment D1.

Embodiment D12: A particle processing system, the system comprising:
- a flow cytometry assembly for processing particles or components in a sample based on at least one characteristic; and
- a mechanical diverter configured to prevent an output stream comprising the processed sample from the flow cytometer from entering a sample collection container based on a set of defined parameters.

Embodiment D13: The particle processing system of embodiment D12, wherein the flow cytometry assembly comprises a microfluidic chip.

Embodiment D14: The particle processing system of embodiment D12 or embodiment D13, wherein the sample is a semen sample and the particles or components are sperm cells.

Embodiment D15: The particle processing system of any one of embodiments D12-D14, wherein the at least one desired characteristic is an amount or type of DNA.

Embodiment D16: The particle processing system of any one of embodiments D12-D15, further comprising an automatic sample mixing system configured to automatically mix the sample processed by the flow cytometry assembly and collected in the sample collection container based on a set of defined parameters.

Embodiment D17: The particle processing system of embodiment D16, wherein the mechanical diverter is configured to prevent the output stream comprising the processed sample from the flow cytometer from entering the automated sample mixing system.

Embodiment D18: The particle processing system of embodiment D16 or embodiment D17, wherein the automatic sample mixing system further comprises:
- a rotary base;
- a set of collection tube holders disposed on top of the rotary base; and
- a set of collection tubes, each tube configured to be disposed in a collection tube holder of the set of collection tubes.

Embodiment D19: The particle processing system of embodiment D17 or embodiment D18, wherein the automatic sample mixing system further comprises a fluid level sensor.

Embodiment D20: The particle processing system of embodiment D18 or embodiment 019, wherein the automatic sample mixing system is configured to switch between a first tube and a second tube in the set of collection tubes when the fluid level sensor detects that the first tube has reached a desired fill level.

Embodiment D21: The particle processing system of any one of embodiments D16-D20, wherein the set of defined parameters for the automatic sample mixing system comprises one or more of a mixing arc defined in degrees, a mixing arc defined in steps, and a rotational speed.

Embodiment D22: The particle processing system of any one of embodiments D12-D21, wherein the set of defined parameters for the mechanical diverter comprise one or more of a purity of the sample, a number of particles in the sample, and a fill level of a collection container.

Embodiment D23: The particle processing system of any one of embodiments 012-D22, wherein the components or particles of the sample comprise components or particles infused with a dye.

Embodiment D24: A sexed, non-human semen product comprising the sample processed by the flow cytometry assembly according to any one of embodiments 012-D23.

Embodiment D25: A method for producing a sexed, non-human semen product, the method comprising:
- processing a semen sample in a flow cytometry apparatus to select a first sub-population of the sample comprising at least one desirable characteristic from a second sub-population of the sample comprising at least one non-desirable characteristic;
- collecting the sample primarily comprising the first sub-population comprising the at least one desirable characteristic in a sample collection container; and
- automatically mixing the collected sample in the sample collection container using a sample mixing system based on a set of defined sample mixing parameters associated with the processed sample, wherein the sample mixing system rotates about a pivot so as to move in an arcuate path, which allows for mixing of the sample in a uniform and controlled motion.

Embodiment D26: The method of embodiment D25, wherein the method further comprises mechanically diverting a portion of the processed sample from being collected in the sample collection container after the processed sample has exited the flow cytometry apparatus.

Embodiment D27: The method of embodiment D25 or embodiment D26, wherein the flow cytometry apparatus is a microfluidic chip.

Embodiment D28: The method of any one of embodiments D25-D27, wherein the at least one desirable characteristic is an amount or type of DNA.

Embodiment D29: The method of embodiment D28, wherein the amount or type of DNA is a detected presence of a X chromosome bearing DNA or Y chromosome bearing DNA.

Embodiment D30: The method of any one of embodiments D25-D29, wherein the automatic sample mixing system further comprises:
 a rotary base;
 a set of collection tube holders disposed on top of the rotary base; and
 a set of collection tubes, each tube configured to be disposed in a collection tube holder of the set of collection tubes.

Embodiment D31: The method of embodiment D30, wherein the automatic sample mixing system further comprises a fluid level sensor.

Embodiment D32: The method of embodiment D31, further comprising switching between a first tube and a second tube in the set of collection tubes when the fluid level sensor detects that the first tube has reached a desired fill level.

Embodiment D33: The method of embodiment D32, wherein the set of defined parameters for the automatic sample mixing system comprises one or more of a mixing arc defined in degrees, a mixing arc defined in steps, and a rotational speed.

Embodiment D34: The method of any one of embodiments D26-D33, wherein the mechanically diverting comprises diverting based on one or more defined parameters comprising a purity of the sample, a number of particles in the sample, and a fill level of a collection container.

Embodiment D35: The method of any one of embodiments D25-D34, wherein the semen sample comprises sperms cells infused with a dye.

Embodiment D36: A sexed, non-human semen product comprising the sample processed by the flow cytometry apparatus according to the method of any one of embodiments D25-D35.

Embodiment D37: A sample mixing system comprising:
 a rotary base;
 a plurality of collection tube holders disposed on top of the rotary base; and
 a plurality of collection tubes, each tube configured to be disposed in a collection tube holder of the plurality of collection tubes;
 wherein the rotary base is configured to rotate such that the collection tube holders and collection tubes disposed therein revolve or move in an arcuate path, wherein contents in the collection tubes are mixed by said motion.

Embodiment D38: The sample mixing system of embodiment D37, wherein the rotary base is operatively coupled to a motor that rotates said rotary base about its central axis, wherein the rotary base is rotated based on one or more of a mixing arc defined in degrees, a mixing arc defined in steps, and a rotational speed.

Embodiment D39: The sample mixing system of embodiment D38, wherein the rotary base rotates back and forth.

Embodiment D40: The sample mixing system of embodiment D39, wherein a degree of rotation of the rotary base ranges from 10° to 180°.

Embodiment D41: The sample mixing system of any one of embodiments D37-D40, wherein the rotary base is a circular plate.

Embodiment D42: The sample mixing system of any one of embodiments D37-041, wherein the rotary base contains magnets that are positioned separately from each other.

Embodiment D43: The sample mixing system of embodiment D42, further comprising one or more Hall effect sensors, wherein one of the magnets in the rotary base has its south pole oriented towards the one or more Hall effect sensors and the other magnets are oriented with their north pole directed toward the one or more Hall effect sensors.

Embodiment D44: The sample mixing system of embodiment D42 or embodiment D43, wherein a base of each collection tube holder contains a magnet, wherein each collection tube holder is attached to the rotary base by magnetic attraction between the magnet of said collection tube holder and one of the magnets of the rotary base.

Embodiment D45: The sample mixing system of embodiment D44, wherein the collection tube holder comprises two or more arms projecting upwardly from the base, wherein the two or more arms hold the collection tubes upright.

Embodiment D46: The sample mixing system of embodiment D45, wherein the collection tube holder comprises two or more arms are expansible to accommodate various sizes of collection tubes.

Embodiment D47: The sample mixing system of any one of embodiments D37-D46, comprising about 2 to 6 collection tube holders.

Embodiment D48: The sample mixing system of any one of embodiments D37-D47, comprising 2 collection tube holders positioned 180° apart, or 4 collection tube holders positioned 90° apart, or 6 collection tube holders positioned 60° apart.

Embodiment D49: The sample mixing system of any one of embodiments D37-D48, wherein a volume capacity of the collection tubes ranges from about 50 mi to about 300 ml.

Embodiment D50: The sample mixing system of any one of embodiments D37-D49, wherein a diameter of the collection tubes ranges from about 100 mm to about 200 mm.

Embodiment D51: The sample mixing system of any one of embodiments D37-D50, wherein the system is positioned under a dispensing instrument such that the dispensing instrument dispenses a sample into one of the collection tubes, wherein the collection tube that is receiving the sample remains under a dispensing path of the dispensing instrument as said collection tube moves in the arcuate path to mix the sample.

Embodiment D52: The sample mixing system of embodiment 051, wherein the sample comprises sperm cells and the collection tubes contain media.

Embodiment D53: The sample mixing system of embodiment D51 or embodiment D52, wherein the media comprises buffered media, wherein mixing maintains buffering and controls a degree of buffering.

Embodiment D54: The sample mixing system of any one of embodiments D51-D53, wherein after mixing the sample in the one collection tube for a period of time, the system automatically places another collection tube under the dispensing instrument such that the sample is dispensed into said collection tube.

Embodiment D55: The sample mixing system of any one of embodiments D37-D54, further comprising a sensor for detecting a liquid level inside the collection tube, wherein the sensor is positioned at or near an outer surface of the collection tube.

Embodiment D56: The sample mixing system of any one of embodiments D37-D55, further comprising an auto dump, wherein the auto dump is configured to prevent flow from entering the collection tube.

Embodiment D57: A method of mixing a sorted sample, the method comprising:

providing the sample mixing system of any one of embodiments D37-D56;

collecting the sorted sample into a collection tube of the sample mixing system; and automatically mixing the collected sample in the collection tube by rotating the rotary base such that the collection tube disposed in the collection tube holder revolves or moves in an arcuate path, wherein the collected sample is mixed in a uniform and controlled motion.

Embodiment D58: The method of embodiment D57 further comprising:

diverting a flow of the sorted sample from the collection tube to a separate collector when the collection tube is filled to desired level;

rotating the rotary base such that a second collection tube is positioned to collect the sorted sample; and diverting the flow of the sorted sample to the second collection tube.

As used herein, "about" refers to plus or minus 10% of the referenced number.

Reference numbers recited in the below claims are solely for ease of examination of this patent application, and are exemplary, and are not intended in any way to limit the scope of the claims to the particular features having the corresponding reference numbers in the figures. In some embodiments, the figures presented in this patent application are drawn to scale, including the angles, ratios of dimensions, etc. In some embodiments, the figures are representative only and the claims are not limited by the dimensions of the figures.

In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A modular flow cytometry system for processing a sample, the system comprising:
   a. a chassis sectioned into a plurality of levels;
   b. an electronics module, wherein the electronics module is disposed in the first level of the chassis, the first level being the lowest of the plurality of levels, wherein the electronics module includes one or more computer processors and a plurality of electronic ports;
   c. a sample pathway module, wherein the sample pathway module is disposed in the second level of the chassis, wherein the sample pathway module includes a microfluidic module for holding a microfluidic chip;
   d. a fluidics module, wherein the fluidics module is disposed in the second level of the chassis, wherein the fluidics module is fluidically coupled to the sample pathway module for circulating one or more fluids through the sample pathway module;
   e. an interrogation module, wherein the interrogation module is disposed in the third level of the chassis and operatively coupled to the electronics module, the interrogation module including a detection laser operatively coupled to a detection assembly, and a kill laser operatively coupled to the detection assembly for processing a sample flowing through the microfluidic chip, wherein the kill laser and the detection laser are disposed on a common side of the interrogation module with respect to each other; and
   f. a sample mixing and collection module, wherein the sample mixing and collection module is disposed below the microfluidic module in the same second level of the chassis, wherein the sample mixing and collection module is configured to collect and automatically mix the processed sample exiting the microfluidic chip, wherein the sample mixing and collection module rotates about a pivot so as to move in an arcuate path, which allows for mixing of the sample in a uniform and controlled motion;
   wherein each module is configured to be separately removed and re-installed or replaced with another of the same module for near-continuous operation of the modular flow cytometry system.

2. The system of claim 1, wherein the sample pathway module further comprises a distribution block fluidically coupled to the microfluidic module, wherein the distribution block delivers the sample to the microfluidic module via a first fluidic line, and a sheath fluid to the microfluidic module via a second fluidic line.

3. The system of claim 2, further comprising a microfluidic device cleaning module for cleaning the sample pathway module, comprising:
   a. a set of fluid reservoirs;
   b. a pump assembly;
   c. a distribution block interface comprising a distribution block securing element and a distribution block alignment element, the distribution block interface further comprising a set of fluid interfaces, at least one of the set of fluid interfaces in fluid communication with at least one of the set of fluid reservoirs; and
   d. a microfluidic device interface comprising a microfluidic device securing element and a microfluidic device alignment element, the microfluidic device interface further comprising a fluid interface, the fluid interface in fluid communication with at least one of the set of fluid reservoirs;

wherein the distribution block interface is adapted to secure the distribution block thereon, wherein the microfluidic device interface is adapted to secure the microfluidic module thereon, and wherein the microfluidic device cleaning system is adapted to clean the sample pathway module circulating a fluid through the sample pathway module.

4. The system of claim 1, wherein the microfluidic chip includes one or more identifying elements disposed on a surface or etched into said surface of the microfluidic chip, wherein the one or more identifying elements are used for identifying the chip that is currently loaded in the microfluidic module, and for automatically aligning and positioning the microfluidic chip relative to the detection and kill lasers.

5. The system of claim 4, wherein the microfluidic chip with the identifying elements is mounted onto a multi-axis stage that readjusts the position of the microfluidic chip using the identifying elements.

6. The system of claim 1, wherein the sample pathway module is configured to process particles or components in a sample based on at least one characteristic, and wherein the sample mixing and collection module is configured to automatically mix the sample processed by the sample pathway module based on a set of defined parameters.

7. The system of claim 5, wherein the sample mixing and collection module further comprises:
 a. a rotary base;
 b. a set of collection tube holders disposed on top of the rotary base; and
 c. a set of collection tubes, each tube configured to be disposed in a collection tube holder of the set of collection tubes.

8. The system of claim 7, wherein the sample mixing and collection module further comprises a fluid level sensor, and wherein the sample mixing and collection module is configured to switch between a first tube and a second tube in the set of collection tubes when the fluid level sensor detects that the first tube has reached a desired fill level.

\* \* \* \* \*